US008457469B2

(12) United States Patent
Suzuki

(10) Patent No.: US 8,457,469 B2
(45) Date of Patent: Jun. 4, 2013

(54) DISPLAY CONTROL DEVICE, DISPLAY CONTROL METHOD, AND PROGRAM

(75) Inventor: Hirotaka Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 13/000,803

(22) PCT Filed: Apr. 22, 2010

(86) PCT No.: PCT/JP2010/057129
§ 371 (c)(1),
(2), (4) Date: Dec. 22, 2010

(87) PCT Pub. No.: WO2010/125962
PCT Pub. Date: Nov. 4, 2010

(65) Prior Publication Data
US 2012/0033933 A1    Feb. 9, 2012

(30) Foreign Application Priority Data

Apr. 30, 2009  (JP) .................................. 2009-110292
Dec. 4, 2009   (JP) .................................. 2009-277055

(51) Int. Cl.
*H04N 9/80* (2006.01)
(52) U.S. Cl.
USPC .......................................... 386/239; 386/241
(58) Field of Classification Search
None
See application file for complete search history.

(56) References Cited

U.S. PATENT DOCUMENTS

| 7,346,920 | B2* | 3/2008 | Lamkin et al. ................ 725/112 |
| 7,594,177 | B2* | 9/2009 | Jojic et al. .................... 715/720 |
| 8,209,623 | B2* | 6/2012 | Barletta et al. ................ 715/776 |
| 2001/0016108 | A1 | 8/2001 | Itoh et al. |
| 2002/0164078 | A1 | 11/2002 | Uehara et al. |
| 2002/0197060 | A1 | 12/2002 | Itoh et al. |
| 2005/0285937 | A1 | 12/2005 | Porikli |
| 2007/0223878 | A1* | 9/2007 | Abe et al. ....................... 386/95 |
| 2008/0031586 | A1 | 2/2008 | Itoh et al. |

FOREIGN PATENT DOCUMENTS

| JP | 10-93925 | 4/1998 |
| JP | 2000-11093 | 1/2000 |
| JP | 2000-299829 | 10/2000 |
| JP | 2002-288219 | 10/2002 |
| JP | 2006-12174 | 1/2006 |
| JP | 2008-153920 | 7/2008 |
| JP | 2008-185626 | 8/2008 |
| JP | 2008-312183 | 12/2008 |
| JP | 2009-47721 | 3/2009 |

\* cited by examiner

*Primary Examiner* — William Vaughn
*Assistant Examiner* — Gelek W Topgyal
(74) *Attorney, Agent, or Firm* — Finnegan, Henderson, Farabow, Garrett & Dunner, LLP

(57) ABSTRACT

The present invention relates to a display control device, a display method, and a program, whereby a new thumbnail method can be provided.
A clustering unit 611 subjects each frame of a content to clustering into any cluster of a plurality of clusters, and a scene classifying unit 612 classifies, regarding each of a plurality of clusters, a frame belonging to a cluster into a scene that is a group of one or more frames that temporally continue. A thumbnail creating unit 613 creates the thumbnail of a scene, and a display control unit 614 displays the thumbnail thereof on a display device 603.

17 Claims, 68 Drawing Sheets

2-PANE DISPLAY  THUMBNAIL

5-PANE DISPLAY

DISPLAY CONTROL DEVICE, DISPLAY CONTROL METHOD, AND PROGRAM

TECHNICAL FIELD

The present invention relates to a display control device, a display control method, and a program, and specifically relates to a display control device, a display control method, and a program, whereby the outline of a content can readily be recognized, for example.

BACKGROUND ART

In recent years, a great number contents, i.e., moving images, have been distributed at Internet sites such as YouTube and so forth, for example, besides content distributed by television broadcasting. Therefore, the importance of a technique enabling users to readily recognize the outline of (what is in) contents, so that a user who views and listens to contents can determine whether or not each content is worth viewing and listening to, has grown.

As for a technique for recognizing the outline of a content, there is a method for displaying the thumbnail of the content.

As for a method for displaying the thumbnail of a content, for example, there is a method for detecting a predetermined frame such as a frame for every fixed interval or the like, of an image of the content, generating a thumbnail by reducing the frame thereof, and displaying this.

Also, as for a method for displaying the thumbnail of a content, for example, there is a method for detecting switching between a commercial and the actual program (program listed in the TV section of a newspaper), switching between a person or object in an image, or the like as a scene change, generating a thumbnail by reducing the frame immediately after the scene change thereof, and displaying this (e.g., see PTL 1).

Further, as for a method for displaying the thumbnail of a content, there is a method for generating a thumbnail by reducing an image representing, in increments of titles, the title (content) thereof, and displaying this (e.g., see PTL 2).

Note that, with the method for displaying the thumbnail of a frame for every fixed interval of the image of a content, similar thumbnail images may consecutively be displayed.

Also, with the method for detecting as a scene change, and displaying the thumbnail of a frame immediately after the scene change thereof, there is a need to prepare for an algorithm for detecting, for each scene change to be detected, the scene change thereof.

Specifically, for example, in order to detect switching between a commercial and the actual program as a scene change, there is a need to prepare for a scene change detecting algorithm to that end, and in order to detect switching between a person and an object in an image as a scene change, there is also a need to prepare for a scene change detecting algorithm to that end.

Further, with the method for displaying a thumbnail in increments of titles, it may be difficult to recognize the outline of a content just by the thumbnail in increments of titles.

CITATION LIST

Patent Literature

PTL 1: Japanese Unexamined Patent Application Publication No. 2008-312183

PTL 2: Japanese Unexamined Patent Application Publication No. 2009-047721

SUMMARY OF INVENTION

Technical Problem

As described above, as for a method for displaying a thumbnail, various types of methods have been proposed, but in view of further increase of contents to be provided hereafter being expected, there has been demand for proposal of a new thumbnail display method.

The present invention has been made in light of such a situation, and provides a new thumbnail display method, thereby enabling the outline of a content to be readily recognized.

Solution to Problem

A display control device or program according to an aspect of the present invention is a display control device or a program causing a computer to serve as a display control device including: clustering means configured to subject each frame of a content to clustering into any of a plurality of clusters; scene classifying means configured to classify, regarding each of the plurality of clusters, a frame belonging to the cluster into a scene that is a group of one or more frames that temporally continue; thumbnail creating means configured to create the thumbnail of the scene; and display control means configured to display the thumbnail of the scene on a display device configured to display an image.

A display control method according to an aspect of the present invention is a display control method including the steps of, with a display control device: subjecting each frame of a content to clustering into any of a plurality of clusters; sectioning, regarding each of the plurality of clusters, a frame belonging to the cluster into a scene that is a group of one or more frames that temporally continue; creating the thumbnail of the scene; and displaying the thumbnail of the scene on a display device for displaying an image.

With an aspect of the present invention, each frame of a content is subjected to clustering into any of a plurality of clusters, and regarding each of the plurality of clusters, a frame belonging to the cluster is classified into a scene that is a group of one or more frames that temporally continue. Subsequently, the thumbnail of the scene is created, and the thumbnail of the scene is displayed.

Note that the display control device may be a stand-alone device, or may be an internal block making up a single device.

Also, the program may be provided by being transmitted via a transmission medium or by being recorded in a recording medium.

Advantageous Effects of Invention

According to an aspect the present invention, the outline of a content can readily be recognized.

DESCRIPTION OF EMBODIMENTS

Information Processing Device for Highlight Scenes

Figure 1:
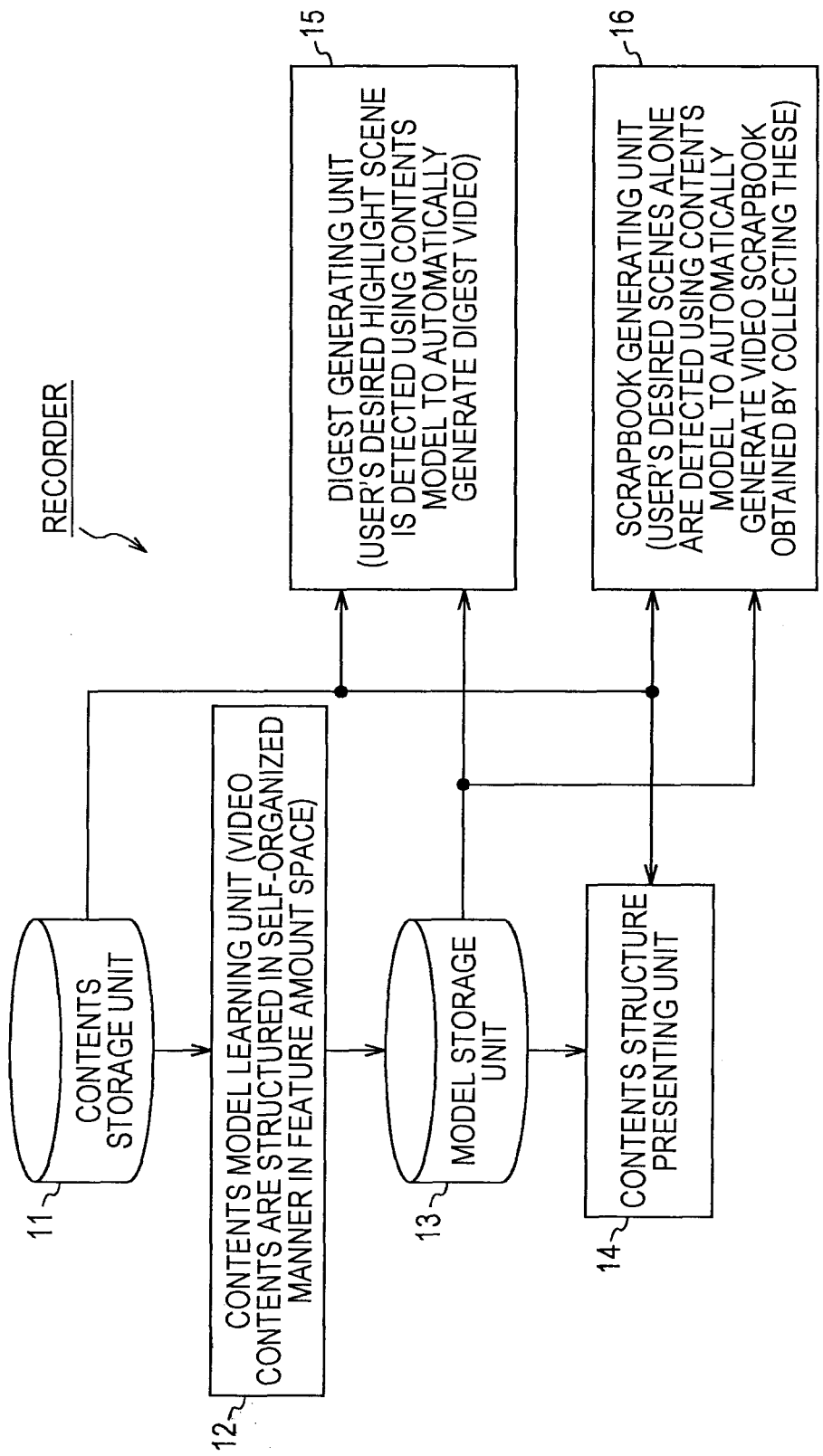
FIG. 1 is a block diagram illustrating a configuration example of an embodiment of a recorder to which the present invention has been applied.

First, description will be made regarding an information processing device for highlight scenes, which enables a digest, in which scenes in which a user has an interest are collected as highlight scenes, to be readily obtained.

For example, as for a highlight scene detection technique for detecting a highlight scene from a content such as a movie, a television broadcast program, or the like, there is a technique taking advantage of the experience and knowledge of an expert (designer), a technique taking advantage of statistical learning using learning samples, and so forth.

With the technique taking advantage of the experience and knowledge of an expert, a detector for detecting an event that occurs in a highlight scene, and a detector for detecting a scene defined from the event thereof (scene where an event occurs) are designed based on the experience and knowledge of the expert. A highlight scene is thus detected using these detectors.

With the technique taking advantage of statistical learning employing a learning sample, a detector for detecting a highlight scene (highlight detector), and a detector for detecting an event that occurs in a highlight scene (event detector), which employs a learning sample, are required. A highlight scene is thus detected using these detectors.

Also, with the highlight scene detection technique, the image or audio feature amount of a content is extracted, and a highlight scene is detected using the feature amount thereof. As for feature amount for detecting a highlight scene, in general, a feature amount customized to the genre of a content from which a highlight scene is to be detected, is employed.

For example, with the highlight scene detection technique of Wang and others, and Duan and others, from a soccer game video, high dimensional feature amount for detecting an event such as "whistle", "applause", or the like is extracted by taking advantage of the lines of a soccer field, the path of travel of a soccer ball, the motion of the entire screen, and audio MFCC (Mel-Frequency Cepstrum Coefficient), and feature amount combined from these is used to perform detection of a play scene of the soccer such as "offensive play", "foul", and so forth.

Also, for example, Wang and others have proposed a highlight scene detection technique wherein a view type sorter employing color histogram feature amount, play location identifier employing a line detector, a replay logo detector, a sportscaster's excitement degree detector, a whistle detector, and so forth are designed from the soccer game video, temporal relationship of these is subjected to modeling by a Bayesian network, thereby making up a soccer highlight detector.

As for the highlight scene detection technique, in addition, for example, with Japanese Unexamined Patent Application Publication No. 2008-185626 (hereafter, also referred to as PTL 1), a technique has been proposed wherein feature amount for featuring the buildup of sound (cheering) is used to detect a highlight scene of a content.

With the above highlight scene detection techniques, a highlight scene (or event) may be detected regarding contents belonging to a particular genre, but it is difficult to detect a suitable scene as a highlight scene regarding contents belonging to other genres.

Specifically, for example, with the highlight scene detection technique according to PTL 1, a highlight scene is detected under a rule that a scene including cheering is a highlight scene, but the genres of contents wherein a scene including cheering is a highlight scene are limited. Also, with the highlight scene detection technique according to PTL 1, it is difficult to detect a highlight scene with a content belonging to a genre wherein a scene without cheering is a highlight scene, as an object.

Accordingly, in order to perform detection of a highlight scene with a content belonging to a genre other than a particular genre as an object by the highlight scene detection technique according to PTL 1, there is a need to design the feature amount so as to be suitable for the genre thereof. Further, a rule design for detection of a highlight scene (or definition of an event) using the feature amount thereof needs to be performed based on an interview of an expert, and so forth.

Therefore, for example, with Japanese Unexamined Patent Application Publication No. 2000-299829 (hereafter, also referred to as PTL 2), a method has been proposed wherein feature amount and a threshold whereby detection of a scene generally determined to be a highlight scene may be used are designed, and a highlight scene is detected by threshold processing using the feature amount and threshold thereof.

However, in recent years, contents have become diversified, it is extremely difficult to obtain a general rule, for example, such as a feature amount, rule of threshold processing, and so forth, to be used for detecting a scene suitable for a highlight scene regarding all of the contents.

Accordingly, in order to detect a scene suitable for a highlight scene, for example, there is a need to design feature amount and a rule to detect a highlight scene, for each genre or the like, adapted to the genre thereof. However, even in the event that such a rule has been designed, it is difficult to detect what we might call a exceptional highlight scene not following the rule.

With regard to contents, for example, such as a game of sports such as a goal scene of a soccer game, a rule to detect a scene generally called a highlight scene may be designed with high precision using the knowledge of an expert.

However, a user's preference greatly varies from one user to another. Specifically, for example, there are separate users who prefer "a scene with a field manager sitting on the bench", "a scene of a pickoff throw to first base in baseball", "a question and answer scene of a quiz program", and so forth, respectively. In this case, it is unrealistic to individually design a rule adapted to each of these user's preferences and to incorporate these in a detection system such as an AV (Audio Visual) device for detecting a highlight scene.

On the other hand, instead of the user viewing and listening to a digest in which highlight scenes detected in accordance with a fixed rule incorporated in a detection system are collected, a detection system learns the preference of each of the users, detects a scene matching the preferences thereof (a scene in which the user is interested) as a highlight scene, and provides a digest wherein such highlight scenes are collected, thereby realizing "personalization", as if it were, of viewing and listening to a content, and expanding ways in how to enjoy contents.

The information processing device for highlight scenes has been made in light of such a situation, and allows a user to readily obtain a digest in which scenes in which the user is interested are collected.

Firstly, an information processing device for highlight scenes is an information processing device including:

feature amount extracting means configured to extract the feature amount of each frame of an image of the content for detector learning of interest that is a content to be used for learning of a highlight detector which is a model for detecting a scene in which the user is interested as a highlight scene;

maximum likelihood state sequence estimating means configured to estimate, with a contents model which is a state transition probability model after said learning obtained by extracting the feature amount of each frame of an image of a content for learning that is a content to be used for learning of a state transition probability model stipulated by state transition probability that a state may proceed, and observation probability that a predetermined observation value will be observed from the state, and performing learning of the state transition probability model using the feature amount of the content for learning, the maximum likelihood state sequence that is a state sequence causing state transition to occur where likelihood is the highest that the feature amount of the content for detector learning of interest will be observed;

highlight label generating means configured to generate a highlight label sequence regarding the content for detector learning of interest by labeling each frame of the content for detector learning of interest using a highlight label representing whether or not the highlight scene in accordance with the user's operations; and highlight detector learning means configured to perform learning of the highlight detector which is a state transition probability model using a label sequence for learning that is a pair of the maximum likelihood state sequence obtained from the content for detector learning of interest, and the highlight label sequence.

Secondly, an information processing device for highlight scenes is the first information processing device for highlight scenes further including:

highlight detecting means configured to extract the feature amount of each frame of an image of the content for highlight detection of interest that is a content from which a highlight scene is to be detected, to estimate the maximum likelihood state sequence that is a state sequence causing state transition to occur where likelihood is the highest that the feature amount of the content for highlight detection of interest will be observed with the contents model, to estimate the maximum likelihood state sequence that is a state sequence causing state transition to occur where likelihood is the highest that a label sequence for detection that is a pair of the maximum likelihood state sequence obtained from the content for highlight detection of interest at the highlight detector, and the highlight label sequence of a highlight label representing being a highlight scene or other than a highlight scene will be observed, to detect the frame of a highlight scene from the content for highlight detection of interest based on the observation probability of the highlight label of each state of a highlight relation state sequence that is the maximum likelihood state sequence obtained from the label sequence for detection, and to generate a digest content that is the digest of the content for highlight detection of interest using the frame of the highlight scene.

Thirdly, an information processing device for highlight scenes is the second information processing device for highlight scenes, wherein in the event that with a state at predetermined point-in-time of the highlight relation state sequence, difference between observation probability of a highlight label representing being a highlight scene, and observation probability of a highlight label representing being other than a highlight scene is greater than a predetermined threshold, the highlight detecting means detect the frame of the content for highlight detection of interest corresponding to the state at the predetermined point-in-time as the frame of a highlight scene.

Fourthly, an information processing device for highlight scenes is the first information processing device for highlight scenes, further including:

scrapbook generating means configured to extract the feature amount of each frame of a content image, to estimate the maximum likelihood state sequence that is a state sequence causing state transition to occur where likelihood is the highest that the feature amount of the content will be observed with the contents model, to extract, of the states of the maximum likelihood state sequence, a frame corresponding to a state matching a state instructed by the user, from the content, and to register the frame extracted from the content on a scrapbook on which the highlight scene is registered.

Fifthly, an information processing device for highlight scenes is the first information processing device for highlight scenes, further including:

inter-state distance calculating means configured to obtain distance between states from one state to another state of the contents model based on state transition probability from the one state to the other one state;

coordinates calculating means configured to obtain, so as to reduced difference between Euclidean distance from the one state to the other one state and the distance between states on a model map that is a two-dimensional or three-dimensional map where the state of the contents model is disposed, state coordinates that are the coordinates of the position of the state on the model map; and display control means configured to perform display control for displaying the model map where the states that correspond to each other are disposed in the positions of the state coordinates.

Sixthly, an information processing device for highlight scenes is the fifth information processing device for highlight scenes, wherein the coordinates calculating means obtain the state coordinates so as to minimize a Sammon Map error function in proportion to a statistical error between the Euclidean distance and the distance between states, and in the event that the Euclidean distance from the one state to the other one state is greater than a predetermined threshold, set the Euclidean distance from the one state to the other one state to distance equal to the distance between states from the one state to the other one state, and perform calculation of the error function.

Seventhly, an information processing device for highlight scenes is the fifth information processing device for highlight scenes, further including:

scrapbook generating means configured to extract the feature amount of each frame of a content image, to estimate the maximum likelihood state sequence that is a state sequence causing state transition to occur where likelihood is the highest that the feature amount of the content will be observed with the contents model, to extract, of the states of the maximum likelihood state sequence, a frame corresponding to a state matching the state on the model map, instructed by the user, from the content, and to register the frame extracted from the content on a scrapbook on which the highlight scene is registered.

Eighthly, an information processing device for highlight scenes is the first information processing device for highlight scenes, wherein the feature amount of the frame is obtained by dividing the frame into sub regions that are multiple small regions, extracting the feature amount of each of the multiple sub regions, and combining the feature amount of each of the multiple sub regions.

Ninthly, an information processing device for highlight scenes is the first information processing device for highlight scenes, wherein the feature amount of the frame is obtained by combining a mean value and dispersion of audio energy, zero crossing rate, or spectrum center of gravity within predetermined time corresponding to the frame.

Tenthly, an information processing device for highlight scenes is the first information processing device for highlight scenes, wherein the feature amount of the frame is obtained by detecting the display region of an object within the frame, dividing the frame into sub regions that are multiple small regions, extracting the percentage of the number of pixels of the display region of the object in the sub region as to the number of pixels in each of the multiple sub regions, as feature amount, and combining the feature amount of each of the multiple sub regions.

Eleventhly, an information processing device for highlight scenes is the first information processing device for highlight scenes, further including:

contents model learning means configured to generate the contents model by performing learning of the state transition probability model using the feature amount of the content for learning.

Twelfthly, an information processing method of an information processing device for highlight scenes is an information processing method including, with an information processing device:

a feature amount extracting step arranged to extract the feature amount of each frame of an image of the content for detector learning of interest that is a content to be used for learning of a highlight detector which is a model for detecting a scene in which the user is interested as a highlight scene;

a maximum likelihood state sequence estimating step arranged to estimate, with a contents model which is a state transition probability model after said learning obtained by extracting the feature amount of each frame of an image of a content for learning that is a content to be used for learning of a state transition probability model stipulated by state transition probability that a state may proceed, and observation probability that a predetermined observation value will be observed from the state, and performing learning of the state transition probability model using the feature amount of the content for learning, the maximum likelihood state sequence that is a state sequence causing state transition to occur where likelihood is the highest that the feature amount of the content for detector learning of interest will be observed;

a highlight label generating step arranged to generate a highlight label sequence regarding the content for detector learning of interest by labeling each frame of the content for detector learning of interest using a highlight label representing whether or not the highlight scene in accordance with the user's operations; and a highlight detector learning step arranged to perform learning of the highlight detector which is a state transition probability model using a label sequence for learning that is a pair of the maximum likelihood state sequence obtained from the content for detector learning of interest, and the highlight label sequence.

Thirteenthly, a program causing a computer to serve as an information processing device for highlight scenes including:

feature amount extracting means configured to extract the feature amount of each frame of an image of the content for detector learning of interest that is a content to be used for learning of a highlight detector which is a model for detecting a scene in which the user is interested as a highlight scene;

maximum likelihood state sequence estimating means configured to estimate, with a contents model which is a state transition probability model after said learning obtained by extracting the feature amount of each frame of an image of a content for learning that is a content to be used for learning of a state transition probability model stipulated by state transition probability that a state may proceed, and observation probability that a predetermined observation value will be observed from the state, and performing learning of the state transition probability model using the feature amount of the content for learning, the maximum likelihood state sequence that is a state sequence causing state transition to occur where likelihood is the highest that the feature amount of the content for detector learning of interest will be observed;

highlight label generating means configured to generate a highlight label sequence regarding the content for detector learning of interest by labeling each frame of the content for detector learning of interest using a highlight label representing whether or not the highlight scene in accordance with the user's operations; and highlight detector learning means configured to perform learning of the highlight detector which is a state transition probability model using a label sequence for learning that is a pair of the maximum likelihood state sequence obtained from the content for detector learning of interest, and the highlight label sequence.

Fourteenthly, an information processing device for highlight scenes is an information processing device including:

obtaining means configured to obtain, with a contents model which is a state transition probability model after said learning obtained by extracting the feature amount of each frame of an image of the content for detector learning of interest that is a content to be used for learning of a highlight detector which is a model for detecting a scene interested by a user as a highlight scene, extracting the feature amount of each frame of an image of a content for learning that is a content to be used for learning of a state transition probability model stipulated by state transition probability that a state may proceed, and observation probability that a predetermined observation value will be observed from the state, and performing learning of the state transition probability model using the feature amount of the content for learning, the highlight detector by estimating the maximum likelihood state sequence that is a state sequence causing state transition to occur where likelihood is the highest that the feature amount of the content for detector learning of interest will be observed, generating a highlight label sequence regarding the content for detector learning of interest by labeling each frame of the content for detector learning of interest using a highlight label representing whether or not the highlight scene in accordance with the user's operations, and performing learning of the highlight detector which is a state transition probability model using a label sequence for learning that is a pair of the maximum likelihood state sequence obtained from the content for detector learning of interest, and the highlight label sequence;

feature amount extracting means configured to extract the feature amount of each frame of an image of the content for highlight detection of interest that is a content from which a highlight scene is to be detected;

first maximum likelihood state sequence estimating means configured to estimate the maximum likelihood state sequence that is a state sequence causing state transition to occur where likelihood is the highest that the feature amount of the content for highlight detection of interest will be observed with the contents model;

second maximum likelihood state sequence estimating means configured to estimate the maximum likelihood state sequence that is a state sequence causing state transition to occur where likelihood is the highest that a label sequence for detection that is a pair between the maximum likelihood state sequence obtained from the content for highlight detection of interest, and the highlight label sequence of a highlight label representing being a highlight scene or other than a highlight scene, will be observed with the highlight detector;

highlight scene detecting means configured to detect the frame of a highlight scene from the content for highlight detection of interest based on the observation probability of the highlight label of each state of a highlight relation state sequence that is the maximum likelihood state sequence obtained from the label sequence for detection; and digest content generating means configured to generate a digest content that is the digest of the content for highlight detection of interest using the frame of the highlight scene.

Fifteenthly, an information processing device for highlight scenes is the fourteenth information processing device for highlight scenes, wherein in the event that difference between the observation probability of a highlight label representing being a highlight scene, and the observation probability of a highlight label representing being other than a highlight scene, in a state at predetermined point-in-time of the highlight relation state sequence is greater than a predetermined threshold, the highlight scene detecting means detect the frame of the content for highlight detection of interest corresponding to the state at the predetermined point-in-time as the frame of a highlight scene.

Sixteenthly, an information processing device for highlight scenes is the fourteenth information processing device for highlight scenes, further including:

scrapbook generating means configured to extract the feature amount of each frame of a content image, to estimate the maximum likelihood state sequence that is a state sequence causing state transition to occur where likelihood is the highest that the feature amount of the content will be observed with the contents model, to extract, of the states of the maximum likelihood state sequence, a frame corresponding to a state matching the state instructed by the user, from the content, and to register the frame extracted from the content on a scrapbook on which the highlight scene is registered.

Seventeenthly, an information processing device for highlight scenes is the fourteenth information processing device for highlight scenes, further including:

inter-state distance calculating means configured to obtain distance between states from one state to another state of the contents model based on the state transition probability from the one state to the other one state;

coordinates calculating means configured to obtain state coordinates that are coordinates of the positions of the states on the model map so as to reduce error between Euclidean distance from the one state to the other one state, and the distance between states on a model map that is a two-dimensional or three-dimensional map where the state of the contents model is disposed; and display control means configured to perform display control for displaying the model map where the states that correspond to each other are disposed in the positions of the state coordinates.

Eighteenthly, an information processing device for highlight scenes is the seventeenth information processing device for highlight scenes, wherein the coordinates calculating means obtain the state coordinates so as to minimize a Sammon Map error function in proportional to a statistical error between the Euclidean distance and the distance between states, and in the event that the Euclidean distance from the one state to the other one state is greater than a predetermined threshold, set the Euclidean distance from the one state to the other one state to distance equal to the distance between states from the one state to the other one state, and perform calculation of the error function.

Nineteenthly, an information processing device for highlight scenes is the seventeenth information processing device for highlight scenes, further including:

scrapbook generating means configured to extract the feature amount of each frame of a content image, to estimate the maximum likelihood state sequence that is a state sequence causing state transition to occur where likelihood is the highest that the feature amount of the content will be observed with the contents model, to extract, of the states of the maximum likelihood state sequence, a frame corresponding to a state matching the state on the model map instructed by the user, from the content, and to register the frame extracted from the content on a scrapbook on which the highlight scene is registered.

Twentiethly, an information processing device for highlight scenes is the fourteenth information processing device for highlight scenes, wherein the feature amount of the frame is obtained by dividing the frame into sub regions that are multiple small regions, extracting the feature amount of each of the multiple sub regions, and combining the feature amount of each of the multiple sub regions.

Twenty-firstly, an information processing device for highlight scenes is the fourteenth information processing device for highlight scenes, wherein the feature amount of the frame is obtained by combining a mean value and dispersion of audio energy, zero crossing rate, or spectrum center of gravity within predetermined time corresponding to the frame.

Twenty-secondly, an information processing device for highlight scenes is the fourteenth information processing device for highlight scenes, wherein the feature amount of the frame is obtained by detecting the display region of an object within the frame, dividing the frame into sub regions that are multiple small regions, extracting the percentage of the number of pixels of the display region of the object in the sub region as to the number of pixels in each of the multiple sub regions, as feature amount, and combining the feature amount of each of the multiple sub regions.

Twenty-thirdly, an information processing method of an information processing device for highlight scenes is an information processing method including, with an information processing device:

an obtaining step arranged to obtain, with a contents model obtained by extracting the feature amount of each frame of an image of the content for detector learning of interest that is a content to be used for learning of a highlight detector which is a model for detecting a scene in which the user is interested as a highlight scene, extracting the feature amount of each frame of an image of a content for learning that is a content to be used for learning of a state transition probability model stipulated by state transition probability that a state may proceed, and observation probability that a predetermined observation value will be observed from the state, and performing learning of the state transition probability model using the feature amount of the content for learning, the highlight detector by estimating the maximum likelihood state sequence that is a state sequence causing state transition to occur where likelihood is the highest that the feature amount of the content for detector learning of interest will be observed, generating a highlight label sequence regarding the content for detector learning of interest by labeling each frame of the content for detector learning of interest using a highlight label representing whether or not the highlight scene in accordance with the user's operations, and performing learning of the highlight detector which is a state transition probability model using a label sequence for learning that is a pair of the maximum likelihood state sequence obtained from the content for detector learning of interest, and the highlight label sequence;

a feature amount extracting step arranged to extract the feature amount of each frame of an image of the content for highlight detection of interest that is a content from which a highlight scene is to be detected;

a first maximum likelihood state sequence estimating step arranged to estimate the maximum likelihood state sequence that is a state sequence causing state transition to occur where likelihood is the highest that the feature amount of the content for highlight detection of interest will be observed with the contents model;

a second maximum likelihood state sequence estimating step arranged to estimate the maximum likelihood state sequence that is a state sequence causing state transition to occur where likelihood is the highest that a label sequence for detection that is a pair between the maximum likelihood state sequence obtained from the content for highlight detection of interest, and the highlight label sequence of a highlight label representing being a highlight scene or other than a highlight scene, will be observed with the highlight detector;

a highlight scene detecting step arranged to detect the frame of a highlight scene from the content for highlight detection of interest based on the observation probability of the highlight label of each state of a highlight relation state sequence that is the maximum likelihood state sequence obtained from the label sequence for detection; and a digest content generating step arranged to generate a digest content that is the digest of the content for highlight detection of interest using the frame of the highlight scene.

Twenty-fourthly, a program causing a computer to serve as an information processing device for highlight scenes including:

obtaining means configured to obtain, with a contents model which is a state transition probability model after said learning obtained by extracting the feature amount of each frame of an image of the content for detector learning of interest that is a content to be used for learning of a highlight detector which is a model for detecting a scene interested by a user as a highlight scene, extracting the feature amount of each frame of an image of a content for learning that is a content to be used for learning of a state transition probability model stipulated by state transition probability that a state may proceed, and observation probability that a predetermined observation value will be observed from the state, and performing learning of the state transition probability model using the feature amount of the content for learning, the highlight detector by estimating the maximum likelihood state sequence that is a state sequence causing state transition to occur where likelihood is the highest that the feature amount of the content for detector learning of interest will be observed, generating a highlight label sequence regarding the content for detector learning of interest by labeling each frame of the content for detector learning of interest using a highlight label representing whether or not the highlight scene in accordance with the user's operations, and performing learning of the highlight detector which is a state transition probability model using a label sequence for learning that is a pair of the maximum likelihood state sequence obtained from the content for detector learning of interest, and the highlight label sequence;

feature amount extracting means configured to extract the feature amount of each frame of an image of the content for highlight detection of interest that is a content from which a highlight scene is to be detected;

first maximum likelihood state sequence estimating means configured to estimate the maximum likelihood state sequence that is a state sequence causing state transition to occur where likelihood is the highest that the feature amount of the content for highlight detection of interest will be observed with the contents model;

second maximum likelihood state sequence estimating means configured to estimate the maximum likelihood state sequence that is a state sequence causing state transition to occur where likelihood is the highest that a label sequence for detection that is a pair between the maximum likelihood state sequence obtained from the content for highlight detection of interest, and the highlight label sequence of a highlight label representing being a highlight scene or other than a highlight scene, will be observed with the highlight detector;

highlight scene detecting means configured to detect the frame of a highlight scene from the content for highlight detection of interest based on the observation probability of the highlight label of each state of a highlight relation state sequence that is the maximum likelihood state sequence obtained from the label sequence for detection; and digest content generating means configured to generate a digest content that is the digest of the content for highlight detection of interest using the frame of the highlight scene.

[Embodiment of Recorder with Information Processing Device of Present Invention Being Applied]

FIG. 1 is a block diagram illustrating a configuration example of an embodiment of a recorder to which an information processing device according to the present invention has been applied.

The recorder in FIG. 1 is, for example, an HD (Hard Disk) recorder or the like, and can video-record (record) (store) various types of contents such as television broadcast programs, contents provided via a network such as the Internet or the like, contents taken by a video camera or the like, and the like.

Specifically, in FIG. 1, the recorder is configured of a contents storage unit 11, a contents model learning unit 12, a model storage unit 13, a contents structure presenting unit 14, a digest generating unit 15, and a scrapbook generating unit 15.

The contents storage unit 11 stores (records) a content, for example, such as a television broadcast program. Storage of a content to the contents storage unit 11 constitutes recording of the content thereof, and the video-recorded content (content stored in the contents storage unit 11) is played, for example, according to the user's operations.

The contents model learning unit 12 performs learning (statistical learning) for structuring the content stored in the contents storage unit 11 in a self-organized manner in predetermined feature amount space to obtain a model (hereafter, also referred to as contents model) representing the structure (temporal space structure) of the content. The contents model learning unit 12 supplies the contents model obtained as learning results to the model storage unit 13.

The model storage unit 13 store the contents model supplied from the contents model learning unit 12.

The contents structure presenting unit 14 uses the content stored in the contents storage unit 11, and the contents model stored in the model storage unit 13 to create and present a later-described model map representing the structure of the content.

The digest generating unit 15 uses the contents model stored in the model storage unit 13 to detect a scene in which the user is interested from the content stored in the contents storage unit 11 as a highlight scene. Subsequently, the digest generating unit 15 generates a digest in which highlight scenes are collected.

The scrapbook generating unit 16 uses the contents model stored in the model storage unit 13 to detect scenes in which the user is interested, and generates a scrapbook collected from the scenes thereof.

Note that generation of a digest by the digest generating unit 15, and generation of a scrapbook by the scrapbook generating unit 16 are common in that a scene in which the user is interested is detected as a result, but detection methods (algorithms) thereof differ.

Also, the recorder in FIG. 1 may be configured without providing the contents structure presenting unit 14 and the scrapbook generating unit 16 and so forth.

Specifically, for example, in the event that a learned contents model has already been stored in the model storage unit 13, the recorder may be configured without providing the contents model learning unit 12.

Also, for example, with regard to the contents structure presenting unit 14, digest generating unit 15, and scrapbook generating unit 16, the recorder may be configured by providing only one or two blocks of these.

Now, let us say that the data of the contents to be stored in the contents storage unit 11 includes an image, audio, and necessary text (subtitle) data (stream).

Also, now, let us say that of the data of the contents, only the data of an image is employed for contents model learning processing, and processing employing a contents model.

However, with the contents model learning processing, and the processing employing a contents model, the data of audio or text other than the data of an image may also be employed, and in this case, the precision of the processing can be improved.

Also, with the contents model learning processing, and the processing employing a contents model, only the data of audio may be employed instead of images.

[Configuration Example of Contents Model Learning Unit 12]

Figure 2:
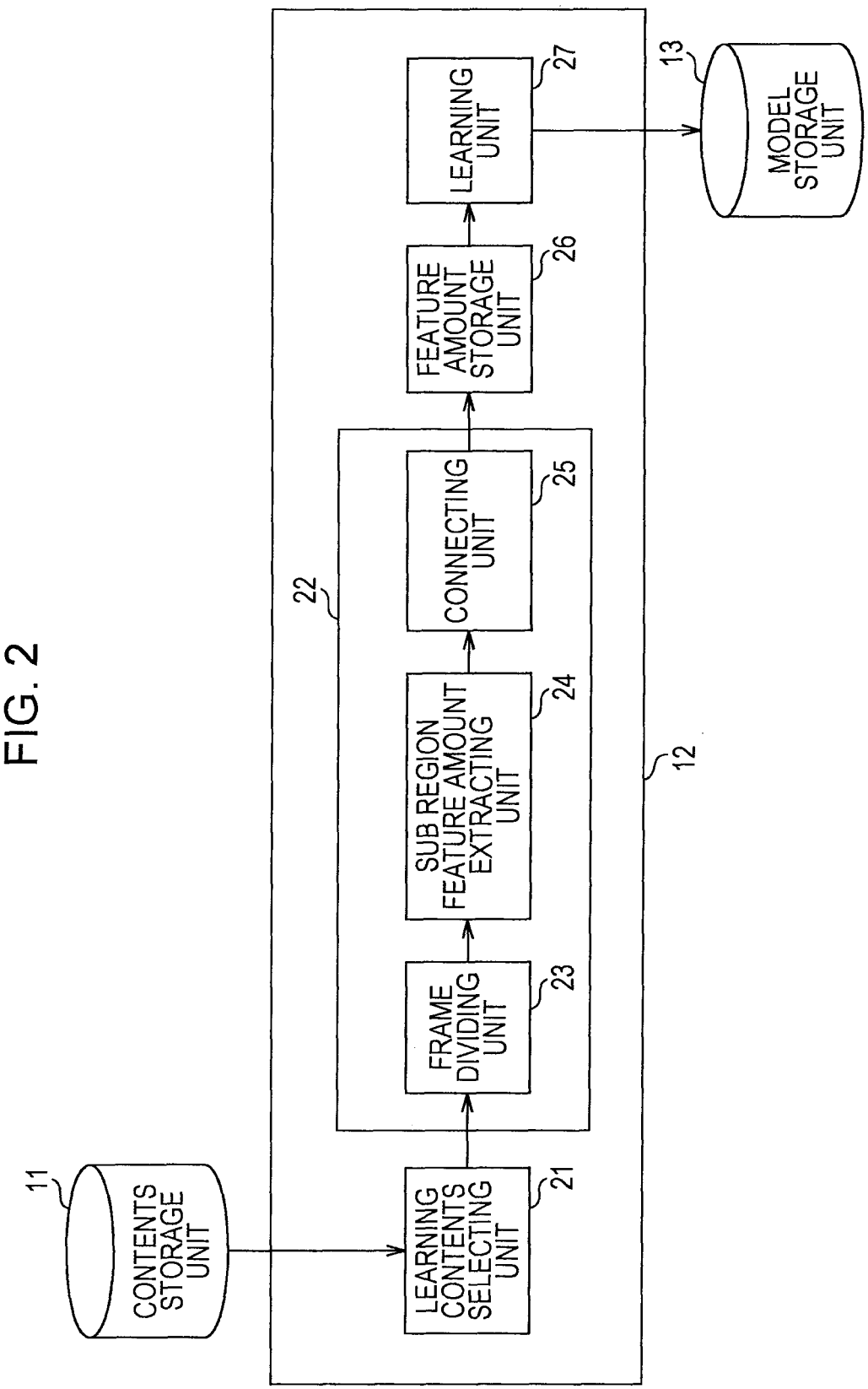
FIG. 2 is a block diagram illustrating a configuration example of a contents model learning unit 12.

FIG. 2 is a block diagram illustrating a configuration example of the contents model learning unit 12 in FIG. 1.

The contents model learning unit 12 extracts the feature amount of each frame of the image of a content for learning that is a content to be used for learning of a state transition probability model stipulated by state transition probability that a state may proceed, and observation probability that a predetermined observation value will be observed from a state. Further, the contents model learning unit 12 uses the feature amount of a content for learning to perform learning of a state transition probability model.

Specifically, the contents model learning unit 12 is configured of a learning contents selecting unit 21, a feature amount extracting unit 22, a feature amount storage unit 26, and a learning unit 27.

The learning contents selecting unit 21 selects a content to be used for learning of a state transition probability model out of the contents stored in the contents storage unit 11 as a content for learning, and supplies to the feature amount extracting unit 22.

Here, the learning contents selecting unit 21 selects, for example, one or more contents belonging to a predetermined category out of the contents stored in the contents storage unit 11 as contents for learning.

The expression "contents belonging to a predetermined category" means that contents have a common structure hidden therein, for example, such as programs of the same genre, a series of programs, a program broadcast every week or every day or otherwise periodically (program of the same title), or the like.

what we might call rough classification, such as a sports program, news program, or the like, for example, may be employed as a genre, but what we might call fine classification, such as a program of a soccer game, a program of a baseball game, or the like, for example, is preferable.

Also, for example, a program of a soccer game may also be classified into a content belonging to a different category from one channel (broadcast station) to another.

Now, let us say that it has already been set in the recorder in FIG. 1 what kind of category is employed as the category of a content.

Also, the category of a content stored in the contents storage unit 11 can be recognized from, for example, meta data such as the genre or title of a program that is transmitted along with the program in television broadcasting, information of a program that a site on the Internet provides, and so forth.

The feature amount extracting unit 22 inversely multiplexes the content for learning from the learning contents selecting unit 21 to image data and audio data, extracts the feature amount of each frame of the image, and supplies to the feature amount storage unit 26.

Specifically, the feature amount extracting unit 22 is configured of a frame dividing unit 23, a sub region feature amount extracting unit 24, and a connecting unit 25.

Each frame of the image of the content for learning from the learning contents selecting unit 21 is supplied to the frame dividing unit 23 in the time sequence.

The frame dividing unit 23 sequentially takes the frame of the content for learning supplied in the time sequence from the learning contents selecting unit 21 as the frame of interest. Subsequently, the frame dividing unit 23 divides the frame of interest into sub regions that are multiple small regions, and supplies to the sub region feature amount extracting unit 24.

The sub region feature amount extracting unit 24 extracts from each sub region of the frame of interest from the frame dividing unit 23 the feature amount of the sub region thereof (hereafter, also referred to as "sub region feature amount"), and supplies to the connecting unit 25.

The connecting unit 25 combines the sub region feature amount of the sub regions of the frame of interest from the sub region feature amount extracting unit 24, and supplies the combined result to the feature amount storage unit 26 as the feature amount of the frame of interest.

The feature amount storage unit 26 stores the feature amount of each frame of the content for learning supplied from (the connecting unit 25 of) the feature amount extracting unit 22 in the time sequence.

The learning unit 27 uses the feature amount of each frame of the content for learning stored in the feature amount storage unit 26 to perform learning of the state transition probability model. Further, the learning unit 27 takes the state transition probability model after learning as a contents model, and supplies to the model storage unit 13 in a manner correlated with the category of the content for learning.

[State Transition Probability Model]

Description will be made regarding the state transition probability model that the learning unit 27 in FIG. 2 learns, with reference to FIG. 3 through FIG. 6.

As for the state transition probability model, for example, an HMM (Hidden Marcov Model) may be employed. In the event of employing an HMM as the state transition probability model, learning of an HMM is performed, for example, by the Baum-Welch re-estimation method.

Figure 3:
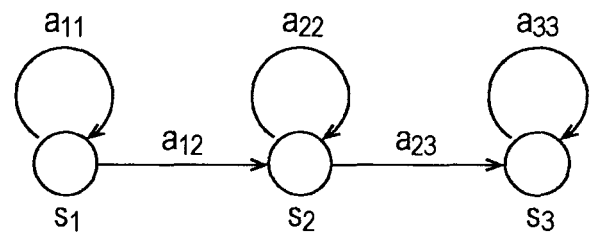
FIG. 3 is a diagram illustrating an example of an HMM.

FIG. 3 is a diagram illustrating an example of a left-to-right type HMM.

The left-to-right type HMM is an HMM where states are arrayed on a straight line from the left to the right direction, and can perform self transition (transition from a certain state to the state thereof), and transition from a certain state to a state positioned on the right side of the state thereof. The left-to-right type HMM is employed for audio recognition or the like, for example.

The HMM in FIG. 3 is made up of three states $s_1$, $s_2$, and $s_3$, and is allowed to perform self transition, and transition from a certain state to a state right-adjacent thereto as state transition.

Note that the HMM is stipulated by the initial probability $\pi_i$ the state $s_i$, state transition probability $a_{ij}$, and observation probability $b_i(o)$ that a predetermined observation value o will be observed from the state $s_i$.

Here, the initial probability $\pi_i$ is probability that the state $s_i$ is the initial state (first state), and with the left-to-right type HMM, the initial probability $\pi_i$ of the state $s_i$ on the leftmost side is set to 1.0, and the initial probability $\pi_i$ of another state $s_i$ is set to 0.0.

The state transition probability $a_{ij}$ is probability that transition will be made from the state $s_i$ to state $s_j$.

The observation probability $b_i(o)$ is probability that the observation value o will be observed from the state $s_i$ at the time of state transition to the state $s_i$. As for the observation probability $b_i(o)$, in the event that the observation value o is a discrete value, a value serving as probability (discrete value) is employed, but in the event that the observation value o is a continuous value, a probability distribution function is employed. As for the probability distribution function, for example, a Gaussian distribution defined by a mean value (mean vector) and dispersion (covariance matrix), or the like may be employed.

Figure 4:
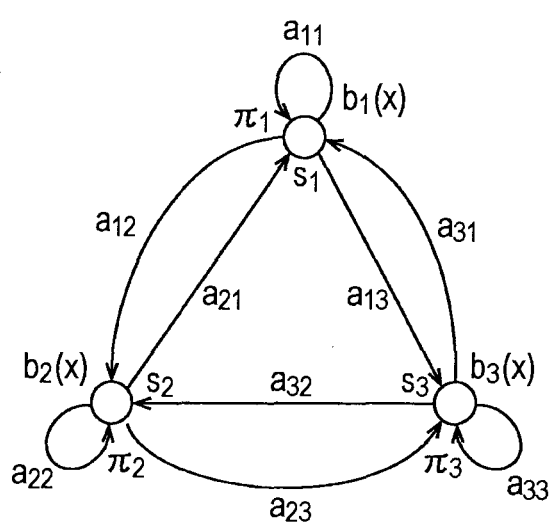
FIG. 4 is a diagram illustrating an example of an HMM.

FIG. 4 is a diagram illustrating an example of an Ergodic type HMM.

The Ergodic type HMM is an HMM with no constraint regarding state transition, i.e., an HMM capable of state transition from an arbitrary state $s_i$ to an arbitrary state $s_j$.

The HMM in FIG. 4 is made up of three states $s_1$, $s_2$, and $s_3$, and is allowed to perform arbitrary state transition.

The Ergodic type HMM is an HMM wherein the flexibility of state transition is the highest, but in the event that the number of states is great, may converge on the local minimum depending on the initial values of the parameters (initial probability $\pi_i$, state transition probability $a_{ij}$, observation probability $b_i(o)$) of the HMM, which prevents suitable parameters from being obtained.

Therefore, we will employ the hypothesis that "most phenomena in nature, and camera work or program configuration creating a video content, can be represented with a sparse connection such as a small world network", and employ an HMM wherein state transition is restricted to a sparse structure for learning at the learning unit 27.

Here, a sparse configuration is not a density state transition such as the Ergodic type HMM whereby state transition from a certain state to an arbitrary state can be made, but a configuration wherein a state to which state transition can be made from a certain state is extremely restricted (structure of sparse state transition).

Now, let us say that even with a sparse structure, there is at least one state transition to another state, and also there is self transition.

Figure 5:
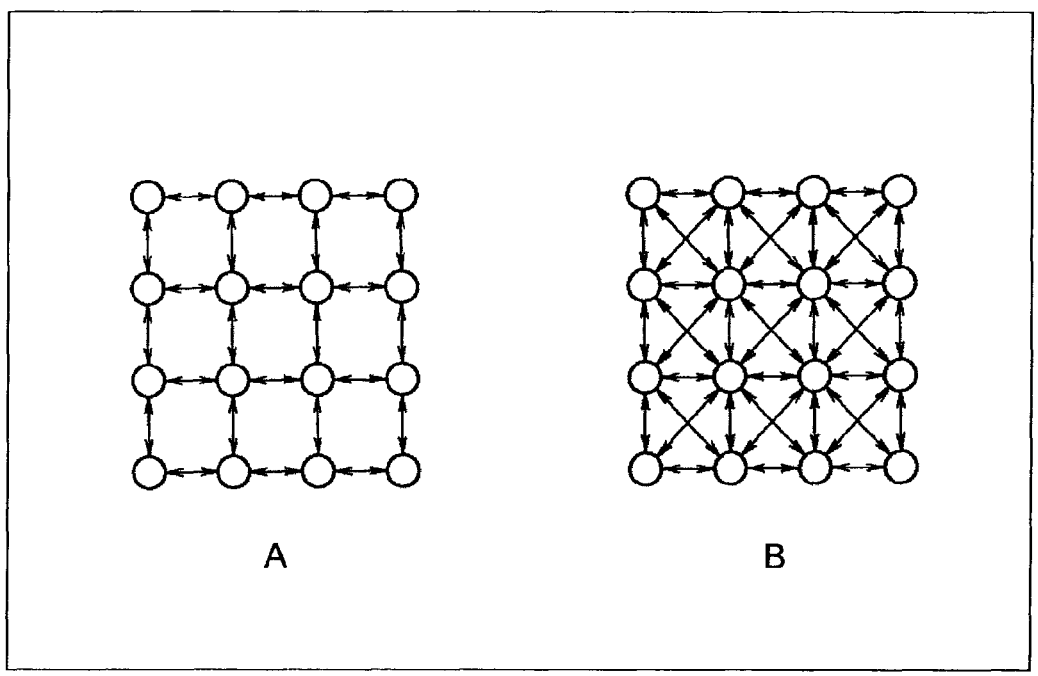
FIG. 5 is a diagram illustrating an example of an HMM.

FIG. 5 is a diagram illustrating an example of a two-dimensional neighborhood restraint HMM that is an HMM having a sparse structure.

With the HMMs in A in FIG. 5 and B in FIG. 5, in addition to the HMMs having a sparse structure, restraint is imposed wherein states making up an HMM are disposed in a grid shape on a two-dimensional plane.

Here, with the HMM in A in FIG. 5, state transition to another state is restricted to a horizontally adjacent state, and a vertically adjacent state. With the HMM in B in FIG. 5, state transition to another state is restricted to a horizontally adjacent state, a vertically adjacent state, and an obliquely adjacent state.

Figure 6:
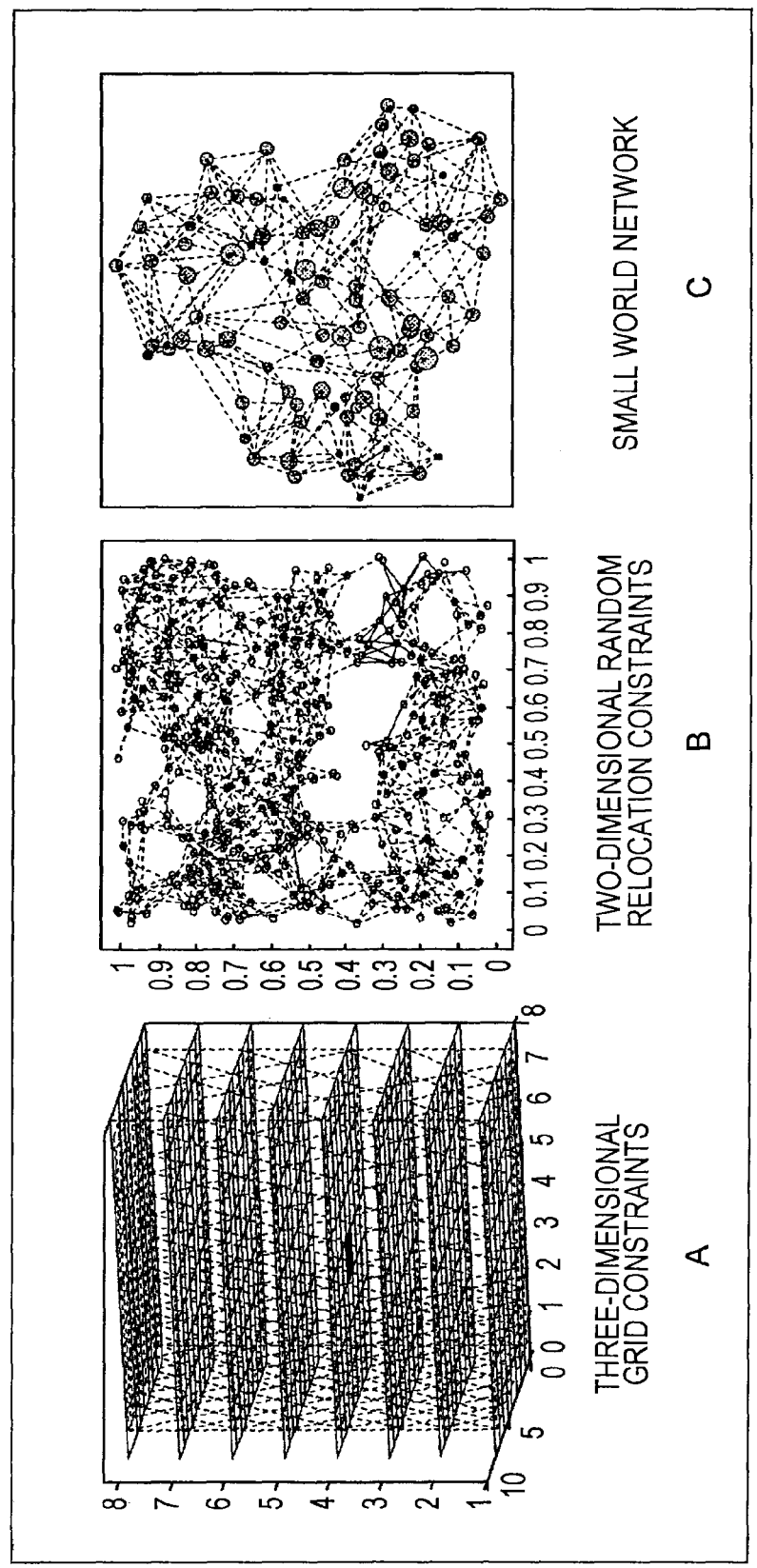
FIG. 6 is a diagram illustrating an example of an HMM.

FIG. 6 is a diagram illustrating an example of an HMM having a sparse structure other than a two-dimensional neighborhood restraint HMM.

Specifically, A in FIG. 6 illustrates an example of an HMM according to three-dimensional grid constraints. B in FIG. 6 illustrates an example of an HMM according to two-dimensional random relocation constraints. C in FIG. 6 illustrates an example of an HMM according to a small world network.

With the learning unit 27 in FIG. 2, learning of an HMM having a sparse structure illustrated in FIG. 5 and FIG. 6 made up of, for example, 100 through several hundred states is performed by the Baum-Welch re-estimation method using the feature amount (extracted from frames) of an image stored in the feature amount storage unit 26.

The HMM that is a contents model obtained as learning results at the learning unit 27 is obtained by learning using only the feature amount of the image (Visual) of a content, and accordingly may be referred to as a Visual HMM.

Here, the feature amount stored in the feature amount storage unit 26, which is used for learning of an HMM, is a vector serving as a continuous value, and as for the observation probability $b_i(o)$ of the HMM, a probability distribution function is employed.

Note that, an HMM is described in, for example, "Fundamentals of Speech Recognition (First and Second), NTT ADVANCED TECHNOLOGY CORPORATION" co-authored by Laurence Rabiner and Biing-Hwang Juang, and Japanese Patent Application No. 2008-064993 previously proposed by the present applicant. Also, use of the Ergodic type HMM or an HMM having a sparse structure is described in, for example, Japanese Patent Application No. 2008-064994 previously proposed by the present applicant.

[Extraction of Feature Amount]

Figure 7:
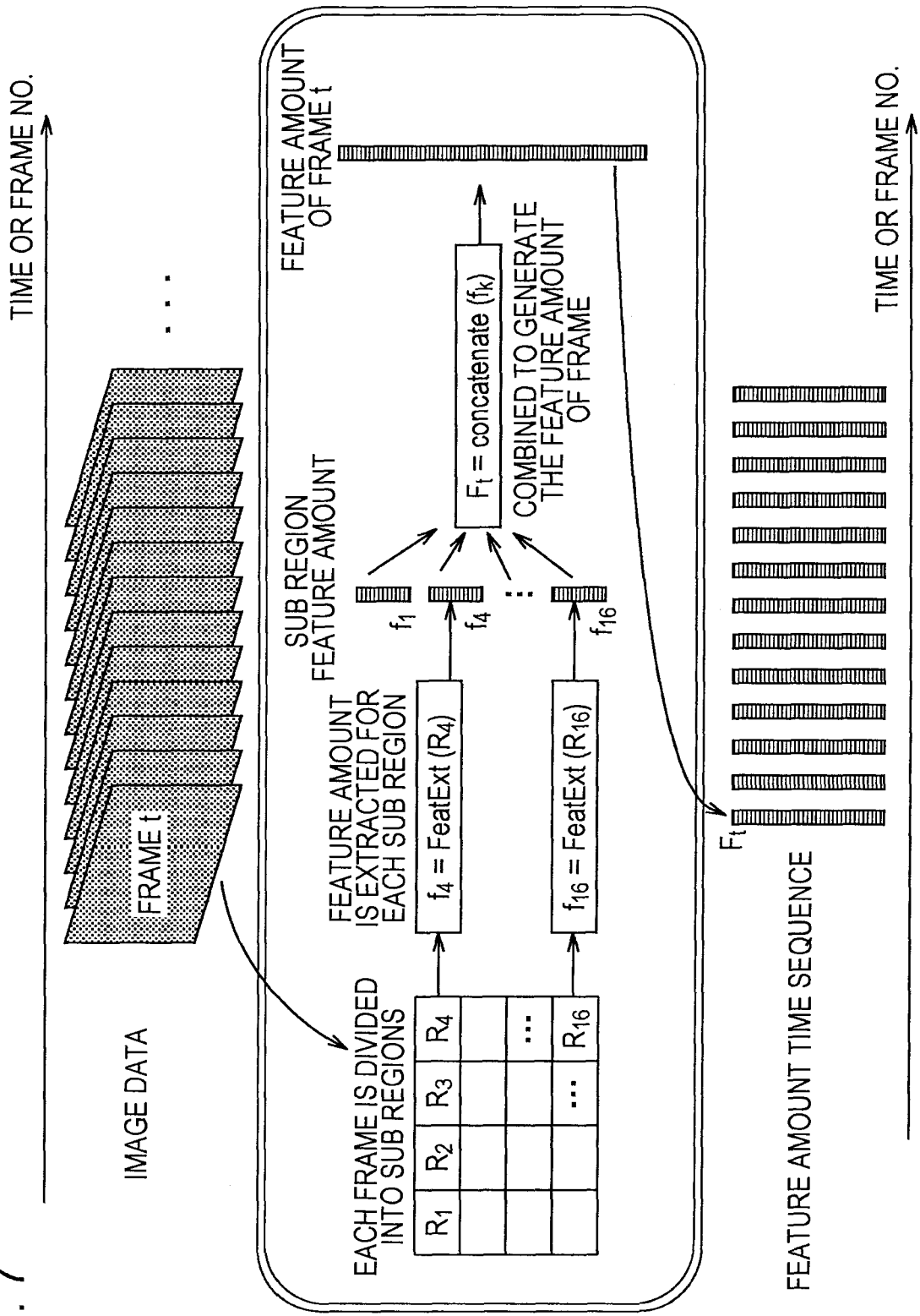
FIG. 7 is a diagram for describing feature amount extraction processing by a feature amount extracting unit 22.

FIG. 7 is a diagram for describing feature amount extraction processing by the feature amount extracting unit 22 in FIG. 2.

With the feature amount extracting unit 22, each frame of the image of the content for learning from the learning contents selecting unit 21 is supplied to the frame dividing unit 23 in time sequence.

The frame dividing unit 23 sequentially takes the frame of the content for learning supplied in the time sequence from the learning contents selecting unit 21 as the frame of interest, divides the frame of interest into multiple sub regions $R_k$, and supplies to the sub region feature amount extracting unit 24.

Here, in FIG. 7, the frame of interest is equally divided into 16 sub regions $R_1, R_2, \ldots, R_{16}$ where horizontal×vertical is 4×4.

Note that the number of sub regions $R_k$ at the time of dividing one frame into sub regions $R_k$ is not restricted to 16 of 4×4. Specifically, one frame can be divided into, for example, 20 sub regions $R_k$ of 5×4, 25 sub regions $R_k$ of 5×5, or the like.

Also, in FIG. 7, one frame is divided (equally divided) into the sub regions $R_k$ having the same size, but the sizes of the sub regions may not be the same. Specifically, for example, an arrangement may be made wherein the center portion of a frame is divided into sub regions having a small size, and the peripheral portions (portions adjacent to the image frame, etc.) of the frame are divided into sub regions having a great size.

The sub region feature amount extracting unit 24 (FIG. 2) extracts the sub region feature amount $f_k$=FeatExt($R_k$) of each sub region $R_k$ of the frame of interest from the frame dividing unit 23, and supplies to the connecting unit 25.

Specifically, the sub region feature amount extracting unit 24 uses the pixel values (e.g., RGB components, YUV components, etc.) of the sub region $R_k$ to obtain the global feature amount of the sub region $R_k$ as the sub region feature amount $f_k$.

Here, the above "global feature amount of the sub region $R_k$" means feature amount, for example, such as a histogram, which is calculated in an additive manner using only the pixel values without using the information of the positions of the pixels making up the sub region $R_k$.

As for the global feature amount, a feature amount called GIST may be employed, for example. The details of the GIST is described in, for example, A. Torralba, K. Murphy, W. Freeman, M. Rubin, "Context-based vision system for place and object recognition", IEEE Int. Conf. Computer Vision, vol. 1, no. 1, pp. 273-280, 2003.

Note that the global feature amount is not restricted to the GIST. Specifically, the global feature amount should be (robust) feature amount, which is robust with regard to visual change such as local position, luminosity, viewpoint, and so forth (so as to absorb change). Examples of such feature amount include HLCA (Higher-order Local Auto-Correlation), LBP (Local Binary Patterns), and color histogram.

The details of the HLCA is described in, for example, N. Otsu, T. Kurita, "A new scheme for practical flexible and intelligent vision systems", Proc. IAPR Workshop on Computer Vision, pp. 431-435, 1988. The details of the LBP is described in, for example, Ojala T, Pietikainen M & Maenpaa T, "Multiresolution gray-scale and rotation invariant texture classification with Local Binary Patterns", IEEE Transactions on Pattern Analysis and Machine Intelligence 24(7): 971-987 (the "a" in Pietikainen and Maenpaa is more accurately a character wherein "••" is added above an "a").

Here, the global feature amount such as the above GIST, LBP, HLCA, color histogram, and so forth has a tendency that the number of dimensions is great, and also has a tendency that correlation between dimensions is high.

Therefore, the sub region feature amount extracting unit 24 (FIG. 2) may perform, after extracting the GIST or the like from the sub regions $R_k$, principal component analysis (PCA (Principal Component Analysis)) such as the GIST thereof or the like. Subsequently, with the sub region feature amount extracting unit 24, the number of dimensions such as the GIST or the like is compressed (restricted) so that an accumulated contribution rate becomes a high value to some extent (e.g., value equal to or greater than 95% or the like) based on the results of the PCA, and the compression result may be taken as sub region feature amount.

In this case, a projective vector projected in PCA space where the number of dimensions such as the GIST or the like is compressed becomes a compression result wherein the number of dimensions such as the GIST or the like is compressed.

The connecting unit 25 (FIG. 2) connects the sub region feature amount $f_1$ through $f_{16}$ of the sub regions $R_1$ through $R_{16}$ of the frame of interest from the sub region feature amount extracting unit 24, and supplies the connection result thereof to the feature amount storage unit 26 as the feature amount of the frame of interest.

Specifically, the connecting unit 25 generates a vector with the sub region feature amount $f_1$ through $f_{16}$ as components by connecting the sub region feature amount $f_1$ through $f_{16}$ from the sub region feature amount extracting unit 24, and supplies the vector thereof to the feature amount storage unit 26 as feature amount $F_t$ of the frame of interest.

Here, in FIG. 7, the frame (frame t) at point-in-time t is the frame of interest. The "point-in-time t" is point-in-time with the head of a content as a reference for example, and with the present embodiment, the frame at the point-in-time t means the t'th frame from the head of the content.

With the feature amount extracting unit 22 in FIG. 2, each frame of a content for learning is sequentially taken from the head as the frame of interest, and the feature amount $F_t$ is obtained as described above. Subsequently, the feature amount $F_t$ of each frame of the content for learning is supplied and stored from the feature amount extracting unit 22 to the feature amount storage unit 26 in the time sequence (in a state in which temporal context is maintained).

As described above, with the feature amount extracting unit 22, the global feature amount of the sub regions $R_k$ is obtained as sub region feature amount $f_k$, and a vector with the sub region feature amount $f_k$ as components is obtained as the feature amount $F_t$ of the frame.

Accordingly, the feature amount $F_t$ of the frame is robust against local change (change that occurs within the sub regions), but becomes feature amount that is discriminative (property for perceptively distinguishing difference) against change in the layout of patterns serving as the entire frame.

According to such feature amount $F_t$, the similarity of a scene (content) between frames may suitably be determined. For example, a scene of "beach" is satisfied as long as it includes "sky" on the upper side of the frame, "sea" in the middle, and "beach" on the lower side of the screen, and accordingly, at what part of the "beach" a person exists, in what part of the "sky" a cloud exists, or the like, has no bearing on whether or not the scene is a scene of a "beach". The feature amount $F_t$ is adapted to determine the similarity of a scene (to classify a scene) from such a viewpoint.

[Contents Model Learning Processing]

Figure 8:
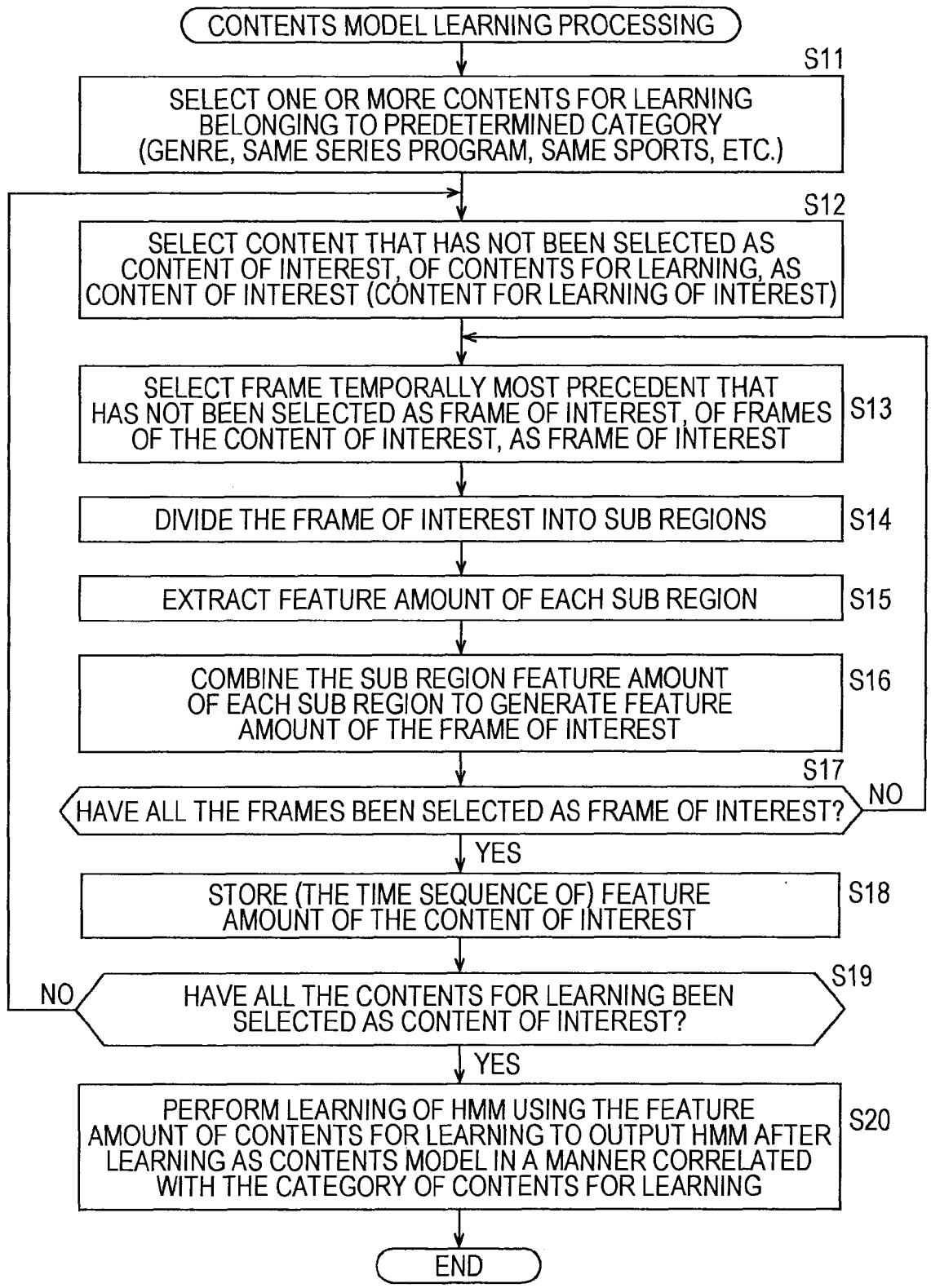
FIG. 8 is a flowchart for describing contents model learning processing.

FIG. 8 is a flowchart for describing the processing (contents model learning processing) that the contents model learning unit 12 in FIG. 2 performs.

In step S11, the learning contents selecting unit 21 selects one or more contents belonging to a predetermined category out of the contents stored in the contents storage unit 11 as contents for learning.

Specifically, for example, the learning contents selecting unit 21 selects an arbitrary content that has not been selected as a content for learning yet out of the contents stored in the contents storage unit 11 as a content for learning.

Further, the learning contents selecting unit 21 recognizes the category of the one content selected as a content for learning, and in the event that another content belonging to the category thereof is stored in the contents storage unit 11, further selects the content thereof (the other content) as a content for learning.

The learning contents selecting unit 21 supplies the content for learning to the feature amount extracting unit 22, and the processing proceeds from step S11 to step S12.

In step S12, the frame dividing unit 23 of the feature amount extracting unit 22 selects one of the contents for learning that has not been selected as the content for learning of interest (hereafter, also referred to as "content of interest") out of the contents for learning from the learning contents selecting unit 21, as the content of interest.

Subsequently, the processing proceeds from step S12 to step S13, where the frame dividing unit 23 selects a temporally most preceding frame that has not been selected as the frame of interest, out of the frames of the content of interest, as the frame of interest, and the processing proceeds to step S14.

In step S14, the frame dividing unit 23 divides the frame of interest into multiple sub regions, and supplies to the sub region feature amount extracting unit 24, and the processing proceeds to step S15.

In step S15, the sub region feature amount extracting unit 24 extracts the sub region feature amount of each of the multiple sub regions from the frame dividing unit 23, and supplies to the connecting unit 25, and the processing proceeds to step S16.

In step S16, the connecting unit 25 generates the feature amount of the frame of interest by connecting the sub region feature amount of each of the multiple sub regions making up the frame of interest from the sub region feature amount extracting unit 24, and the processing proceeds to step S17.

In step S17, the frame dividing unit 23 determines whether or not all the frames of the content of interest have been selected as the frame of interest.

In the event that determination is made in step S17 that there is a frame in the frames of the content of interest that has not been selected as the frame of interest, the processing returns to step S13, and hereafter, the same processing is repeated.

Also, in the event that determination is made in step S17 that all the frames of the content of interest have been selected as the frame of interest, the processing proceeds to step S18, where the connecting unit 25 supplies and stores (the time sequence of) the feature amount of each frame of the content of interest obtained regarding the content of interest to the feature amount storage unit 26.

Subsequently, the processing proceeds from step S18 to step S19, where the frame dividing unit 23 determines whether or not all the contents for learning from the learning contents selecting unit 21 have been selected as the content of interest.

In the event that determination is made in step S19 that, of the contents for learning, there is a content for learning that has not been selected as the content of interest, the processing returns to step S12, and hereafter, the same processing is repeated.

Also, in the event that determination is made in step S19 that all the contents for learning have been selected as the content of interest, the processing proceeds to step S20, where the learning unit 27 uses the feature amount of the contents for learning (time sequence of the feature amount of each frame) stored in the feature amount storage unit 26 to perform learning of the HMM.

Subsequently, the learning unit 27 outputs (supplies) the HMM after learning to the model storage unit 13 as a contents model in a manner correlated with the category of the content for learning, and ends the contents model learning processing.

Note that the contents model learning processing may be started at an arbitrary timing.

According to the above contents model learning processing, with an HMM, the structure of a content (e.g., configuration created by a program configuration, camera work, etc.) hidden in a content for learning is acquired in a self-organized manner.

As a result thereof, each state of the HMM serving as a contents model obtained by the contents model learning processing corresponds to an element of the structure of the content acquired by learning, and state transition expresses temporal transition between the elements of the structure of the content.

Subsequently, the state of the contents model expresses a frame group having near spatial distance, and also similar temporal context in feature amount space (the space of the feature amount extracted at the feature amount extracting unit 22 (FIG. 2)) (i.e., "similar scenes") in a collective manner.

Here, for example, in the event that the content is a quiz program, roughly, the flow of setting of a quiz, presentation of a hint, an answer by a performer, and a correct answer announcement, is taken as the basic flow of a program, and the quiz program advances by repeating this basic flow.

The above basic flow of a program is equivalent to the structure of a content, and each of setting of a quiz, presentation of a hint, an answer by a performer, and a correct answer announcement is equivalent to an element of the structure of the content.

Also, for example, advancement from setting of a quiz to presentation of a hint, or the like is equivalent to temporal transition between the elements of the structure of the content.

[Configuration Example of Contents Structure Presenting Unit 14]

Figure 9:
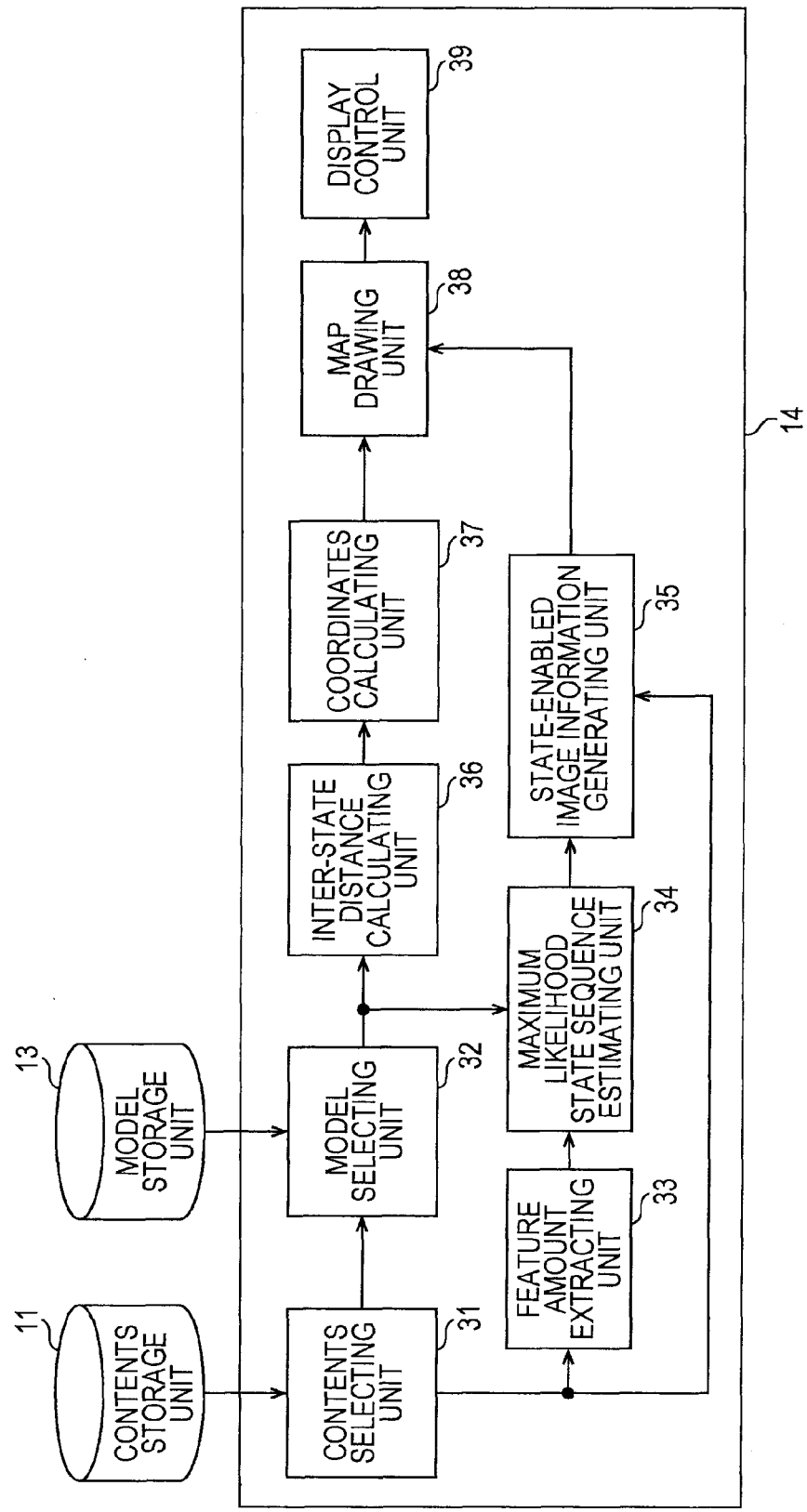
FIG. 9 is a block diagram illustrating a configuration example of a contents structure presenting unit 14.

FIG. 9 is a block diagram illustrating a configuration example of the contents structure presenting unit 14 in FIG. 1.

As described above, the contents model acquires the structure of a content hidden in a content for learning, but the contents structure presenting unit 14 presents the structure of the content thereof to the user in a visual manner.

Specifically, the contents structure presenting unit 14 is configured of a contents selecting unit 31, a model selecting unit 32, a feature amount extracting unit 33, a maximum likelihood state sequence estimating unit 34, a state-enabled image information generating unit 35, a inter-state distance calculating unit 36, a coordinates calculating unit 37, a map drawing unit 38, and a display control unit 39.

The contents selecting unit 31 selects a content, out of the contents stored in the contents storage unit 11, of which the structure is to be visualized, as the content for presentation of interest (hereafter, also simply referred to as "content of interest"), for example, according to the user's operations or the like.

Subsequently, the contents selecting unit 31 supplies the content of interest to the feature amount extracting unit 33 and state-enabled image information generating unit 35. Also, the contents selecting unit 31 recognizes the category of the content of interest, and supplies to the model selecting unit 32.

The model selecting unit 32 selects a contents model of the category matching the category of the content of interest (the contents model correlated with the category of the content of interest), from the contents selecting unit 31, out of the contents models stored in the model storage unit 13 as the model of interest.

Subsequently, the model selecting unit 32 supplies the model of interest to the maximum likelihood state sequence estimating unit 34 and inter-state distance calculating unit 36.

The feature amount extracting unit 33 extracts the feature amount of each frame of (the image of) the content of interest supplied from the contents selecting unit 31 in the same way as with the feature extracting unit 22 in FIG. 2, and supplies (the time sequence of) the feature amount of each frame of the content of interest to the maximum likelihood state sequence estimating unit 34.

The maximum likelihood state sequence estimating unit 34 estimates the maximum likelihood state sequence (the sequence of states making up a so-called Viterbi path) that is a state sequence causing state transition where likelihood is the highest that (the time sequence of) the feature amount of the content of interest from the feature amount extracting unit 33 will be observed in the model of interest from the model selecting unit 32, for example, in accordance with the Viterbi algorithm.

Subsequently, the maximum likelihood state sequence estimating unit 34 supplies the maximum likelihood state sequence (hereafter, also referred to as "the maximum likelihood state sequence of the model of interest corresponding to the content of interest") in the event that the feature amount of the content of interest is observed in the model of interest to the state-enabled image information generating unit 35.

Now, let us say that the state of point-in-time t with the head of the maximum likelihood state sequence of the model of interest as to the content of interest as a reference (the t'th state from the top, making up the maximum likelihood state sequence) is represented as s(t), and also the number of frames of the content of interest is represented as T.

In this case, the maximum likelihood state sequence of the model of interest as to the content of interest is the sequence of T states s(1), s(2), . . . , s(T), and the t'th state thereof (state at point-in-time t) s(t) corresponds to the frame at the point-in-time t (frame t) of the content of interest.

Also, if we say that the total of the states of the model of interest is represented as N, the state s(t) at the point-in-time t is one of N states $s_1, s_2, \ldots, s_N$.

Further, each of the N states $s_1, s_2, \ldots, s_N$ is appended with a state ID (Identification) that is an index for determining a state.

Now, if we say that the state s(t) at point-in-time t of the maximum likelihood state sequence of the model of interest as to the content of interest is the i'th state $s_i$ of N states $s_1$ through $s_N$, the frame at the point-in-time t corresponds to the state $s_i$.

Accordingly, each frame of the content of interest corresponds of one of the N states $s_1$ through $s_N$.

The entity of the maximum likelihood state sequence of the model of interest as to the content of interest is the sequence of the state ID of one state of the N states $s_1$ through $s_N$, corresponding to the frame of each point-in-time t of the content of interest.

The maximum likelihood state sequence of the model of interest as to the content of interest as described above expresses what kind of state transition the content of interest causes on the model of interest.

The state-enabled image information generating unit 35 selects the frame corresponding to the same state out of the content of interest from the contents selecting unit 31 for each state ID of the states making up the maximum likelihood state sequence (sequence of state IDs) from the maximum likelihood state sequence estimating unit 34.

Specifically, the state-enabled image information generating unit 35 sequentially selects the N states $s_i$ through $s_N$ of the model of interest as the state of interest.

Now, if we say that the state $s_i$ of which the state ID is #i has been selected as the state of interest, the state-enabled image information generating unit 35 retrieves the state matching the state of interest (state of which the state ID is #i) out of the maximum likelihood state sequence, and stores the frame corresponding to the state thereof in a manner correlated with the state ID of the state of interest.

Subsequently, the state-enabled image information generating unit 35 processes the frame correlated with the state ID to generate image information corresponding to the state ID thereof (hereafter, also referred to as "state-enabled image information"), and supplies to the map drawing unit 38.

Here, as for the state-enabled image information, for example, still images where the thumbnails of one or more frames correlated with the state ID are disposed in the time sequential order (image sequence), moving images (movies) where one or more frames correlated with the state ID are reduced and arrayed in the time sequential order, or the like may be employed.

Note that the state-enabled image information generating unit 35 generates no (cannot generate) state-enabled image information regarding the state ID of a state not appearing in the maximum likelihood state sequence out of the state IDs of the N states $s_1$ through $s_N$ of the model of interest.

The inter-state distance calculating unit 36 obtains inter-state distance $d_{ij}^*$ from one state $s_i$ to another state $s_j$ of the model of interest from the model selecting unit 32 based on the state transition probability $a_{ij}$ from one state $s_i$ to another state $s_j$. Subsequently, after obtaining the inter-state distance $d_{ij}^*$ from an arbitrary state $s_i$ to an arbitrary state $s_j$ of the N states of the model of interest, the inter-state distance calculating unit 36 supplies a matrix with N rows by N columns (inter-state distance matrix) with the inter-state distance $d_{ij}^*$ as components to the coordinates calculating unit 37.

Now, let us say that, for example, in the event that the state transition probability $a_{ij}$ is greater than a predetermined threshold (e.g., $(1/N) \times 10_{-2}$), the inter-state distance calculating unit 36 sets the inter-state distance $d_{ij}$ to, for example, 0.1 (small value), and in the event that the state transition probability $a_{ij}$ is equal to or smaller than the predetermined threshold, sets the inter-state distance $d_{ij}^*$ to, for example, 1.0 (great value).

The coordinates calculating unit 37 obtains state coordinates Yi that are the coordinates of the position of the state $s_i$ on the model map so as to reduce error between Euclidean distance $d_{ij}$ from one state $s_i$ to another state $s_j$ on the model map that is a two-dimensional or three-dimensional map where the N states $s_1$ through $s_N$ of the model of interest are disposed, and the inter-state distance $d_{ij}^*$ of the inter-state distance matrix from the inter-state distance calculating unit 36.

Specifically, the coordinates calculating unit 37 obtains the state coordinates Yi so as to minimize a Sammon Map error function E in proportional to statistical error between the Euclidean distance $d_{ij}$ and the inter-state distance $d_{ij}^*$.

Here, the Sammon Map is one of multidimensional scaling methods, and the details thereof are described in, for example, J. W. Sammon, JR., "A Nonlinear Mapping for Data Structure Analysis", IEEE Transactions on Computers, vol. C-18, No. 5, May 1969.

With the Sammon Map, for example, state coordinates $Y_i = (x_i, y_i)$ on the model map that is a two-dimensional map is obtained so as to minimize the error function E of Expression (1).

[Expression 1]

Expression 1

$$E = \frac{1}{\sum_{i<j}[d_{ij}^*]} \sum_{i<j}^{N} \frac{[d_{ij}^* - d_{ij}]^2}{d_{ij}^*} \quad (1)$$

Here, in Expression (1), N represents the total number of the states of the model of interest, and i and j are state indexes that take an integer value in a range of 1 through N (and also serve as state IDs in the present embodiment).

$d_{ij}^*$ represents an element in the i'th row the j'th column of the inter-state distance matrix, and represents distance between states from the state $s_i$ to the state $s_j$. $d_{ij}$ represents Euclidean distance between the coordinates (state coordinates) $Y_i$ of the position of the state $S_i$, and the coordinates $Y_j$ of the position of the state $S_j$ on the model map.

The coordinates calculating unit 37 obtains the state coordinates $Y_i$ (i=1, 2, . . . , N) by repetitive application of a gradient method so as to minimize the error function E in Expression (1), and supplies to the map drawing unit 38.

The map drawing unit 38 draws (the graphics of) the model map where (the image of) the corresponding state $s_i$ is disposed in the state coordinates $Y_i$ from the coordinates calculating unit 37. Also, the map drawing unit 38 draws the segment of a line connecting between states on the model map according to the state transition probability between the states thereof.

Further, the map drawing unit 38 links the state $s_i$ on the model map with the state-enabled image information corresponding to the state ID of the state $s_i$, of the state-enabled image information from the state-enabled image information generating unit 35, and supplies to the display control unit 39.

The display control unit 39 performs display control for displaying the model map from the map drawing unit 38 on an unshown display.

Figure 10:
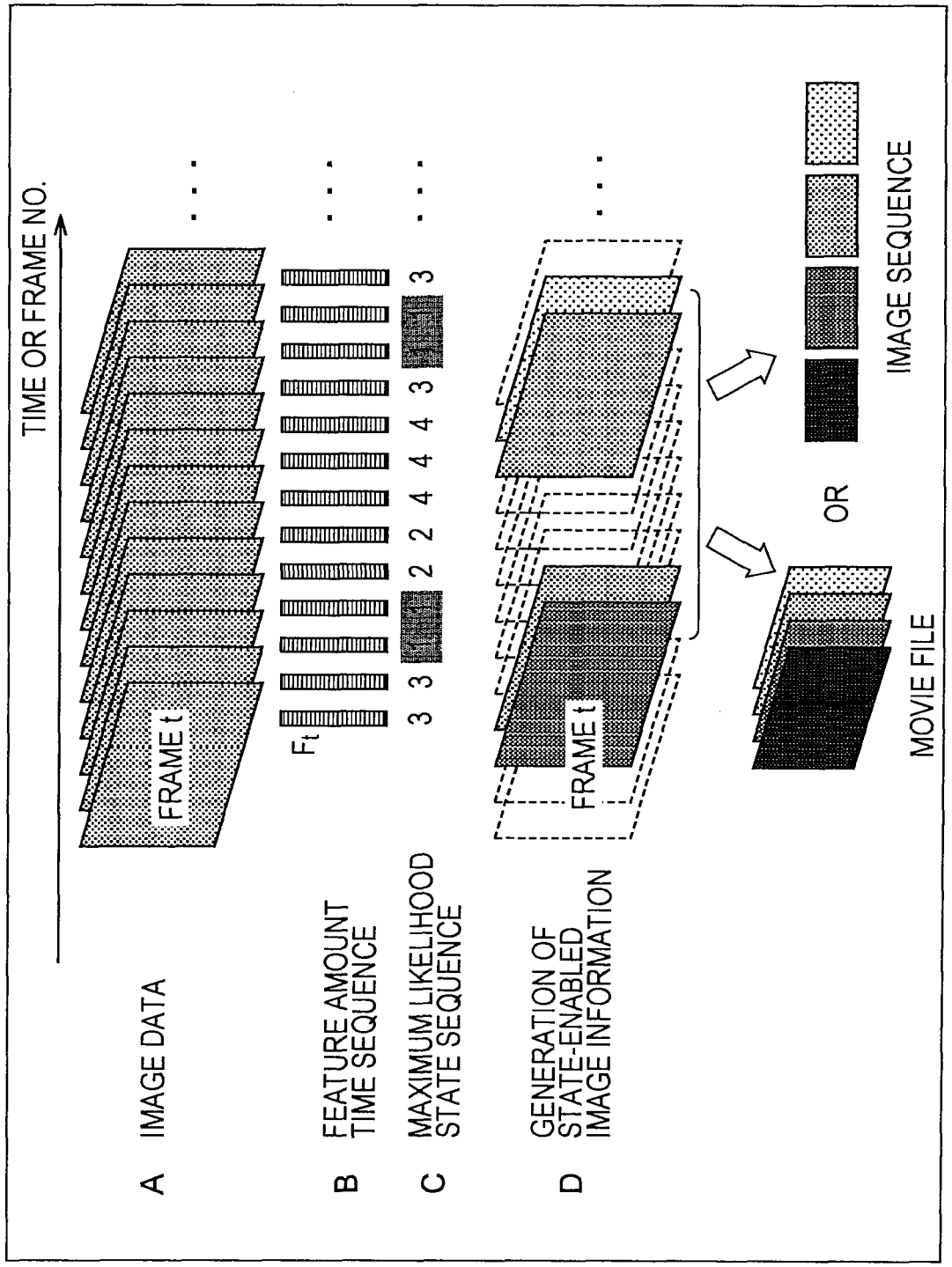
FIG. 10 is a diagram for describing the outline of contents structure presentation processing.

FIG. 10 is a diagram for describing the outline of the processing (contents structure presentation processing) that the contents structure presenting unit 14 in FIG. 9 performs.

A in FIG. 10 illustrates the time sequence of the frames of the content selected as the content of interest (content for presentation of interest) at the contents selecting unit 31.

B in FIG. 10 illustrates the time sequence of the feature amount of the time sequence of the frames in A in FIG. 10 extracted at the feature amount extracting unit 33.

C in FIG. 10 illustrates the maximum likelihood state sequence where the time sequence of the feature amount of the content of interest in B in FIG. 10 will be observed (the maximum likelihood state sequence of the model of interest as to the content of interest) in the model of interest, estimated at the maximum likelihood state estimating unit 34.

Here, the entity of the maximum likelihood state sequence of the model of interest as to the content of interest is, as described above, the sequence of state IDs. Subsequently, the t'th state ID from the head of the maximum likelihood state sequence of the model of interest as to the content of interest is the state ID of a state where the feature amount of the t'th frame (at point-in-time t) of the content of interest (the state ID of the state corresponding to the frame t) in the maximum likelihood state sequence.

D in FIG. 10 illustrates the state-enabled image information to be generated at the state-enabled image information generating unit 35.

In D in FIG. 10, with the maximum likelihood state sequence in C in FIG. 10, a frame corresponding to a state of which the state ID is "1" is selected, and a movie or image sequence serving as the state-enabled image information as to the state ID thereof is generated.

Figure 11:
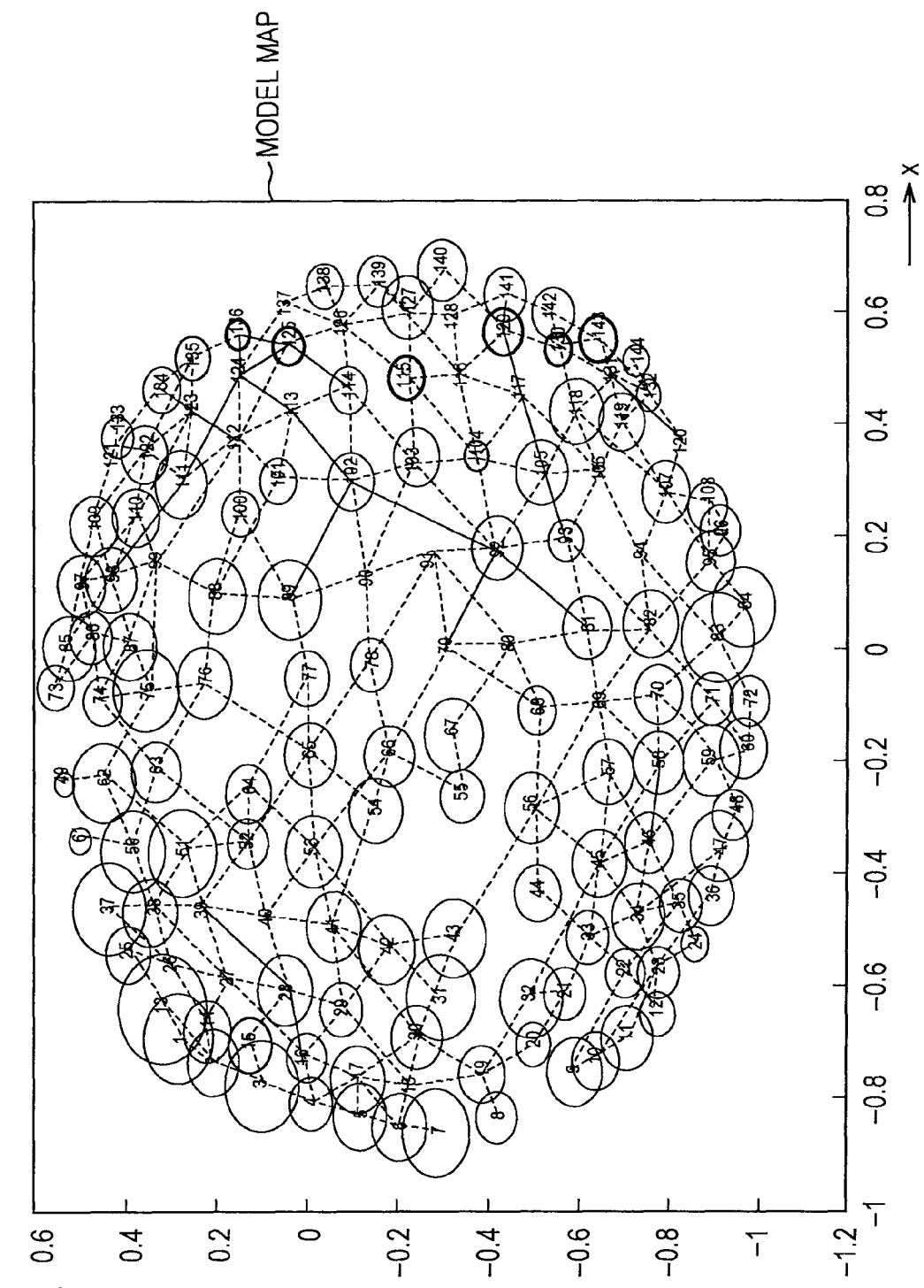
FIG. 11 is a diagram illustrating an example of a model map.

FIG. 11 is a diagram illustrating an example of a model map to be drawn by the map drawing unit 38 in FIG. 9.

With the model map in FIG. 11, an ellipse represents a state, and the segment of a line connecting between ellipses (dotted line) represents state transition. Also, a numeral provided to an ellipse represents the state ID of the state represented by the ellipse thereof.

The model map drawing unit 38 draws, as described above, (the graphics of) a model map where (the image (ellipse in FIG. 11) of) the corresponding state $s_i$ is disposed in the position of the state coordinates $Y_i$ obtained at the coordinates calculating unit 37.

Further, the map drawing unit 38 draws the segment of a line connecting between states on the model map according to the state transition probability between states thereof. Specifically, in the event that the state transition probability from a state $s_i$ to another state $s_j$ on the model map is greater than a predetermined threshold, the map drawing unit 38 draws the segment of a line connecting between the state $s_i$ to another state $s_j$ thereof.

Here, with the model map, states and so forth may be drawn in an emphasized manner.

Specifically, with the model map in FIG. 11, the state $s_i$ is drawn with an ellipse (including a circle) or the like, but the ellipse or the like representing this state $s_i$ may be drawn by changing its radius or color according to dispersion of a Gaussian distribution serving as a probability distribution function serving as the observation probability $b_j(o)$ of the state $s_i$ thereof.

Also, the segment of a line connecting between states on the model map according to the state transition probability between the states thereof may be drawn by changing the width or color of the segment of the line according to the size of the state transition probability.

Note that a method for drawing states and so forth in an emphasized manner is not restricted to drawing as described above. Further, emphasis on states or the like does not necessarily need to be performed.

Incidentally, with the coordinates calculating unit 37 in FIG. 9, in the event that the error function E in Expression (1) is employed as is, and the state coordinates $Y_i$ on the model map is obtained so as to minimize the error function E, (the ellipses representing) the states are disposed in a circular pattern on the model map, as illustrated in FIG. 11.

Subsequently, in this case, states are concentrated in the vicinity (outside) (outer edge) of the circumference of the model map, which prevents the user from viewing the locations of the states, and accordingly, visibility may be diminished.

Therefore, with the coordinates calculating unit 37 in FIG. 9, the state coordinates $Y_i$ on the model map may be obtained so as to correct the error function E in Expression (1) to minimize the error function E after correction.

Specifically, the coordinates calculating unit 37 determines whether or not the Euclidean distance $d_{ij}$ is greater than a predetermined threshold THd (e.g., THd=1.0 or the like).

Subsequently, in the event that the Euclidean distance $d_{ij}$ is not greater than the predetermined threshold THd, with calculation of the error function in Expression (1), the coordinates calculating unit 37 employs the Euclidean distance $d_{ij}$ in Expression (1) thereof as the Euclidean distance $d_{ij}$ as is.

On the other hand, in the event that the Euclidean distance $d_{ij}$ is greater than the predetermined threshold THd, with calculation of the error function in Expression (1), the coordinates calculating unit 37 employs the inter-state distance $d_{ij}^*$ (let us say that $d_{ij}=d_{ij}^*$) is employed as the Euclidean distance $d_{ij}$ (the Euclidean distance $d_{ij}$ is set to distance equal to the inter-state distance $d_{ij}^*$).

In this case, with the model map, when paying notice to two states $s_i$ and $s_j$ of which the Euclidean distance $d_{ij}$ is near to some extent (not greater than the threshold THd), the state coordinates $Y_i$ and $Y_j$ are changed so as to match the Euclidean distance $d_{ij}$ with the inter-state distance $d_{ij}^*$ (so that the Euclidean distance $d_{ij}$ approximates the inter-state distance $d_{ij}^*$).

On the other hand, with the model map, when paying attention to two states $s_i$ and $s_j$ of which the Euclidean distance $d_{ij}$ is distant to some extent (greater than the threshold THd), the state coordinates $Y_i$ and $Y_j$ are not changed.

As a result thereof, with the two states $s_i$ and $s_j$ of which the Euclidean distance $d_{ij}$ is distant to some extent, the Euclidean distance $d_{ij}$ remains still distant, so as illustrated in FIG. 11, states are concentrated in the vicinity (outer edge) of the circumference of the model map, whereby visibility can be prevented from being diminished.

Figure 12:
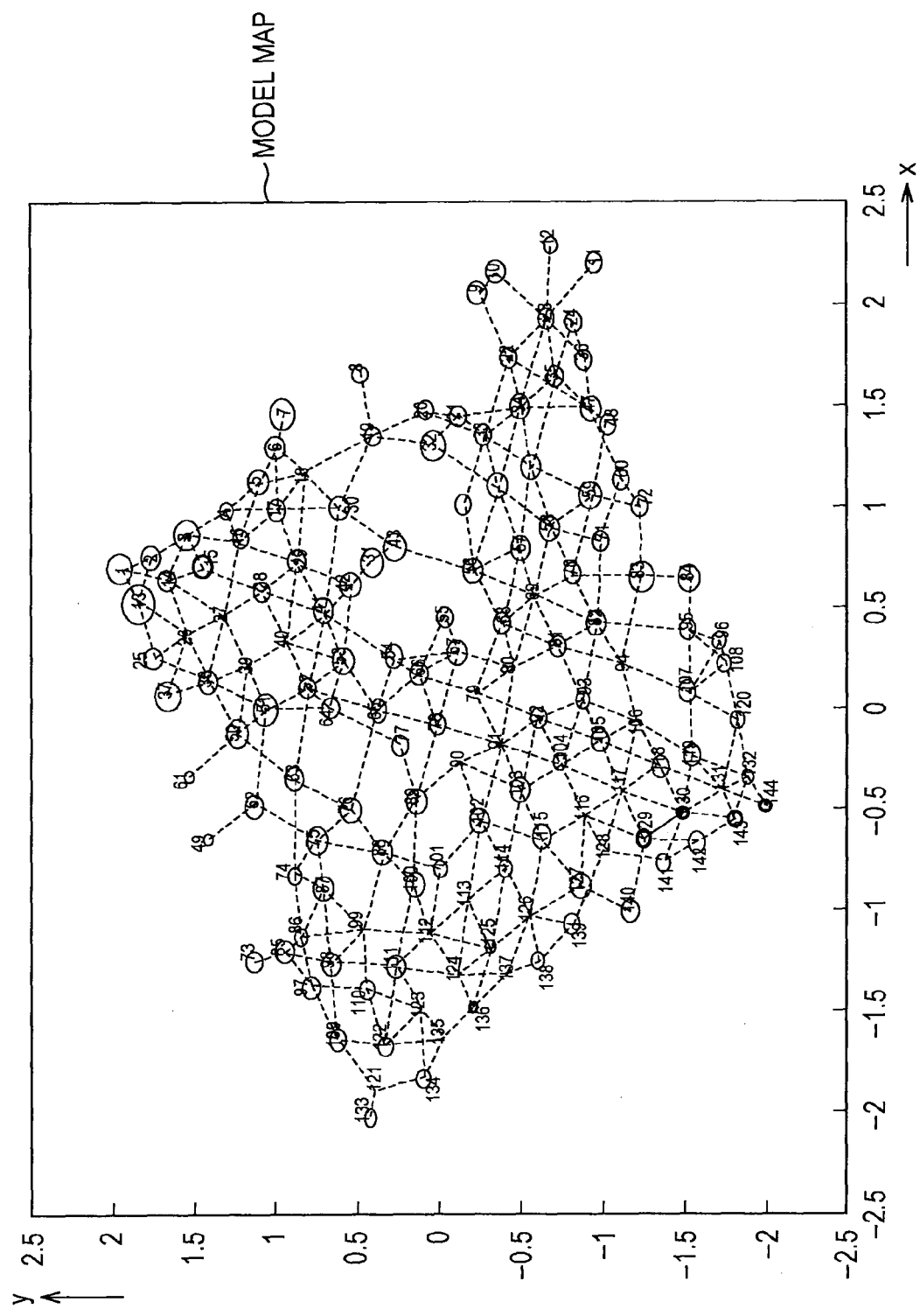
FIG. 12 is a diagram illustrating an example of a model map.

FIG. 12 is a diagram illustrating an example of the model map to be obtained using the error function E after correction.

According to the model map in FIG. 12, it can be recognized that states are not concentrated in the vicinity of the circumference.

[Contents Structure Presentation Processing]

Figure 13:
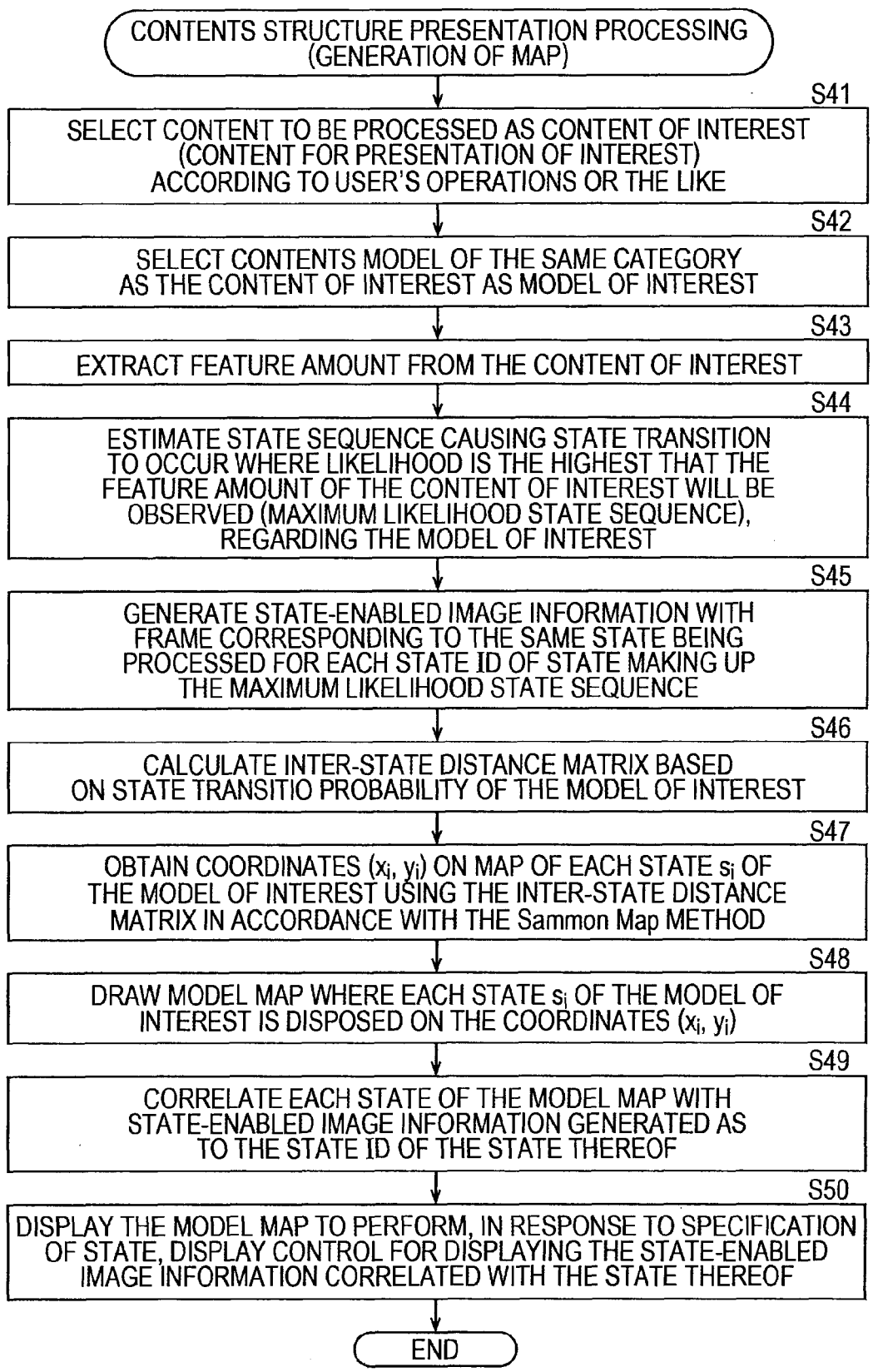
FIG. 13 is a flowchart for describing the contents structure presentation processing by the contents structure presenting unit 14.

FIG. 13 is a flowchart for describing the contents structure presentation processing that the contents structure presenting unit 14 in FIG. 9 performs.

In step S41, the contents selecting unit 31 selects the content of interest (content for presentation of interest) out of the contents stored in the contents storage unit 11 according to, for example, the user's operations.

Subsequently, the contents selecting unit 31 supplies the content of interest to the feature amount extracting unit 33 and state-enabled image information generating unit 35. Also, the contents selecting unit 31 recognizes the category of the content of interest, and supplies to the model selecting unit 32, and the processing proceeds from step S41 to step S42.

In step S42, the model selecting unit 32 selects a contents model correlated with the category of the content of interest from the contents selecting unit 31 out of the contents models stored in the model storage unit 13 as the model of interest.

Subsequently, the model selecting unit 32 supplies the model of interest to the maximum likelihood state sequence estimating unit 34 and inter-state distance calculating unit 36, and the processing proceeds from step S42 to step S43.

In step S43, the feature amount extracting unit 33 extracts the feature amount of each frame of the content of interest from the contents selecting unit 31, and supplies (the time sequence of) the feature amount of each frame of the content of interest to the maximum likelihood state sequence estimating unit 34, and the processing proceeds to step S44.

In step S44, the maximum likelihood state sequence estimating unit 34 estimates the maximum likelihood state sequence where the feature amount of the content of interest from the feature amount extracting unit 33 will be observed (the maximum likelihood state sequence of the model of interest as to the content of interest) in the model of interest from the model selecting unit 32.

Subsequently, the maximum likelihood state sequence estimating unit 34 supplies the maximum likelihood state sequence of the model of interest as to the content of interest to the state-enabled image information generating unit 35, and the processing proceeds from step S44 to step S45.

In step S45, the state-enabled image information generating unit 35 selects a frame corresponding to the same state out of the content of interest from the contents selecting unit 31 for each state ID of states making up the maximum likelihood state sequence (sequence of state IDs) from the maximum likelihood state sequence estimating unit 34.

Further, the state-enabled image information generating unit 35 stores, in a manner correlated with a state ID, the frame corresponding to the state of the state ID thereof. Also, the state-enabled image information generating unit 35 processes the frame correlated with the state ID, thereby generating state-enabled image information.

Subsequently, the state-enabled image information generating unit 35 supplies the state-enabled image information corresponding to the state ID to the map drawing unit 38, and the processing proceeds from step S45 to step S46.

In step S46, the inter-state distance calculating unit 36 obtains the inter-state distance $d_{ij}^*$ from one state $s_i$ to another state $s_j$ of the model of interest from the model selecting unit 32 based on the state transition probability $a_{ij}$. Subsequently, after obtaining the inter-state distance $d_{ij}^*$ from an arbitrary state $s_i$ to an arbitrary state $s_j$ of N states of the model of interest, the inter-state distance calculating unit 36 supplies a inter-state distance matrix with the inter-state distance $d_{ij}^*$ thereof as a component to the coordinates calculating unit 37, and the processing proceeds from step S46 to step S47.

In step S47, the coordinates calculating unit 37 obtains the state coordinates $Y_i=(x_i, y_i)$ so as to minimize the error function E in Expression (1) that is statistical error between the Euclidean distance $d_{ij}$ from one state $s_i$ to another state $s_j$, and the inter-state distance $d_{ij}^*$ of the inter-state distance matrix from the inter-state distance calculating unit 36, on the model map.

Subsequently, the coordinates calculating unit 37 supplies the state coordinates $Y_i=(x_i, y_i)$ to the map drawing unit 38, and the processing proceeds from step S47 to step S48.

In step S48, the map drawing unit 38 draws, for example, (the graphics of) a two-dimensional model map where (the image of) the corresponding state $s_i$ in the position of the state coordinates $Y_i=(x_i, y_i)$ from the coordinates calculating unit 37. Further, the map drawing unit 38 draws the segment of a line connecting between states of which the state transition probabilities are equal to or greater than a predetermined threshold, on the model map, and the processing proceeds from step S48 to step S49.

In step S49, the map drawing unit 38 links the state $s_i$ on the model map with the state-enabled image information corresponding to the state ID of the state $s_i$, of the state-enabled image information from the state-enabled image information generating unit 35, and supplies to the display control unit 39, and the processing proceeds step S50.

In step S50, the display control unit 39 performs display control for displaying the model map from the map drawing unit 38 on an unshown display.

Further, the display control unit 39 performs display control for displaying the state-enabled image information corresponding to the state ID of the state thereof (playback control for playing) in response to the specification of a state on the model map by the user's operations.

Specifically, upon the user performing operations for specifying a state on the model map, the display control unit 39 displays the state-enabled image information linked to the state thereof on an unshown display separate from the model map, for example.

Thus, the user can recognize the image of the frame corresponding to the state on the model map.

[Configuration Example of Digest Generating Unit 15]

Figure 14:
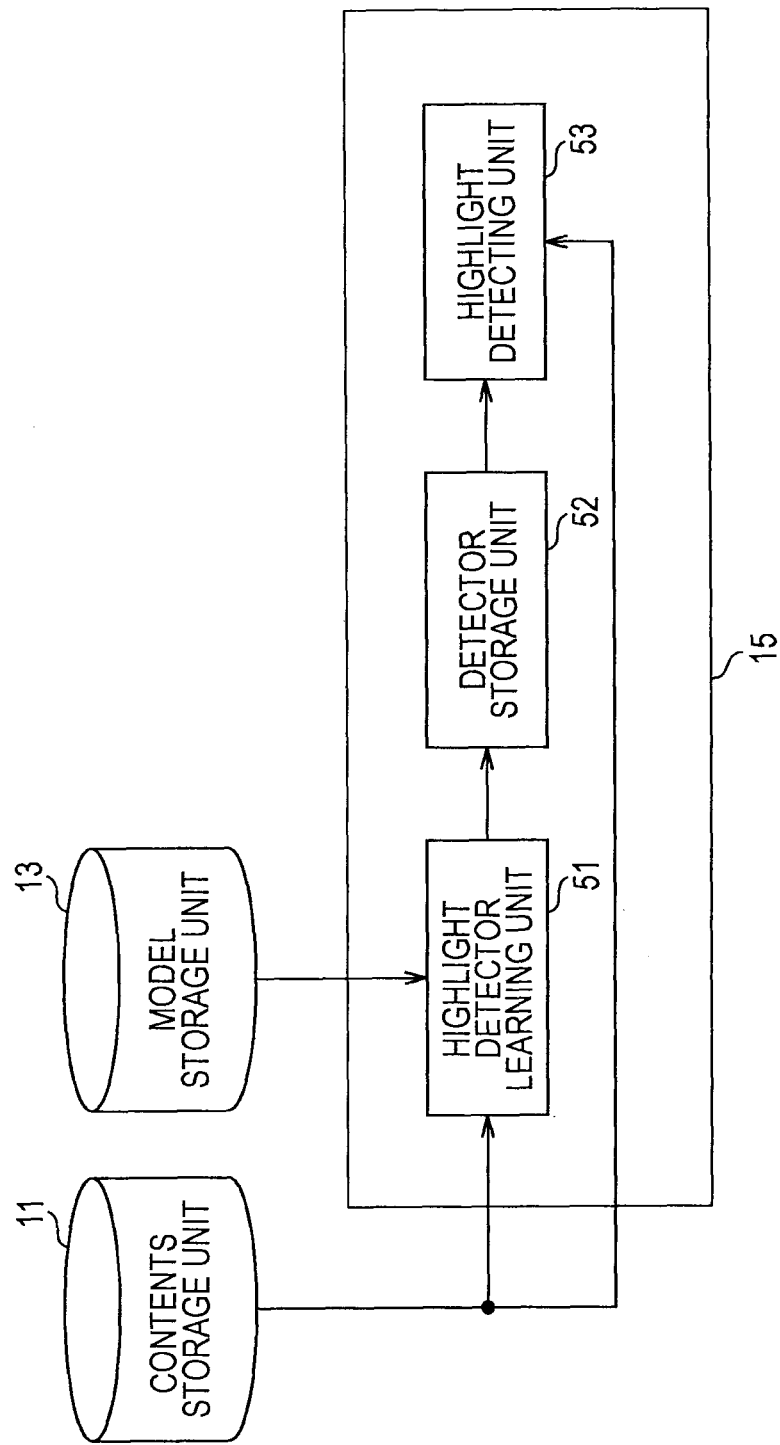
FIG. 14 is a block diagram illustrating a configuration example of a digest generating unit 15.

FIG. 14 is a block diagram illustrating a configuration example of the digest generating unit 15 in FIG. 1.

The digest generating unit 15 is configured of a highlight detector learning unit 51, a detector storage unit 52, and a highlight detecting unit 53.

The highlight detector learning unit 51 uses the content stored in the contents storage unit 11, and the contents model stored in the model storage unit 13 to perform learning of a highlight detector which is a model for detecting a scene in which the user is interested as a highlight scene.

The highlight detector learning unit 51 supplies a highlight detector after learning to the detector storage unit 52.

Here, as for a model serving as a highlight detector, in the same way as with a contents model, for example, an HMM may be employed, which is one of the state transition probability models.

The detector storage unit 52 stores the highlight detector from the highlight detector learning unit 51.

The highlight detector 53 uses the highlight detector stored in the detector storage unit 52 to detect the frame of a highlight scene from the content stored in the contents storage unit 11. Further, the highlight detector 53 uses the frame of a highlight scene to generate a digest content which is a digest of the content stored in the contents storage unit 11.

[Configuration Example of Highlight Detector Learning Unit 51]

Figure 15:
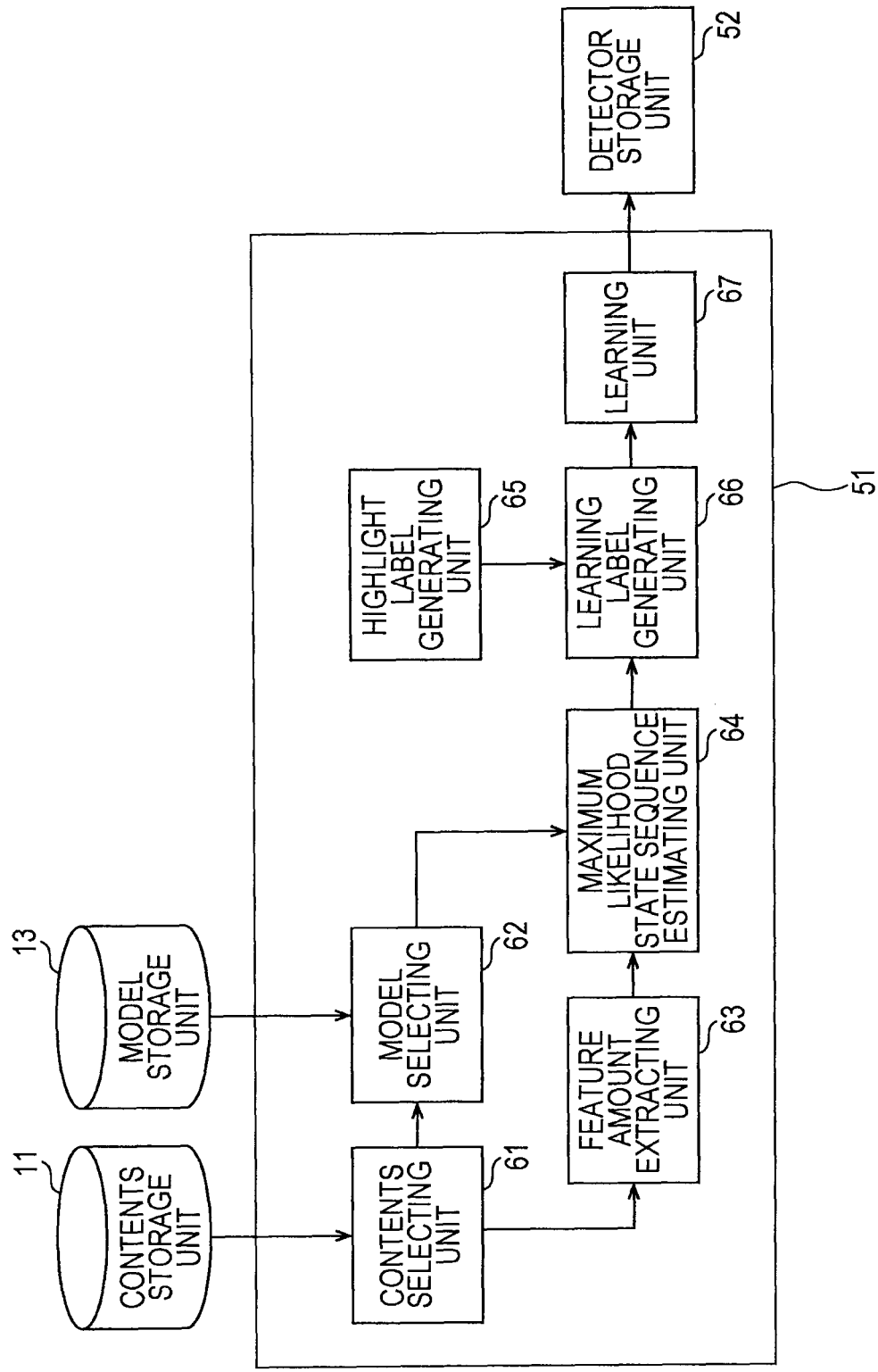
FIG. 15 is a block diagram illustrating a configuration example of a highlight detector learning unit 51.

FIG. 15 is a block diagram illustrating a configuration example of the highlight detector learning unit 51 in FIG. 14.

In FIG. 15, the highlight detector learning unit 51 is configured of a contents selecting unit 61, a model selecting unit 62, a feature amount extracting unit 63, a maximum likelihood state sequence estimating unit 64, a highlight label generating unit 65, a learning label generating unit 66, and a learning unit 67.

The contents selecting unit 61 selects a content to be used for learning of a highlight detector out of the contents stored in the contents storage unit 11 as the content for detector learning of interest (hereafter, simply referred to as "content of interest"), for example, according to the user's operations.

Specifically, the contents selecting unit 61 selects, for example, the content that the user specified as a playback object out of the recorded programs that are contents stored in the contents storage unit 11, as the content of interest.

Subsequently, the contents selecting unit 61 supplies the content of interest to the feature amount extracting unit 63, and also recognizes the category of the content of interest, and supplies to the model selecting unit 62.

The model selecting unit 62 selects the content model correlated with the category of the content of interest, from the contents selecting unit 61, out of the contents models stored in the model storage unit 13, as the model of interest, and supplies to the maximum likelihood state sequence estimating unit 64.

The feature amount extracting unit 63 extracts the feature amount of each frame of the content of interest supplied from the contents selecting unit 61 in the same way as with the feature amount extracting unit 22 in FIG. 2, and supplies (the time sequence of) the feature amount of each frame of the content of interest to the maximum likelihood state sequence estimating unit 64.

The maximum likelihood state sequence estimating unit 64 estimates, in the same way as with the maximum likelihood state sequence estimating unit 34 in FIG. 9, the maximum likelihood state sequence causing state transition where likelihood is the highest that (the time sequence of) the feature amount of the content of interest from the feature amount extracting unit 63 will be observed (the maximum likelihood state sequence of the model of interest as to the content of interest), in the model of interest from the model selecting unit 62.

Subsequently, the maximum likelihood state sequence estimating unit 64 supplies the maximum likelihood state sequence of the model of interest as to the content of interest to the learning label generating unit 66.

The highlight label generating unit 65 follows user operations to perform labeling of a highlight label representing whether or not a highlight scene, to each frame of the content of interest selected at the contents selecting unit 61, thereby generating a highlight label sequence regarding the content of interest.

Specifically, the content of interest selected by the contents selecting unit 61 is, as described above, the content that the user has specified as a playback object, and the image of the content of interest is displayed on an unshown display (and also, audio is output from an unshown speaker).

When an interesting scene is displayed on the display, the user can input a message to the effect that this scene is an interesting scene by operating an unshown remote commander or the like, and the highlight label generating unit 65 generates a highlight label in accordance with such a user's operations.

Specifically, for example, if we say that the user's operations at the time of inputting a message representing being an interesting scene are favorite operations, the highlight label generating unit 65 generates, for example, a highlight label of which the value is "0", which represents being other than a highlight scene, as to a frame to which favorite operations have not been performed.

Also, the highlight label generating unit 65 generates, for example, a highlight label of which the value is "1", which represents being a highlight scene, as to a frame to which favorite operations have been performed.

Subsequently, the highlight label generating unit 65 supplies a highlight label sequence that is the time sequence of a highlight label generated regarding the content of interest to the learning label generating unit 66.

The learning label generating unit 66 generates a label sequence for learning that is a pair of the sequence of the state IDs that is the maximum likelihood state sequence of the model of interest as to the content of interest (the maximum likelihood state sequence obtained from the content of interest) from the maximum likelihood state sequence estimating unit 64, and the highlight label sequence from the highlight label generating unit 65.

Specifically, the learning label generating unit 66 generates the label sequence for learning of multi streams, made up of a pair of the state ID at each point-in-time t (the state ID of a state corresponding to the frame t) regarding the state IDs that are the maximum likelihood state sequence from the maximum likelihood state sequence estimating unit 64 and the highlight label sequence from the highlight label generating unit 65, and the highlight label (highlight label as to frame t).

Subsequently, the learning label generating unit 66 supplies the label sequence for learning to the learning unit 67.

The learning unit 67 uses the label sequence for learning from the learning label generating unit 66 to perform, for example, learning of a highlight detector which is a multi-stream HMM of the Ergodic type, in accordance with the Baum-Welch re-estimation method.

Subsequently, the learning unit 67 supplies and stores the highlight detector after learning to the detector storage unit 52 in a manner correlated with the category of the content of interest selected at the contents selecting unit 61.

Here, the highlight label obtained at the highlight label generating unit 65 is a binary label (symbol) of which the value is "0" or "1", and is a discrete value. Also, the maximum likelihood state sequence obtained from the content of interest at the maximum likelihood state sequence estimating unit 64 is the sequence of state IDs, and is also a discrete value.

Accordingly, the label sequence for learning generated as a pair of such a highlight label and maximum likelihood state sequence at the learning label generating unit 66 is also (the time sequence of) a discrete value. In this way, the label sequence for learning is a discrete value, so the observation probability $b_j(o)$ of an HMM serving as a highlight detector of which the learning is performed at the learning unit 67 is a value (discrete value) itself serving as probability.

Note that with a multi-stream HMM, as to an individual sequence (stream) (hereafter, also referred to as "component sequence") making up the multi-stream, weight that is a degree for affecting the component sequence thereof on the multi-stream HMM (hereafter, also referred to as "sequence weight") may be set.

Great sequence weight is set to a component sequence to be emphasized at the time of learning of a multi-stream HMM, or at the time of recognition using a multi-stream HMM (at the time of obtaining the maximum likelihood state sequence), whereby pre-knowledge can be provided so as to prevent the learning result of the multi-stream HMM from falling into a local solution.

Note that the details of a multi-stream HMM are described in, for example, SATOSHI TAMURA, KOJI IWANO, SADAOKI FURUI, "Multi-modal speech recognition using optical-flow analysis", Acoustical Society of Japan (ASJ), 2001 autumn lecture collected papers, 1-1-14, pp. 27-28 (2001-10), and so forth.

The above literature has introduced an example of use of a multi-stream HMM in the audio-visual speech recognition field. Specifically, description has been made wherein when the audio SN (Signal to Noise ratio) ratio is low, learning and recognition are performed so as to increase influence of an image larger than influence of audio by lowering the sequence weight of the audio feature amount sequence.

A point of a multi-stream HMM different from an HMM employing a single sequence other than a multi stream is, as illustrated in Expression (2), in that the observation probability $b_j(o_{[1]}, o_{[2]}, \ldots, o_{[M]})$ of the entire multi-stream is calculated by taking sequence weight $W_m$ set beforehand into consideration regarding the observation probability $b_{[m]j}(o_{[m]})$ of each component sequence $o_{[m]}$ making up the multi stream.

[Expression 2]

Expression 2

$$b_j(o_{[1]}, o_{[2]}, \ldots, o_{[M]}) = \prod_{m=1}^{M} b_{[m]j}(o_{[m]})^{W_m}, \quad (2)$$

where $W_m \geq 0, \sum_{m=1}^{M} W_m = 1$

Here, in Expression (2), M represents the number of component sequences $o_{[m]}$ (number of streams) making up the multi stream, sequence weight $W_m$ represents the sequence weight of the m'th component sequences $o_{[m]}$ of M component sequences making up the multi stream.

A label sequence for learning that is a multi stream to be used for learning at the learning unit 67 in FIG. 15 is made up of two component sequences of a state ID sequence $o_{[v]}$ and a highlight label sequence $o_{[HL]}$.

In this case, the observation probability $b_j(o_{[v]}, o_{[HL]})$ of the label sequence for learning is represented with Expression (3).

[Expression 3]

$$b_j(o_{[V]}, o_{[HL]}) = (b_{[V]j}(o_{[V]}))^W \times (b_{[HL]j}(o_{[HL]}))^{1-W} \quad (3)$$

Here, in Expression (3), $b_{[v]j}(o_{[v]})$ represents the observation probability of the state ID sequence $o_{[v]}$ (the observation probability that the observation value $o_{[v]}$ will be observed in the state $s_j$), and $b_{[HL]j}(o_{[HL]})$ represents the observation probability of the highlight label sequence $o_{[HL]}$. Also, W represents the sequence weight of the state ID sequence $o_{[v]}$, and 1−W represents the sequence weight of the highlight label sequence $O_{[HL]}$.

Note that with learning of an HMM serving as a highlight detector, 0.5 may be employed as the sequence weight W, for example.

Figure 16:
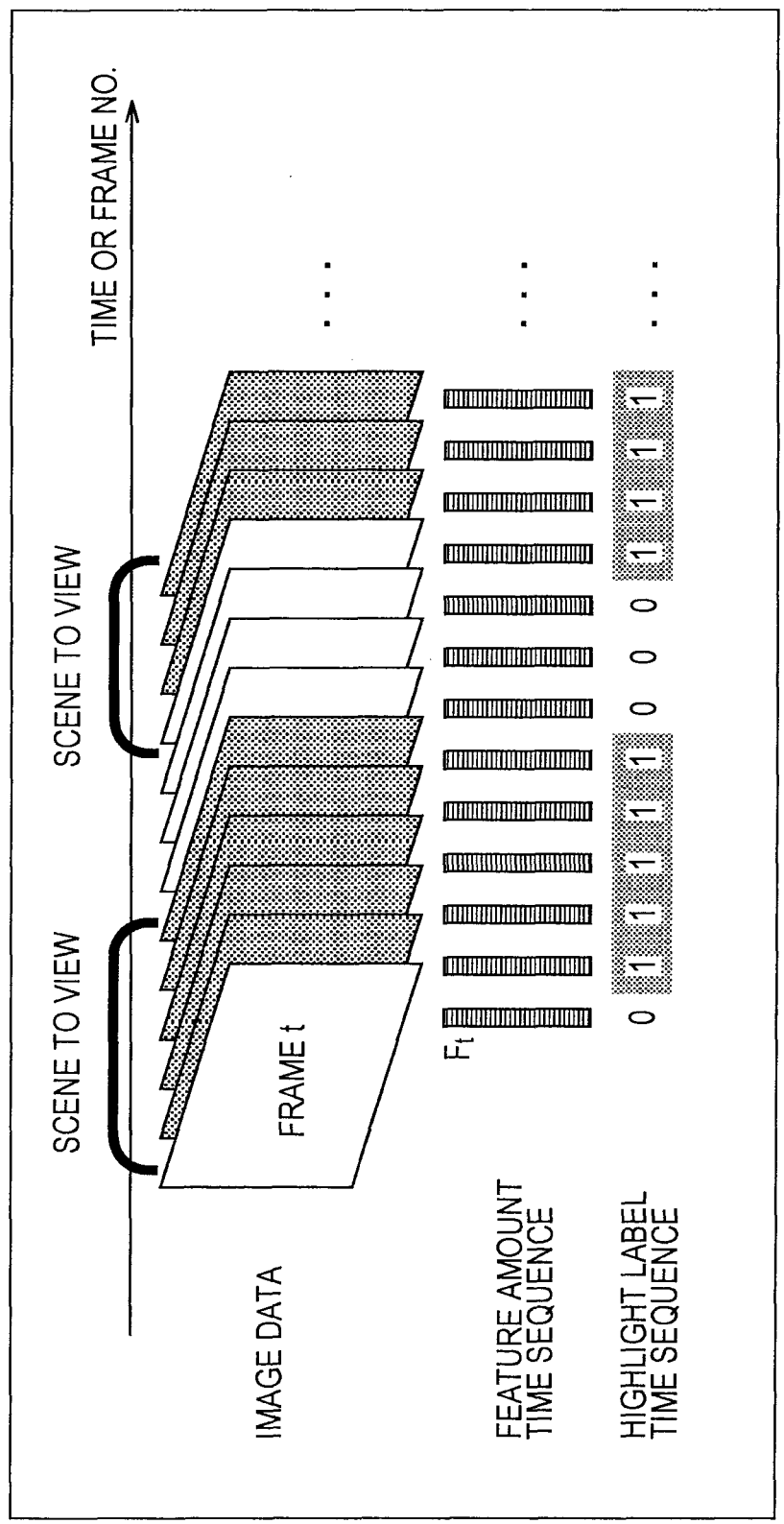
FIG. 16 is a diagram for describing processing of a highlight label generating unit 65.

FIG. 16 is a diagram for describing the processing of the highlight label generating unit 65 in FIG. 15.

The highlight label generating unit 65 generates a highlight label of which the value is "0" as to a frame (point-in-time) of the content of interest to which the user's favorite operations have not been performed, which represents being other than a highlight scene. Also, the highlight label generating unit 65 generates a highlight label of which the value is "1" as to a frame of the content of interest to which the user's favorite operations have been performed, which represents being a highlight scene.

[Highlight Detector Learning Processing]

Figure 17:
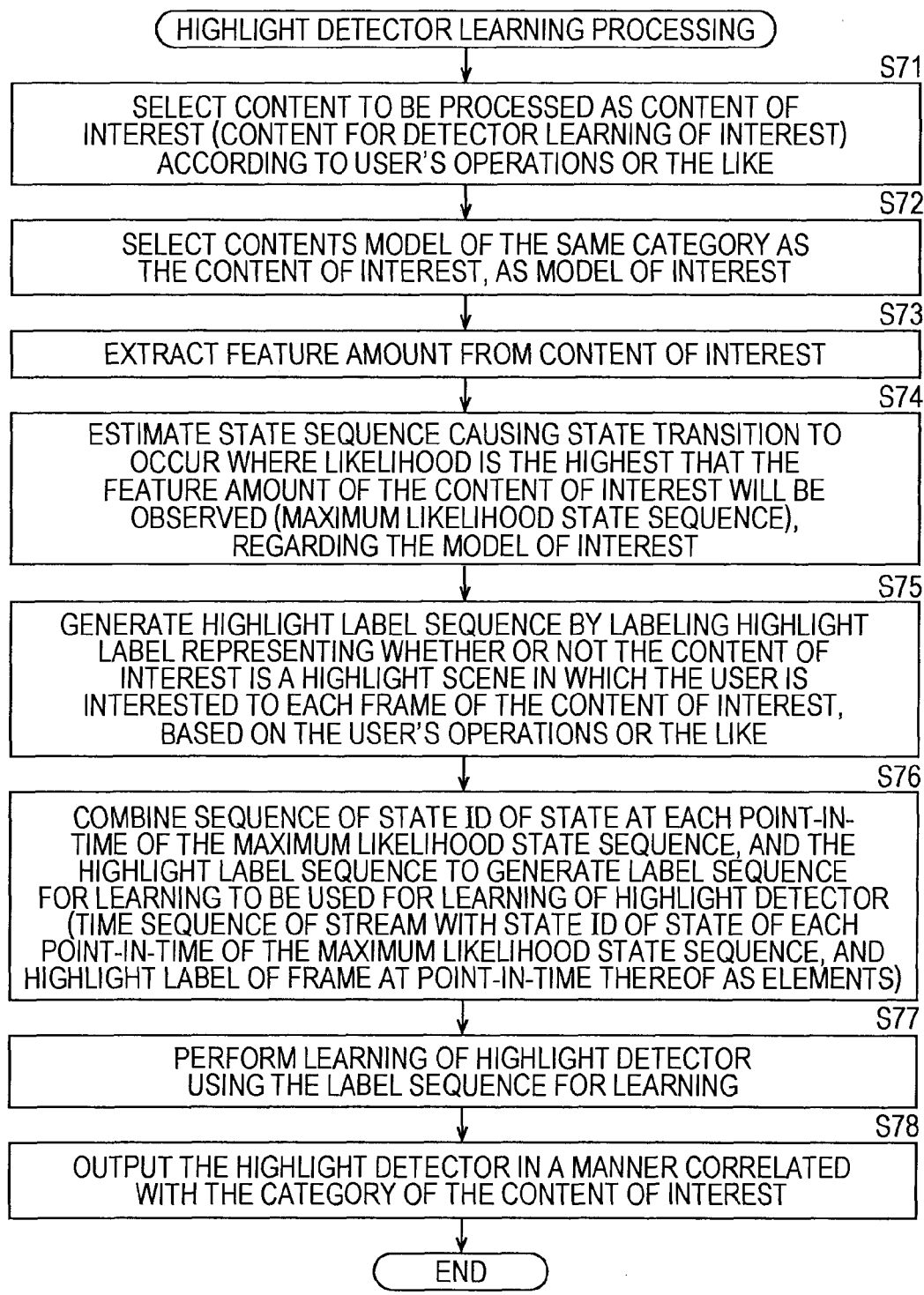
FIG. 17 is a flowchart for describing highlight detector learning processing by the highlight detector learning unit 51.

FIG. 17 is a flowchart for describing the processing (highlight detector learning processing) that the highlight detector learning unit 51 in FIG. 15 performs.

In step S71, the contents selecting unit 61 selects, for example, a content with playback being specified by the user's operations out of the contents stored in the contents storage unit 11 as the content of interest (content for detector learning of interest).

Subsequently, the contents selecting unit 61 supplies the content of interest to the feature amount extracting unit 63, and also recognizes the category of the content of interest, and supplies to the model selecting unit 62, and the processing proceeds from step S71 to step S72.

In step S72, the model selecting unit 62 selects a contents model correlated with the category of the content of interest from the contents selecting unit 61 out of the contents models stored in the model storage unit 13 as the model of interest.

Subsequently, the model selecting unit 62 supplies the model of interest to the maximum likelihood state sequence estimating unit 64, and the processing proceeds from step S72 to step S73.

In step S73, the feature amount extracting unit 63 extracts the feature amount of each frame of the content of interest supplied from the contents selecting unit 61, supplies (the time sequence of) the feature amount of each frame of the content of interest to the maximum likelihood state sequence estimating unit 64, and the processing proceeds to step S74.

In step S74, the maximum likelihood state sequence estimating unit 64 estimates the maximum likelihood state sequence causing state transition where likelihood is the highest that (the time sequence of) the feature amount of the content of interest from the feature amount extracting unit 63 will be observed in the model of interest from the model selecting unit 62 (maximum likelihood state sequence of model of interest as to the content of interest).

Subsequently, the maximum likelihood state sequence estimating unit 64 supplies the maximum likelihood state sequence of the model of interest as to the content of interest to the learning label generating unit 66, and the processing proceeds from step S74 to step S75.

In step S75, the highlight label generating unit 65 generates a highlight label sequence regarding the content of interest by performing labeling of a highlight label to each frame of the content of interest selected at the contents selecting unit 61 in accordance with the user's operations.

Subsequently, the highlight label generating unit 65 supplies the highlight label sequence generated regarding the content of interest to the learning label generating unit 66, and the processing proceeds to step S76.

In step S76, the learning label generating unit 66 generates a learning label that is a pair of the state ID sequence that is the maximum likelihood state sequence of the model of interest as to the content of interest from the maximum likelihood state sequence estimating unit 64, and the highlight label sequence from the highlight label generating unit 65.

Subsequently, the learning label generating unit 66 supplies the label sequence for learning to the learning unit 67, and the processing proceeds from step S76 to step S77.

In step S77, the learning unit 67 uses the label sequence for learning from the learning label generating unit 66 to perform learning of a highlight detector that is an HMM, and the processing proceeds to step S78.

In step S78, the learning unit 67 supplies and stores the highlight detector after learning to the detector storage unit 52 in a manner correlated with the category of the content of interest selected at the contents selecting unit 61.

As described above, a highlight detector is obtained by performing learning of an HMM using a label sequence for learning that is a pair of a state ID sequence that is the maximum likelihood state sequence of the model of interest as to the content of interest, and a highlight label sequence generated according to the user's operations.

Accordingly, determination may be made by referencing the observation probability $b_{[HL]}(o_{[HL]})$ of the highlight label sequence $o_{[HL]}$ of each state of the highlight detector whether or not a frame corresponding to the state $o_{[v]}$ of a contents model, observed in the state thereof (probability is high), is a scene in which the user is interested (highlight scene).

[Configuration Example of Highlight Detecting Unit 53]

Figure 18:
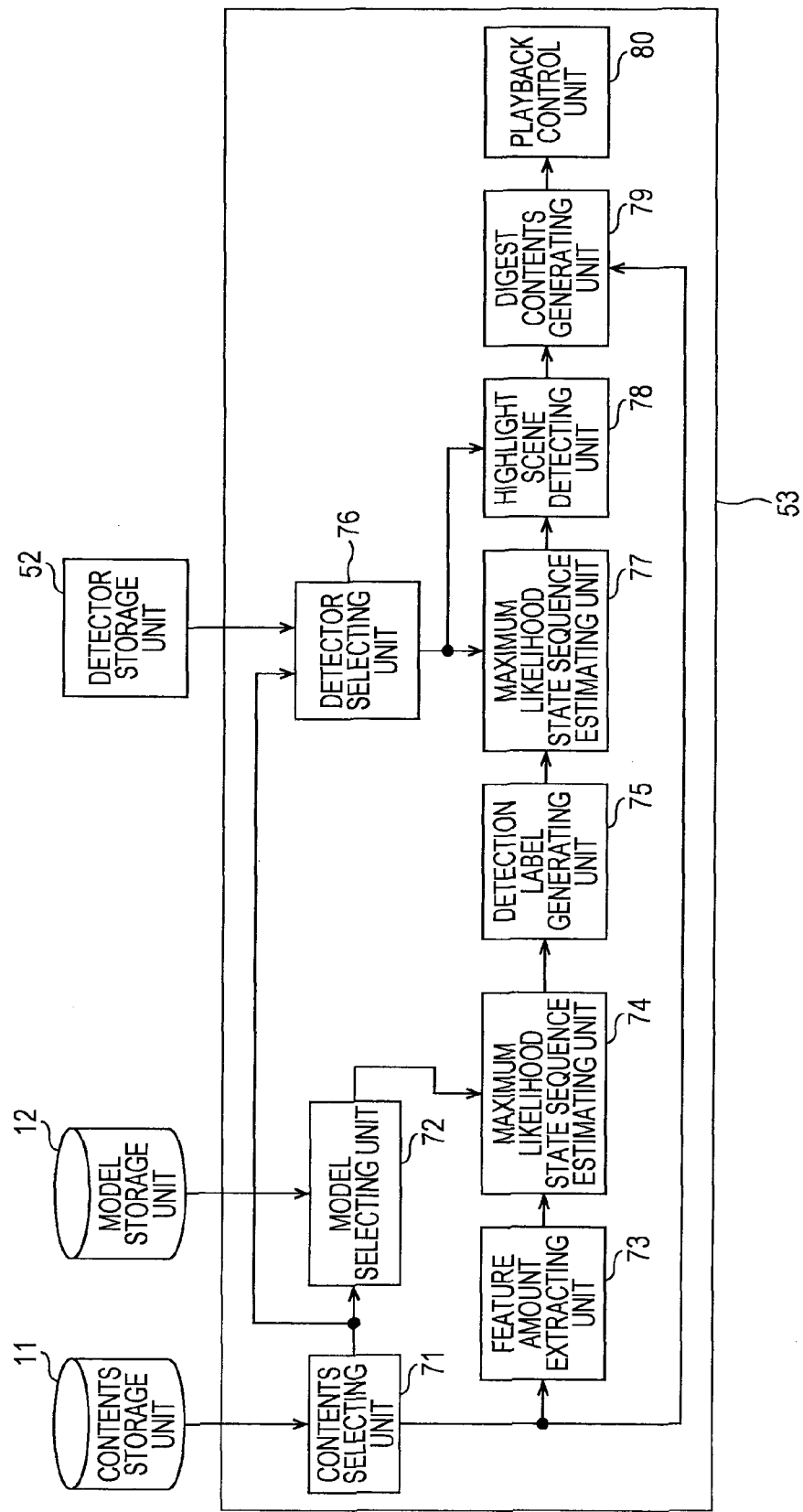
FIG. 18 is a block diagram illustrating a configuration example of a highlight detecting unit 53.

FIG. 18 is a block diagram illustrating a configuration example of the highlight detecting unit 53 in FIG. 14.

In FIG. 18, the highlight detecting unit 53 is configured of a contents selecting unit 71, a model selecting unit 72, a feature amount extracting unit 73, a maximum likelihood state sequence estimating unit 74, a detection label generating unit 75, a maximum likelihood state sequence estimating unit 77, a highlight scene detecting unit 78, a digest contents generating unit 79, and a playback control unit 80.

The contents selecting unit 71 selects, for example, the content for highlight detection of interest (hereafter, also simply referred to as "content of interest") that is an object content from which a highlight scene is to be detected, out of the contents stored in the contents storage unit 11, for example, according to the user's operations.

Specifically, the contents selecting unit 71 selects, for example, the content specified as a content from which a digest is generated by the user, as the content of interest. Alternatively, the contents selecting unit 71 selects, for example, an arbitrary content of contents from which a digest has not been generated yet as the content of interest.

After selecting the content of interest, the contents selecting unit 71 supplies the content of interest thereof to the feature amount extracting unit 73, and also recognizes the category of the content of interest, and supplies to the model selecting unit 72 and detector selecting unit 76.

The model selecting unit 72 selects a contents model correlated with the category of the content of interest, from the content selecting unit 71, out of the contents models stored in the model storage unit 13 as the model of interest, and supplies to the maximum likelihood state sequence estimating unit 74.

The feature amount extracting unit 73 extracts, in the same way as with the feature amount extracting unit 22 in FIG. 2, the feature amount of each frame of the content of interest supplied from the contents selecting unit 71, and supplies (the time sequence of) the feature amount of each frame of the content of interest to the maximum likelihood state sequence estimating unit 74.

The maximum likelihood state sequence estimating unit 74 estimates, in the same way as with the maximum likelihood state sequence estimating unit 34 in FIG. 9, the maximum likelihood state sequence causing state transition where likelihood is the highest that (the time sequence of) the feature amount of the content of interest from the feature amount extracting unit 73 will be observed in the model of interest from the model selecting unit 72 (maximum likelihood state sequence of the model of interest as to the content of interest).

Subsequently, the maximum likelihood state sequence estimating unit 74 supplies the maximum likelihood state sequence of the model of interest as to the content of interest to the detection label generating unit 75.

The detection label generating unit 75 generates a label sequence for detection that is a pair of a state ID sequence that is the maximum likelihood state sequence of the model of interest as to the content of interest (the maximum likelihood state sequence obtained from the content of interest) from the maximum likelihood state sequence estimating unit 74, and a highlight label sequence of highlight labels alone representing being other than a highlight scene (or being a highlight scene).

Specifically, the detection label generating unit 75 generates a highlight label sequence having the same length (sequence length) as the maximum likelihood state sequence from the maximum likelihood state sequence estimating unit 74, which is a highlight label sequence of highlight labels alone representing being other than a highlight scene, as a dummy sequence, as if it were, to be given to a highlight detector.

Further, the detection label generating unit 75 generates a label sequence for detection of a multi-stream, made up of a pair of a state ID that is the maximum likelihood state sequence from the maximum likelihood state sequence estimating unit 74, the state ID at each point-in-time t (the state ID of a state corresponding to the frame t) in a highlight label sequence serving as a dummy sequence, and a highlight label (a highlight label as to the frame t (here, a highlight label representing being other than a highlight scene)).

Subsequently, the detection label generating unit 75 supplies the label sequence for detection to the maximum likelihood state sequence estimating unit 77.

The detecting unit selecting unit 76 selects a highlight detector correlated with the category of the content of interest, from the contents selecting unit 71, out of the highlight detectors stored in the detector storage unit 52, as the detector of interest. Subsequently, the detector selecting unit 76 obtains the detector of interest out of the highlight detectors stored in the detector storage unit 52, and supplies to the maximum likelihood state sequence estimating unit 77 and highlight scene detecting unit 78.

The maximum likelihood state sequence estimating unit 77 estimates, for example, in accordance with the Viterbi algorithm, the maximum likelihood state sequence (hereafter, also referred to as "highlight relation state sequence") causing state transition where likelihood is the highest that the label sequence for detection from the detection label generating unit 75 will be observed in the HMM that is the detector of interest from the detector selecting unit 76.

Subsequently, the maximum likelihood state sequence estimating unit 77 supplies the highlight relation state sequence to the highlight scene detecting unit 78.

Note that the label sequence for detection is a multi stream with the state ID sequence $o_{[v]}$ that is the maximum likelihood state sequence of the model of interest as to the content of interest, and the highlight label sequence $o_{[HL]}$ serving as a dummy sequence as component sequences, and at the time of estimation of the highlight relation state sequence, the observation probability $b_j(o_{[v]}, o_{[HL]})$ of the label sequence for detection is obtained in accordance with Expression (3) in the same way as with the case of the label sequence for learning.

However, as for the sequence weight W of the state ID sequence $o_{[v]}$ at the time of obtaining the observation probability $b_j(o_{[v]}, o_{[HL]})$ of the label sequence for detection is 1.0. In this case, the sequence weight W of the state ID sequence $o_{[v]}$ is 0.0. Thus, with the maximum likelihood state sequence estimating unit 77, estimation of the highlight relation state sequence is performed while taking only the maximum likelihood state sequence of the model of interest as to the content of interest into consideration and without taking the highlight label sequence input as a dummy sequence into consideration.

The highlight scene detecting unit 78 recognizes the observation probability $b_{[HL]j}(o_{[HL]})$ of the highlight label $o_{[HL]}$ of each state of the maximum likelihood state sequence (highlight relation state sequence) obtained from the label sequence for detection, from the maximum likelihood state sequence estimating unit 77 by referencing the detector of interest from the detector selecting unit 76.

Further, the highlight scene detecting unit 78 detects the frame of a highlight scene for the content of interest based on the observation probability $b_{[HL]j}(o_{[HL]})$ of the highlight label $o_{[HL]}$.

Specifically, in the event that, in the state $s_j$ at the point-in-time t of the highlight relation state sequence, difference $b_{[HL]j}(o_{[HL]}="1")-b_{[HL]j}(o_{[HL]}="0")$ between the observation probability $b_{[HL]j}(o_{[HL]}="1")$ of a highlight label representing being a highlight scene, and the observation probability $b_{[HL]j}(o_{[HL]}="0")$ of a highlight label representing being other than a highlight scene is greater than a predetermined threshold THb (e.g., THb=0, etc.), the highlight scene detecting unit 78 detects the frame t of the content of interest, corresponding to the state $s_j$ at the point-in-time t, as the frame of a highlight scene.

Subsequently, the highlight scene detecting unit 78 sets, of the content of interest, regarding a frame being a highlight scene, a highlight flag of one bit representing whether or not the frame is a highlight scene frame, to a value representing being a highlight scene, for example, "1". Also, the highlight scene detecting unit 78 sets, of the content of interest, regarding a frame being other than a highlight scene, the highlight flag to a value representing being other than a highlight scene, for example, "0".

Subsequently, the highlight scene detecting unit 78 supplies (the time sequence of) the highlight flag of each frame of the content of interest to the digest contents generating unit 79.

The digest contents generating unit 79 extracts a highlight scene frame determined by the highlight flag from the highlight scene detecting unit 78 from the frames of the content of interest from the contents selecting unit 71. Further, the digest contents generating unit 79 uses at least the highlight scene frame extracted from the frames of the content of interest to generate a digest content that is a digest of the content of interest, and supplies to the playback control unit 80.

The playback control unit 80 performs playback control for playing the digest content from the digest contents generating unit 79.

Figure 19:
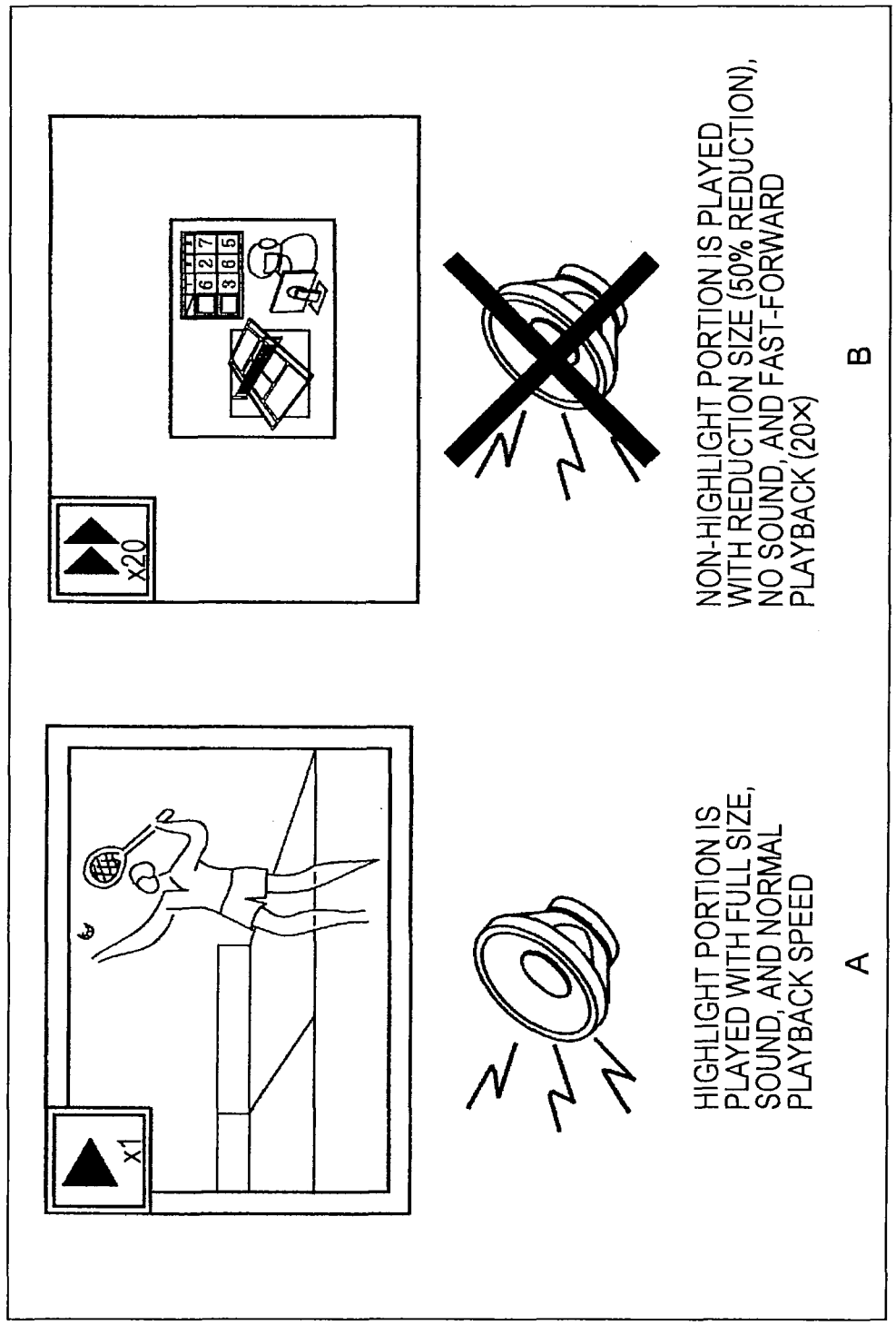
FIG. 19 is a diagram for describing an example of a digest content that a digest contents generating unit 79 generates.

FIG. 19 illustrates an example of a digest content that the digest contents generating unit 79 in FIG. 18 generates.

A in FIG. 19 illustrates a first example of a digest content.

In A in FIG. 19, the digest contents generating unit 79 extracts the image of a highlight scene frame, and audio data along with the image thereof from the content of interest, and generates the content of a moving image where the image data and audio data thereof are combined while maintaining temporal context, as a digest content.

In this case, with the playback control unit 80 (FIG. 18), only the image of a highlight scene frame is displayed with the same size (hereafter, also referred to as "full size") as with the original content (content of interest), and also the audio along with the image thereof is output.

Note that, in A in FIG. 19, with extraction of the image of a highlight scene frame from the content of interest, all the highlight scene frames may also be extracted, or extraction with frames being thinned out may also be performed, such as one frame extraction for every two highlight scene frames, or the like.

B in FIG. 19 illustrates a second example of a digest content.

In B in FIG. 19, the digest contents generating unit 79 performs frame thinning-out processing (e.g., thinning-out processing for extracting one frame per 20 frames) so that of the frames of the content of interest, the image of a non-highlight scene frame is viewed as fast forward at the time of viewing and listening, and also the content of interest is processed so that audio along with the image of a non-highlight scene frame is muted, thereby generating a digest content.

In this case, with the playback control unit 80 (FIG. 18), regarding a highlight scene, the image is displayed by 1×, and also, audio along with the image thereof is output, but with regard to other than a highlight scene (non-highlight scene), the image is displayed by fast forward (e.g., 20×), and also, audio along with the image thereof is not output.

Note that, in B in FIG. 19, audio along with the image of a non-highlight scene has been arranged so as not to be output, but audio along with the image of a non-highlight scene may be output in the same way as audio along with the image of a highlight scene. In this case, the audio along with the image of a non-highlight scene may be output at a small volume, and the audio along with the image of a highlight scene may be output at a large volume, respectively.

Also, in B in FIG. 19, the image of a highlight scene, and the image of a non-highlight scene are displayed with the same size (full size), but the image of a non-highlight scene may be displayed with a smaller size than the size of the image of a highlight scene (e.g., the sizes obtained by reducing the sizes of the width and length of the image of a highlight scene to 50% respectively, etc.) (, or the image of a highlight scene may be displayed with a greater size than the size of the image of a non-highlight scene).

Further, in FIG. 19, in the event of thinning out frames, thinning-out ratio thereof may be specified by the user, for example.

[Highlight Detection Processing]

Figure 20:
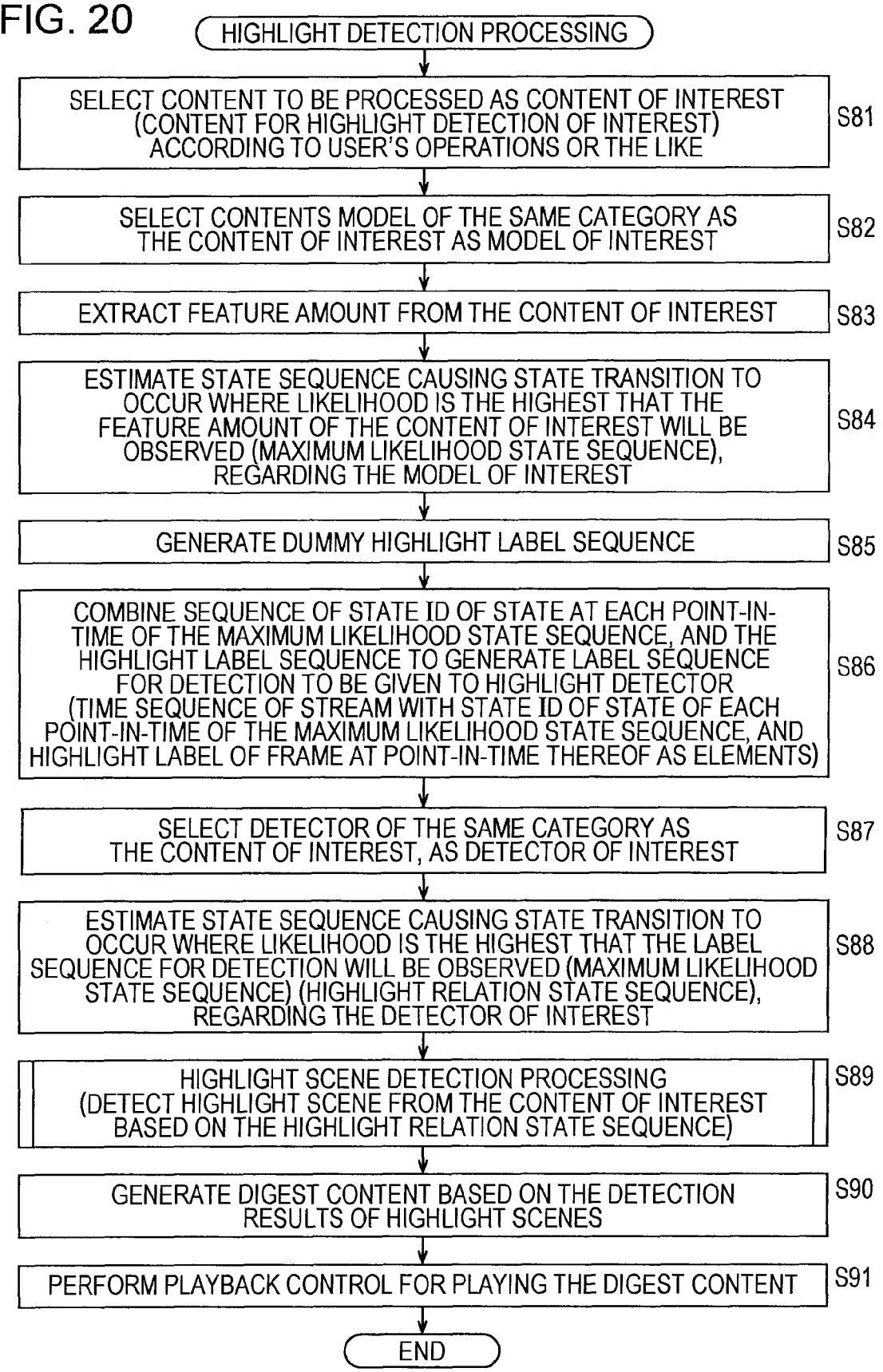
FIG. 20 is a flowchart for describing highlight detection processing by a highlight detecting unit 53.

FIG. 20 is a flowchart for describing the processing (highlight detection processing) of the highlight detecting unit 53 in FIG. 18.

In step S81, the contents selecting unit 71 selects the content of interest that is a content from which a highlight scene is to be detected (content for highlight detection of interest) out of the contents stored in the contents storage unit 11.

Subsequently, the contents selecting unit 71 supplies the content of interest to the feature amount extracting unit 73. Further, the contents selecting unit 71 recognizes the category of the content of interest, and supplies to the model selecting unit 72 and detector selecting unit 76, and the processing proceeds from step S81 to step S82.

In step S82, the model selecting unit 72 selects a contents model correlated with the category of the content of interest, from the contents selecting unit 71, out of the contents models stored in the model storage unit 13, as the model of interest.

Subsequently, the model selecting unit 72 supplies the model of interest to the maximum likelihood state sequence estimating unit 74, and the processing proceeds from step S82 to step S83.

In step S83, the feature amount extracting unit 73 extracts the feature amount of each frame of the content of interest supplied from the contents selecting unit 71, supplies to the maximum likelihood state sequence estimating unit 74, and the processing proceeds to step S84.

In step S84, the maximum likelihood state sequence estimating unit 74 estimates the maximum likelihood state sequence (the maximum likelihood state sequence of the model of interest as to the content of interest) causing state transition where likelihood is the highest that (the time sequence of) the feature amount of the content of interest from the feature amount extracting unit 73 will be observed in the model of interest from the model selecting unit 72.

Subsequently, the maximum likelihood state sequence estimating unit 74 supplies the maximum likelihood state sequence of the model of interest as to the content of interest to the detection label generating unit 75, and the processing proceeds from step S84 to step S85.

In step S85, the detection label generating unit 75 generates a highlight label sequence made up of highlight labels (highlight labels of which the values are "0") alone representing being other than a highlight scene, as a dummy highlight label sequence, for example, and the processing proceeds to step S86.

In step S86, the detection label generating unit 75 generates a label sequence for detection that is a pair of a state ID sequence that is the maximum likelihood state sequence of the model of interest as to the content of interest, and a dummy highlight label sequence, from the maximum likelihood state sequence estimating unit 74.

Subsequently, the detection label generating unit 75 supplies the label sequence for detection to the maximum likelihood state sequence estimating unit 77, and the processing proceeds from step S86 to step S87.

In step S87, the detector selecting unit 76 selects a highlight detector correlated with the category of the content of interest, from the contents selecting unit 71, out of the highlight detectors stored in the detector storage unit 52, as the detector of interest. Subsequently, the detector selecting unit 76 obtains the detector of interest out of the highlight detectors stored in the detector storage unit 52, supplies to the maximum likelihood state sequence estimating unit 77 and highlight scene detecting unit 78, and the processing proceeds from step S87 to step S88.

In step S88, the maximum likelihood state sequence estimating unit 77 estimates the maximum likelihood state sequence (highlight relation state sequence) causing state transition where likelihood is the highest that the label sequence for detection from the detection label generating unit 75 will be observed in the detector of interest from the detector selecting unit 76.

Subsequently, the maximum likelihood state sequence estimating unit 77 supplies the highlight relation state sequence to the highlight scene detecting unit 78, and the processing proceeds from step S88 to step S89.

In step S89, the highlight scene detecting unit 78 detects a highlight scene from the content of interest based on the highlight relation state sequence from the maximum likelihood state sequence estimating unit 77, and performs highlight scene detection processing for outputting a highlight flag.

Subsequently, after completion of the highlight scene detection processing, the processing proceeds from step S89 to step S90, where the digest contents generating unit 79 extracts a highlight scene frame determined by the highlight flag that the highlight scene detecting unit 78 outputs, from the frames of the content of interest from the contents selecting unit 71.

Further, the digest contents generating unit 79 uses a highlight scene frame extracted from the frames of the content of interest to generate a digest content of the content of interest, supplies to the playback control unit 80, and the processing proceeds from step S90 to step S91.

In step S91, the playback control unit 80 performs playback control for playing the digest content from the digest contents generating unit 79.

Figure 21:
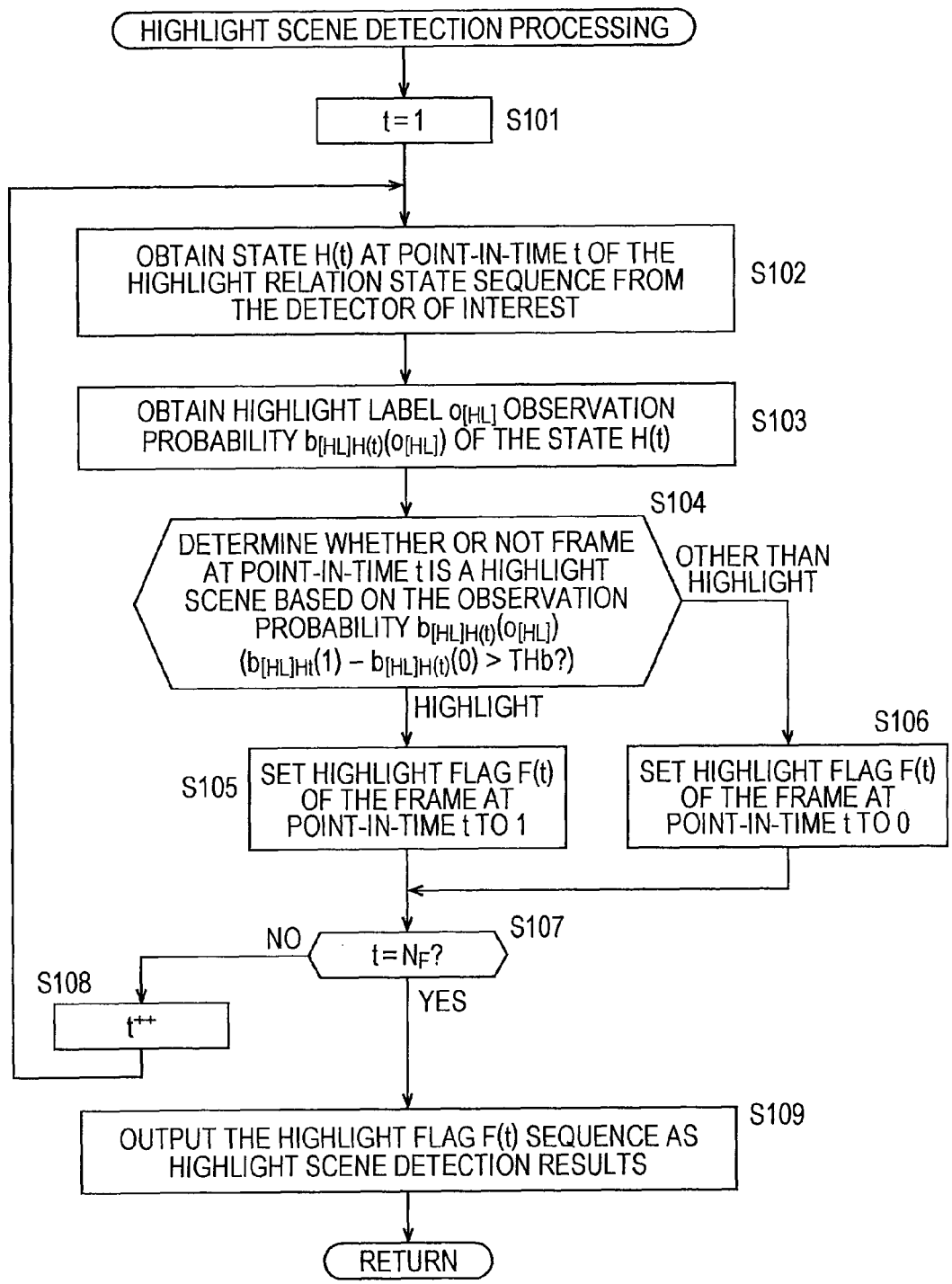
FIG. 21 is a flowchart for describing highlight scene detection processing.

FIG. 21 is a flowchart for describing the highlight scene detection processing that the highlight scene detecting unit 78 (FIG. 18) performs in step S89 in FIG. 20.

In step S101, the highlight scene detecting unit 78 sets a variable t for counting point-in-time (the number of frames of the content of interest) to 1 serving as the initial value, and the processing proceeds to step S102.

In step S102, the highlight scene detecting unit 78 obtains (recognizes) state $H(t)=s_j$ at the point-in-time t (the t'th state from the head) of the highlight relation state sequence from the maximum likelihood state sequence estimating unit 77 out of the states $s_1$ through $s_{N'}$ of an HMM serving as the detector of interest (N' represents the total number of the states of an HMM serving as the detector of interest) from the detector selecting unit 76 (FIG. 18).

Subsequently, the processing proceeds from step S102 to step S103, where the highlight scene detecting unit 78 obtains the observation probability $b_{[HL]H(t)j}(o_{[HL]})$ of the highlight label $o_{[HL]}$ of the state $H(t)=s_j$ at the point-in-time t from the detector of interest from the detector selecting unit 76, and the processing proceeds to step S104.

In step S104, the highlight scene detecting unit 78 determines whether or not the frame at the point-in-time t of the content of interest is a highlight scene based on the observation probability $b_{[HL]H(t)}(o_{[HL]})$ of the highlight label $o_{[HL]}$.

In the event that determination is made in step S104 that the frame at the point-in-time t of the content of interest is a highlight scene, i.e., for example, in the event that, of the observation probability $b_{[HL]H(t)}(o_{[HL]})$ of the highlight label $o_{[HL]}$, difference $b_{[HL]j}(o_{[HL]}="1")-b_{[HL]j}(o_{[HL]}="0")$ between the observation probability $b_{[HL]H(t)}(o_{[HL]}="1")$ of a highlight label representing being a highlight scene, and the observation probability $b_{[HL]H(t)}(o_{[HL]}="0")$ of a highlight label representing being other than a highlight scene is greater than the predetermined threshold THb, the processing proceeds to step S105, where the highlight scene detecting unit 78 sets the highlight flag F(t) of the frame at the point-in-time t of the content of interest to "1" of a value representing being a highlight scene.

Also, in the event that determination is made in step S104 that the frame at the point-in-time t of the content of interest is other than a highlight scene, i.e., for example, in the event that, of the observation probability $b_{[HL]H(t)}(o_{[HL]})$ of the highlight label $o_{[HL]}$, difference $b_{[HL]j}(o_{[HL]}="1")-b_{[HL]j}(o_{[HL]}="0")$ between the observation probability $b_{[HL]H(t)}(o_{[HL]}="1")$ of a highlight label representing being a highlight scene, and the observation probability $b_{[HL]H(t)}(o_{[HL]}="0")$ of a highlight label representing being other than a highlight scene is not greater than the predetermined threshold THb, the processing proceeds to step S106, where the highlight scene detecting unit 78 sets the highlight flag F(t) of the frame at the point-in-time t of the content of interest to "0" of a value representing being other than a highlight scene.

After steps S105 and S106, the processing proceeds to step S107 in either case, where the highlight scene detecting unit 78 determines whether or not the variable t is equal to the total number $N_F$ of the frames of the content of interest.

In the event that determination is made in step S107 that the variable t is not equal to the total number $N_F$ of frames, the processing proceeds to step S108, where the highlight scene detecting unit 78 increments the variable t by one, and the processing returns to step S102.

Also, in the event that determination is made in step S107 that the variable t is equal to the total number $N_F$ of frames, i.e., in the event that, of the content of interest, the highlight flag F(t) is obtained for each frame with the feature amount being obtained, the processing proceeds to step S109, where the highlight scene detecting unit 78 outputs the sequence of the highlight flag F(t) of the content of interest to the digest contents generating unit 79 (FIG. 18) as the highlight scene detection result, and the processing returns.

As described above, the highlight detecting unit 53 (FIG. 18) estimates, with a highlight detector, a highlight relation state sequence that is the maximum likelihood state sequence in the event that a label sequence for detection that is a pair of a state ID sequence that is the maximum likelihood state sequence of the model of interest as to the content of interest, and a dummy highlight label sequence is observed, and based on the observation probability of the highlight label of each state of the highlight relation state sequence thereof, detects a highlight scene frame from the content of interest, and generates a digest content using the highlight scene frame thereof.

Also, the highlight detector is obtained by performing learning of an HMM using a label sequence for learning that is a pair of a state ID sequence that is the maximum likelihood state sequence of a contents model as to a content, and a highlight label sequence generated according to the user's operations.

Accordingly, even in the event that the content of interest for generating a digest content is not used for learning of a contents model or highlight detector, if learning of a contents model or highlight detector is performed using a content having the same category as the content of interest, a digest (digest content) generated by collecting a scene in which the user is interested as a highlight scene can readily be obtained using the contents model and highlight detector thereof.

[Configuration Example of Scrapbook Generating Unit 16]

Figure 22:
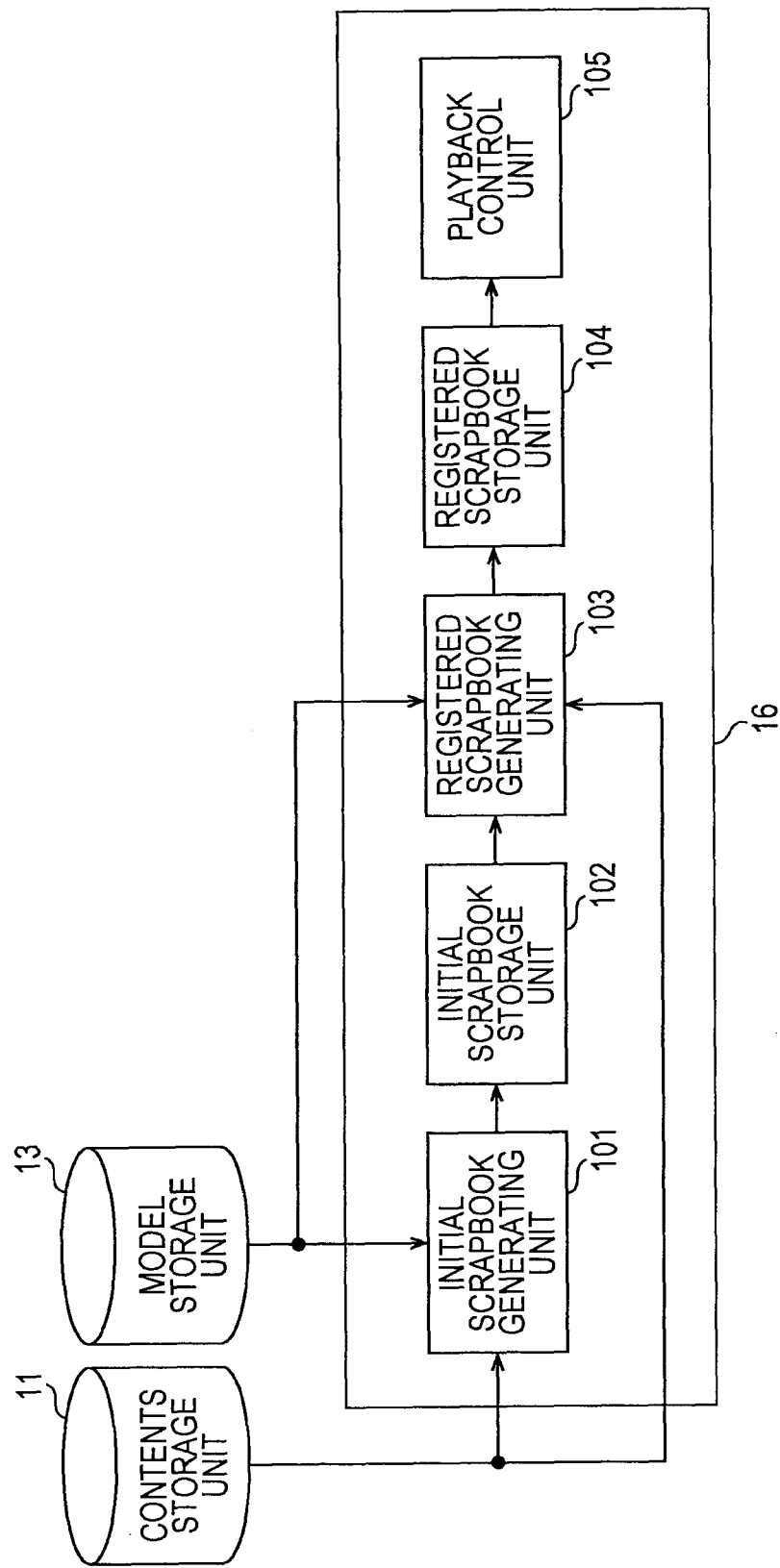
FIG. 22 is a block diagram illustrating a configuration example of a scrapbook generating unit 16.

FIG. 22 is a block diagram illustrating a configuration example of the scrapbook generating unit 16 in FIG. 1.

The scrapbook generating unit 16 is configured of an initial scrapbook generating unit 101, an initial scrapbook storage unit 102, a registered scrapbook generating unit 103, a registered scrapbook storage unit 104, and a playback control unit 105.

The initial scrapbook generating unit 101 uses a content stored in the contents storage unit 11, and a contents model stored in the model storage unit 13 to generate a later-described initial scrapbook, and supplies to the initial scrapbook storage unit 102.

The initial scrapbook storage unit 102 stores the initial scrapbook from the initial scrapbook generating unit 101.

The registered scrapbook generating unit 103 uses a content stored in the contents storage unit 11, a contents model stored in the model storage unit 13, and an initial scrapbook stored in the initial scrapbook storage unit 102 to generate a later-described registered scrapbook, and supplies to the registered scrapbook storage unit 104.

The registered scrapbook storage unit 104 stores the registered scrapbook from the registered scrapbook generating unit 103.

The playback control unit 105 performs playback control for playing a registered scrapbook stored in the registered scrapbook storage unit 104.

[Configuration Example of Initial Scrapbook Generating Unit 101]

Figure 23:
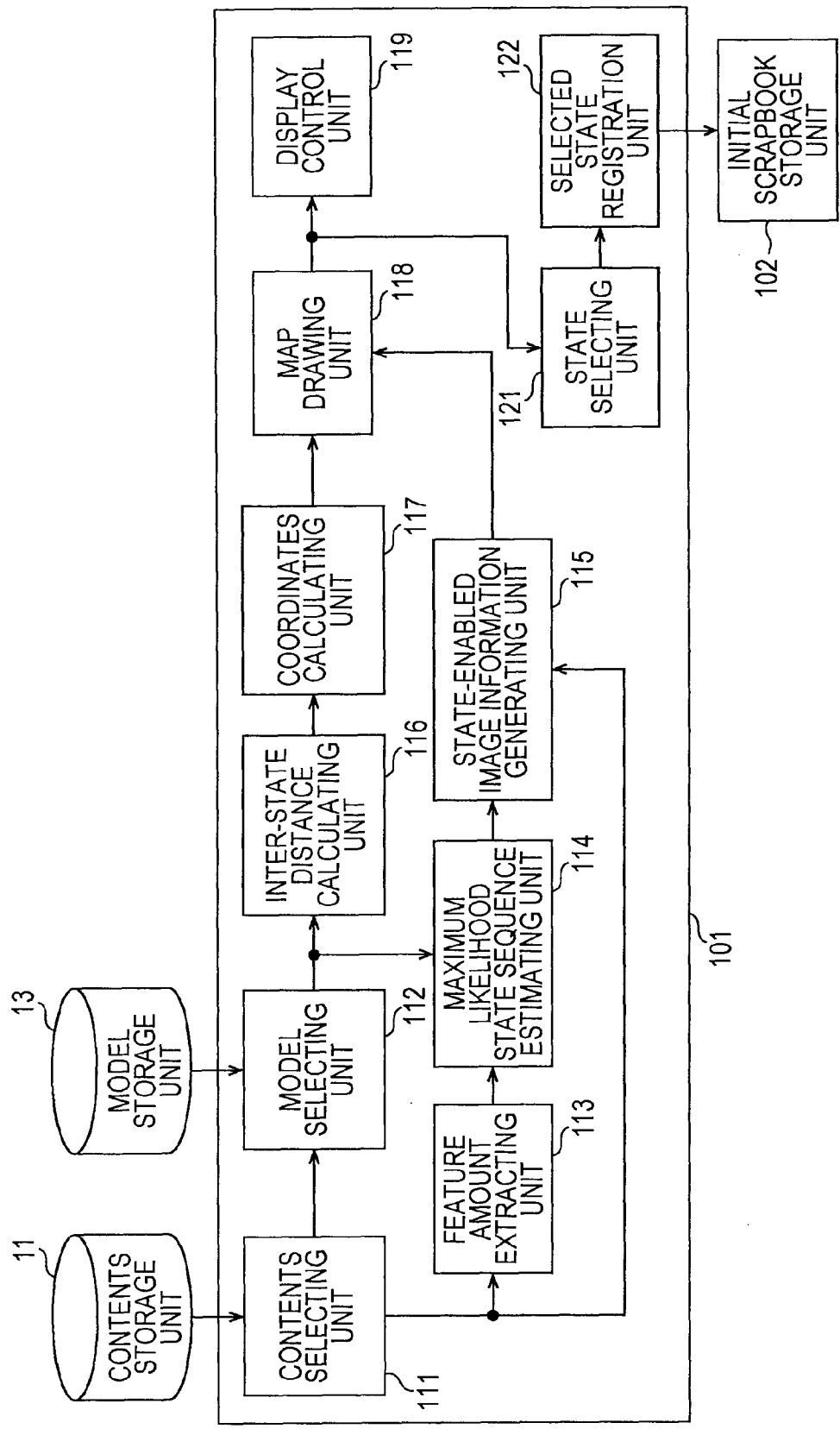
FIG. 23 is a block diagram illustrating a configuration example of an initial scrapbook generating unit 101.

FIG. 23 is a block diagram illustrating a configuration example of the initial scrapbook generating unit 101 in FIG. 22.

In FIG. 23, the initial scrapbook generating unit 101 is configured of a contents selecting unit 111, a model selecting unit 112, a feature amount extracting unit 113, a maximum likelihood state sequence estimating unit 114, a state-enabled image information generating unit 115, a inter-state distance calculating unit 116, a coordinates calculating unit 117, a map drawing unit 118, a display control unit 119, a state selecting unit 121, and a selected state registration unit 122.

The contents selecting unit 111 through the display control unit 119 are configured in the same way as with the contents selecting unit 31 through the display control unit 39 of the contents structure presenting unit 14 (FIG. 9), and perform the contents structure presentation processing described in FIG. 13.

Note that the map drawing unit 118 supplies, in the same way as with the map drawing unit 38 in FIG. 9, a model map to the display control unit 119, and also to the state selecting unit 121.

In the event that a state on the model map (FIG. 11, FIG. 12) displayed by the contents structure presentation processing has been specified by the user's operations, the state selecting unit 121 selects the specified state thereof as a selected state.

Further, the state selecting unit 121 references the model map from the map drawing unit 118 to recognize the state ID of the selected state, and supplies to the selected state registration unit 122.

The selected state registration unit 122 generates an empty scrapbook, and registers the state ID of the selected state from the state selecting unit 121 on the empty scrapbook thereof. Subsequently, the selected state registration unit 122 supplies and stores the scrapbook in which a state ID has been registered, to the initial scrapbook storage unit 102 as an initial scrapbook.

Here, the scrapbook that the selected state registration unit 122 generates is an electronic storage warehouse whereby data such as still images (photos), moving images, audio (music), and so forth can be kept (stored).

Note that the empty scrapbook is a scrapbook in which nothing is registered, and the initial scrapbook is a scrapbook in which a state ID is registered.

With the initial scrapbook generating unit 101 configured as described above, the model map (FIG. 11, FIG. 12) is displayed on an unshown display by the contents structure presentation processing (FIG. 13) being performed. Subsequently, in the event that a state on the model map has been specified by the user's operations, the state ID of the specified state (selected state) thereof is registered in the (empty) scrapbook.

Figure 24:
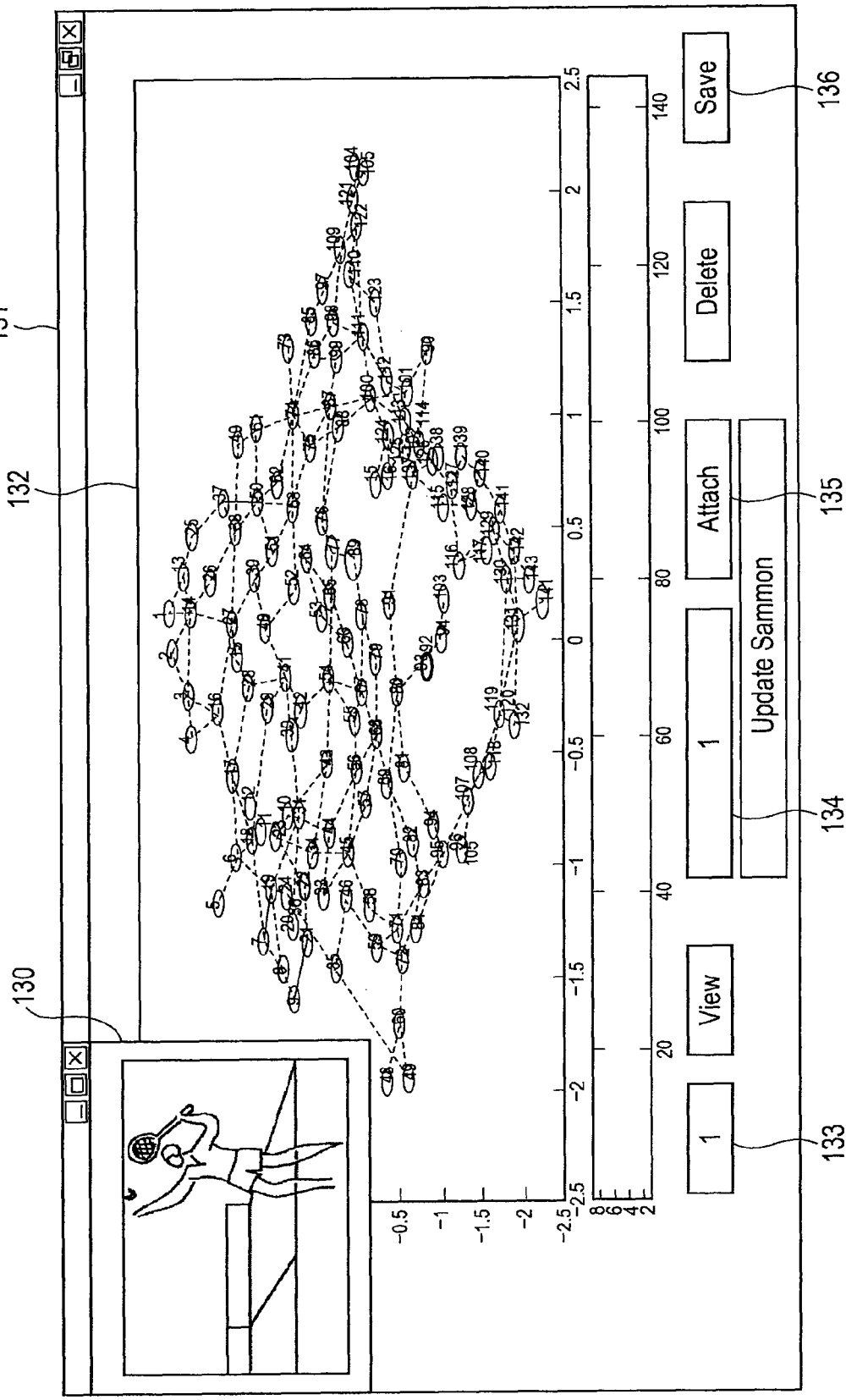
FIG. 24 is a diagram illustrating an example of user interface for a user specifying the state on a model map.

FIG. 24 is a diagram illustrating an example of a user interface for a user specifying a state on a model map, which is displayed by the display control unit 119 performing display control.

In FIG. 24, a model map 132 generated at the map drawing unit 118 is displayed on a window 131.

A state on the model map 132 within the window 131 can be focused by being specified by the user. Specification of a state by the user may be performed, for example, by clicking a state to be focused on using a pointing device such as a mouse or the like, by moving a cursor which moves according to operations of the pointing device to the position of a state to be focused on, or the like.

Also, of states on the model map 132, a state that has already been a selected state, and a state that has not been a selected state may be displayed in a different display format such as different color or the like.

With the lower portion of the window 131, a state ID input field 133, a scrapbook ID input field 134, a registration button 135, an end button 136, and so forth are provided.

Of the states on the model map 132, the state ID of a focused state is displayed on the state ID input field 133.

Note that the user can also input a state ID directly on the state ID input field 133.

A scrapbook ID that is information for determining a scrapbook for registering the state ID of a selected state is displayed on the scrapbook ID input field 134.

Note that the scrapbook ID input field 134 can be operated by the user (e.g., can be clicked using a pointing device such as a mouse or the like), and a scrap book ID to be displayed on the scrapbook ID input field 134 is changed according to operations of the scrapbook ID input field 134 by the user. Accordingly, the user can change the scrapbook in which a state ID is registered by operating the scrapbook ID input field 134.

The registration button 135 is operated in the event of registering the state ID of a focused state (state in which a state ID is displayed on the state ID input field 133) in the scrapbook. That is to say, in the event of the registration button 135 being operated, a focused state is selected (determined) as a selected state.

The end button 136 is operated, for example, when ending the display of the model map 132 (when closing the window 131), or the like.

The window 130 is opened in the event that, of the states on the model map 132, state-enabled image information generated in the contents structure presentation processing is linked to a focused state. Subsequently, the state-enabled image information linked to the focused state is displayed on the window 130.

Note that, on the window 130 (further, an unshown window other than the window 130), instead of the state-enabled image information linked to the focused state, state-enabled image information linked to each of the focused state, and a state near the focused state, or state-enabled image information linked to each of all the states on the model map 132 may be displayed temporally in sequence, or spatially in parallel.

The user can specify an arbitrary state on the model map 132 displayed on the window 131 by clicking or the like.

Upon a state being specified by the user, the display control unit 119 (FIG. 23) displays the state-enabled image information linked to the state specified by the user on the window 130.

Thus, the user can confirm the image of a frame corresponding to the state on the model map 132.

In the event of viewing the image displayed on the window 130, having an interest in the image thereof, and desiring to register on a scrapbook, the user operates the registration button 135.

Upon the registration button 135 being operated, the state selecting unit 121 (FIG. 23) selects the state on the model map 132 specified by the user at that time as a selected state.

Subsequently, upon the user operating the end button 136, the state selecting unit 121 supplies the state IDs in a selected state selected so far to the selected state registration unit 122 (FIG. 23).

The selected state registration unit 122 registers the state IDs in a selected state from the state selecting unit 121 on the empty scrapbook, and stores the scrapbook in which the state IDs have been registered to the initial scrapbook storage unit 102 as an initial scrapbook. Subsequently, the display control unit 119 (FIG. 23) closes the windows 131 and 141.

[Initial Scrapbook Generation Processing]

Figure 25:
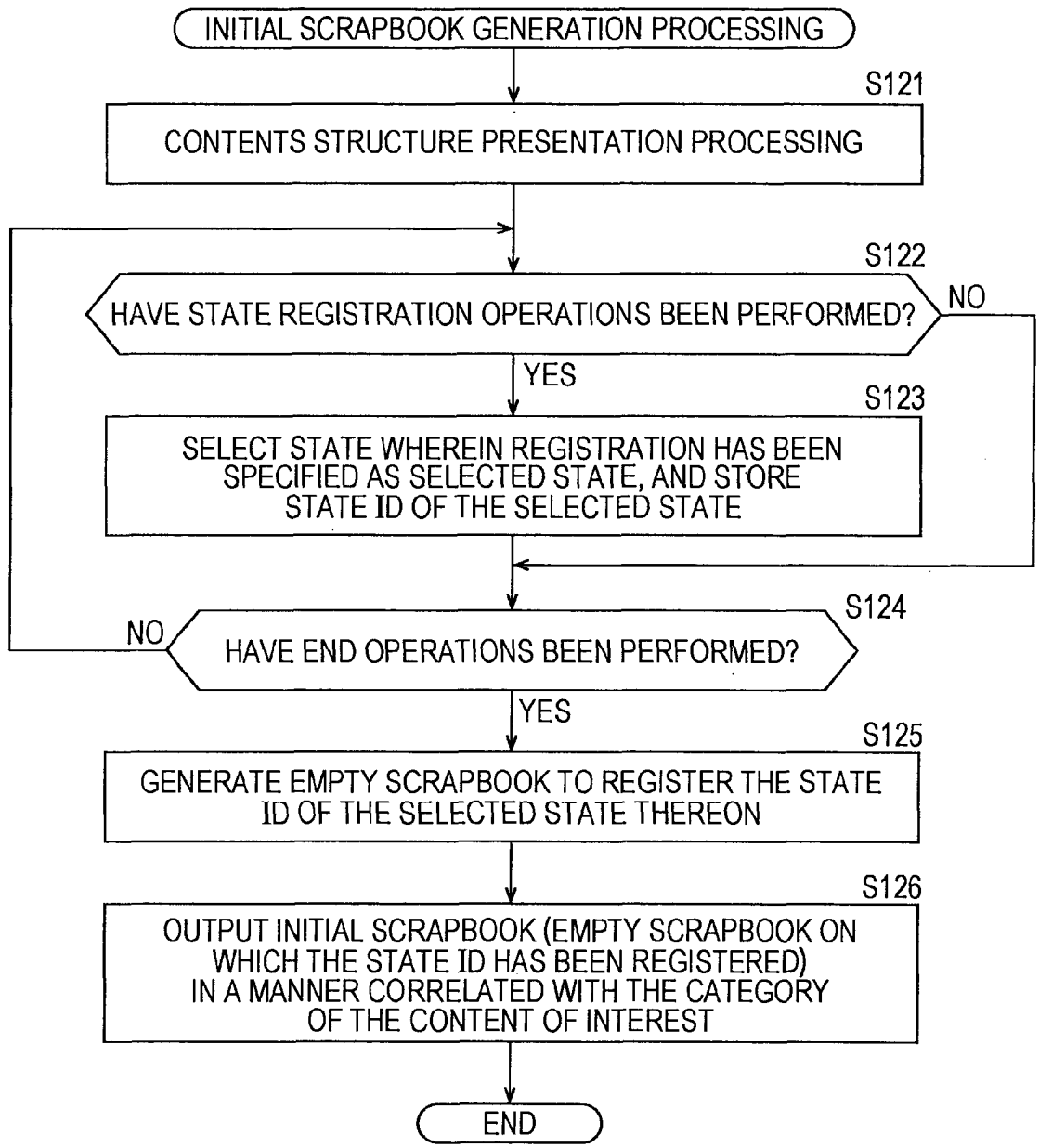
FIG. 25 is a flowchart for describing initial scrapbook generation processing by the initial scrapbook generating unit 101.

FIG. 25 is a flowchart for describing the processing (initial scrapbook generation processing) that the initial scrapbook generating unit 101 in FIG. 23 performs.

In step S121, the contents selecting unit 111 or display control unit 119 performs the same contents structure presentation processing (FIG. 13) as with the contents selecting unit 31 through the display control unit 39 in the contents structure presenting unit 14 (FIG. 9). Thus, the window 131 (FIG. 24) including the model map 132 is displayed on the unshown display.

Subsequently, the processing proceeds from step S121 to step S122, where the state selecting unit 121 determines whether or not state registration operations have been operated by the user.

In the event that determination is made in step S122 that state registration operations have been performed, i.e., in the event that a state on the model map 132 has been specified by the user, and the registration button 135 (FIG. 24) (of the window 131) has been operated, the processing proceeds to step S123, where the state selecting unit 121 selects the state on the model map 132 specified by the user at the time of the registration button 135 being operated, as a selected state.

Further, the state selecting unit 121 stores the state ID of the selected state in unshown memory, and the processing proceeds from step S123 to step S124.

Also, in the event that determination is made in step S122 that the state registration operation has not been performed, the processing skips step S123 to proceed to step S124.

In step S124, the state selecting unit 121 determines whether or not the end operation has been performed by the user.

In the event that determination is made in step S124 that the end operation has not been performed, the processing returns to step S122, and hereafter, the same processing is repeated.

Also, in the event that determination is made in step S124 that the end operation has been performed, i.e., in the event that the user has operated the end button 136 (FIG. 24), the state selecting unit 121 supplies all the state IDs of the selected states stored in step S123 to the selected state registration unit 122, and the processing proceeds to step S125.

In step S125, the selected state registration unit 122 generates an empty scrapbook, and registers the state IDs of the selected states from the state selecting unit 121 on the empty scrapbook thereof.

Further, the selected state registration unit 122 takes the scrapbook on which the state IDs have been registered, as an initial scrapbook, and correlates the initial scrapbook thereof with the category of the content selected as the content of interest (content for presentation of interest) in the contents structure presentation processing (FIG. 13) in step S121.

Subsequently, the selected state registration unit 122 supplies and stores the initial scrapbook correlated with the category of the content of interest to the initial scrap book storage unit 102.

Subsequently, the window 131 (FIG. 24) displayed in the contents structure presentation processing in step S121 is closed, and the initial scrapbook generation processing ends.

[Configuration Example of Registration Scrapbook Generating Unit 103]

Figure 26:
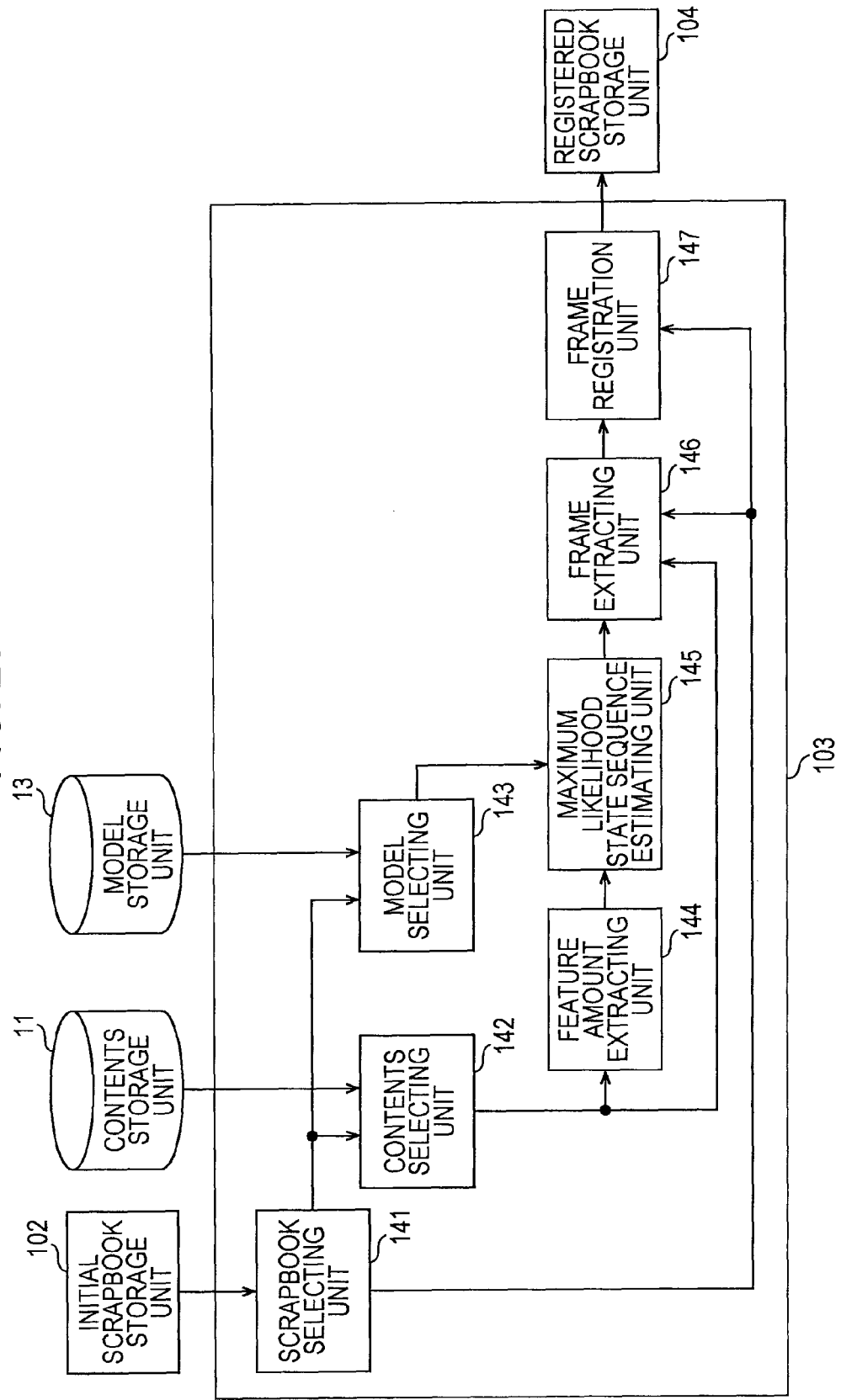
FIG. 26 is a block diagram illustrating a configuration example of a registered scrapbook generating unit 103.

FIG. 26 is a block diagram illustrating a configuration example of the registered scrapbook generating unit 103 in FIG. 22.

In FIG. 26, the registered scrapbook generating unit 103 is configured of a scrapbook selecting unit 141, a contents selecting unit 142, a model selecting unit 143, a feature amount extracting unit 144, a maximum likelihood state sequence estimating unit 145, a frame extracting unit 146, and a frame registration unit 147.

The scrapbook selecting unit 141 selects one of the initial scrapbooks stored in the initial scrapbook storage unit 102 as the scrapbook of interest, and supplies to the frame extracting unit 146 and frame registration unit 147.

Also, the scrapbook selecting unit 141 supplies the category correlated with the scrapbook of interest to the contents selecting unit 142 and model selecting unit 143.

The contents selecting unit 142 selects one of the contents belonging to the category from the scrapbook selecting unit 141 out of the contents stored in the contents storage unit 11 as the content for scrapbook of interest (hereafter, also simply referred to as "content of interest").

Subsequently, the contents selecting unit 142 supplies the content of interest to the feature amount extracting unit 144 and frame extracting unit 146.

The model selecting unit 143 selects the contents model correlated with the category from the scrapbook selecting unit 141 out of the contents models stored in the model storage unit 13 as the model of interest, and supplies to the maximum likelihood state sequence estimating unit 145.

The feature amount extracting unit 144 extracts, in the same way as with the feature extracting unit 22 in FIG. 2, the feature amount of each frame of (the image of) the content of interest supplied from the contents selecting unit 142, and supplies (the time sequence of) the feature amount of each frame of the content of interest to the maximum likelihood state sequence estimating unit 145.

The maximum likelihood state sequence estimating unit 145 estimates the maximum likelihood state sequence (the maximum likelihood state sequence of the model of interest as to the content of interest) that is a state sequence causing state transition where likelihood is the highest that (the time sequence of) the feature amount of the content of interest from the feature amount extracting unit 144 will be observed in the model of interest from the model selecting unit 143, for example, in accordance with the Viterbi algorithm.

Subsequently, the maximum likelihood state sequence estimating unit 145 supplies the maximum likelihood state sequence of the model of interest as to the content of interest to the frame extracting unit 146.

The frame extracting unit 146 determines, with regard to each state of the maximum likelihood state sequence from the maximum likelihood state sequence estimating unit 145, whether or not the state ID matches the state ID (hereafter, also referred to as "registered state ID") of a selected state registered in the scrapbook of interest from the scrapbook selecting unit 141.

Further, the frame extracting unit 146 extracts the frame corresponding to a state of the states of the maximum likelihood state sequence from the maximum likelihood state sequence estimating unit 145, of which the state ID matches a registered state ID registered in the scrapbook of interest from the scrapbook selecting unit 141, out of the content of interest from the contents selecting unit 142, and supplies to the frame registration unit 147.

The frame registration unit 147 registers the frame from the frame extracting unit 146 in the scrapbook of interest from the scrapbook selecting unit 141. Further, the frame registration unit 147 supplies and stores the scrapbook of interest after frame registration to the registered scrapbook storage unit 104 as a registered scrapbook.

[Registered Scrapbook Generation Processing]

Figure 27:
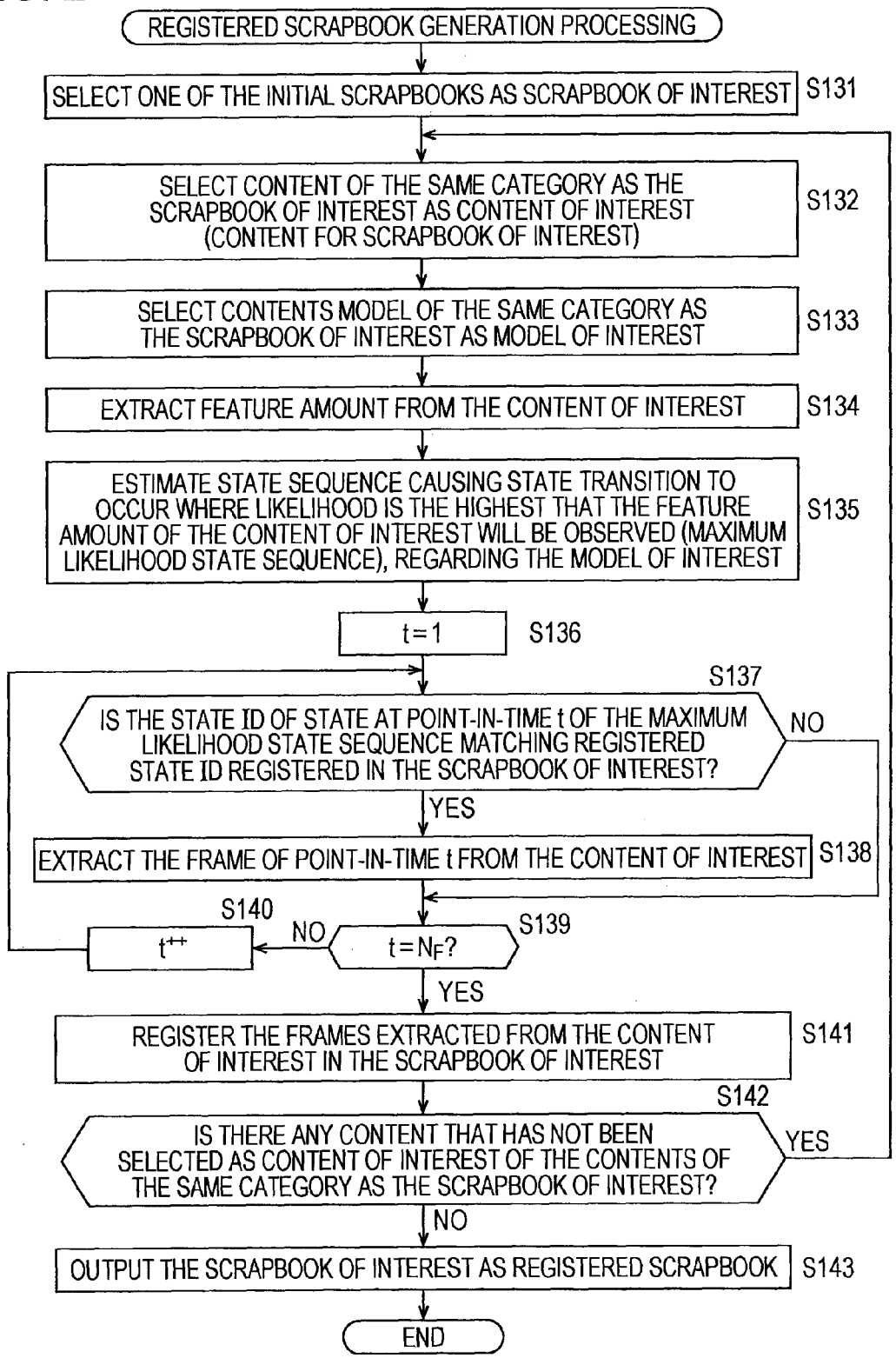
FIG. 27 is a flowchart for describing registered scrapbook generation processing by the registered scrapbook generating unit 103.

FIG. 27 is a flowchart for describing the registered scrapbook generation processing that the registered scrapbook generating unit 103 in FIG. 26 performs.

In step S131, the scrapbook selecting unit 141 selects, of the initial scrapbooks stored in the initial scrapbook storage unit 102, one of initial scrapbooks that has not been selected yet as the scrapbook of interest, as the scrapbook of interest.

Subsequently, the scrapbook selecting unit 141 supplies the scrapbook of interest to the frame extracting unit 146 and frame registration unit 147. Further, the scrapbook selecting unit 141 supplies the category correlated with the scrapbook of interest to the contents selecting unit 142 and model selecting unit 143, and the processing proceeds from step S131 to step S132.

In step S132, the contents selecting unit 142 selects, of the contents stored in the contents storage unit 11, one of contents that has not been selected yet as the content of interest (content for scrapbook of interest) out of the contents belonging to the category from the scrapbook selecting unit 141, as the content of interest.

Subsequently, the contents selecting unit 142 supplies the content of interest to the feature amount extracting unit 144 and frame extracting unit 146, and the processing proceeds from step S132 to step S133.

In step S133, the model selecting unit 143 selects, of the contents models stored in the model storage unit 13, a contents model correlated with the category from the scrapbook selecting unit 141, as the model of interest.

Subsequently, the model selecting unit 143 supplies the model of interest to the maximum likelihood state sequence estimating unit 145, and the processing proceeds from step S133 to step S134.

In step S134, the feature amount extracting unit 144 extracts the feature amount of each frame of the content of interest supplied from the contents selecting unit 142, and supplies (the time sequence of) the feature amount of each frame of the content of interest to the maximum likelihood state sequence estimating unit 145.

Subsequently, the processing proceeds from step S134 to step S135, where the maximum likelihood state sequence estimating unit 145 estimates the maximum likelihood state sequence (the maximum likelihood state sequence of the model of interest as to the content of interest) causing state transition where likelihood is the highest that (the time sequence of) the feature amount of the content of interest from the feature amount extracting unit 144 will be observed in the model of interest from the model selecting unit 143.

Subsequently, the maximum likelihood state sequence estimating unit 145 supplies the maximum likelihood state sequence of the model of interest as to the content of interest to the frame extracting unit 146, and the processing proceeds from step S135 to step S136.

In step S136, the frame extracting unit 146 sets the variable t for counting point-in-time (the number of frames of the content of interest) to 1 serving as the initial value, and the processing proceeds to step S137.

In step S137, the frame extracting unit 146 determines whether or not the state ID of the state at the point-in-time t (the t'th state from the head) of the maximum likelihood state sequence (the maximum likelihood state sequence of the model of interest as to the content of interest) from the maximum likelihood state sequence estimating unit 145 matches one of the registered state IDs in a selected state registered in the scrapbook of interest from the scrapbook selecting unit 141.

In the event that determination is made in step S137 that the state ID of the state at the point-in-time t of the maximum likelihood state sequence of the model of interest as to the content of interest matches one of the registered state IDs in a selected state registered in the scrapbook of interest, the processing proceeds to step S138, where the frame extracting unit 146 extracts the frame at the point-in-time t from the content of interest from the contents selecting unit 142, supplies to the frame registration unit 147, and the processing proceeds to step S139.

Also, in the event that determination is made in step S137 that the state ID of the state at the point-in-time t of the maximum likelihood state sequence of the model of interest as to the content of interest does not match any of the registered state IDs in a selected state registered in the scrapbook of interest, the processing skips step S138 to proceed to step S139.

In step S139, the frame extracting unit 146 determines whether or not the variable t is equal to the total number $N_F$ of the frames of the content of interest.

In the event that determination is made in step S139 that the variable t is unequal to the total number $N_F$ of the frames of the content of interest, the processing proceeds to step S140, where the frame extracting unit 146 increments the variable t by one. Subsequently, the processing returns from step S140 to step S137, and hereafter, the same processing is repeated.

Also, in the event that determination is made in step S139 that the variable t is equal to the total number $N_F$ of the frames of the content of interest, the processing proceeds to step S141, where the frame registration unit 147 registers the frames supplied from the frame extracting unit 146, i.e., all the frames extracted from the content of interest in the scrapbook of interest from the scrapbook selecting unit 141.

Subsequently, the processing proceeds from step S141 to step S142, where the contents selecting unit 142 determines whether or not, of the contents belonging to the same category as the category correlated with the scrapbook of interest, stored in the contents storage unit 11, there is a content that has not been selected yet as the content of interest.

In the event that determination is made in step S142 that, of the contents belonging to the same category as the category correlated with the scrapbook of interest, stored in the contents storage unit 11, there is a content that has not been selected yet as the content of interest, the processing returns to step S132, and hereafter, the same processing is repeated.

Also, in the event that determination is made in step S142 that, of the contents belonging to the same category as the category correlated with the scrapbook of interest, stored in the contents storage unit 11, there is no content that has not yet been selected as the content of interest, the processing proceeds to step S143, where the frame registration unit 147 outputs the scrapbook of interest to the registered scrapbook storage unit 104 as a registered scrapbook, and the registered scrapbook generation processing ends.

The registered scrapbook generation processing that the registered scrapbook generating unit 103 (FIG. 26) performs will further be described with reference to FIG. 28.

Figure 28:
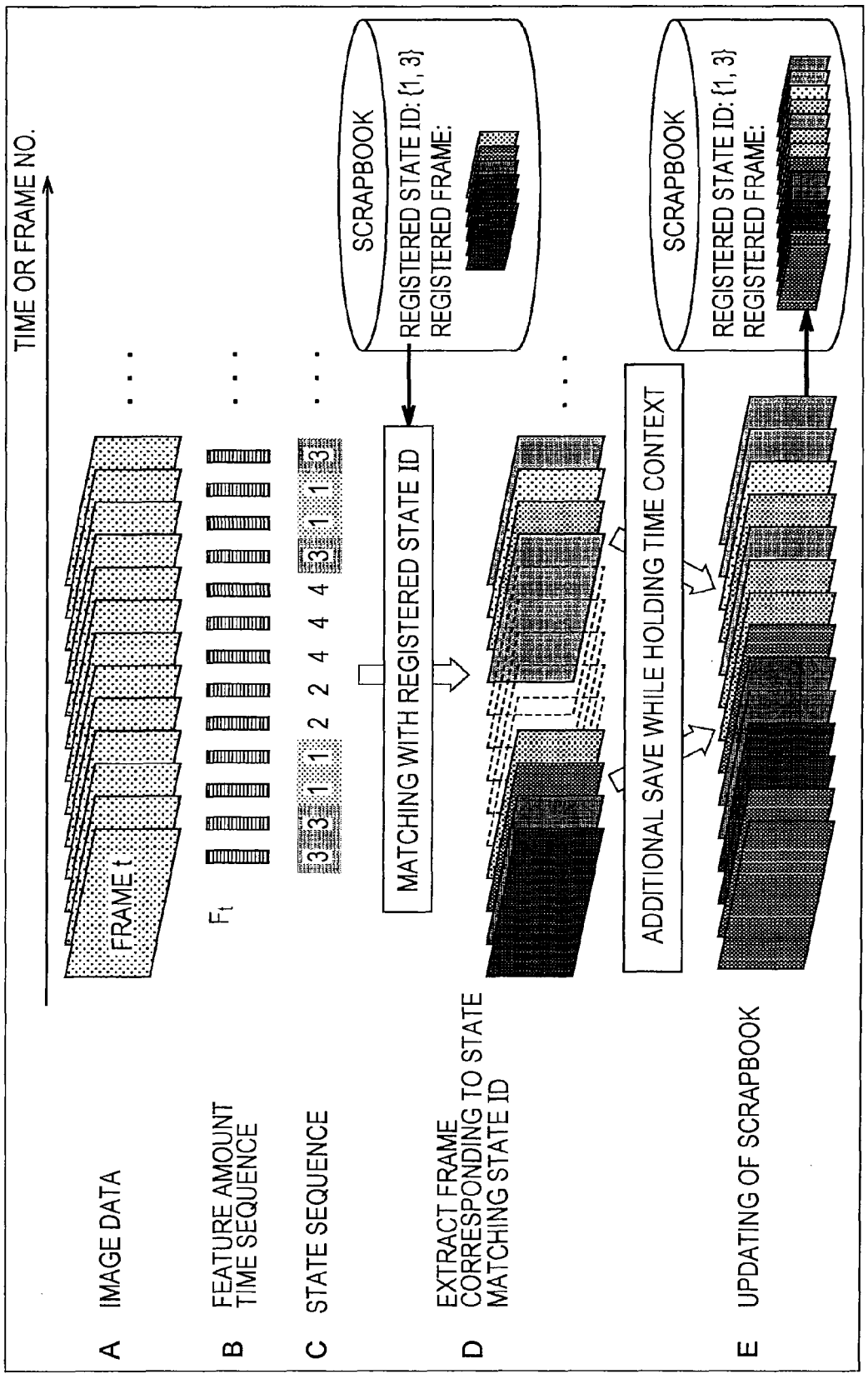
FIG. 28 is a diagram for describing the registered scrapbook generation processing.

A in FIG. 28 illustrates the time sequence of the frames of the content selected as the content of interest (content for scrapbook of interest) at the contents selecting unit 142 (FIG. 26).

B in FIG. 28 illustrates the time sequence of the feature amount of the time sequence of the frames in A in FIG. 28, extracted at the feature amount extracting unit 144 (FIG. 26).

C in FIG. 28 illustrates the maximum likelihood state sequence (the maximum likelihood state sequence of the model of interest as to the content of interest) where the time sequence of the feature amount of the content of interest in B in FIG. 28 will be observed in the model of interest, estimated at the maximum likelihood state sequence estimating unit 145 (FIG. 26).

Now, the entity of the maximum likelihood state sequence of the model of interest as to the content of interest is, as described above, the sequence of state IDs. Subsequently, the t'th state ID from the head of the maximum likelihood state sequence of the model of interest as to the content of interest is the state ID of a state where the feature amount of the t'th frame (at point-in-time t) of the content of interest (the state ID of the state corresponding to the frame t) will be observed in the maximum likelihood state sequence.

D in FIG. 28 illustrates frames extracted from the content of interest at the frame extracting unit 146 (FIG. 26).

In D in FIG. 28, "1" and "3" are registered as the registered state IDs of the scrapbook of interest, and each of the frames of which the state IDs are "1" and "3" is extracted from the content of interest.

E in FIG. 28 illustrates a scrapbook on which the frames extracted from the content of interest are registered (registered scrapbook).

With the scrapbook, the frames extracted from the content of interest are registered in a form maintaining the temporal context thereof, e.g., as a moving image.

As described above, the registered scrapbook generating unit 103 extracts the feature amount of each frame of the image of the content of interest, estimates the maximum likelihood state sequence causing state transition where likelihood is the highest that the feature amount of the content of interest will be observed in the model of interest, extracts, of the states of the maximum likelihood state sequence thereof, a frame corresponding to a state matching the state ID (registered state ID) of the state on the model map, specified by the user in the initial scrapbook generation processing (FIG. 25), out of the content of interest, and registers the frame extracted from the content of interest in the scrapbook, so the user simply specifies, in the model map, a state corresponding to a frame in which the user is interested (e.g., of scenes where a singer is singing a song, a frame showing a close-up of a face, etc.), whereby the scrapbook collected from frames containing the same material as the frame thereof can be obtained.

Note that, in FIG. 27, generation of a registered scrapbook has been performed with all the contents belonging to the category correlated with the scrapbook of interest as the content of interest, but generation of a registered scrapbook may be performed with just a single content specified by the user as the content of interest.

Also, with the registered scrapbook generation processing in FIG. 27, an arrangement has been made wherein at the scrapbook selecting unit 141, the scrapbook of interest is selected out of the initial scrapbooks stored in the initial scrapbook storage unit 102, and the frames extracted from the content of interest are registered in the scrapbook of interest thereof, but additionally, the scrapbook of interest may be selected out of the registered scrapbooks stored in the registered scrapbook storage unit 104.

Specifically, in the event that a new content has been stored in the contents storage unit 11, if there has already been a registered scrapbook correlated with the category of the new content thereof, the registered scrapbook generation processing (FIG. 27) may be performed with the new content thereof being taken as the content of interest, and also with the registered scrapbook correlated with the category of the content of interest as the scrapbook of interest.

Also, with the registered scrapbook generating unit 103 (FIG. 26), an arrangement may be made wherein in addition to the frames (image) from the content of interest, audio along with the frames thereof is extracted at the frame extracting unit 146, and is registered on an initial scrapbook at the frame registration unit 147.

Further, in the event that a new content has been stored in the contents storage unit 11, if there has already been a registered scrapbook correlated with the category of the new content thereof, the initial scrapbook generation processing (FIG. 25) including the contents structure presentation processing (FIG. 13) may be performed with the new content as the content of interest to additionally register the new state ID in the registered scrapbook.

Subsequently, in the event that the new state ID has additionally been registered in the registered scrapbook by the initial scrapbook generation processing, the registered scrapbook generation processing (FIG. 27) may be performed with the registered scrapbook thereof as the scrapbook of interest to extract, from the contents stored in the contents storage unit 11, a frame of which the state ID matches the new state ID additionally registered in the registered scrapbook so as to be additionally registered in the registered scrapbook.

In this case, from a content c from which a frame f that has already been registered in the registered scrapbook has been extracted, another frame f' of which the state ID matches the new state ID additionally registered in the registered scrapbook may be extracted and additionally registered in the registered scrapbook.

This additional registration of the frame f' in the registered scrapbook is performed so as to maintain temporal context with the frame f extracted from the content c from which the frame f' thereof has been extracted.

Note that, in this case, there is a need to determine the content c from which the frame f registered in the registered scrapbook has been extracted, so there is a need to register a content ID serving as information for determining the content c from which the frame f thereof has been extracted, in the registered scrapbook along with the frame f.

Now, with the highlight scene detection technique according to Japanese Unexamined Patent Application Publication No. 2005-189832, in the processing on the preceding stage, each of the mean value and dispersion of the motion vector sizes extracted from the image of a content is quantized to four or five labels, and also the feature amount extracted from the audio of the content is classified into labels of "applause", "hit ball", "female voice", "male voice", "music", "music+voice", and "noise" by a neural network sorter, thereby obtaining an image label time sequence and an audio label time sequence.

Further, with the highlight scene detection technique according to Japanese Unexamined Patent Application Publication No. 2005-189832, in the processing on the subsequent stage, a detector for detecting a highlight scene is obtained by learning employing the label time sequences.

Specifically, of the content data, with the data of a section serving as a highlight scene as learning data to be used for learning an HMM serving as a detector, learning of a discrete HMM (HMM with the observation value being a discrete value) is performed by providing each label sequence of the image and audio obtained from the learning data to the HMM.

Subsequently, each label time sequence of the image and audio of predetermined length (window length) is extracted from a content that is an object from which a highlight scene is detected by sliding window processing, and is given to the HMM after learning, whereby likelihood that a label time sequence will be observed is obtained in the HMM thereof.

Subsequently, in the event that the likelihood is greater than a predetermined threshold, the section of a label sequence where the likelihood has been obtained is detected as the section of a highlight scene.

According to the highlight scene detection technique according to Japanese Unexamined Patent Application Publication No. 2005-189832, an HMM serving as a detector for detecting a highlight scene can be obtained by learning without designing pre-knowledge from an expert regarding what kind of scene such as feature amount, an event, or the like becomes a highlight scene, by simply providing the data of a section serving as a highlight scene, of the content data, to the HMM as learning data.

As a result thereof, for example, providing the data of a scene in which the user is interested to the HMM as learning data enables the scene in which the user is interested to be detected as a highlight scene.

However, with the highlight scene detection technique according to Japanese Unexamined Patent Application Publication No. 2005-189832, (audio) feature amount adapted to labeling of, for example, "applause", "hit ball", "female voice", "male voice", "music", "music+voice", or "noise" is extracted with a particular genre content as a content to be detected, from such a particular genre content.

Accordingly, with the highlight scene detection technique according to Japanese Unexamined Patent Application Publication No. 2005-189832, a content to be detected is restricted to a particular genre content, and in order to eliminate such restriction, each time the genre of the content to be detected differs, there is a need to design (determine beforehand) and extract feature amount adapted to the genre thereof.

Also, the threshold of likelihood to be used for detection the section of a highlight scene needs to be determined for each content genre, but determination of such a threshold is difficult.

On the other hand, with the recorder in FIG. 1, the feature amount extracted from a content is used as is without being subjected to labeling representing what is in a content such as "applause" or the like to perform learning of a contents model (HMM), and the structure of the content is obtained in the contents model in a self-organic manner, so as for the feature amount to be extracted from the content, general-purpose feature amount generally used for classification (identification) of a scene, or the like, can be employed instead of feature amount adapted to a particular genre.

Accordingly, with the recorder in FIG. 1, even in the event that various genres of content are contents to be detected, learning of a contents model needs to be performed for each genre, but feature amount to be extracted from the content does not need to be changed for each genre.

Consequently, the highlight scene detection technique according to the recorder in FIG. 1 can be said to be a technique having extremely high versatility independent from content genres.

Also, with the recorder in FIG. 1, an interesting scene (frame) is specified by the user, a highlight label representing whether or not a highlight scene is subjected to labeling to each frame of a content to generate a highlight label sequence in accordance with the specification thereof, and learning of an HMM serving as a highlight detector is performed using a multi stream with the highlight label sequence as a component sequence, whereby the HMM serving as a highlight detector can readily be obtained even without designing preknowledge from an expert regarding what kind of scene such as feature amount or event or the like becomes a highlight scene.

In this way, the highlight detection technique according to the recorder in FIG. 1 is also high in versatility in that preknowledge from an expert is not required.

Subsequently, the recorder in FIG. 1 learns the user's preference, detects a scene suitable for the preference thereof (a scene with the user's interest) as a highlight scene, and presents a digest in which such highlight scenes are collected. Accordingly, "personalization" of viewing and listening of contents, as if it were, is realized, thereby broadening how to enjoy contents.

[Application to Server Client System]

With the recorder in FIG. 1, the entirety may be configured as a stand-alone device, but may also be configured by being classified into a server and a client as a server client system.

Now, as for contents models, and eventually, contents employed for learning of a contents model, contents (contents models) common to all the users may be employed.

On the other hand, a scene with a user's interest, i.e., a highlight scene for a user differs for each user.

Therefore, in the event that the recorder in FIG. 1 is configured as a server client system, for example, management (storage) of contents to be used for learning of a contents model may be performed by the server.

Also, for example, learning of the structure of a content, i.e., learning of a contents model may be performed by the server for each content category such as a content genre or the like, and further, management (storage) of a contents model after learning may also be performed by the server.

Also, for example, with a contents model, estimation of the maximum likelihood state sequence causing state transition where likelihood is the highest that the feature amount of a content will be observed, and further, management (storage) of the maximum likelihood state sequence serving as the estimation results thereof may also be performed by the server.

With the server client system, a client requests information necessary for processing from the server, and the server provides (transmits) the information requested from the client to the client. Subsequently, the client performs necessary processing using the information received from the server.

Figure 29:
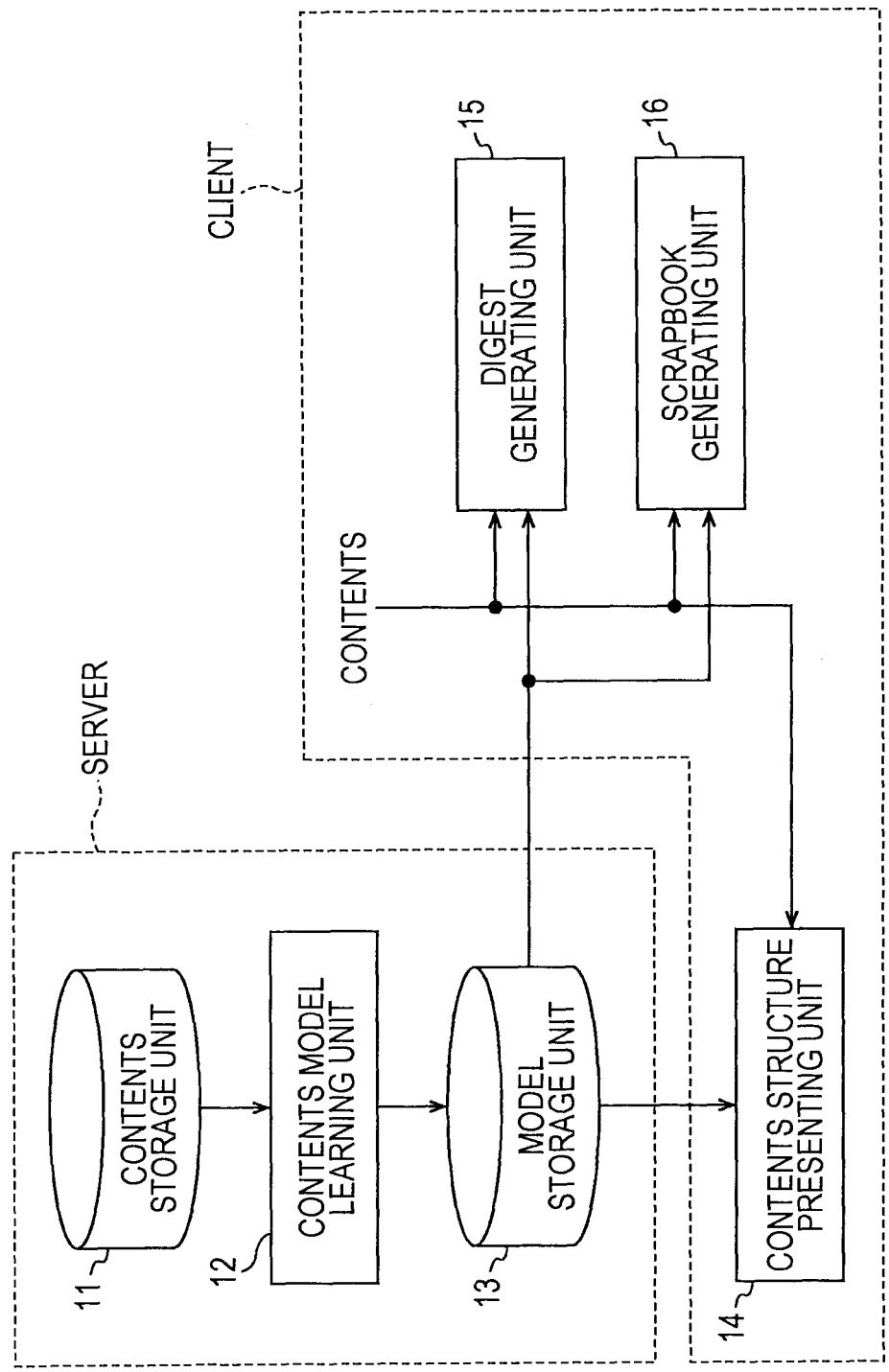
FIG. 29 is a block diagram illustrating a first configuration example of a server client system.

FIG. 29 is a block diagram illustrating, in the event that the recorder in FIG. 1 is configured of a server client system, a configuration example (first configuration example) of the server client system thereof.

In FIG. 29, the server is configured of a contents storage unit 11, a contents model learning unit 12, and a model storage unit 13, and the client is configured of a contents structure presenting unit 14, a digest generating unit 15, and a scrapbook generating unit 16.

Note that, in FIG. 29, contents may be provided to the client from the contents storage unit 11, and may also be provided from an unshown block (e.g., tuner, etc.) other than that.

In FIG. 29, the whole of the contents structure presenting unit 14 is provided to the client side, but with regard to the contents structure presenting unit 14, an arrangement may be made wherein a portion thereof is configured as the server, and the remaining portions are configured as the client.

Figure 30:
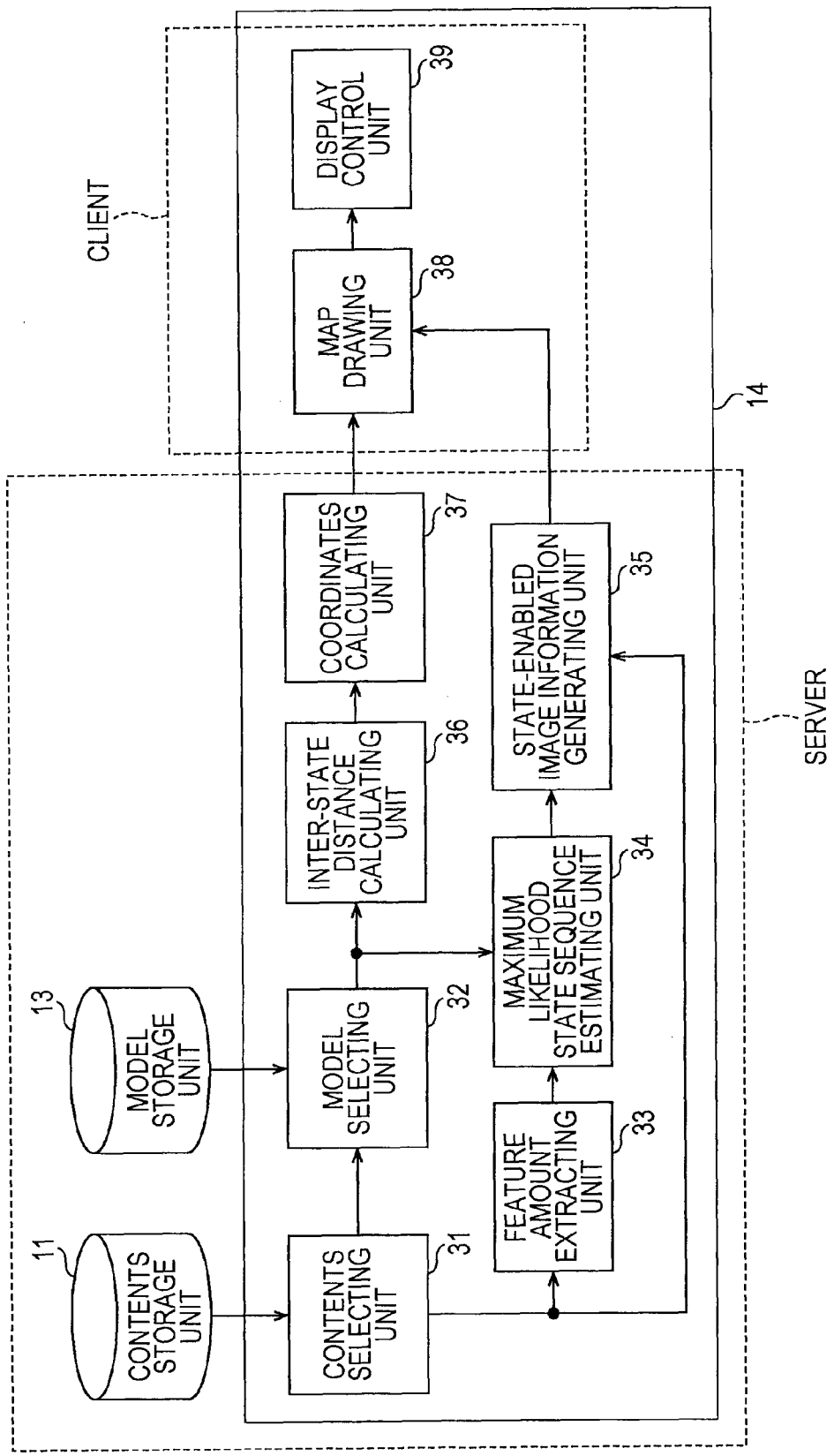
FIG. 30 is a block diagram illustrating a second configuration example of the server client system.

FIG. 30 is a block diagram illustrating a configuration example (second configuration example) of such a server client system.

In FIG. 30, the contents selecting unit 31 through coordinates calculating unit 37 serving as a portion of the contents structure presenting unit 14 (FIG. 9) are provided to the server, and the map drawing unit 38 and display control unit 39 serving as a remaining portion of the contents structure presenting unit 14 are provided to the client.

In FIG. 30, the client transmits a content ID serving as information for determining a content to be used for drawing of a model map to the server.

With the server, the content determined by the content ID from the client is selected as the content of interest at the contents selecting unit 31, and state coordinates necessary for generation (drawing) of a model map are obtained, and also state-enabled image information is generated.

Further, with the server, the state coordinates and the state-enabled image information are transmitted to the client, and with the client, a model map is drawn using the state coordinates from the server, and the model map thereof is linked to the state-enabled image information from the server. Subsequently, with the client, the model map is displayed.

Next, with the above FIG. 29, the whole of the digest generating unit 15 (FIG. 14) including the highlight detector learning unit 51 is provided to the client side, but with regard to the highlight detector learning unit 51 (FIG. 15), an arrangement may be made wherein a portion thereof is configured as the server, and the remaining portions are configured as the client.

Figure 31:
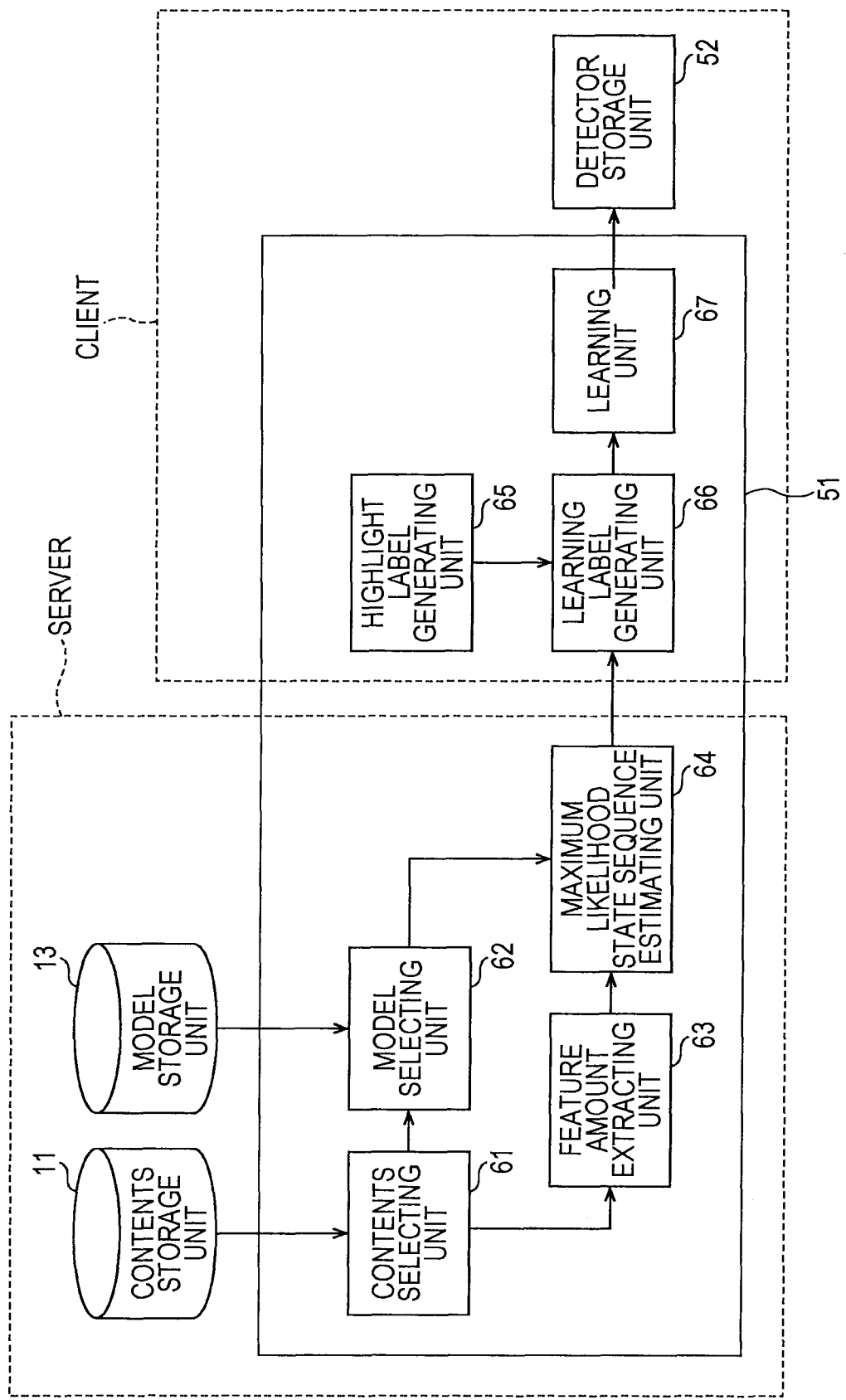
FIG. 31 is a block diagram illustrating a third configuration example of the server client system.

FIG. 31 is a block diagram illustrating a configuration example (third configuration example) of such a server client system.

In FIG. 31, the contents selecting unit 61 through maximum likelihood state sequence estimating unit 64 serving as a portion of the highlight detector learning unit 51 (FIG. 15) are provided to the server, and the highlight label generating unit 65 through learning unit 67 serving as a remaining portion thereof are provided to the client.

In FIG. 31, the client transmits the content ID of a content to be used for learning of a highlight detector to the server.

With the server, the content determined by the content ID from the client is selected as the content of interest at the contents selecting unit 61, and the maximum likelihood state sequence as to the content of interest is obtained. Subsequently, with the server, the maximum likelihood state sequence as to the content of interest is provided to the client.

With the client, a label sequence for learning is generated using the maximum likelihood state sequence from the server, and learning of a highlight detector is performed using the label sequence for learning thereof. Subsequently, with the client, the highlight detector after learning is stored in the detector storage unit 52.

Next, with the above FIG. 29, the whole of the digest generating unit 15 (FIG. 14) including the highlight detecting unit 53 is provided to the client side, but with regard to the highlight detecting unit 53 (FIG. 18), an arrangement may be made wherein a portion thereof is configured as the server, and the remaining portions are configured as the client.

Figure 32:
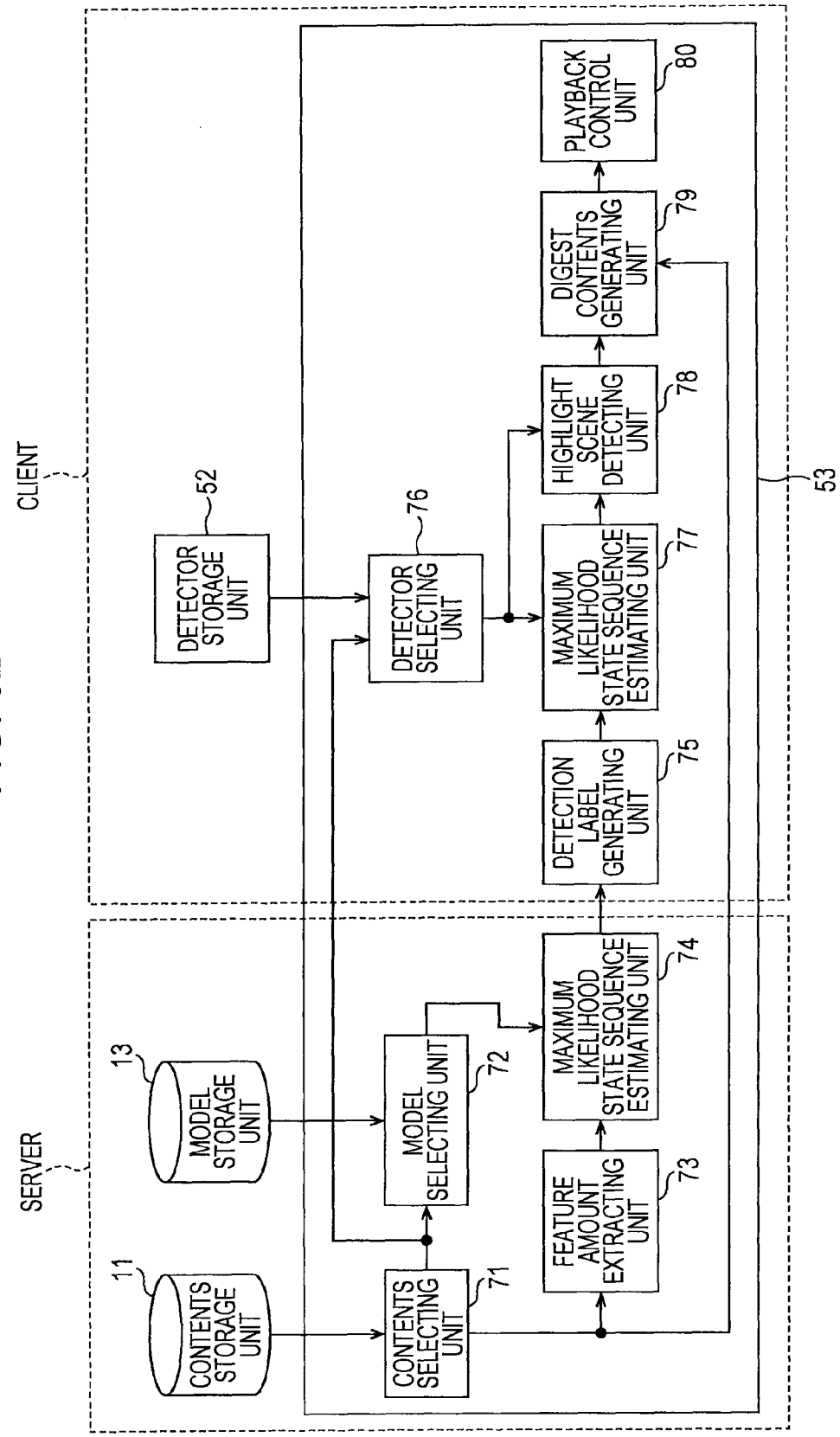
FIG. 32 is a block diagram illustrating a fourth configuration example of the server client system.

FIG. 32 is a block diagram illustrating a configuration example (fourth configuration example) of such a server client system.

In FIG. 32, the contents selecting unit 71 through maximum likelihood state sequence estimating unit 74 serving as a portion of the highlight detecting unit 53 (FIG. 18) are provided to the server, and the detection label generating unit 75 through playback control unit 80 serving as a remaining portion thereof are provided to the client.

In FIG. 32, the client transmits the content ID of a content regarding which detection is to be made that is a highlight scene detection object to the server.

With the server, the content determined by the content ID from the client is selected as the content of interest at the contents selecting unit 71, and the maximum likelihood state sequence as to the content of interest is obtained. Subsequently, with the server, the maximum likelihood state sequence as to the content of interest is provided to the client.

With the client, a label sequence for detection is generated using the maximum likelihood state sequence from the server, and detection of highlight scenes using the label sequence for detection and the highlight detectors stored in the detector storage unit 52, and generation of a digest content using the highlight scenes thereof are performed.

Next, with the above FIG. 29, the whole of the scrapbook generating unit 16 (FIG. 22) including the initial scrapbook generating unit 101 is provided to the client side, but with regard to the initial scrapbook generating unit 101 (FIG. 23), an arrangement may be made wherein a portion thereof is configured as the server, and the remaining portions are configured as the client.

Figure 33:
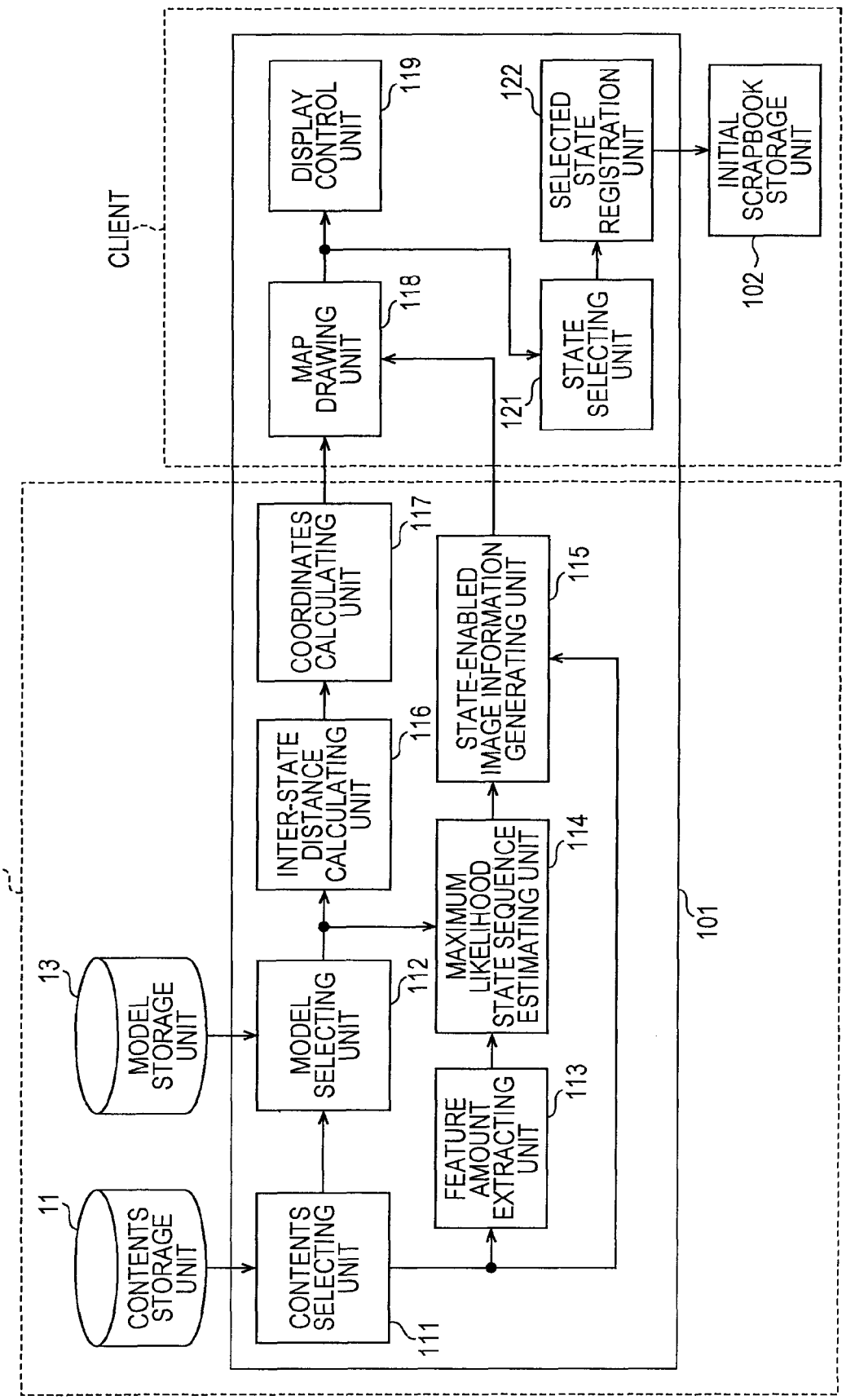
FIG. 33 is a block diagram illustrating a fifth configuration example of the server client system.

FIG. 33 is a block diagram illustrating a configuration example (fifth configuration example) of such a server client system.

In FIG. 33, the contents selecting unit 111 through coordinates calculating unit 117 serving as a portion of the initial scrapbook generating unit 101 (FIG. 23) are provided to the server, and the map drawing unit 118, display control unit 119, state selecting unit 121, and selected state registration unit 122 serving as a remaining portion thereof are provided to the client.

In FIG. 33, the client transmits a content ID serving as information for determining a content to be used for drawing of a model map to the server.

With the server, the content determined by the content ID from the client is selected as the content of interest at the contents selecting unit 111, and state coordinates necessary for generation (drawing) of a model map are obtained, and also state-enabled image information is generated.

Further, with the server, the state coordinates and the state-enabled image information are transmitted to the client, and with the client, a model map is drawn using the state coordinates from the server, and the model map thereof is linked to the state-enabled image information from the server. Subsequently, with the client, the model map is displayed.

Also, with the client, according to the user's operations, a state on the model map is selected as a selected state, and the state ID of the selected state thereof is recognized. Subsequently, with the client, the state ID of the selected state is registered on a scrapbook, and the scrapbook thereof is stored in the initial scrapbook storage unit 102 as an initial scrapbook.

Next, with the above FIG. 29, the whole of the scrapbook generating unit 16 (FIG. 22) including the registered scrapbook generating unit 103 is provided to the client side, but with regard to the registered scrapbook generating unit 103 (FIG. 26), an arrangement may be made wherein a portion thereof is configured as the server, and the remaining portions are configured as the client.

Figure 34:
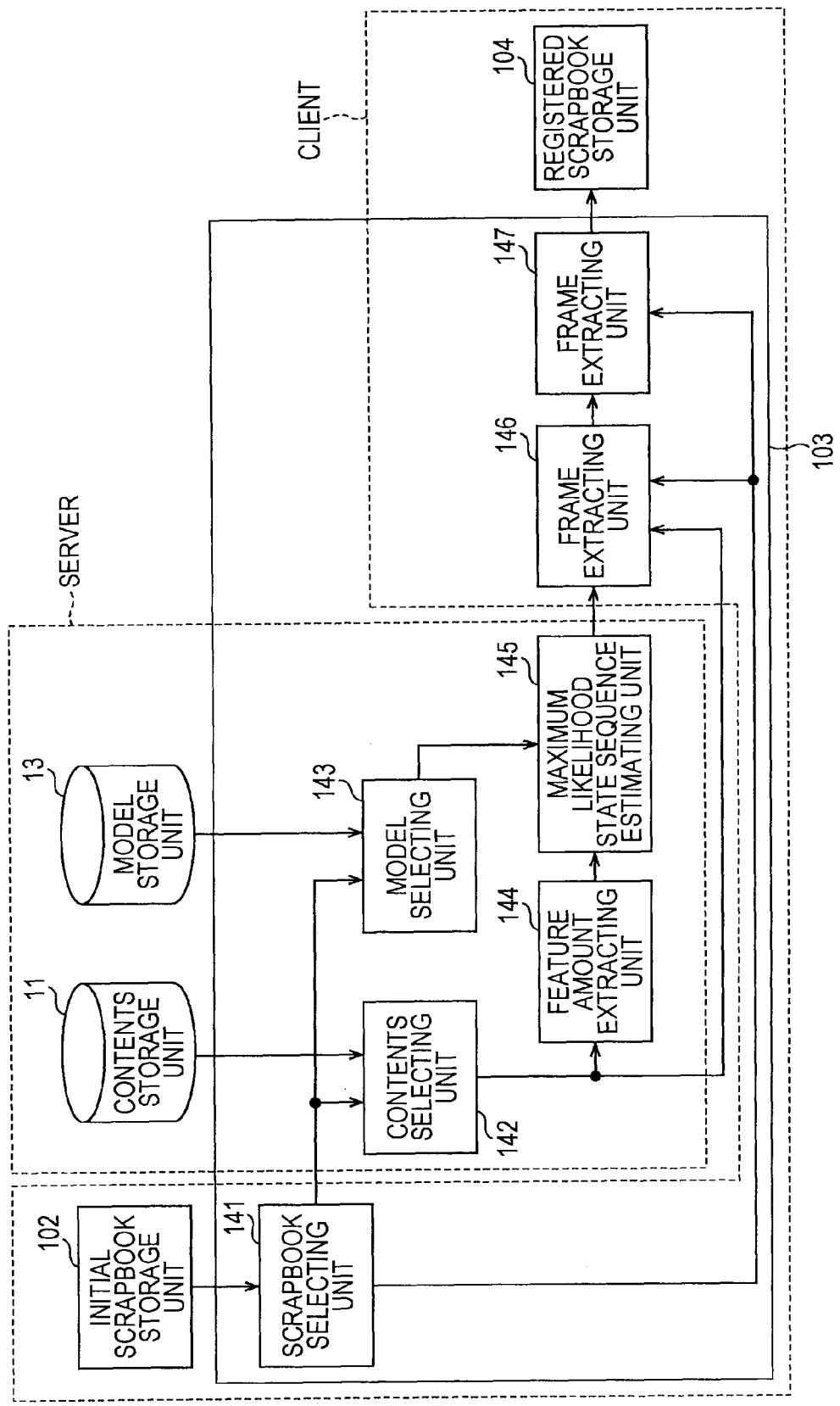
FIG. 34 is a block diagram illustrating a sixth configuration example of the server client system.

FIG. 34 is a block diagram illustrating a configuration example (sixth configuration example) of such a server client system.

In FIG. 34, the contents selecting unit 142 through maximum likelihood state sequence estimating unit 145 serving as a portion of the registered scrapbook generating unit 103 (FIG. 26) are provided to the server, and the scrapbook selecting unit 141, frame extracting unit 146, and frame registration unit 147 serving as a remaining portion thereof are provided to the client.

In FIG. 34, the client transmits the category correlated with the scrapbook of interest selected by the scrapbook selecting unit 141 to the server.

With the server, as to a content of the category from the client, the maximum likelihood state sequence of a contents model correlated with the category thereof is estimated, and is provided to the client along with the content of the category from the client.

With the client, of the states of the maximum likelihood state sequence from the server, a frame of which the state ID corresponds to a state matching the state ID (registered state ID) registered in the scrapbook of interest selected at the scrapbook selecting unit 141 is extracted from the content from the server, and is registered in the scrapbook.

As described above, the recorder in FIG. 1 is configured by being divided into the server and the client, whereby processing can rapidly be performed even when the client has low hardware performance.

Note that, of the processing that the recorder in FIG. 1 performs, as long as the client performs processing of a part where the user's preference is reflected, how to divide the recorder in FIG. 1 into the server and the client is not particularly restricted.

[Configuration Example of Other Recorders]

Description has been made above regarding an example wherein feature amount obtained from a frame-based image is used to learn a contents model by structuring a video content in a self-organized manner, to present a content structure, or to generate a digest video or video scrap. However, at the time of learning a contents model, other than a frame-based image may be employed as feature amount, and for example, audio or an object within an image or the like may be employed as feature amount.

Figure 35:
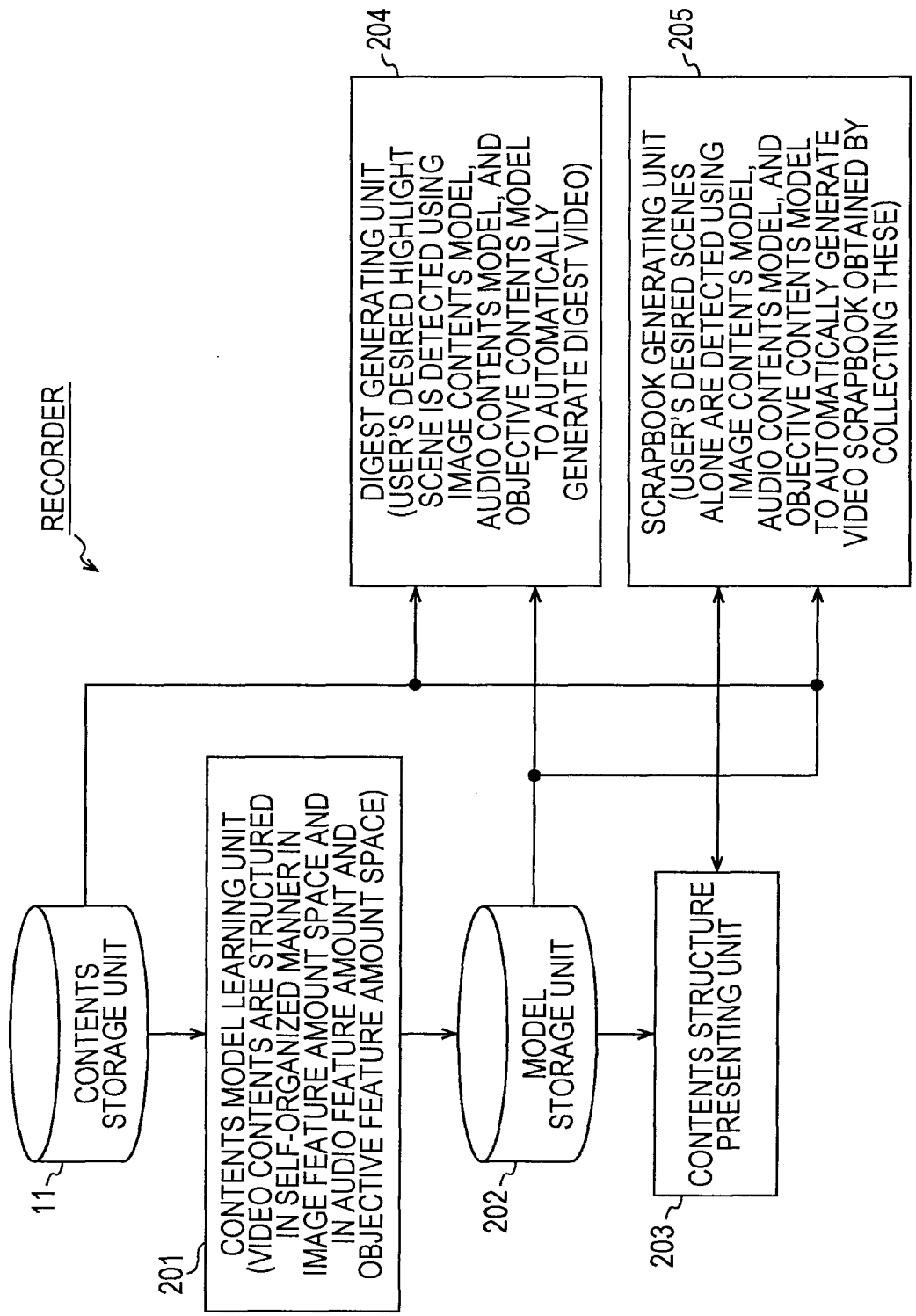
FIG. 35 is a block diagram illustrating a configuration example of another embodiment of the recorder to which the present invention has been applied.

FIG. 35 is a block diagram illustrating a configuration example of another embodiment of a recorder to which the information processing device of the present invention has been applied, which employs feature amount other than a frame-based image. Note that a configuration having the same function as with the recorder in FIG. 1 is denoted with the same reference numeral, and description thereof will be omitted as appropriate.

Specifically, the recorder in FIG. 35 differs from the recorder in FIG. 1 in that a contents model learning unit 201, a model storage unit 202, a contents structure presenting unit 203, a digest generating unit 204, and a scrapbook generating unit 205 are provided instead of the contents model learning unit 12, model storage unit 13, contents structure presenting unit 14, digest generating unit 15, and scrapbook generating unit 16.

The contents model learning unit 201, model storage unit 202, contents structure presenting unit 203, digest generating unit 204, and scrapbook generating unit 205 have basically the same function as with the contents model learning unit 12, model storage unit 13, contents structure presenting unit 14, digest generating unit 15, and scrapbook generating unit 16. However, feature amount treated at the corresponding units differs in that the former handles three types of feature amount of further audio feature amount, and object feature amount in addition to the feature amount of the above frame-based image (hereafter, also referred to as image feature amount). Note that description will be made here regarding an example handling three types of feature amount, but the number of types of feature amount to be handled is not restricted to three, so the number of types of feature amount to be handled may exceed three.

[Configuration Example of Contents Model Learning Unit 201]

Figure 36:
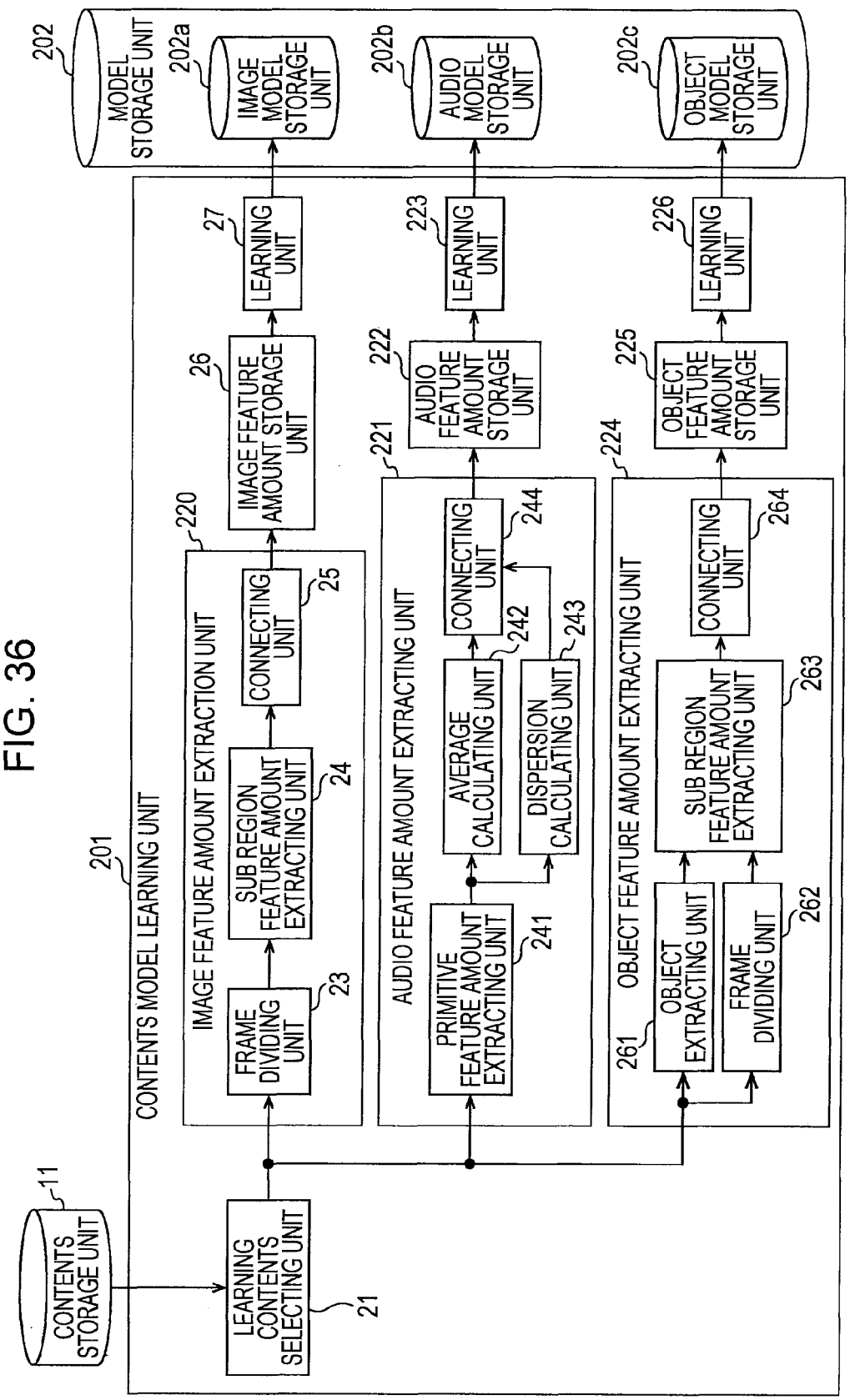
FIG. 36 is a block diagram illustrating a configuration example of a contents model learning unit 201.

FIG. 36 is a block diagram illustrating a configuration example of the contents model learning unit 201 in FIG. 35. Note that, with the configuration of the contents model learning unit 201 in FIG. 36, a configuration having the same function as with the contents model learning unit 12 described in FIG. 2 is denoted with the same reference numeral, and description thereof will be omitted.

The contents model learning unit 201 extracts image feature amount, audio feature amount, and object feature amount as the feature amount of each frame of the image of a content for learning that is a content to be used for learning of a state transition probability model stipulated by state transition probability that a state will transition, and observation probability that a predetermined observation value will be observed from a state. Subsequently, the contents model learning unit 201 performs learning of each state transition probability model using the image feature amount, audio feature amount, and object feature amount of the content for learning.

The image feature amount extracting unit 220 is the same as the feature amount extracting unit 22 in FIG. 2, and further, the image feature amount storage unit 26 and the learning unit 27 are the same as those in FIG. 2. Specifically, the configuration for handling image feature amount is the same as with the contents model learning unit 12 in FIG. 2. Also, with the learning unit 27, a contents model obtained from learning is stored in an image model storage unit 202a in the model storage unit 202. Specifically, the image model storage unit 202a is the same as the model storage unit 13 in FIG. 2. Note that the contents model stored in the image model storage unit 202a is a contents model obtained from image feature amount, so hereafter will also be referred to as an image contents model.

The audio feature amount extracting unit 221 extracts feature amount regarding the audio of the content for learning in a manner correlated with each frame of the image.

The audio feature amount extracting unit 221 inversely multiplexes the content for learning from the learning contents selecting unit 21 to image data and audio data, extracts audio feature amount in a manner correlated with each frame of the image, and supplies to the audio feature amount storage unit 222. Note that, hereafter, the feature amount regarding the frame-based audio mentioned here will be referred to as audio feature amount.

Specifically, the audio feature amount extracting unit 221 is configured of a primitive feature amount extracting unit 241, an average calculating unit 242, a dispersion calculating unit 243, and a connecting unit 244.

The primitive feature amount extracting unit 241 extracts primitive feature amount that is primitive feature amount for generating audio feature amount suitable for classifying audio into scenes (e.g., "music", "non-music", "noise", "human voice", "human voice+music", "music", etc.) which is used for an audio classification (sound classification) field. The primitive feature amount is used for audio classification, and examples thereof include energy obtained from audio signals by calculation in relatively short time basis such as 10-msec order or so, a zero crossing rate, and spectrum center of gravity.

More specifically, the primitive feature amount extracting unit 241 extracts primitive feature amount using a feature amount extracting method described in, for example, "Zhu Liu; Jincheng Huang; Yao Wang; Tsuhan Chen, Audio feature extraction and analysis for scene classification, First Workshop on Multimedia Signal Processing, 1997., IEEE Volume, Issue, 23-25 Jun. 1997 Page(s): 343-348", and "Brezeale, D. Cook, D. J., Automatic Video Classification: A Survey of the Literature, IEEE Transactions on Systems, Man, and Cybernetics, Part C: Applications and Reviews, May 2008, Volume: 38, Issue: 3, pp. 416-430".

The average calculating unit 242 extracts feature amount in a longer predetermined time basis in time sequence by calculating a mean value as statistics amount in a longer predetermined time basis (commonly, 1 sec or more) from the primitive feature amount time sequence, and supplies to the connecting unit 244.

The dispersion calculating unit 243 extracts feature amount in a longer predetermined time basis in time sequence by calculating dispersion as statistics amount in a longer predetermined time basis (commonly, 1 sec or more) from the primitive feature amount time sequence, and supplies to the connecting unit 244.

The connecting unit 244 connects the mean value and dispersion obtained as statistical amount from the primitive feature amount time sequence, and supplies the connection result to the audio feature amount storage unit 26 as the feature amount of the frame of interest.

More specifically, in order to realize later-described processing, audio feature amount needs to be extracted so as to synchronize with the above image feature amount. Also, audio feature amount is preferably feature amount adapted to distinguish a scene by audio at each point-in-time when image feature amount is extracted, so audio feature amount is generated in accordance with the following technique.

Specifically, first, in the event that a tone signal is a stereo voice signal, the primitive feature amount extracting unit 241 converts the stereo audio signal into a monaural signal. Subsequently, the primitive feature amount extracting unit 241 gradually shifts, as illustrated in the waveform charts A and B in FIG. 37, the window of time width of 0.05 sec. with step width of 0.05 sec., and extracts the primitive feature amount of the audio signal within the window. Here, with the waveform charts A and B, in either charts, the vertical axis represents the amplitude of the audio signal, and the horizontal axis represents time. Also, the waveform chart B displays resolution regarding a portion of the waveform chart A, and with the waveform chart A, a range of 0 ($\times 10^4$) through 10 ($\times 10^4$) is a 2.0833-sec scale, and with the waveform chart B, a range of 0 through 5000 is a 0.1042-sec scale. Note that, with regard to the primitive feature amount, multiple types may be extracted from the audio signal within the window. In this case, the primitive feature amount extracting unit 241 makes up a vector with these multiple types as elements to obtain primitive feature amount.

Figure 38:
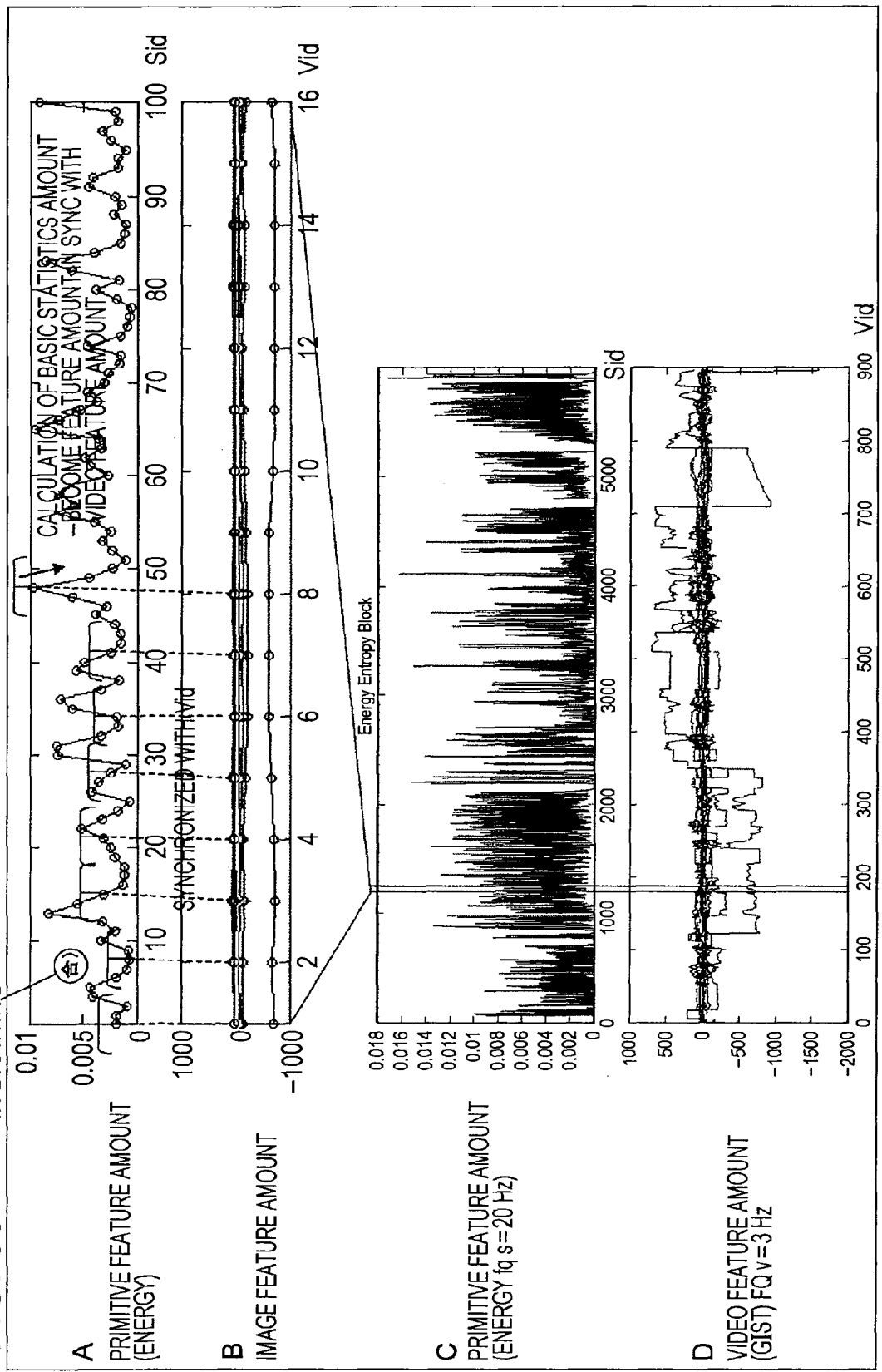
FIG. 38 is a diagram for describing the feature amount extraction processing by the audio feature amount extracting unit 221.

Subsequently, at each point-in-time when image feature amount is extracted (e.g., frame start point-in-time, or midpoint point-in-time between frame start point-in-time and frame end point-in-time), as illustrated in FIG. 38, the average calculating unit 242 and dispersion calculating unit 243 obtain the mean value and dispersion of the primitive feature amount of 0.5-sec worth before and after the point-in-time thereof respectively, and the audio feature amount extracting unit 221 takes these as the audio feature amount at this point-in-time.

In FIG. 38, from the top, the waveform chart A is a waveform illustrating relationship between an identifier (point-in-time when primitive feature amount is extracted) Sid for identifying the sampling data of audio information, and energy that is primitive feature amount, and the waveform chart B is a waveform illustrating relationship between an identifier (point-in-time when primitive feature amount is extracted) Vid for identifying frames of an image, and image feature amount (GIST). Note that, with the waveform charts A and B, circle marks represent primitive feature amount and image feature amount, respectively.

Also, the waveform charts C and D are waveforms serving as the origins of the waveform charts A and B respectively, and the waveform charts A and B are waveforms where the display intervals of the identifiers Sid and Vid of the horizontal axes of portions of the waveform charts C and D are enlarged. FIG. 38 illustrates an example when the sampling rate fq_s of the audio primitive feature amount is 20 Hz, and the sampling rate fq_v of image feature amount is 3 Hz.

The audio identifier Sid of primitive feature amount in sync with the frame of a certain image identifier Vid is indicated with the following Expression (4).

$$Sid = \mathrm{ceil}((Vid-1) \times (fq\_s/fq\_v)) + 1 \quad (4)$$

Here, ceil( ) is a function indicating rounding in a positive infinite direction (the minimum integer equal to or greater than a value within the parentheses).

Now, if we say that the number of samples W of primitive feature amount to be used for obtaining a mean value serving as audio feature amount is represented by Expression (5) with a predetermined constant K as 1, the number of samples is 7. In this case, with the frame of a certain image identifier Vid, the mean value and dispersion of the primitive feature amount of W=7 with the audio identifier Sid satisfying Expression (4) as the center become the corresponding (synchronous) audio feature amount.

$$W = \mathrm{round}(K \times (fq\_s/fq\_v)) \quad (5)$$

Here, round( ) is a function for converting into the nearest integer (rounding below a decimal point within parentheses). Note that, in Expression (5), if we say that the constant K=fq_v, the primitive feature amount to be used for obtaining audio feature amount becomes 1-sec worth of primitive feature amount.

The audio feature amount thus extracted is stored in the audio feature amount storage unit 222. Note that functions regarding the audio feature amount storage unit 222 and learning unit 223 are the same as with the image feature amount storage unit 26 and learning unit 27, so description thereof will be omitted. Further, a contents model obtained by the learning unit 223 performing learning processing is stored in the audio model storage unit 202b of the model storage unit 202 as an audio contents model.

The object feature amount extracting unit 224 extracts feature amount in a manner correlated with an object regarding each frame of the image of a content for learning.

The object feature amount extracting 224 inversely multiplexes the content for learning from the learning contents selecting unit 21 to image data and audio data, and detects an existence range of an object, for example, such as a person, and a face included in each frame of the image as a rectangular image. Subsequently, the object feature amount extracting unit 224 extracts feature amount using the detected rectangular image, and supplies to the object feature amount storage unit 225.

Specifically, the object feature amount extracting unit 224 is configured of an object extracting unit 261, a frame dividing unit 262, a sub region feature amount extracting unit 263, and a connecting unit 264.

The object extracting unit 261 first inversely multiplexes the content for learning to image data and audio data. Next, the object extracting unit 261 executes object detection processing regarding each frame of the image, and if we say that the object is a person's whole body appearance, as illustrated in the upper left portion in FIG. 39, detects objects OB1 and OB2 made up of a rectangular region within a frame $F_1$. Subsequently, the object extracting unit 261 outputs vectors (X1, Y1, W1, H1) and (X2, Y2, W2, H2) made up of the upper left coordinates and width and height of a rectangular region including a detected object, indicated with a shaded portion in the lower left portion in FIG. 39, to the sub region feature amount extracting unit 263. Note that in the event that multiple objects have been detected, and multiple rectangular regions have been output, this information is output to one frame, equivalent to the number of detections.

Figure 39:
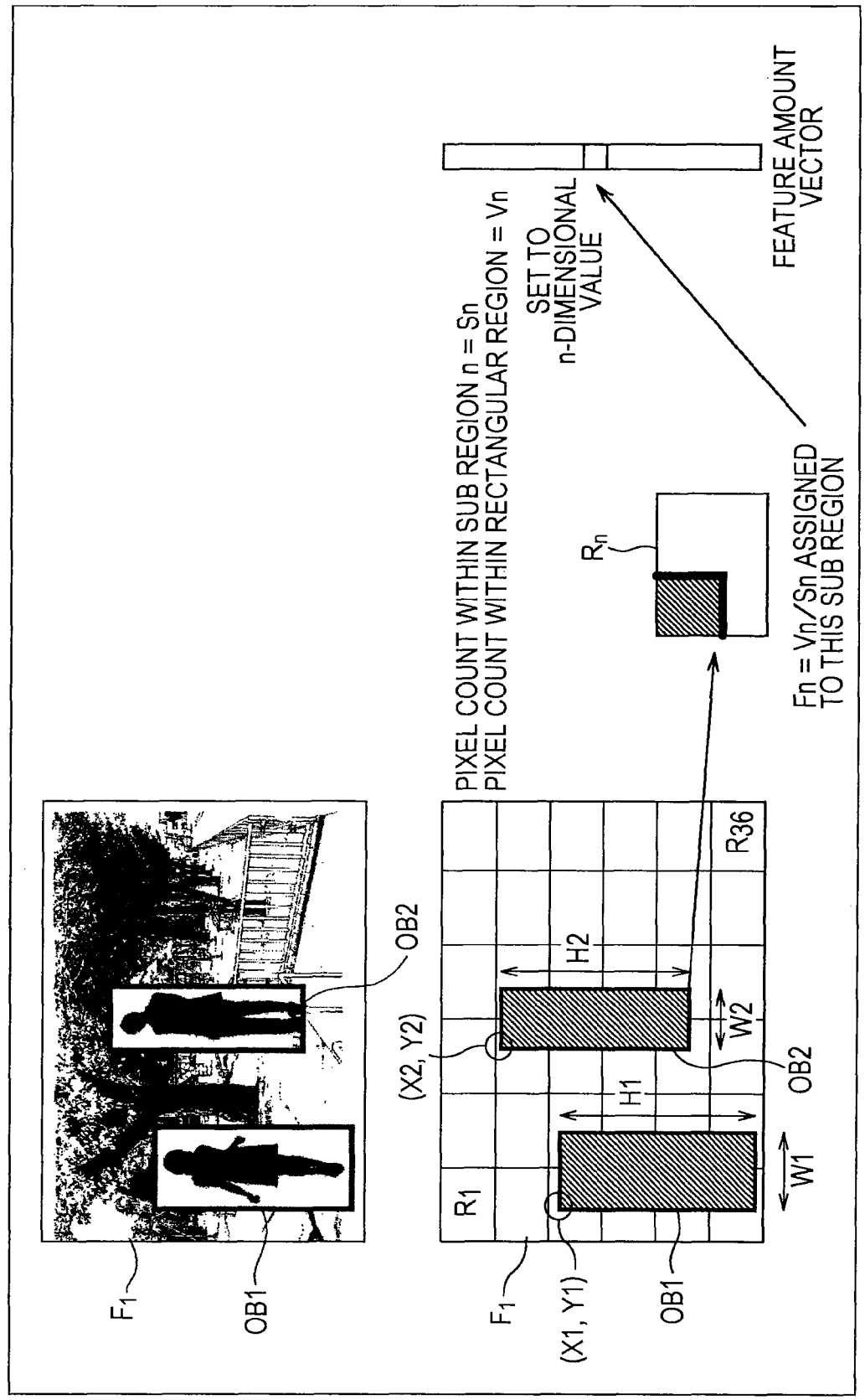
FIG. 39 is a diagram for describing feature amount extraction processing by an object feature amount extracting unit 224.

At the same time, the frame dividing unit 262 divides, in the same way as with the frame dividing unit 23, a frame into, for example, sub regions $R_1$ through $R_{36}$ (6×6) as illustrated in the lower left portion in FIG. 39, and supplied to the sub region feature amount extracting unit 263.

The sub region feature amount extracting unit 263 counts, as illustrated in the middle lower portion in FIG. 39, the number of pixels $V_n$ of a rectangular region in each sub region $R_n$, and accumulates only detection count worth. Further, the sub region feature amount extracting unit 263 normalizes the image size by dividing the number of pixels $V_n$ of the rectangular region by the total number of pixels $S_n$ within the sub region, and outputs to the connecting unit 264.

The connecting unit 264 connects, as illustrated in the lower right portion in FIG. 39, a value $F_n = V_n/S_n$ calculated in each sub region $R_n$ as a vector component, thereby generating a vector serving as object feature amount to output to the object feature amount storage unit 225. Note that functions regarding the object feature amount storage unit 225 and learning unit 226 are the same as with the image feature amount storage unit 26 and learning unit 27, description thereof will be omitted. Further, the contents model obtained by the learning unit 226 performing learning processing is stored in the object model storage unit 202c of the model storage unit 202 as an object contents model.

[Contents Model Learning Processing Performed by Contents Model Learning Unit 201]

Next, the contents learning processing that the contents model learning unit 201 in FIG. 36 will be described. The contents learning processing that the contents model learning unit 201 in FIG. 36 performs is made up of image contents model learning processing, audio contents model learning processing, and object contents model learning processing, according to the type of feature amount. Of these, the image contents model learning processing is the same as the contents model learning processing described with reference to FIG. 8, and a generated image contents model is simply stored in the image model storage unit 202a, so description thereof will be omitted.

Figure 40:
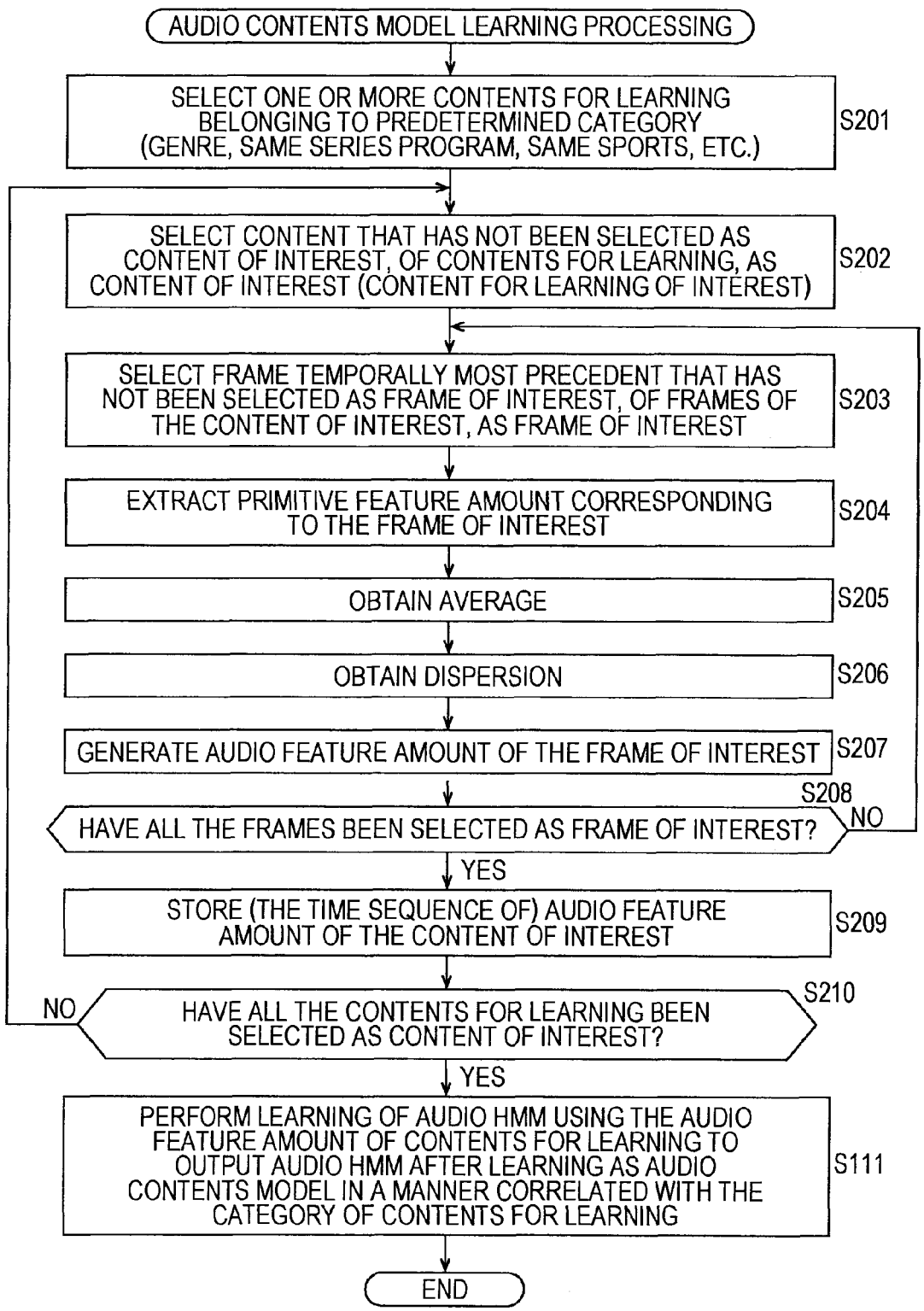
FIG. 40 is a flowchart for describing audio contents model learning processing by the contents model learning unit 201.

Next, the audio contents model learning processing that the contents model learning unit 201 in FIG. 36 will be described with reference to the flowchart in FIG. 40. Note that the processing in step S201 in FIG. 40 is the same as the processing in step S11 in FIG. 8, so description thereof will be omitted.

In step S202, the primitive feature amount extracting unit 241 of the audio feature amount extracting unit 221 selects one of contents for learning that has not been selected yet as the content for learning of interest (hereafter, also referred to as "content of interest") out of the contents for learning from the learning contents selecting unit 21, as the content of interest.

Subsequently, the processing proceeds from step S202 to step S203, where the primitive feature amount extracting unit 241 selects a temporally most preceding frame that has not been selected as the frame of interest, out of the frames of the content of interest, as the frame of interest, and the processing proceeds to step S204.

Figure 37:
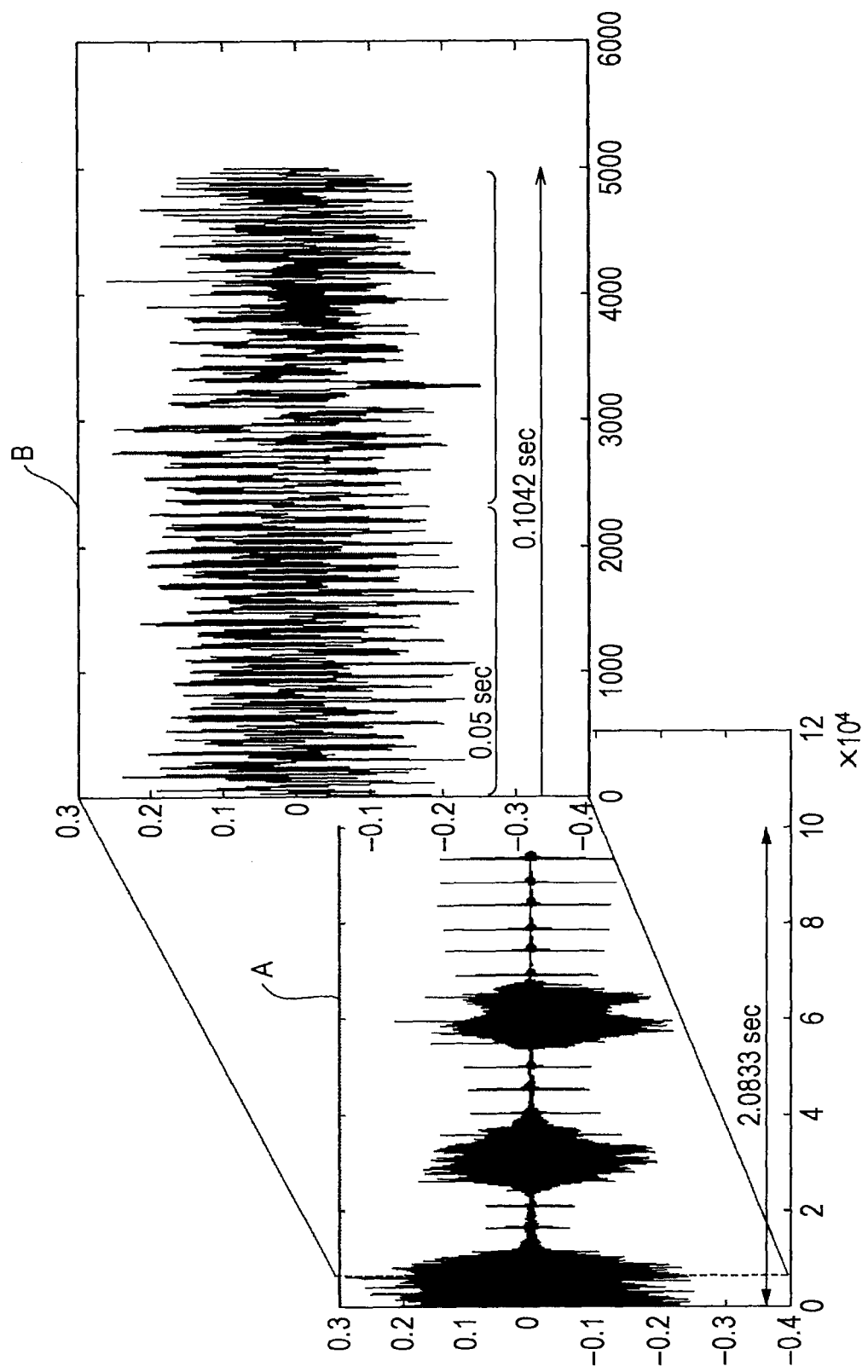
FIG. 37 is a diagram for describing feature amount extraction processing by an audio feature amount extracting unit 221.

In step S204, the primitive feature amount extracting unit 241 extracts, as described with reference to FIG. 37 and FIG. 38, primitive feature amount to be used for generating audio feature amount corresponding to the frame of interest out of audio source of the content of interest. Subsequently, the primitive feature amount extracting unit 241 supplies the extracted primitive feature amount to the average calculating unit 242 and dispersion calculating unit 243.

In step S205, the average calculating unit 242 calculates, of the supplied primitive feature amount, a mean value regarding the frame of interest worth, and supplies to the connecting unit 244.

In step S206, the dispersion calculating unit 243 calculates, of the supplied primitive feature amount, dispersion regarding the frame of interest worth, and supplies to the connecting unit 244.

In step S207, the connecting unit 244 connects the mean value of primitive feature amount of the frame of interest, supplied from the average calculating 242, and the dispersion of the primitive feature amount of the frame of interest, supplied from the dispersion calculating unit 243, thereby making up a feature vector. Subsequently, the connecting unit 244 generates this feature amount vector as the audio feature amount of the frame of interest, and the processing proceeds to step S208.

In step S208, the frame dividing unit 23 determines whether or not all the frames of the content of interest have been selected as the frame of interest.

In the event that determination is made in step S208 that, of the frames of the content of interest, there is a frame that has not been selected as the frame of interest, the processing returns to step S203, and hereafter, the same processing is repeated.

Also, in the event that determination is made in step S208 that all the frames of the content of interest have been selected as the frame of interest, the processing proceeds to step S209, where the connecting unit 244 supplies and stores (the time sequence of) the feature amount of each frame of the content of interest obtained regarding the content of interest to the audio feature amount storage unit 222.

Subsequently, the processing proceeds from step S209 to step S210, where the primitive feature amount extracting unit 241 determines whether or not all the contents for learning from the learning contents selecting unit 21 have been selected as the content of interest.

In the event that determination is made in step S210 that there is, of the contents for learning, a content for learning that has not been selected yet as the content of interest, the processing returns to step S202, and hereafter, the same processing is repeated.

Also, in the event that determination is made in step S210 that all the contents for learning have been selected as the content of interest, the processing proceeds to step S211, where the learning unit 223 uses the audio feature amount (the time sequence of the audio feature amount of each frame) of the content for learning stored in the audio feature amount storage unit 222 to perform learning of an audio HMM.

Subsequently, the learning unit 223 outputs (supplies) the audio HMM after learning to the audio model storage unit 202b as an audio contents model in a manner correlated with the category of the content for learning, and the audio contents model learning processing ends.

Note that the audio contents model learning processing may be started at an arbitrary timing.

According to the above audio contents model learning processing, the structure of a content (e.g., structure created from audio or the like) hidden in a content for learning is obtained in a self-organized manner with the audio HMM.

As a result thereof, each state of the audio HMM serving as an audio content model obtained in the audio contents model learning processing corresponds to an element of the structure of a content obtained by learning, and state transition expresses temporal transition between elements of the structure of the content.

Subsequently, the state of an audio contents model expresses a frame group of having spatially near distance and temporally similar context (i.e., "similar scenes") in audio feature amount space (the space of audio feature amount extracted at the audio feature amount extracting unit 221 (FIG. 36)) in a collected manner.

Figure 41:
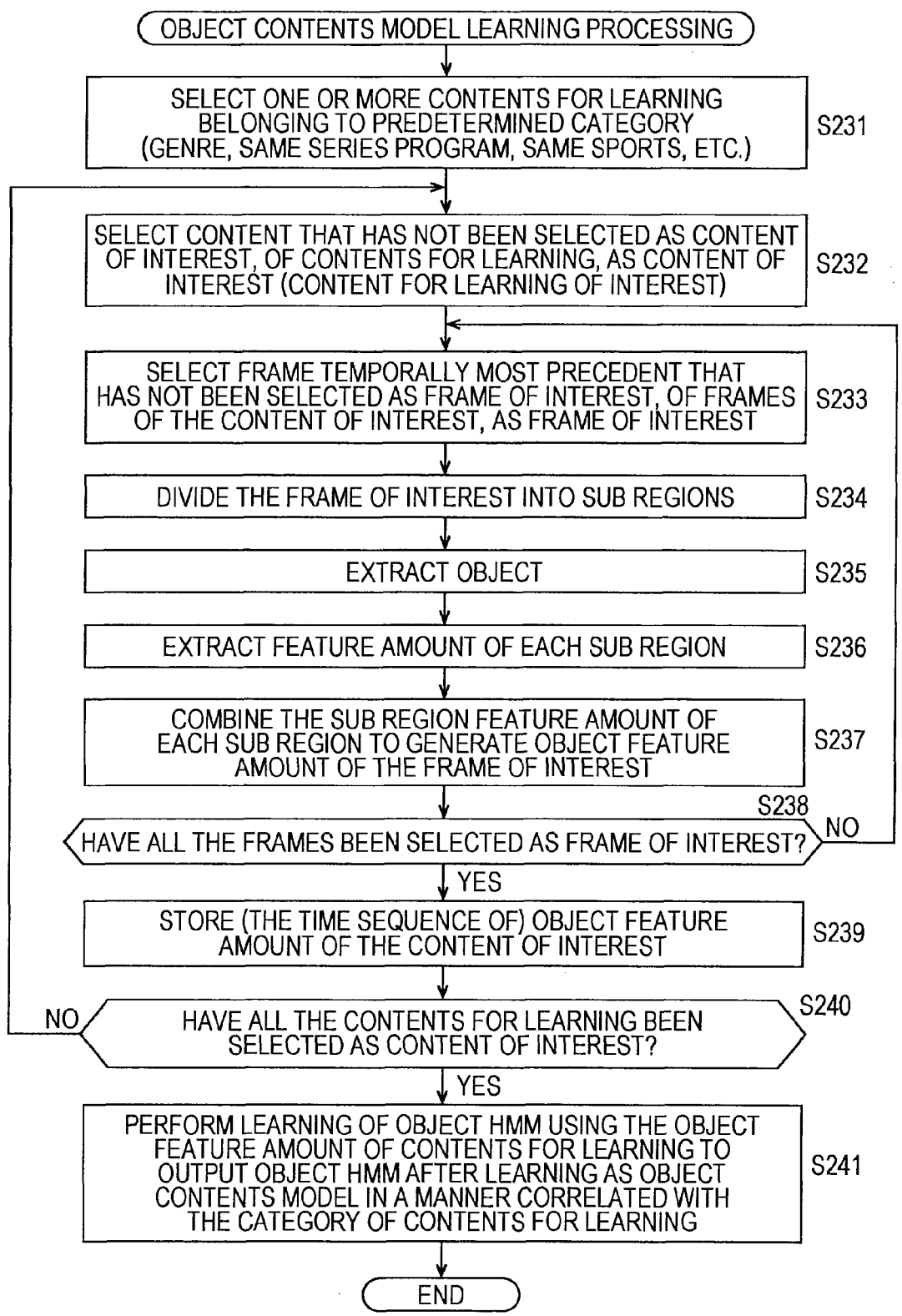
FIG. 41 is a flowchart for describing object contents model learning processing by the contents model learning unit 201.

Next, the object contents model learning processing that the contents model learning unit 201 in FIG. 36 performs will be described with reference to the flowchart in FIG. 41. Note that the processing in step S231 in FIG. 41 is the same as the processing in step S11 in FIG. 8, so description thereof will be omitted.

In step S232, the frame dividing unit 262 of the object feature amount extracting unit 224 selects, of the contents for learning from the learning contents selecting unit 21, one of contents for learning that has not been selected yet as the content for learning of interest (hereafter, also referred to as "content of interest"), as the content of interest.

Subsequently, the processing proceeds from step S232 to step S233, where the frame dividing unit 262 selects a temporally most preceding frame that has not been selected as the frame of interest, out of the frames of the content of interest, as the frame of interest, and the processing proceeds to step S234.

In step S234, the frame dividing unit 262 divides the frame of interest into multiple sub regions, and supplies to the sub region feature amount extracting unit 263, and the processing proceeds to step S235.

In step S235, the object extracting unit 261 detects an object included in the frame of interest, takes the region including the detected object as a rectangular region, and outputs a vector made up of the upper left coordinates, width, and height of the rectangular region to sub region feature amount extracting unit 263.

In step S236, the sub region feature amount extracting unit 263 counts the number of pixels $V_n$ making up the rectangular region including the object regarding each sub region $R_n$ from the frame dividing unit 262. Further, the sub region feature amount extracting unit 263 performs normalization by dividing the number of pixels $V_n$ making up the rectangular region in each sub region $R_n$ by the total number of pixels $S_n$ included in the sub region $R_n$, and supplies to the connecting unit 264 as the sub region feature amount $F_n = V_n/S_n$.

In step S237, the connecting unit 264 generates the object feature amount of the frame of interest by connecting the sub region feature amount $F_n$ of each of the multiple sub regions $R_n$ making up the frame of interest, from the sub region feature amount extracting unit 263, and the processing proceeds to step S238.

In step S238, the frame dividing unit 262 determines whether or not all the frames of the content of interest have been selected as the frame of interest.

In the event that determination is made in step S238 that there is, of the frames of the content of interest, a frame that has not been selected as the frame of interest, the processing returns to step S233, and hereafter, the same processing is repeated.

Also, in the event that determination is made in step S238 that all the frames of the content of interest have been selected as the frame of interest, the processing proceeds to step S239, where the connecting unit 244 supplies and stores (the time sequence of) the object feature amount of each frame of the content of interest obtained regarding the content of interest to the object feature amount storage unit 225.

Subsequently, the processing proceeds from step S239 to step S240, where the frame dividing unit 262 determines whether or not all the contents for learning from the learning contents selecting unit 21 have been selected as the content of interest.

In the event that determination is made in step S240 that there is, of the contents for learning, a content for learning that has not been selected as the content of interest, the processing returns to step S232, and hereafter, the same processing is repeated.

Also, in the event that determination is made in step S240 that all the contents for learning have been selected as the content of interest, the processing proceeds to step S241. In step S241, the learning unit 226 uses the object feature amount of the contents for learning (the time sequence of the object feature amount of each frame) stored in the object feature amount storage unit 225 to perform learning of the object HMM.

Subsequently, the learning unit 226 outputs (supplies) the object HMM after learning to the object model storage unit 202c as an object contents model in a manner correlated with the category of the contents for learning, and the object contents model learning processing ends.

Note that the object contents model learning processing may be started at an arbitrary timing.

According to the above object contents model learning processing, the structure of a content (e.g., structure created from appearance/disappearance of an object) hidden in a content for learning is obtained in a self-organized manner with the audio HMM.

As a result thereof, each state of the objet HMM serving as an object content obtained in the object contents model learning processing corresponds to an element of the structure of a content obtained by learning, and state transition expresses temporal transition between elements of the structure of the content.

Subsequently, the state of an object contents model expresses a frame group of having spatially near distance and temporally similar context (i.e., "similar scenes") in object feature amount space (the space of object feature amount extracted at the object feature amount extracting unit 224 (FIG. 36)) in a collected manner.

Next, a configuration example of the contents structure presenting unit 203 will be described. A configuration example of the contents structure presenting unit 203 will become, for example, a configuration wherein the state selecting unit 419 and selected state registration unit 420 of a later-described initial scrapbook generating unit 317 (FIG. 48) are eliminated. This is because the contents structure presenting unit 203 is configured wherein a contents structure presenting unit 14 corresponding to each of an image contents model, an audio contents model, and an object contents model is provided.

Also, the contents structure presentation processing of the contents structure presenting unit 203 becomes processing for displaying the map image of each content structure of an image contents model, audio contents model, and object contents model individually, or on independent windows respectively. Accordingly, each of the image contents model, audio contents model, and object contents model is realized by the same processing as the above contents structure presentation processing (FIG. 13) of the contents structure presenting unit 14 (FIG. 9).

According to the above reasons, with regard to a configuration example of the contents structure presenting unit 203, and the contents structure presentation processing thereof, description thereof will be omitted.

[Configuration Example of Digest Generating Unit 204]

Figure 42:
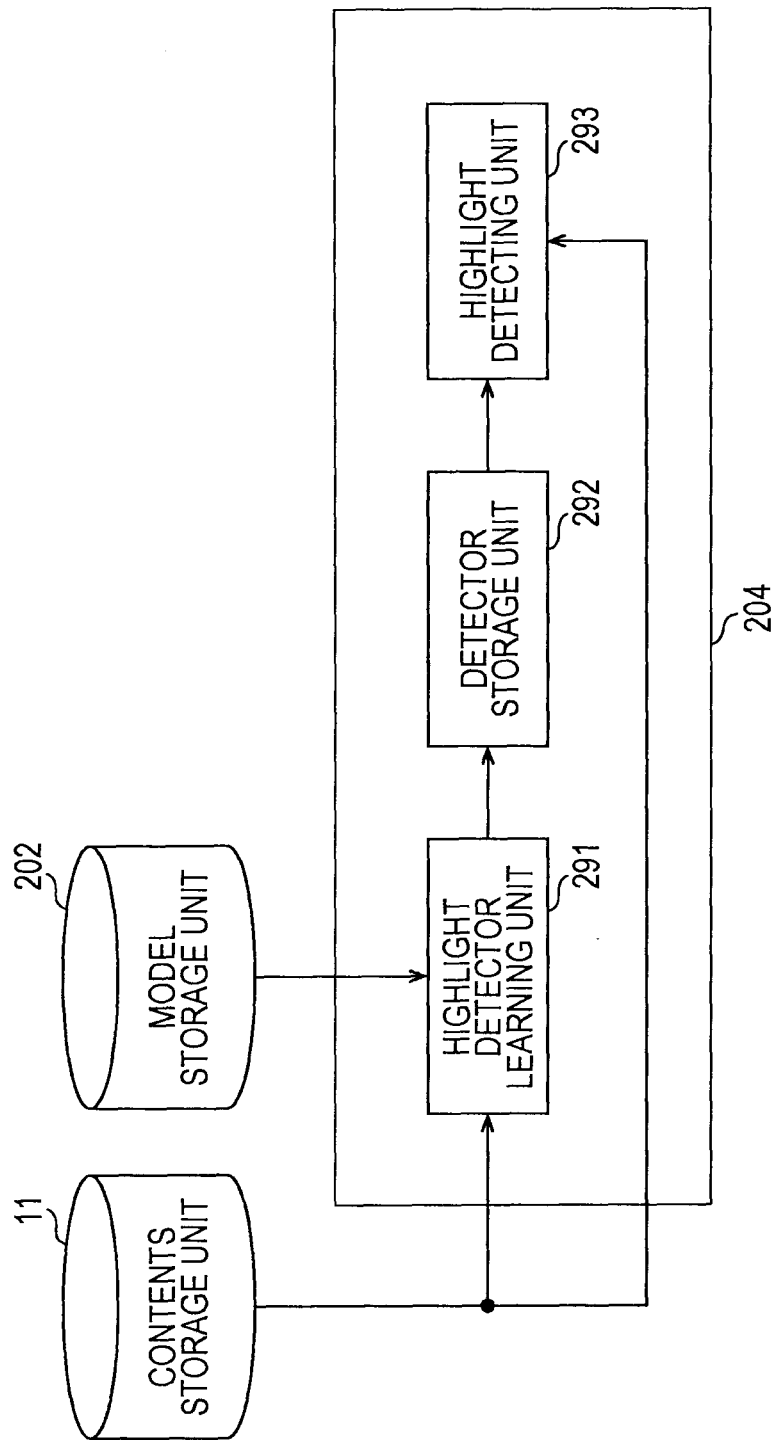
FIG. 42 is a block diagram illustrating a configuration example of a digest generating unit 204.

FIG. 42 is a block diagram illustrating a configuration example of the digest generating unit 204 in FIG. 35.

The digest generating unit 204 is configured of a highlight detector learning unit 291, a detector storage unit 292, and a highlight detecting unit 293.

The highlight detector learning unit 291, detector storage unit 292, and highlight detecting unit 293 have basically the same functions as with the highlight detector learning unit 51, detector storage unit 52, and highlight detecting unit 53, but any of these can execute processing for handling an image contents model, audio contents model, and object contents model.

[Configuration Example of Highlight Detector Learning Unit 291]

Figure 43:
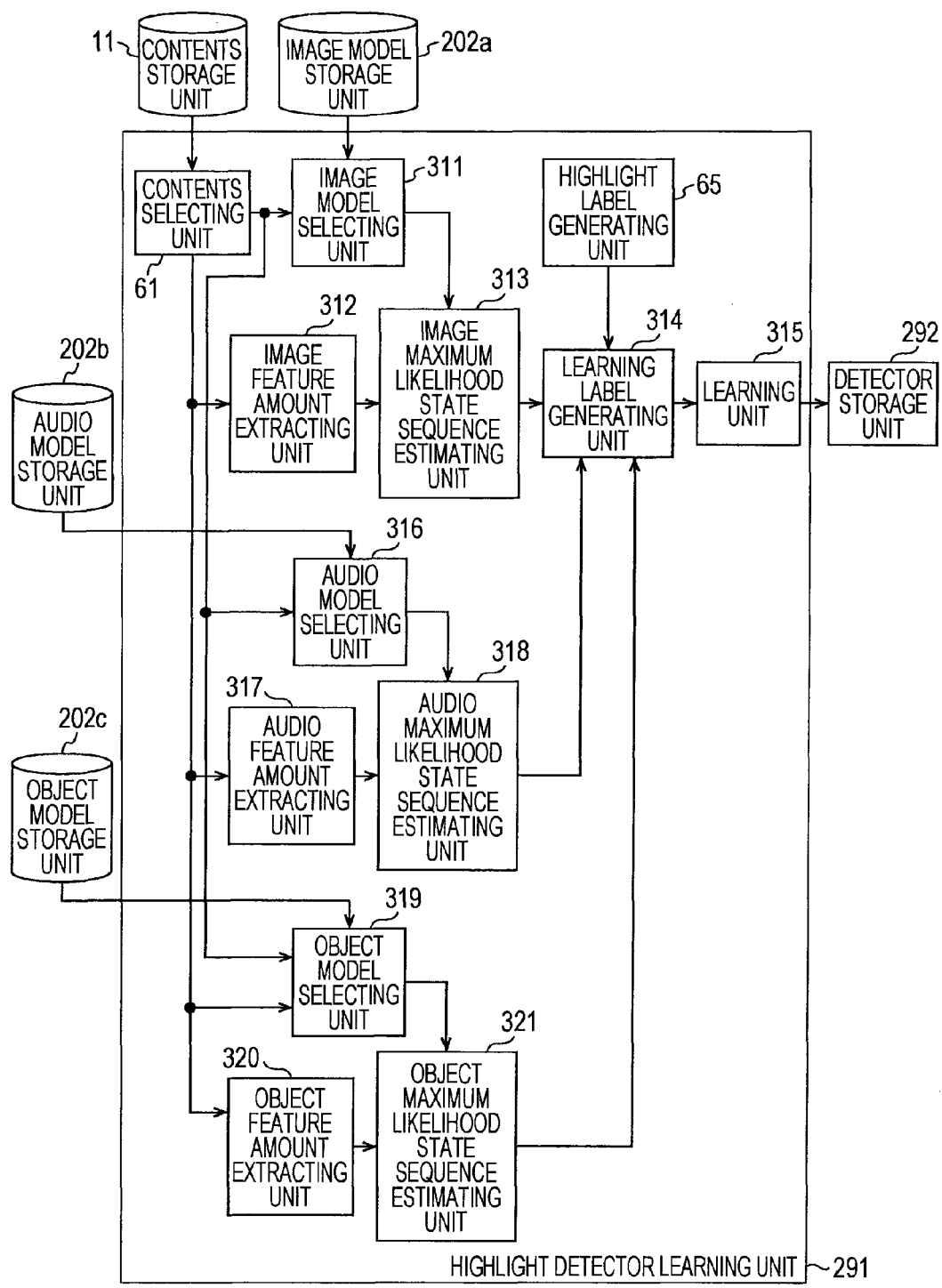
FIG. 43 is a block diagram illustrating a configuration example of a highlight detector learning unit 291.

FIG. 43 is a block diagram illustrating a configuration example of the highlight detector learning unit 291 in FIG. 42. Note that, with the configuration of the highlight detector learning unit 291 in FIG. 43, a configuration having the same function as with the configuration of the highlight detector learning unit 51 in FIG. 15 is denoted with the same reference numeral, and description thereof will be omitted as appropriate.

Specifically, the highlight detector learning unit 291 differs from the configuration of the highlight detector learning unit 51 in that a model selecting unit 62, a feature amount extracting unit 63, and a maximum likelihood state sequence estimating unit 64, which can handle image feature amount, audio feature amount, and object feature amount, are provided. More specifically, the highlight detector learning unit 291 includes an image model selecting unit 311, an image feature amount extracting unit 312, and an image maximum likelihood state sequence estimating unit 313, which can handle image feature amount. Also, the highlight detector learning unit 291 includes an audio model selecting unit 316, an audio feature amount extracting unit 317, and an audio maximum likelihood state sequence estimating unit 318, which can handle audio feature amount. Further, the highlight detector learning unit 291 includes an object model selecting unit 319, an object feature amount extracting unit 320, and an object maximum likelihood state sequence estimating unit 321, which can handle object feature amount.

However, the image model selecting unit 311, image feature amount extracting unit 312, and image maximum likelihood state sequence estimating unit 313, which take an image contents model as an object, are the same as the model selecting unit 62, feature amount extracting unit 63, and maximum likelihood state sequence estimating unit 64. Also, the audio model selecting unit 316, audio feature amount extracting unit 317, audio maximum likelihood state sequence estimating unit 318 have basically the same functions as with the model selecting unit 62, feature amount extracting unit 63, and maximum likelihood state sequence estimating unit 64 except that feature amount to be handled is audio feature amount. Further, the object model selecting unit 319, object feature amount extracting unit 320, and object maximum likelihood state sequence estimating unit 321 also have basically the same functions as with the model selecting unit 62, feature amount extracting unit 63, and maximum likelihood state sequence estimating unit 64 except that feature amount to be handled is object feature amount.

Further, the image model selecting unit 311 selects one of image contents models from the image model storage unit 202a of the model storage unit 202. The audio model selecting unit 316 selects one of audio contents models from the audio model storage unit 202b of the model storage unit 202. The object model selecting unit 319 selects one of object contents models from the object model storage unit 202c of the model storage unit 202.

Also, the highlight detector learning unit 291 in FIG. 43 includes a learning label generating unit 314 instead of the learning label generating unit 66. The learning label generating unit 314 has basically the same function as with the learning label generating unit 66. The learning label generating unit 314 causes the image maximum state sequence estimating unit 313 to obtain a state ID sequence that is the maximum likelihood state sequence (also referred to as image maximum likelihood state sequence) at the time of the image feature amount of the content of interest being observed in the image contents model serving as the model of interest. The learning label generating unit 314 causes the audio maximum state sequence estimating unit 318 to obtain a state ID sequence that is the maximum likelihood state sequence (also referred to as audio maximum likelihood state sequence) at the time of the audio feature amount of the content of interest being observed in the audio contents model serving as the model of interest. The learning label generating unit 314 causes the object maximum state sequence estimating unit 319 to obtain a state ID sequence that is the maximum likelihood state sequence (also referred to as object maximum likelihood state sequence) at the time of the object feature amount of the content of interest being observed in the object contents model serving as the model of interest. The learning label generating unit 314 obtains the highlight label sequence from the highlight label generating unit 65. Subsequently, the learning label generating unit 314 generates state ID sequences that are an image maximum likelihood state sequence, audio maximum likelihood state sequence, and object maximum likelihood state sequence, and a label sequence for learning made up of a highlight label sequence.

Specifically, the learning label generating unit 314 generates a multi-stream label sequence for learning synthesized from the state IDs of the maximum likelihood state sequence of each of an image, audio, and an object, and the state ID at each point-in-time t in a highlight label sequence, and a highlight label.

Accordingly, the learning label generating unit 314 generates a multi-stream label sequence for learning made up of a component sequence of the number of streams M=4 in the above Expression (2). Subsequently, the learning label generating unit 314 supplies the multi-stream label sequence for learning to the learning unit 315.

The learning unit 315 uses the label sequence for learning from the learning label generating unit 314 to perform, for example, learning of a highlight detector that is an Ergodic type multi-stream HMM in accordance with the Baum-Welch re-estimation method.

Subsequently, the learning unit 315 supplies and stores the highlight detector after learning to the detector storage unit 292 in a manner correlated with the category of the content of interest selected at the content selecting unit 61.

Note that, with the learning of a multi-stream HMM at the learning unit 315, as described above, configuration is made by four types of component sequence of M=4, so with the sequence weight of each component sequence as $W_1$ through $W_4$, for example, in the event that all are equally allocated, any of these may be set to ¼ (=0.25). Also, if the number of streams M is generalized, in the event that the sequence weight of each sequence is set to be equal, any sequence weight may be set to 1/M.

[Highlight Detector Learning Processing]

Figure 44:
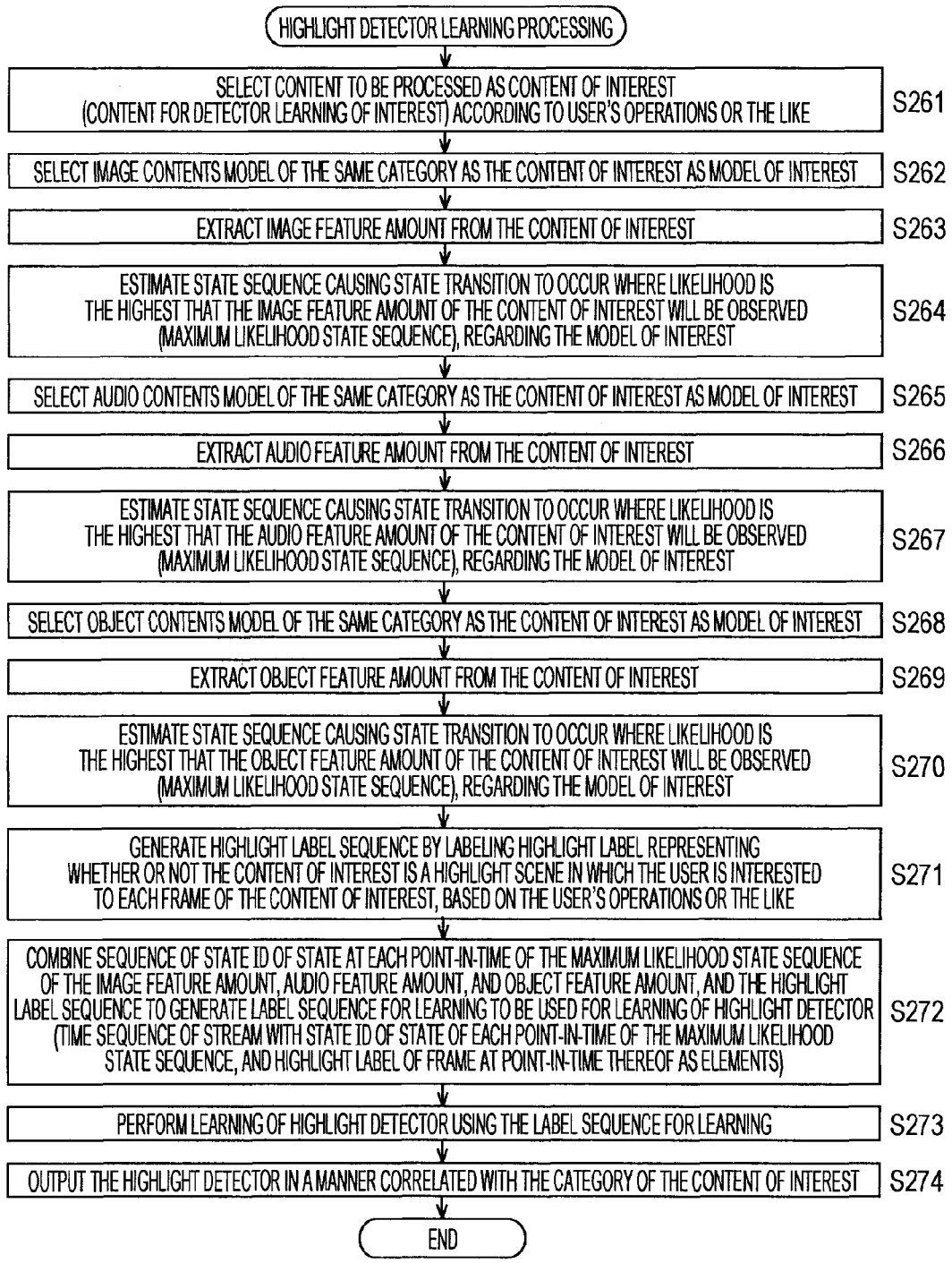
FIG. 44 is a flowchart for describing highlight detector learning processing by the highlight detector learning unit 291.

FIG. 44 is a flowchart for describing the processing (highlight detector learning processing) that the highlight detector learning unit 291 in FIG. 43 performs.

In step S261, the contents selecting unit 61 selects a content of which the playback has been specified by the user's operation out of the contents stored in the contents storage unit 11 as the content of interest (content for detector learning of interest).

Subsequently, the contents selecting unit 61 supplies the content of interest to each of the image feature amount extracting unit 312, audio feature amount extracting unit 317, and object feature amount extracting unit 320. Also, the contents selecting unit 61 recognizes the category of the content of interest, and supplies to the image model selecting unit 311, audio model selecting unit 316, and object model selecting unit 319, and the processing proceeds from step S261 to step S262.

In step S262, the image model selecting unit 311 selects an image contents model correlated with the category of the content of interest, from the contents selecting unit 61, out of the image contents models stored in the image model storage unit 202a, as the model of interest.

Subsequently, the image model selecting unit 311 supplies the model of interest to the image maximum likelihood state sequence estimating unit 313, and the processing proceeds from step S262 to step S263.

In step S263, the image feature amount extracting unit 312 extracts the image feature amount of each frame of the content of interest supplied from the contents selecting unit 61, and supplies (the time sequence of) the image feature amount of each frame of the content of interest to the image maximum likelihood state sequence estimating unit 313. Subsequently, the processing proceeds to step S264.

In step S264, the image maximum likelihood state sequence estimating unit 313 estimates the image maximum likelihood state sequence causing state transition where likelihood is the highest that (the time sequence of) the image feature amount of the content of interest from the image feature amount extracting unit 312 will be observed in the model of interest from the image model selecting unit 311.

Subsequently, the image maximum likelihood state sequence estimating unit 313 supplies the image maximum likelihood state sequence of the model of interest as to the content of interest to the learning label generating unit 314, and the processing proceeds from step S264 to step S265.

In step S265, the audio model selecting unit 316 selects an audio contents model correlated with the category of the content of interest, from the contents selecting unit 61, out of the audio contents models stored in the audio model storage unit 202*b*, as the model of interest.

Subsequently, the audio model selecting unit 316 supplies the model of interest to the audio maximum likelihood state sequence estimating unit 318, and the processing proceeds from step S265 to step S266.

In step S266, the audio feature amount extracting unit 317 extracts the audio feature amount of each frame of the content of interest supplied from the contents selecting unit 61, and supplies (the time sequence of) the audio feature amount of each frame of the content of interest to the audio maximum likelihood state sequence estimating unit 318. Subsequently, the processing proceeds to step S267.

In step S267, the audio maximum likelihood state sequence estimating unit 318 estimates the audio maximum likelihood state sequence causing state transition where likelihood is the highest that (the time sequence of) the audio feature amount of the content of interest from the audio feature amount extracting unit 317 will be observed in the model of interest from the audio model selecting unit 316.

Subsequently, the audio maximum likelihood state sequence estimating unit 318 supplies the audio maximum likelihood state sequence of the model of interest as to the content of interest to the learning label generating unit 314, and the processing proceeds from step S267 to step S268.

In step S268, the object model selecting unit 319 selects an object contents model correlated with the category of the content of interest, from the contents selecting unit 61, out of the object contents models stored in the object model storage unit 202*c*, as the model of interest.

Subsequently, the object model selecting unit 319 supplies the model of interest to the object maximum likelihood state sequence estimating unit 321, and the processing proceeds from step S268 to step S269.

In step S269, the object feature amount extracting unit 320 extracts the object feature amount of each frame of the content of interest supplied from the contents selecting unit 61, and supplies (the time sequence of) the object feature amount of each frame of the content of interest to the object maximum likelihood state sequence estimating unit 321. Subsequently, the processing proceeds to step S270.

In step S270, the object maximum likelihood state sequence estimating unit 321 estimates the object maximum likelihood state sequence causing state transition where likelihood is the highest that (the time sequence of) the object feature amount of the content of interest from the object feature amount extracting unit 320 will be observed in the model of interest from the object model selecting unit 319.

Subsequently, the object maximum likelihood state sequence estimating unit 321 supplies the object maximum likelihood state sequence of the model of interest as to the content of interest to the learning label generating unit 314, and the processing proceeds from step S270 to step S271.

In step S271, the highlight label generating unit 65 labels a highlight label to each frame of the content of interest selected at the contents selecting unit 61 in accordance with the user's operations, thereby generating a highlight label sequence regarding the content of interest.

Subsequently, the highlight label generating unit 65 supplies the highlight label sequence generated regarding the content of interest to the learning label generating unit 314, and the processing proceeds to step S272.

In step S272, the learning label generating unit 314 obtains the state ID sequence of the image maximum likelihood state sequence of the model of interest as to the content of interest from the image maximum likelihood state sequence estimating unit 313. Also, the learning label generating unit 314 obtains the state ID sequence of the audio maximum likelihood state sequence of the model of interest as to the content of interest from the audio maximum likelihood state sequence estimating unit 318. Further, the learning label generating unit 314 obtains the state ID sequence of the object maximum likelihood state sequence of the model of interest from the object maximum likelihood state sequence estimating unit 321. Also, the learning label generating unit 314 obtains the highlight label sequence from the highlight label generating unit 65. Subsequently, the learning label generating unit 314 combines four sequences of the state ID sequences of these image maximum likelihood state sequence, audio maximum likelihood state sequence, and object maximum likelihood state sequence, and a highlight label sequence to generate a label sequence for learning.

Subsequently, the learning label generating unit 314 supplies the label sequence for learning to the learning unit 315, and the processing proceeds from step S272 to step S273.

In step S273, the learning unit 315 uses the label sequence for learning from the learning label generating unit 314 to perform learning of a highlight detector that is a multi-stream HMM, and the processing proceeds to step S274.

In step S274, the learning unit 315 supplies and stores the highlight detector after learning to the detector storage unit 292 in a manner correlated with the category of the content of interest selected at the content selecting unit 61.

As described above, the highlight detector is obtained by learning of a multi-stream HMM using the four label sequences for learning of the state ID sequences of the image maximum likelihood state sequence, audio maximum likelihood state sequence, and object maximum likelihood state sequence, and the highlight label sequence.

Accordingly, by the observation probability of the highlight sequence, of each state of the highlight detector, being referenced, determination may be made whether or not a frame, (with a high possibility of being) observed in that state, corresponding to the state of a contents model is a scene with the user's interest (highlight scene).

[Configuration Example of Highlight Detecting Unit 293]

Figure 45:
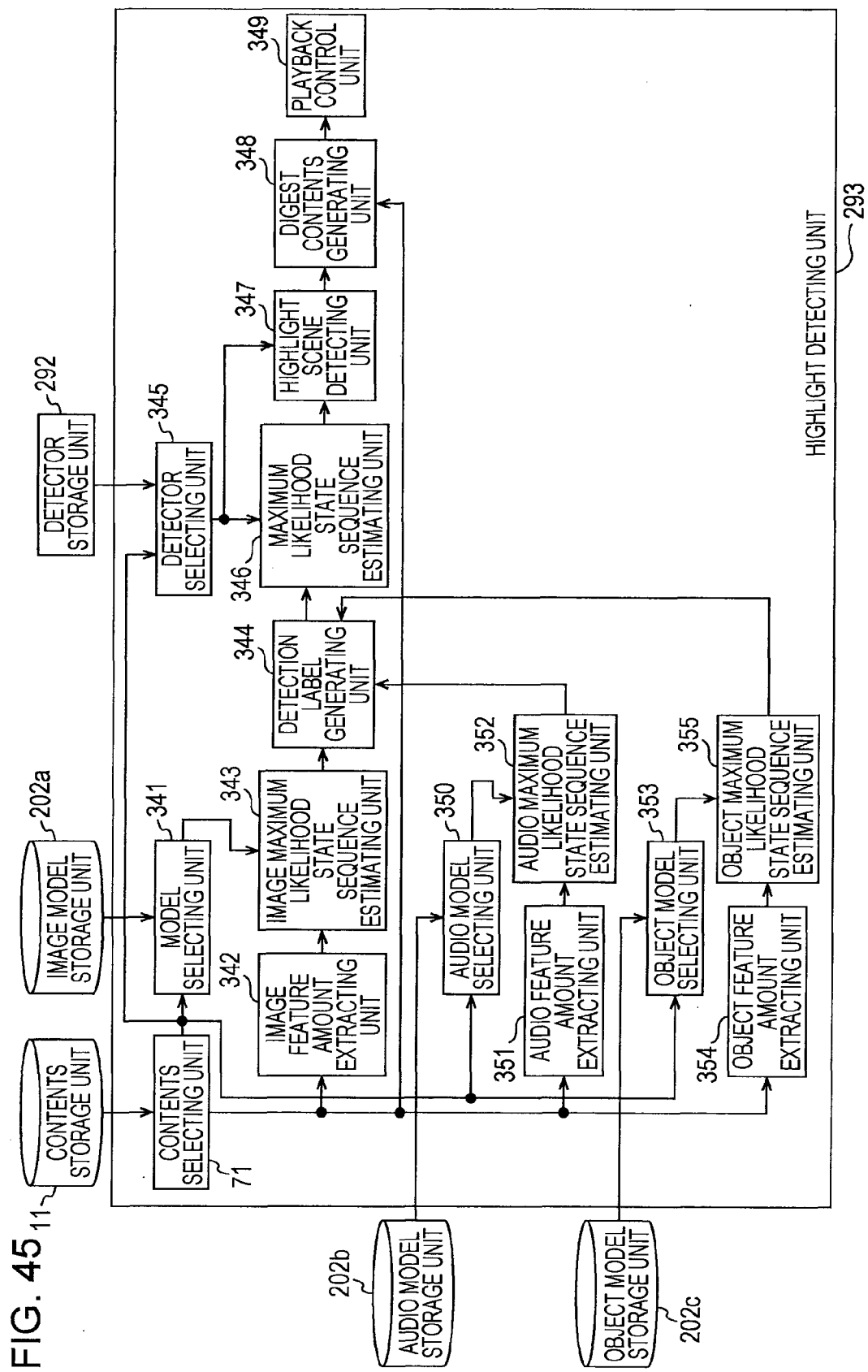
FIG. 45 is a block diagram illustrating a configuration example of a highlight detecting unit 293.

FIG. 45 is a block diagram illustrating a configuration example of the highlight detecting unit 293 in FIG. 42. Note that, with the highlight detecting unit 293 in FIG. 45, a configuration including the same function as the configuration in the highlight detecting unit 53 in FIG. 18 is denoted with the same reference numeral, and description thereof will be omitted.

The highlight detecting unit 293 in FIG. 45 has basically the same function as with the highlight detecting unit 53 in FIG. 18, but differs in that a detection label is generated in response to each of image feature amount, audio feature amount, and object feature amount.

Specifically, the image model selecting unit 341, image feature amount extracting unit 342, and image maximum likelihood state sequence estimating unit 343 are the same as the image model selecting unit 311, image feature amount extracting unit 312, and image maximum likelihood state sequence estimating unit 313 of the highlight detector learning unit 291 in FIG. 43. Also, the audio model selecting unit 350, audio feature amount extracting unit 351, and audio maximum likelihood state sequence estimating unit 352 are the same as the audio model selecting unit 316, audio feature amount extracting unit 317, and audio maximum likelihood state sequence estimating unit 318 of the highlight detector learning unit 291 in FIG. 43. Further, the object model selecting unit 353, object feature amount extracting unit 354, and object maximum likelihood state sequence estimating unit 355 are the same as the object model selecting unit 319, object feature amount extracting unit 320, and object maximum likelihood state sequence estimating unit 321 of the highlight detector learning unit 291 in FIG. 43.

According to such a configuration, the state ID sequence of each of the image maximum likelihood state sequence, audio maximum likelihood state sequence, and object maximum likelihood state sequence of the model of interest as to the content of interest is supplied to the learning label generating unit 344.

The detection label generating unit 344 generates a label sequence for detection made up of state ID sequences that are the image maximum likelihood state sequence, audio maximum likelihood state sequence, and object maximum likelihood state sequence of the model of interest as to the content of interest, and a highlight label sequence made up of highlight labels alone.

Specifically, the detection label generating unit 344 generates a highlight label sequence made up of highlight labels alone representing other than a highlight scene, and having the same length (sequence length) as the sequences of the image maximum likelihood state sequence, audio maximum likelihood state sequence, and object maximum likelihood state sequence, as a dummy sequence, as if it were, to be given to a highlight detector.

Further, the detection label generating unit 344 generates a multi-stream label sequence for detection by state IDs that are the image maximum likelihood state sequence, audio maximum likelihood state sequence, and object maximum likelihood state sequence, and a state ID at each point-in-time t in a highlight label sequence that is a dummy sequence, and a highlight label being combined.

Subsequently, the learning label generating unit 344 supplies the label sequence for detection to the maximum likelihood state sequence estimating unit 346.

Note that, at the time of obtaining the observation probability of the label sequence for detection, as for the sequence weight $W_1$ through $W_4$ of the image maximum likelihood state sequence, audio maximum likelihood state sequence, object maximum likelihood state sequence, and highlight label sequence serving as a dummy sequence, ($W_1$: $W_2$: $W_3$:$W_4$)=(1/3:1/3:1/3:0) is employed. Thus, with the maximum likelihood state sequence estimating unit 346, estimation of a highlight relation state sequence is performed while taking only the image maximum likelihood state sequence, audio maximum likelihood state sequence, and object maximum likelihood state sequence of the model of interest as to the content of interest into consideration without taking the highlight label sequence input as a dummy sequence into consideration. Also, if the weight in the case of the number of streams M is generalized, in the event that the weight of the highlight sequence is set to 0, and the sequence weight other than the highlight sequence is set to be equal, any sequence weight may be set to 1/(M−1).

Also, with the detector selecting unit 345, maximum likelihood state sequence estimating unit 346, highlight scene detecting unit 347, digest contents generating unit 348, and playback control unit 349, a multi-stream detection label to be handled is a label sequence for detection made up of four streams. Other than this point, these have basically the same function as with the detector selecting unit 76, maximum likelihood state sequence estimating unit 77, highlight scene detecting unit 78, digest contents generating unit 79, and playback control unit 80, so description thereof will be omitted.

[Highlight Detection Processing]

Figure 46:
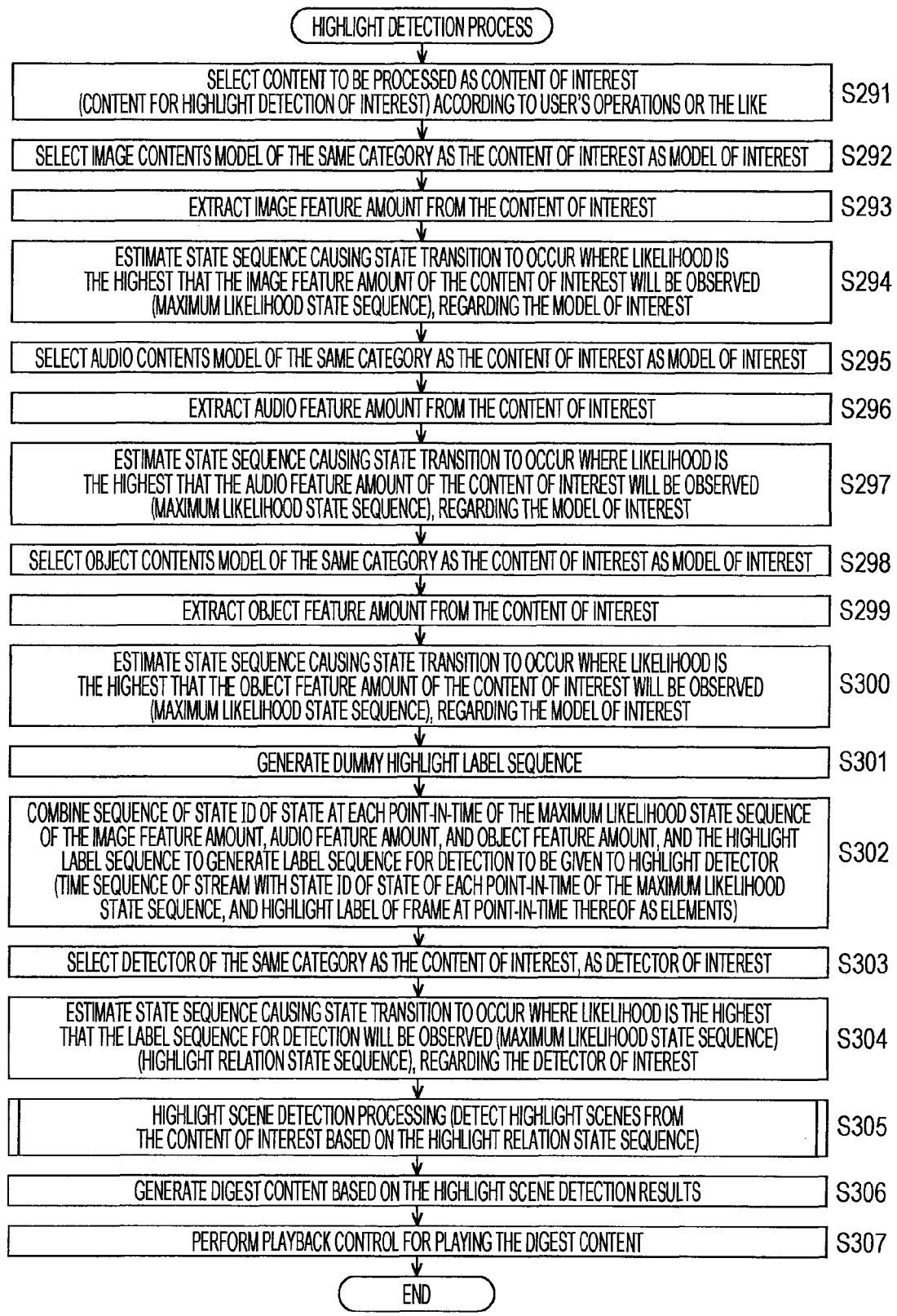
FIG. 46 is a flowchart for describing highlight detection processing by the highlight detecting unit 293.

FIG. 46 is a flowchart for describing the processing (highlight detection processing) of the highlight detecting unit 293 in FIG. 45.

In step S291, the contents selecting unit 71 selects the content of interest that is a content from which a highlight scene is to be detected (content for highlight detection of interest) out of the contents stored in the contents storage unit 11.

Subsequently, the contents selecting unit 71 supplies the content of interest to the image feature amount extracting unit 342, audio feature amount extracting unit 351, and object feature amount extracting unit 354. Further, the contents selecting unit 71 recognizes the category of the content of interest, supplies to the image model selecting unit 341, audio model selecting unit 350, object model selecting unit 353, and detector selecting unit 345, and the processing proceeds from step S291 to step S292.

In step S292, the image model selecting unit 341 selects an image contents model correlated with the category of the content of interest, from the contents selecting unit 71, out of the image contents models stored in the image model storage unit 202a, as the model of interest.

Subsequently, the image model selecting unit 341 supplies the model of interest to the image maximum likelihood state sequence estimating unit 343, and the processing proceeds from step S292 to step S293.

In step S293, the image feature amount extracting unit 342 extracts the image feature amount of each frame of the content of interest supplied from the contents selecting unit 71, supplies to the image maximum likelihood state sequence estimating unit 343, and the processing proceeds to step S294.

In step S294, the image maximum likelihood state sequence estimating unit 343 estimates the image maximum likelihood state sequence (the image maximum likelihood state sequence of the model of interest as to the content of interest) causing state transition where likelihood is the highest that (the time sequence of) the image feature amount of the content of interest from the image feature amount extracting unit 342 will be observed in the model of interest from the image model selecting unit 341.

Subsequently, the maximum likelihood state sequence estimating unit 294 supplies the image maximum likelihood state sequence of the model of interest as to the content of interest to the detection label generating unit 344, and the processing proceeds from step S294 to step S295.

In step S295, the audio model selecting unit 350 selects an audio contents model correlated with the category of the content of interest, from the contents selecting unit 71, out of the audio contents models stored in the audio model storage unit 202b, as the model of interest.

Subsequently, the audio model selecting unit 350 supplies the model of interest to the audio maximum likelihood state sequence estimating unit 352, and the processing proceeds from step S295 to step S296.

In step S296, the audio feature amount extracting unit 351 extracts the audio feature amount of each frame of the content of interest supplied from the contents selecting unit 71, supplies to the audio maximum likelihood state sequence estimating unit 352, and the processing proceeds to step S297.

In step S297, the audio maximum likelihood state sequence estimating unit 352 estimates the audio maximum likelihood state sequence (the audio maximum likelihood state sequence of the model of interest as to the content of interest) causing state transition where likelihood is the highest that (the time sequence of) the audio feature amount of the content of interest from the audio feature amount extracting unit 351 will be observed in the model of interest from the audio model selecting unit 350.

Subsequently, the audio maximum likelihood state sequence estimating unit 352 supplies the audio maximum likelihood state sequence of the model of interest as to the content of interest to the detection label generating unit 344, and the processing proceeds from step S297 to step S298.

In step S298, the object model selecting unit 353 selects an object contents model correlated with the category of the content of interest, from the contents selecting unit 71, out of the object contents models stored in the object model storage unit 202c, as the model of interest.

Subsequently, the object model selecting unit 353 supplies the model of interest to the object maximum likelihood state sequence estimating unit 355, and the processing proceeds from step S298 to step S299.

In step S299, the object feature amount extracting unit 354 extracts the object feature amount of each frame of the content of interest supplied from the contents selecting unit 71, supplies to the object maximum likelihood state sequence estimating unit 355, and the processing proceeds to step S300.

In step S300, the object maximum likelihood state sequence estimating unit 355 estimates the object maximum likelihood state sequence (the object maximum likelihood state sequence of the model of interest as to the content of interest) causing state transition where likelihood is the highest that (the time sequence of) the object feature amount of the content of interest from the object feature amount extracting unit 354 will be observed in the model of interest from the object model selecting unit 353.

Subsequently, the object maximum likelihood state sequence estimating unit 355 supplies the object maximum likelihood state sequence of the model of interest as to the content of interest to the detection label generating unit 344, and the processing proceeds from step S300 to step S301.

In step S301, the detection label generating unit 344 generates, for example, a highlight label sequence made up of highlight labels (highlight labels of which the values are "0") alone representing being other than a highlight scene, as a dummy highlight label sequence, and the processing proceeds to step S302.

In step S302, the detection label generating unit 344 generates four sequences of label sequences for detection of state ID sequences that are the image maximum likelihood state sequence, audio maximum likelihood state sequence, and object maximum likelihood state sequence of the model of interest as to the content of interest, and a dummy highlight sequence.

Subsequently, the detection label generating unit 344 supplies the label sequences for detection to the maximum likelihood state sequence estimating unit 346, and the processing proceeds from step S302 to step S303.

In step S303, the detector selecting unit 345 selects a highlight detector correlated with the category of the content of interest, from the contents selecting unit 71, out of the highlight detectors stored in the detector storage unit 292, as the detector of interest. Subsequently, the detector selecting unit 345 obtains the detector of interest out of the highlight detectors stored in the detector storage unit 292, supplies to the maximum likelihood state sequence estimating unit 346 and highlight detecting unit 347, and the processing proceeds from step S303 to step S304.

In step S304, the maximum likelihood state sequence estimating unit 346 estimates the maximum likelihood state sequence (highlight relation state sequence) causing state transition where likelihood is the highest that the label sequence for detection from the detection label generating unit 344 will be observed in the detector of interest from the detector selecting unit 345.

Subsequently, the maximum likelihood state sequence estimating unit 346 supplies the highlight relation state sequence to the highlight detecting unit 347, and the processing proceeds from step S304 to step S305.

In step S305, the highlight scene detecting unit 347 performs highlight scene detection processing for detecting a highlight scene from the content of interest to output a highlight flag, based on the highlight label observation probability of each state of the highlight relation state sequence from the maximum likelihood state sequence estimating unit 346.

Subsequently, after completion of the highlight detection processing, the processing proceeds from step S305 to step S306, where the digest contents generating unit 348 extracts the frame of a highlight scene determined by the highlight flag that the highlight scene detecting unit 347 outputs, from the frames of the content of interest from the contents selecting unit 71.

Further, the digest contents generating unit 348 uses the highlight scene frame extracted from the frames of the content of interest to generate a digest content of the content of interest, supplies to the playback control unit 349, and the processing proceeds from step S306 to step S307.

In step S307, the playback control unit 49 performs playback control for playing the digest content from the digest contents generating unit 348.

Note that the highlight scene detection processing in step S305 is the same as the processing in step S89 in FIG. 20, i.e., the processing described with reference to the flowchart in FIG. 21, so description thereof will be omitted.

As described above, the highlight detecting unit 293 estimates the highlight relation state sequence of the maximum likelihood state sequence where a label sequence for detection will be observed from the state ID sequences that are the image, audio, and object maximum likelihood state sequences, and the dummy highlight label sequence at the highlight detector. Subsequently, the highlight detecting unit 293 detects a highlight scene frame from the content of interest based on the highlight label observation probability of each state of the highlight relation state sequence thereof, and generates a digest content using the highlight scene thereof.

Also, the highlight detector is obtained by performing learning of an HMM using a label sequence for learning made up of four sequences of combination of state ID sequences that are the image maximum likelihood state sequence, audio maximum likelihood state sequence, and object maximum likelihood state sequence of a contents model as to a content, and a highlight label sequence generated by the user's operations.

Accordingly, even in the event that the content of interest for generating a digest content is not used for learning of a contents model or highlight detector, if learning of a contents model or highlight detector is performed using a content having the same category as the content of interest, a digest (digest content) generated by collecting a scene in which the user is interested as a highlight scene can readily be obtained using the contents model and highlight detector thereof.

[Configuration Example of Scrapbook Generating Unit 205]

Figure 47:
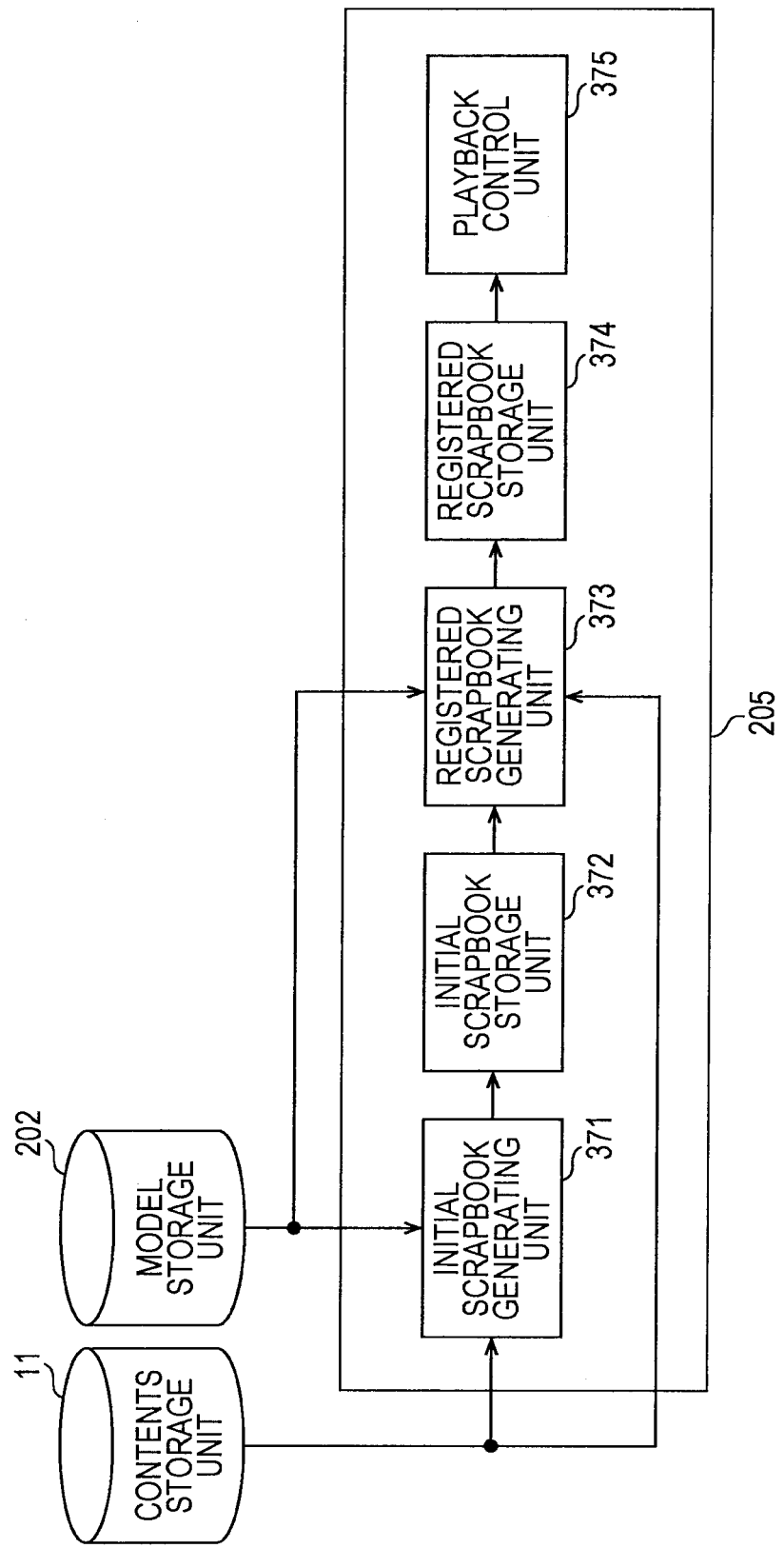
FIG. 47 is a block diagram illustrating a configuration example of a scrapbook generating unit 203.

FIG. 47 is a block diagram illustrating a configuration example of the scrapbook generating unit 205 in FIG. 35.

The scrapbook generating unit 205 is configured of an initial scrapbook generating unit 371, an initial scrapbook storage unit 372, a registered scrapbook generating unit 373, a registered scrapbook storage unit 374, and a playback control unit 375.

The initial scrapbook generating unit 371, initial scrapbook storage unit 372, registered scrapbook generating unit 373, registered scrapbook storage unit 374, and playback control unit 375 are basically the same as the initial scrapbook generating unit 101 through the playback control unit 105. However, any of these executes processing corresponding to not only an image contents model based on image feature amount but also an audio contents model based on audio feature amount, and an object contents model based on object feature amount.

[Configuration Example of Initial Scrapbook Generating Unit 371]

Figure 48:
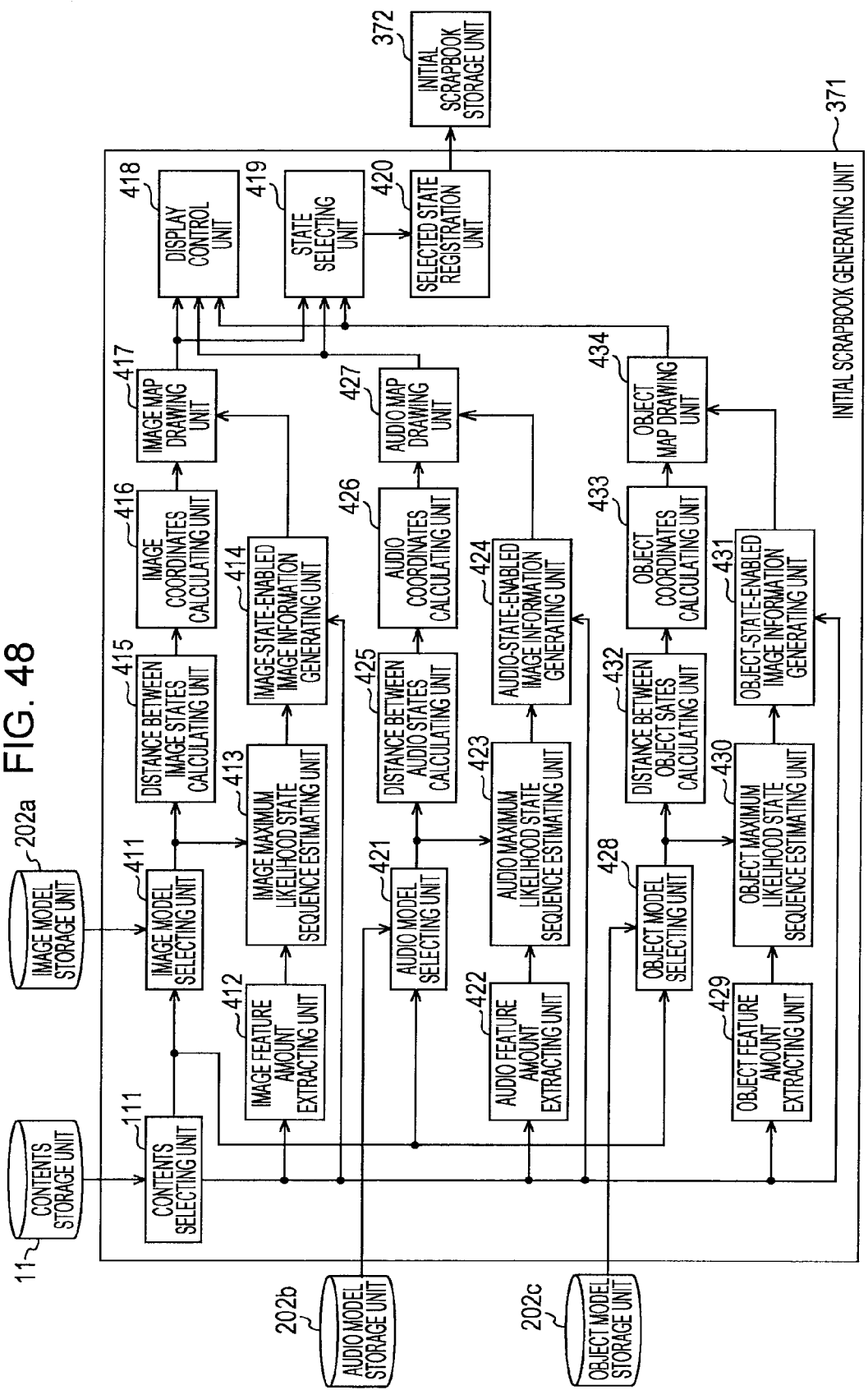
FIG. 48 is a block diagram illustrating a configuration example of an initial scrapbook generating unit 371.

FIG. 48 is a block diagram illustrating a configuration example of the initial scrapbook generating unit 371 in FIG. 47. Note that, with the configuration of the initial scrapbook generating unit 371 in FIG. 48, a configuration having the same function as with the initial scrapbook generating unit 101 in FIG. 23 is denoted with the same reference numeral, and description thereof will be omitted as appropriate.

Also, in FIG. 48, of the initial scrapbook generating unit 371, an image model selecting unit 411, an image feature amount extracting unit 412, an image maximum likelihood state sequence estimating unit 413, an image-state-enabled image information generating unit 414, a distance between image states calculating unit 415, an image coordinates calculating unit 416, and an image map drawing unit 417 are the same as the model selecting unit 112, feature amount extracting unit 113, maximum likelihood state sequence estimating unit 114, state-enabled image information generating unit 115, inter-state distance calculating unit 116, coordinates calculating unit 117, and map drawing unit 118 respectively, so description thereof will be omitted.

Specifically, the image model selecting unit 411 through the image map drawing unit 417 are configured in the same way as the model selecting unit 32 through the map drawing unit 38 of the contents structure presenting unit 14 (FIG. 9), and perform contents structure presentation processing based on the image feature amount described in FIG. 13.

Also, an audio model selecting unit 421, an audio feature amount extracting unit 422, an audio maximum likelihood state sequence estimating unit 423, an audio-state-enabled image information generating unit 424, a distance between audio states calculating unit 425, an audio coordinates calculating unit 426, and an audio map drawing unit 427 perform the same processing as the image model selecting unit 411, image feature amount extracting unit 412 through image map drawing unit 417 except that an object to be handled is audio feature amount.

Further, an object model selecting unit 428, an object feature amount extracting unit 429, an object maximum likelihood state sequence estimating unit 430, an object-state-enabled image information generating unit 431, a distance between object states calculating unit 432, an object coordinates calculating unit 433, and an object map drawing unit 434 perform the same processing as the image model selecting unit 411 through the image map drawing unit 417 except that an object to be handled is object feature amount.

Also, a display control unit 418, a state selecting unit 419, and a selected state registration unit 420 perform the same processing as the display control unit 119, state selecting unit 121, and selected state registration unit 122, respectively.

Accordingly, with the initial scrapbook generating unit 371, the model map (FIG. 11, FIG. 12) is displayed on the unshown display based on each of the image feature amount, audio feature amount, and object feature amount by the contents structure presentation processing being performed. Subsequently, in the event that a state on the model map based on each of the image feature amount, audio feature amount, and object feature amount has been specified by the user's operation, the state ID of the specified state (selected state) is registered on the (empty) scrapbook.

Figure 49:
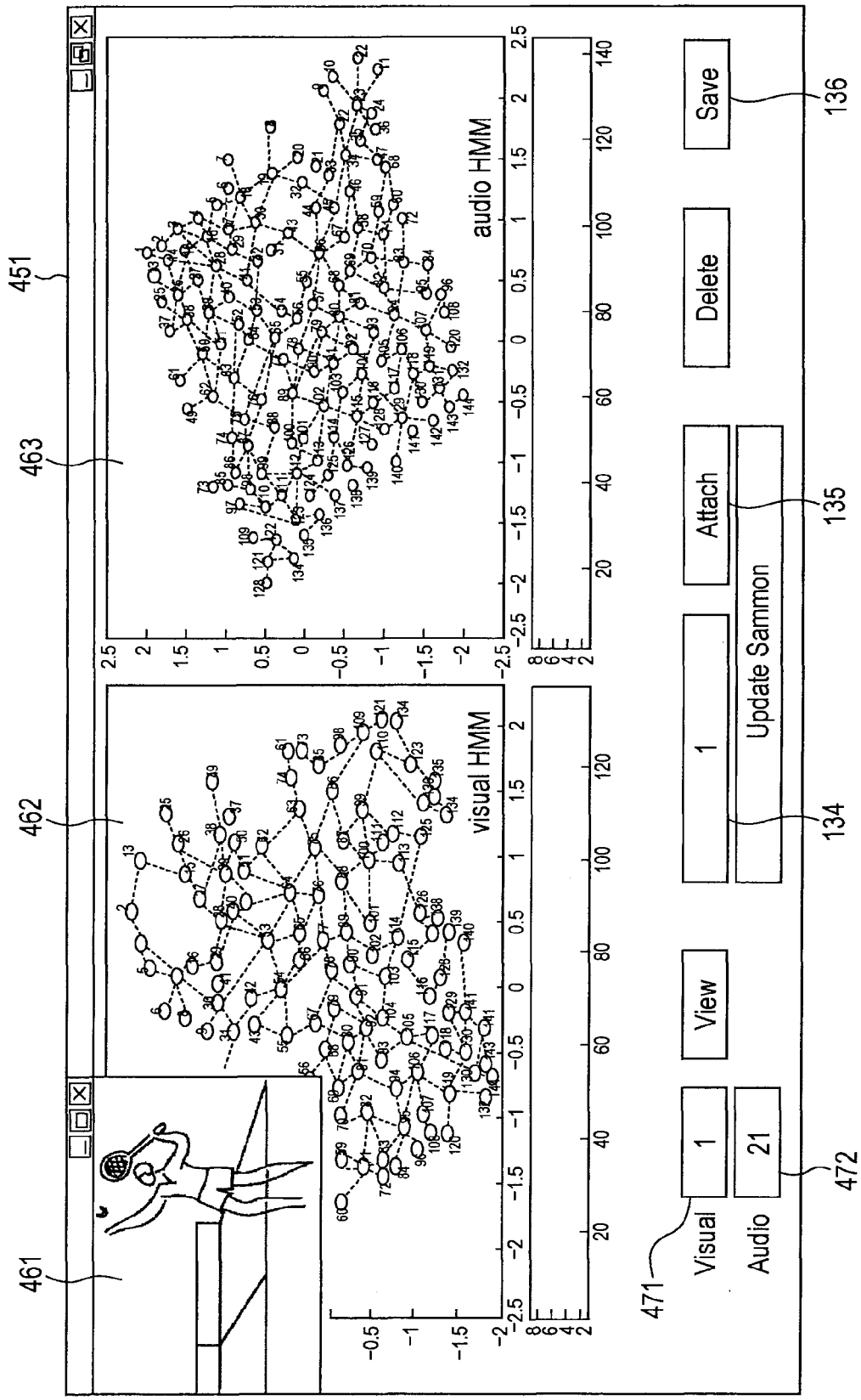
FIG. 49 is a diagram illustrating an example of user interface for a user specifying the state on a model map.

FIG. 49 is a diagram illustrating a user interface example to be displayed by the display control unit 418 performing display control for the user specifying a state on the model map. Note that display having the same function as with the display in the window 131 in FIG. 24 is denoted with the same reference numeral, and description thereof will be omitted as appropriate.

In FIG. 49, a model map 462 based on the image feature amount generated at the image map drawing unit 417, and a model map 463 based on the audio feature amount generated at the audio map drawing unit 427 are displayed on a window 451. Note that, with the example in FIG. 49, though not illustrated, it goes without saying that a model map based on the object feature amount generated at the object map drawing unit 434 may be displayed together. Also, in the event that another feature amount other than the image feature amount, audio feature amount, and object feature amount is handled, a model map based on the other feature amount may further be drawn and displayed. Further, each of the model maps may also be displayed on a different window.

The states on the model maps 462 and 463 within the window 451 can be focused by the user's specification. Specification of a state by the user may be performed by clicking using a pointing device such as a mouse or the like, or by moving a cursor which moves according to the operation of a pointing device to the position of a state to be focused on, or the like.

Also, of the states on the model maps 462 and 463, a state that has already been in a selected state, and a state that has not been in a selected state may be displayed in a different display format such as a different color or the like.

With the display in the lower portion of the window 451, a point different from the window 131 in FIG. 24 is in that an image state ID input field 471 and an audio state ID input field 472 are provided instead of the state ID input field 133.

Of the states on the model map 462 based on the image feature amount, the state ID of a focused state is displayed on the image state ID input filed 471.

Of the states on the model map 463 based on the audio feature amount, the state ID of a focused state is displayed on the audio state ID input filed 472.

Note that the user may also directly input a state ID on the image state ID input field 471 and the audio state ID input field 472. Also, in the event that a model map based on the object feature amount is displayed, an object state ID input filed is also displayed together.

The window 461 is opened in the event that, of the states on the model maps 462 and 463, a focused state is linked to the state-enabled image information generated at the contents structure presentation processing. Subsequently, the state-enabled image information linked to the focused state is displayed.

Note that state-enabled image information linked to each of a focused state and a state positioned in the vicinity of the focused state on the model maps 462 and 463 may be displayed on the window 461. Also, state-enabled image information linked to each of all the states on the model maps 462 and 463 may be displayed on the window 461 temporally serially, or spatially in parallel.

The user may specify an arbitrary state on the model maps 462 and 463 displayed on the window 451 by clicking the state, or the like.

Upon a state being specified by the user, the display control unit 418 (FIG. 48) displays the state-enabled image information linked to the state specified by the user on the window 461.

Thus, the user can confirm the image of a frame corresponding to a state on the model maps 462 and 463.

With the initial scrapbook generating unit 371 in FIG. 48, the state ID of a selected state of the image model map, audio model map, and object model map is registered in the initial scrapbook by the selected state registration unit 420.

Specifically, the initial scrapbook generation processing by the initial scrapbook generating unit 371 in FIG. 48 is the same as the processing described with reference to FIG. 25 regarding each of the image model map (model map based on the image feature amount), audio model map (model map based on the audio feature amount), and object model map (model map based on the object feature amount), so description thereof will be omitted.

However, with the initial scrapbook generating unit 371 in FIG. 48, in the event that, of the image model map, audio model map, and object model map, a selected state selected (specified) from a certain model map, and a selected state selected form another model map correspond to the same frame, (the state IDs of) these selected states are registered in the initial scrapbook in a correlated manner.

Specifically, for example, now, let us pay attention on the image model map and the audio model map.

Each frame of the content of interest corresponds to any state on the image model map (state where the image feature amount of the frame is observed in the image maximum likelihood state sequence), and also corresponds to any state on the audio model map.

Accordingly, there may be a case where the same frame of the content of interest corresponds to a selected state selected from the image model map, and a selected state selected from the audio model map.

In this case, the selected state selected from the image model map, and the selected state selected from the audio model map, which correspond to the same frame, are registered in the initial scrapbook in a correlated manner.

In addition to a case where of the image model map, audio model map, and object model map, the same frame corresponds to two selected states selected from each of arbitrary two model maps, in the event that the same frame corresponds to three selected states selected from each of three model maps of the image model map, audio model map, and object model map as well, the three selected states thereof are registered in the initial scrapbook in a correlated manner.

Now, of the state IDs (registered state IDs) of the selected states registered in the initial scrapbook, the state ID of a selected state selected from the image model map (state of an image contents model) will also be referred to as "image registered state ID", hereafter, as appropriate.

Similarly, of the registered state IDs registered in the initial scrapbook, the state ID of a selected state selected from the audio model map (state of an audio contents model) will also be referred to as "audio registered state ID", hereafter, as appropriate, and the state ID of a selected state selected from the object model map (state of an object contents model) will also be referred to as "object registered state ID", hereafter, as appropriate.

[Configuration Example of Registered Scrapbook Generating Unit 373]

Figure 50:
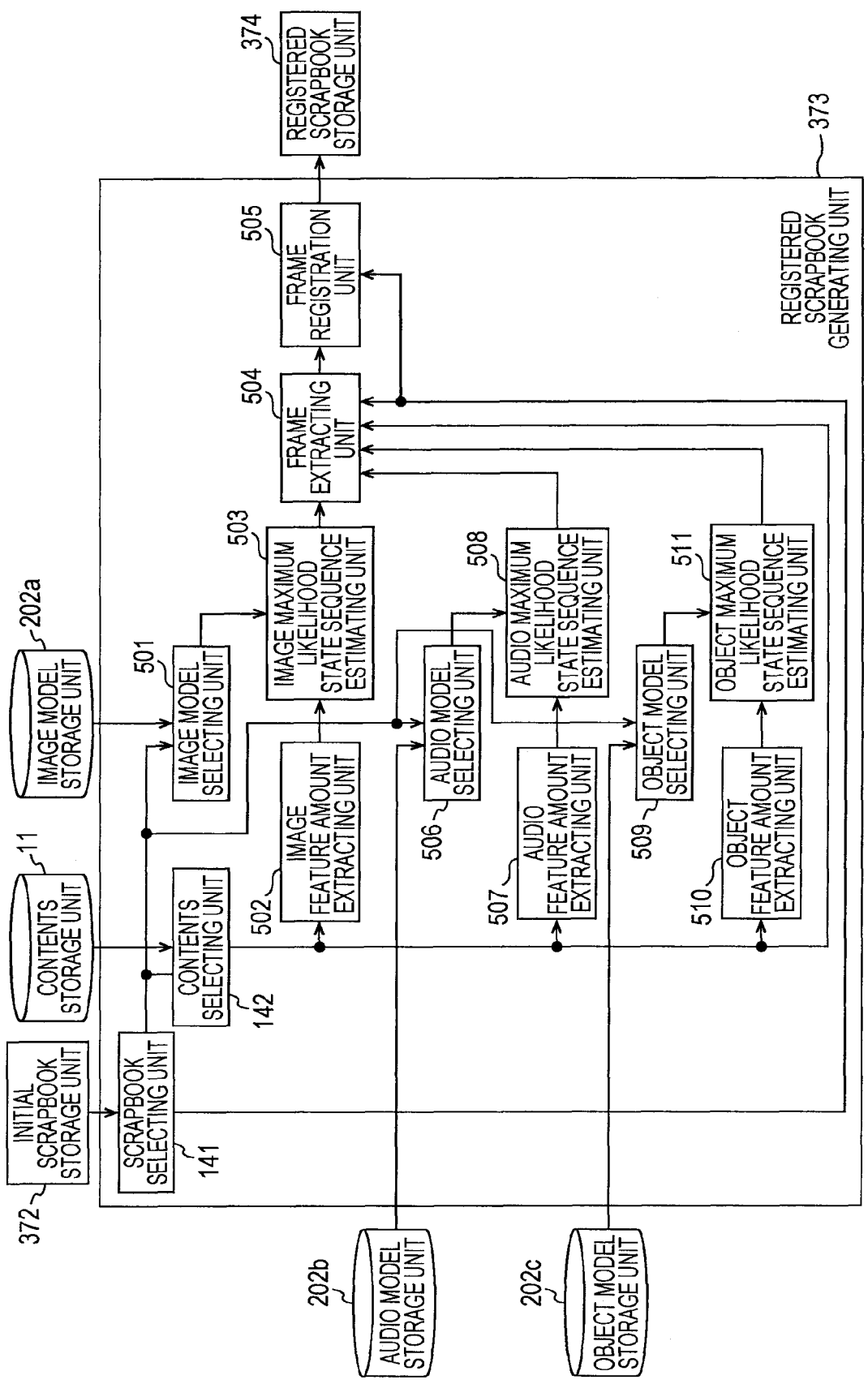
FIG. 50 is a block diagram illustrating a configuration example of a registered scrapbook generating unit 373.

FIG. 50 is a block diagram illustrating a configuration example of the registered scrapbook generating unit 373 in FIG. 47. Note that, with registered scrapbook generating unit 373 in FIG. 50, a configuration having the same function as with the configuration in the registered scrapbook generating unit 103 in FIG. 26 is denoted with the same reference numeral, and description thereof will be omitted as appropriate.

In FIG. 50, an image model selecting unit 501, an image feature amount extracting unit 502, an image maximum likelihood state sequence estimating unit 503, and a frame registration unit 505 are the same as the model selecting unit 143 through the maximum likelihood state sequence estimating unit 145, and frame registration unit 147 in FIG. 26, so description thereof will be omitted.

Also, an audio model selecting unit 506, an audio feature amount extracting unit 507, an audio maximum likelihood state sequence estimating unit 508 are the same as the image model selecting unit 501 through the image maximum likelihood state sequence estimating unit 503 except that an object to be handled is audio feature amount, so description thereof will be omitted.

Further, an object model selecting unit 509, an object feature amount extracting unit 510, an object maximum likelihood state sequence estimating unit 511 are the same as the image model selecting unit 501 through the image maximum likelihood state sequence estimating unit 503 except that an object to be handled is object feature amount, so description thereof will be omitted.

A frame extracting unit 504 has basically the same function as with the frame extracting unit 146 in FIG. 26, but differs in a state sequence to be handled. Specifically, the frame extracting unit 504 determines whether or not each state ID of the image maximum likelihood state sequence, audio maximum likelihood state sequence, and object maximum likelihood state sequence matches a registered state ID registered in the scrapbook of interest from the scrapbook selecting unit 141.

Further, the frame extracting unit 504 extracts a frame corresponding to a state of which the state ID matches a registered state ID registered in the scrapbook of interest from the scrapbook selecting unit 141, and supplies to the frame registration unit 505.

[Registered Scrapbook Generation Processing by Registered Scrapbook Generating Unit 373]

Figure 51:
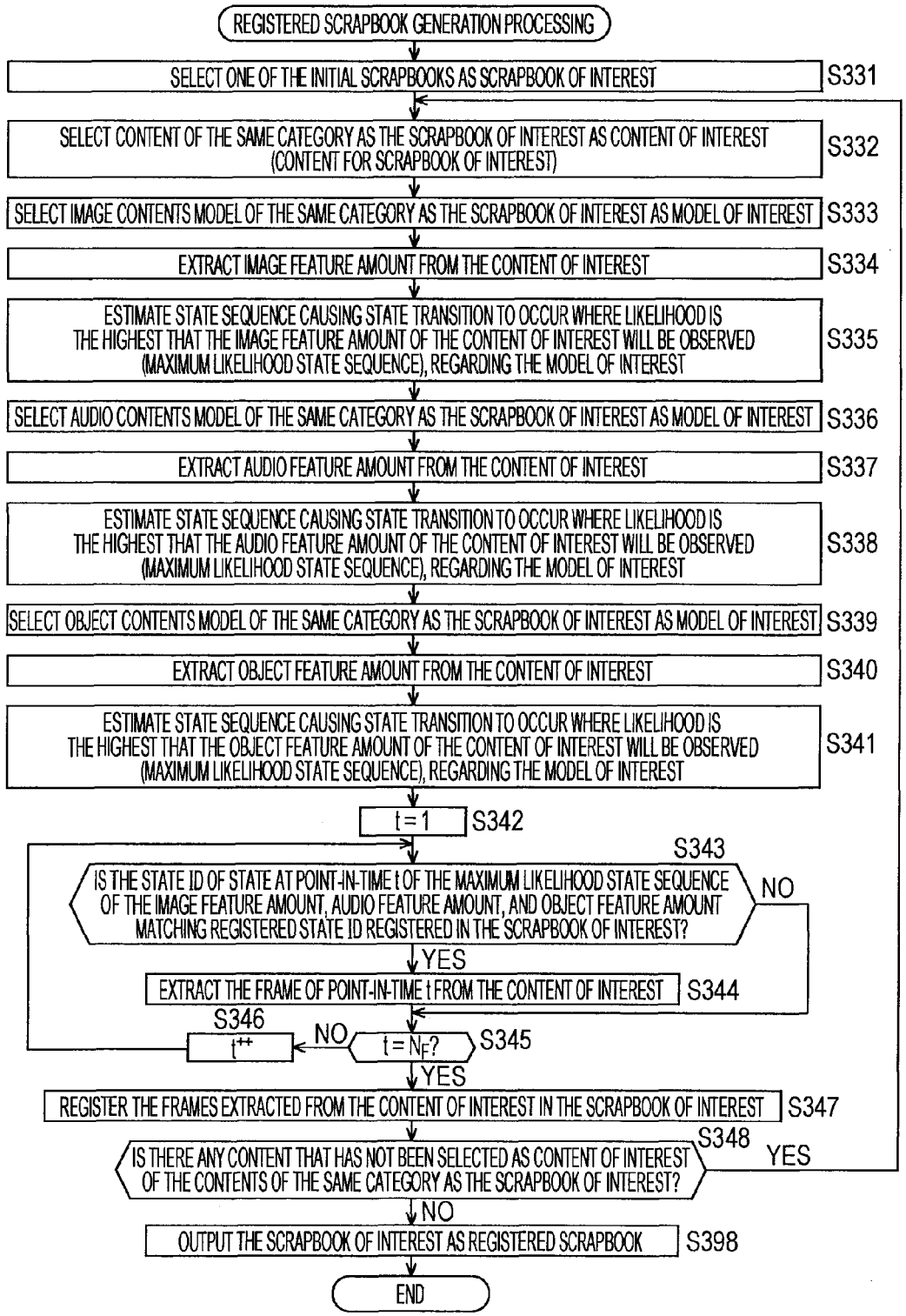
FIG. 51 is a flowchart for describing registered scrapbook generation processing by the registered scrapbook generating unit 373.

FIG. 51 is a flowchart for describing the registered scrapbook generation processing that the registered scrapbook generating unit 373 in FIG. 50 performs.

In step S331, the scrapbook selecting unit 141 selects, of the initial scrapbooks stored in the initial scrapbook storage unit 372, one of the initial scrapbooks that has not been selected yet as the scrapbook of interest, as the scrapbook of interest.

Subsequently, the scrapbook selecting unit 141 supplies the scrapbook of interest to the frame extracting unit 504 and frame registration unit 505. Further, the scrapbook selecting unit 141 supplies the category correlated with the scrapbook of interest to the contents selecting unit 142, image model selecting unit 501, audio model selecting unit 506, and object model selecting unit 509. Subsequently, the processing proceeds from step S331 to step S332.

In step S332, the contents selecting unit 142 selects, one of contents that has not been selected yet as the content of interest, out of the contents belonging to the category from the scrapbook selecting unit 141 of the contents stored in the contents storage unit 11, as the content of interest.

Subsequently, the contents selecting unit 142 supplies the content of interest to the image feature amount extracting unit 502, audio feature amount extracting unit 507, object feature amount extracting unit 510, and frame extracting unit 504, and the processing proceeds from step S332 to step S333.

In step S333, the image model selecting unit 501 selects an image contents model correlated with the category from the scrapbook selecting unit 141 out of the image contents models stored in the image model storage unit 202a, as the model of interest.

Subsequently, the image model selecting unit 501 supplies the model of interest to the image maximum likelihood state sequence estimating unit 503, and the processing proceeds from step S333 to step S334.

In step S334, the image feature amount extracting unit 502 extracts the image feature amount of each frame of the content of interest supplied from the contents selecting unit 142, and supplies (the time sequence of) the image feature amount of each frame of the content of interest to the image maximum likelihood state sequence estimating unit 503.

Subsequently, the processing proceeds from step S334 to step S335. In step S335, the image maximum likelihood state sequence estimating unit 503 estimates the image maximum likelihood state sequence causing state transition where likelihood is the highest that (the time sequence of) the image feature amount of the content of interest from the image feature amount extracting unit 502 will be observed in the model of interest from the image model selecting unit 501.

Subsequently, the image maximum likelihood state sequence estimating unit 503 supplies the image maximum likelihood state sequence of the model of interest as to the content of interest to the frame extracting unit 504, and the processing proceeds from step S335 to step S336.

In step S336, the audio model selecting unit 506 selects an audio contents model correlated with the category from the scrapbook selecting unit 141 out of the audio contents models stored in the audio model storage unit 202b, as the model of interest.

Subsequently, the audio model selecting unit 506 supplies the model of interest to the audio maximum likelihood state sequence estimating unit 508, and the processing proceeds from step S336 to step S337.

In step S337, the audio feature amount extracting unit 507 extracts the audio feature amount of each frame of the content of interest supplied from the contents selecting unit 142, and supplies (the time sequence of) the audio feature amount of each frame of the content of interest to the audio maximum likelihood state sequence estimating unit 508.

Subsequently, the processing proceeds from step S337 to step S338. In step S338, the audio maximum likelihood state sequence estimating unit 508 estimates the audio maximum likelihood state sequence causing state transition where likelihood is the highest that (the time sequence of) the audio feature amount of the content of interest from the audio feature amount extracting unit 507 will be observed in the model of interest from the audio model selecting unit 506.

Subsequently, the audio maximum likelihood state sequence estimating unit 508 supplies the audio maximum likelihood state sequence of the model of interest as to the content of interest to the frame extracting unit 504, and the processing proceeds from step S338 to step S339.

In step S339, the object model selecting unit 509 selects an object contents model correlated with the category from the scrapbook selecting unit 141 out of the object contents models stored in the object model storage unit 202c, as the model of interest.

Subsequently, the object model selecting unit 509 supplies the model of interest to the object maximum likelihood state sequence estimating unit 511, and the processing proceeds from step S339 to step S340.

In step S340, the object feature amount extracting unit 510 extracts the object feature amount of each frame of the content of interest supplied from the contents selecting unit 142, and supplies (the time sequence of) the object feature amount of each frame of the content of interest to the object maximum likelihood state sequence estimating unit 511.

Subsequently, the processing proceeds from step S340 to step S341. In step S341, the object maximum likelihood state sequence estimating unit 511 estimates the object maximum likelihood state sequence causing state transition where likelihood is the highest that (the time sequence of) the object feature amount of the content of interest from the object feature amount extracting unit 510 will be observed in the model of interest from the object model selecting unit 509.

Subsequently, the object maximum likelihood state sequence estimating unit 511 supplies the object maximum likelihood state sequence of the model of interest as to the content of interest to the frame extracting unit 504, and the processing proceeds from step S341 to step S342.

In step S342, the frame extracting unit 504 sets the variable t for counting point-in-time (the number of frames of the content of interest) to 1 serving as the initial value, and the processing proceeds to step S343.

In step S343, the frame extracting unit 504 determines whether or not the state IDs of the states at the point-in-time t (the t'th state from the head) of the image maximum likelihood state sequence, audio maximum likelihood state sequence, and object maximum likelihood state sequence match one of the registered state IDs in a selected state registered in the scrapbook of interest from the scrapbook selecting unit 141.

In the event that determination is made in step S343 that the state IDs of the states at the point-in-time t of the image maximum likelihood state sequence, audio maximum likelihood state sequence, and object maximum likelihood state sequence of the model of interest as to the content of interest match one of the registered state IDs of the scrapbook of interest, the processing proceeds to step S344.

In step S344, the frame extracting unit 504 extracts the frame at the point-in-time t from the content of interest from the contents selecting unit 142, supplies to the frame registration unit 505, and the processing proceeds to step S345.

Also, in the event that determination is made in step S343 that the state IDs of the states at the point-in-time t of the image maximum likelihood state sequence, audio maximum likelihood state sequence, and object maximum likelihood state sequence of the model of interest do not match any of the registered state IDs of the scrapbook of interest, the processing proceeds to step S345. That is to say, step S344 is skipped.

In step S345, the frame extracting unit 504 determines whether or not the variable t is equal to the total number $N_F$ of the frames of the content of interest.

In the event that determination is made in step S345 that the variable t is unequal to the total number $N_F$ of the frames of the content of interest, the processing proceeds to step S346, where the frame extracting unit 504 increments the variable t by one. Subsequently, the processing returns from step S346 to step S343, and hereafter, the same processing is repeated.

Also, in the event that determination is made in step S345 that the variable t is equal to the total number $N_F$ of the frames of the content of interest, the processing proceeds to step S347.

In step S347, the frame registration unit 505 registers the frames supplied from the frame extracting unit 504, i.e., all the frames extracted from the content of interest in the scrapbook of interest from the scrapbook selecting unit 141.

Subsequently, the processing proceeds from step S347 to step S348. In step S348, the contents selecting unit 142 determines whether or not, of the contents belonging to the same category as the category correlated with the scrapbook of interest, stored in the contents storage unit 11, there is a content that has not been selected yet as the content of interest.

In the event that determination is made in step S348 that, of the contents belonging to the same category as the category correlated with the scrapbook of interest, stored in the contents storage unit 11, there is a content that has not been selected yet as the content of interest, the processing returns to step S332.

Also, in the event that determination is made in step S348 that, of the contents belonging to the same category as the category correlated with the scrapbook of interest, stored in the contents storage unit 11, there is no content that has not been selected yet as the content of interest, the processing proceeds to step S349.

In step S349, the frame registration unit 505 outputs the scrapbook of interest to the registered scrapbook storage unit 374 as a registered scrapbook, and the registered scrapbook generation processing ends.

Description will be made regarding the registered scrapbook generation processing that the registered scrapbook generating unit 373 performs, and specifically regarding difference with the scrapbook generation processing in the event of employing only the image feature amount by the registered scrapbook generating unit 103 described in FIG. 28, with reference to FIG. 52.

Specifically, in D in FIG. 28, "1" and "3" are registered as the image registered state IDs of the scrapbook of interest, and the frames of which the state IDs based on the image feature amount (state IDs in the image maximum likelihood state sequence where the image feature amount of the content of interest will be observed) are "1" and "3" are extracted from the content of interest, respectively.

Subsequently, as illustrated in E in FIG. 28, the frames extracted from the content of interest are registered in a form maintaining the temporal context thereof, for example, as a moving image.

Figure 52:
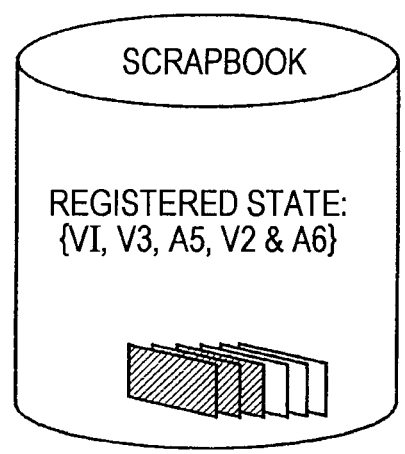
FIG. 52 is a diagram for describing the registered scrapbook generation processing.

On the other hand, in the event of employing feature amount other than the image feature amount, i.e., for example, in the event of employing the image feature amount and audio feature amount, as illustrated in FIG. 52, "V1", "V3", "A5", and "V2&A6" may be registered as the registered state IDs of the scrapbook of interest.

Here, in FIG. 52, a character string made up of a character of "V" and a number following this character such as "V1" and so forth represents an image registered state ID of the registered state IDs, and a character string made up of a character of "A" and a number following this character such as "A5" and so forth represents an audio registered state ID of the registered state IDs.

Also, in FIG. 52, "V2&A6" represents that "V2" that is an image registered state ID, and "A6" that is an audio registered state ID are correlated.

As illustrated in FIG. 52, in the event that "V1", "V3", "A5", and "V2&A6" are registered in the scrapbook of interest as the registered state IDs, with the frame extracting unit 504 (FIG. 50), a frame of which the state ID based on the image feature amount matches the image registered state ID="V1", and a frame of which the state ID based on the image feature amount matches the image registered state ID="V3" are extracted from the content of interest, and also a frame of which the state ID based on the audio feature amount matches the audio registered state ID="A5" are extracted from the content of interest.

Further, with the frame extracting unit 504, a frame of which the state ID based on the image feature amount matches the image registered state ID="V2" and also the state ID based on the audio feature amount matches the audio registered state ID="A6" is extracted from the content of interest.

Accordingly, frames are selected while taking a plurality of feature amount into consideration, and accordingly, as compared to the case of employing the image feature amount alone, a scrapbook in which frames with the user's interest are collected with further high precision can be obtained.

Note that, in FIG. 52, an example employing the image feature amount and audio feature amount is illustrated, but it goes without saying that the object feature amount may further be employed.

Also, description has been made above regarding an example employing the image feature amount, audio feature amount, and object feature amount, but further a combination of a plurality of different feature amounts may be employed, or these may independently be employed. Further, an arrangement may be made wherein the object feature amount is set according to the type of objects, and these are used in a distinction manner, e.g., each of a person's whole image, the upper half of the body, a face image, and so forth serving as objects may be used as individual object feature amount.

<Information Processing Device for Thumbnail Display>

Incidentally, according to contents models, each frame of a content may be subjected to clustering.

Hereafter, description will be made regarding an information processing device for thumbnail display which contributes to rapid recognition of what is in the contents, or the like by displaying thumbnails using clustering results wherein each frame of a content is subjected to clustering.

[Embodiment of Display System to Which Display Control Device of Present Invention has been Applied]

Figure 53:
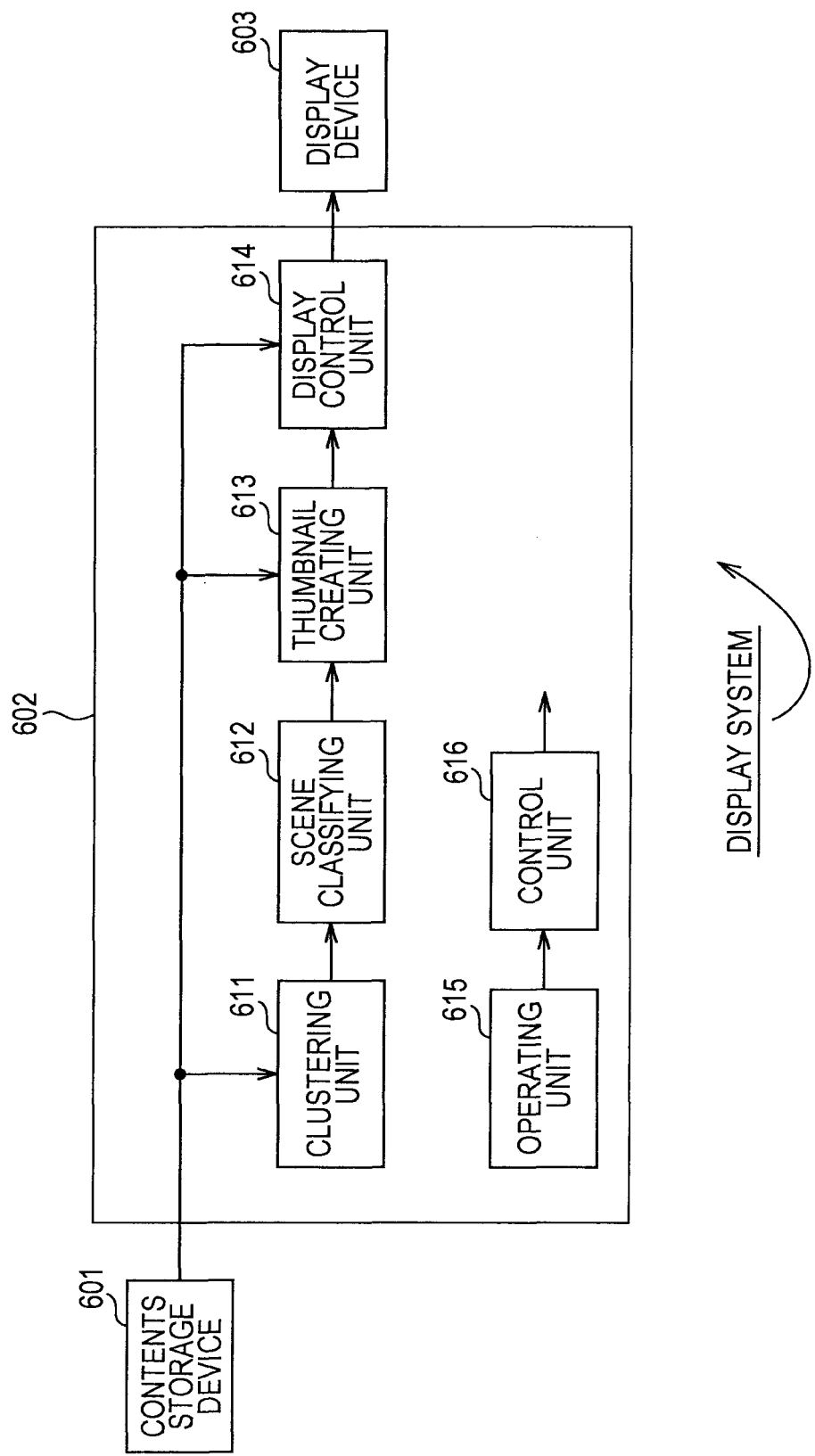
FIG. 53 is a block diagram illustrating a configuration example of an embodiment of a display system to which the present invention has been applied.

FIG. 53 is a block diagram illustrating a configuration example of an embodiment of a display system serving as an information processing device for thumbnail display to which the present invention has been applied.

In FIG. 53, the display system includes a contents storage device 601, a display control device 602, and a display device 603.

Note that the contents storage device 601 is equivalent to, for example, a recorder, a site on the Internet (server), a built-in or external HD of a PC (Personal Computer), or the like, and the display device 603 is equivalent to, for example, a TV (television receiver) or the like.

Also, the display control device 602 may be configured separately from each of the contents storage device 601 and display device 603, or may be built into a recorder or the like equivalent to the contents storage device 601, or TV or the like equivalent to the display device 603.

The contents storage device 601 stores, in the same way as with the contents storage unit 11 in FIG. 1, moving image contents. Also, the contents storage device 601 reads out a stored content, and supplies to the display control device 602.

The display control device 602 controls display of an image at the display device 603.

Specifically, the display control device 602 includes a clustering unit 611, a scene classifying unit 612, a thumbnail creating unit 613, a display control unit 614, an operating unit 615, and a control unit 616.

A content to be played (hereafter, also referred to as "playback object content") is supplied from the contents storage device 601 to the clustering unit 611.

The clustering unit 611 subjects each frame of the playback object content from the contents storage device 601 to clustering to one cluster of predetermined multiple clusters, and supplies (outputs) clustering information representing the clustering results thereof to the scene classifying unit 612.

Here, the clustering information includes at least cluster information for determining a cluster to which each frame of the playback object content belongs (e.g., a unique number added to a cluster, etc.).

The scene classifying unit 612 classifies, regarding each of multiple clusters to be subjected to clustering at the clustering unit 611, a frame belonging to the cluster thereof into a scene that is a frame group of one or more frames that temporally continue.

Specifically, the scene classifying unit 612 sequentially selects each of the multiple clusters to be subjected to clustering at the clustering unit 611 as the cluster of interest, and recognizes a frame of the playback object content, belonging to the cluster of interest, based on the clustering information from the clustering unit 611.

Further, the scene classifying unit 612 classifies a frame belonging to the cluster of interest into a scene (cut or shot) with a frame group of one or more frames which temporally continue at the time of being arrayed in time sequence as one scene.

Accordingly, for example, in the event that n1 frames which continue from the t1'th frame t1 from the head of the playback object content, and n2 frames which continue from the t2'th (>t1+n1) frame t2 from the head of the playback object content belong to the cluster of interest, with the scene classifying unit 612, the n1+n2 frames belonging to the cluster of interest are classified into a scene including the n1 frames which continue from the frame t1 of the playback object content, and a scene including the n2 frames which continue from the frame t2 of the playback object content.

Subsequently, the scene classifying unit 612 takes the scene obtained from a frame belonging to the cluster of interest as a scene belonging to the cluster of interest, and supplies scene information representing the scene thereof to the thumbnail creating unit 613.

Here, the scene information includes at least frame information for determining a frame included in the scene (e.g., a number representing what number frame from the head of the playback object content), and cluster information representing a cluster to which the scene (consequently, a frame included in the scene) belongs.

The scene information of each scene of the playback object content is supplied from the scene classifying unit 612 to the thumbnail creating unit 613, and also the playback object content is supplied from the contents storage device 601 to the thumbnail creating unit 613.

The thumbnail creating unit 613 creates the thumbnail of each scene of the playback object content.

Specifically, the thumbnail creating unit 613 recognizes all the scenes of the playback object content based on the scene information from the scene classifying unit 612, and sequentially selects as the scene of interest.

Further, the thumbnail creating unit 613 recognizes a frame included in the scene of interest based on the scene information from the scene classifying unit 612, and creates a thumbnail representing (what is in) the scene of interest using the frame included in the scene of interest from the contents storage device 601.

Subsequently, the thumbnail creating unit 613 supplies the thumbnail of the scene of interest to the display control unit 614 along with the scene information of the scene of interest.

Here, as for the thumbnail of the scene of interest, of the frames included in the scene of interest, for example, an image obtained by one frame such as the head frame or the like being reduced in size may be employed.

Also, as for the thumbnail of the scene of interest, of the frames included in the scene of interest, for example, an image such as animation GIF or the like for displaying images obtained by reducing multiple frames by animation (moving image) may be employed.

The thumbnail of a scene of the playback object content, and the scene information are supplied from the thumbnail creating unit 613 to the display control unit 614, and also the playback object content is supplied from the contents storage device 601 to the display control unit 614.

The display control unit 614 performs display control for displaying the thumbnail of a scene from the thumbnail creating unit 613 on the display device 603 based on the scene information from the thumbnail creating unit 613.

Also, the display control unit 614 performs display control for displaying (the image of) each frame of the playback object content supplied from the contents storage device 601 on the display device 603.

The operating unit 615 is operated at the time of inputting specification of the playback object content, specification of such as a thumbnail displayed on the display device 603, or the like, and supplies an operation signal corresponding to the operation thereof to the control unit 616.

The control unit 616 controls a necessary block of the clustering unit 611, scene classifying unit 612, thumbnail playback unit 613, and display control unit 614 in accordance with the operation signal from the operating unit 615.

Also, the control unit 616 performs playback control for playing (a frame of) the playback object content from the contents storage device 601, and so forth.

Note that the control unit 616 supplies necessary data (signals) to the contents storage device 601, clustering unit 611, scene classifying unit 612, thumbnail playback unit 613, and display control unit 614. However, drawing of connection lines for the control unit 616 supplying necessary data is omitted for preventing the drawing from becoming complicated.

The display device 603 displays a thumbnail or (a frame of) the playback object content in accordance with the display control from the display control unit 614.

[Processing of Thumbnail Display Control]

Figure 54:
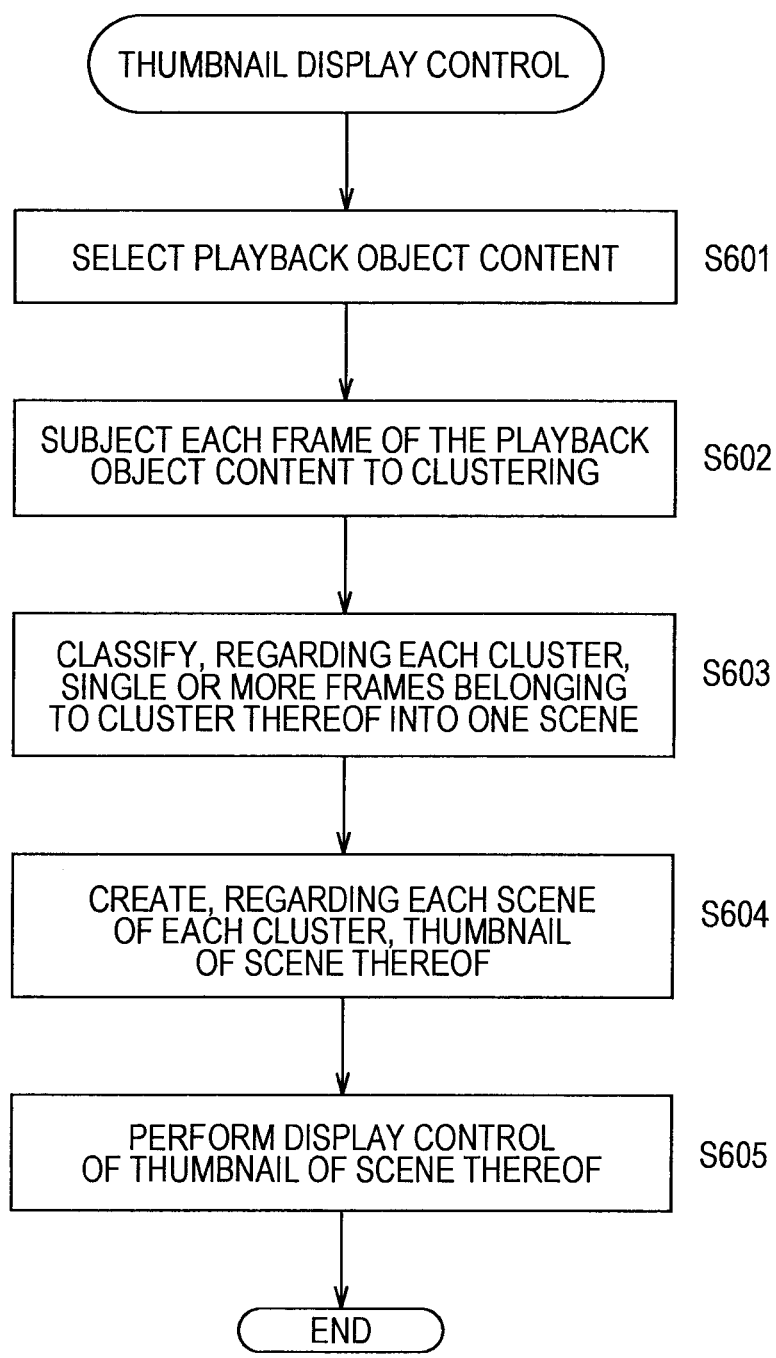
FIG. 54 is a flowchart for describing thumbnail display control processing.

FIG. 54 is a flowchart for describing the processing of thumbnail display control for the display control device 602 in FIG. 53 displaying the thumbnails of a content on the display device 603.

In step S601, the control unit 616 waits for specification input for specifying the playback object content out of the contents stored in the contents storage device 601 being performed (given) by the user operating the operating unit 615, and based on the specification input thereof, selects the content specified by the specification input thereof as the playback object content.

Subsequently, the control unit 616 causes the contents storage device 601 to read out the playback object content therefrom and to supply to the clustering unit 611 and thumbnail creating unit 613, and the processing proceeds from step S601 to step S602.

In step S602, the clustering unit 611 subjects each frame of the playback object content from the contents storage device 601 to clustering, and supplies the clustering information representing the clustering results thereof to the scene classifying unit 612, and the processing proceeds to step S603.

In step S603, the scene classifying unit 612 classifies, regarding each cluster, a frame belonging to the cluster thereof into a scene that is a frame group of one or more frames which temporally continue based on the clustering information from the clustering unit 611.

Subsequently, the scene classifying unit 612 supplies the scene information representing each scene belonging to each cluster to the thumbnail creating unit 613, and the processing proceeds from step S603 to step S604.

In step S604, the thumbnail creating unit 613 recognizes all the scenes of the playback object content based on the scene information from the scene classifying unit 612, and creates, regarding each scene, the thumbnail of the scene thereof using the playback object content from the contents storage device 601.

Subsequently, the thumbnail creating unit 613 supplies the thumbnail of each scene to the display control unit 614 along with the scene information of the scene thereof, and the processing proceeds from step S604 to step S605.

In step S605, the display control unit 614 performs display control for displaying the thumbnail of a scene from the thumbnail creating unit 613 on the display device 603 based on the scene information from the thumbnail creating unit 613.

As described above, with the display control device 602, the clustering unit 611 subjects each frame of the playback object content to clustering, and the scene classifying unit 612 classifies, regarding each cluster, a frame belonging to the cluster thereof into a scene that is a frame group of one or more frames that temporally continue.

Therefore, according to the display control device 602, the playback object content can readily be classified into a scene for each content (feature amount) corresponding to each cluster.

That is to say, even if what kind of method is employed as a clustering method for clustering frames, similar content (feature amount) of frame is subjected to clustering to each cluster.

Accordingly, when paying notice to a certain cluster, a frame belonging to the cluster thereof is simply classified into a frame group of one or more frames that temporally continue, whereby a scene of the content corresponding to the cluster thereof can readily be configured.

Note that what kind of content the content corresponding to a cluster is, may be known or may be unknown.

However, in order to set the content corresponding to a cluster to known content, i.e., in order to know beforehand that a frame having known content is subjected to clustering, such as a frame including many people, a frame where one person is in close-up, or the like, clusters (further, the feature amount of each frame to be used for clustering) need to be designed so as to subject a frame having such known content to clustering.

However, it is troublesome to thus design clusters so as to subject a frame having particular known content to clustering, and may be difficult in some cases.

On the other hand, it is easy to design a cluster having unknown content, i.e., a cluster with what kind of content a frame to be subjected to clustering has being unknown. Further, even if the content corresponding to a cluster is unknown, what kind of content a scene (frame) belonging to each cluster is can be understood by the user viewing the thumbnail of the scene to be displayed on the display device 603, which is not a cause for concern.

[Configuration Example of Clustering Unit 611]

Figure 55:
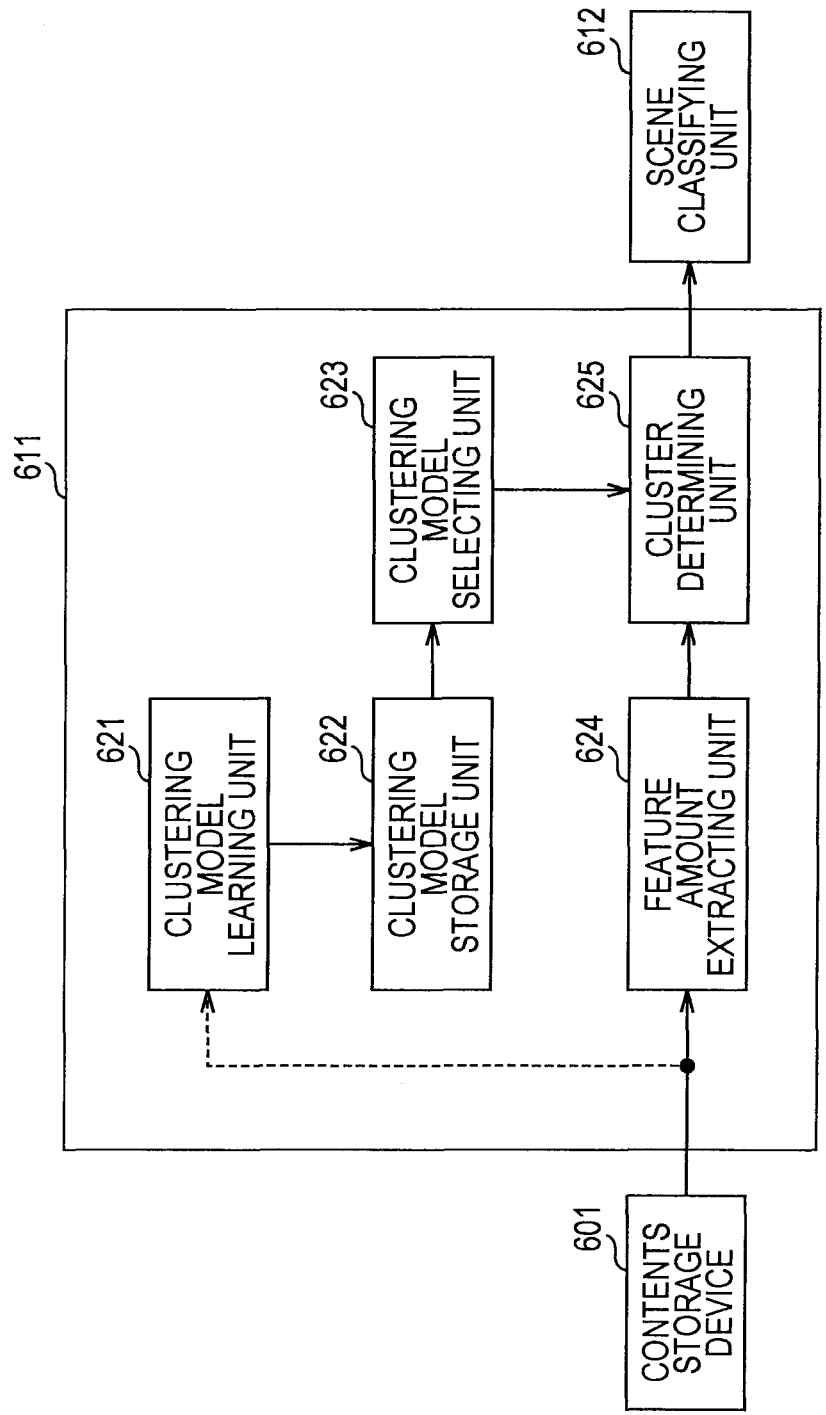
FIG. 55 is a block diagram illustrating a configuration example of a clustering unit 611.

FIG. 55 is a block diagram illustrating a configuration example of the clustering unit 611 in FIG. 53.

In FIG. 55, the clustering unit 611 includes a clustering model learning unit 621, a clustering model storage unit 622, a clustering model selecting unit 623, a feature amount extracting unit 624, and a cluster determining unit 625.

The clustering model learning unit 621 performs learning of a clustering model that is a model to be used for clustering each frame of a content, and supplies to the clustering model storage unit 622.

Note that as for the clustering model, for example, a state transition model including a state and state transition may be employed.

As for the state transition model employed as the clustering model, for example, an HMM serving as the above contents model, or a later-described model using the k-means method to be used for vector quantization (hereafter, also referred to as "new vector quantized model"), or an equally later-described model using the GMM (Gaussian Mixture Model) (hereafter, also referred to as "new GMM"), or the like may be employed.

The clustering model learning unit 621 takes the contents stored in the contents storage device 601 as contents for learning to learn a clustering model, and classifies the contents for learning thereof for each category.

Subsequently, the clustering model learning unit 621 performs, regarding each category, learning of the clustering model of the category thereof using the content for learning of the category thereof to generate (obtain) a category-based clustering model.

Specifically, as for the clustering model, for example, in the event of employing the above HMM serving as a contents model, the clustering model learning unit 621 performs, in the same way as with the contents model learning unit 12 in FIG. 2, learning of a contents model serving as a clustering model.

Note that, hereafter, in order to simplify description, in the same way as with the cases of FIG. 1 through FIG. 34, of the data of a content, only image data will be employed for clustering model learning processing, and processing employing a clustering model.

However, with the clustering model learning processing, and processing employing a clustering model, as described in FIG. 35 through FIG. 52, in addition to an image, data (feature amount) such as audio or the like may be employed.

The clustering model storage unit 622 stores a category-based clustering model to be generated at the clustering model learning unit 621 and the like.

Here, learning of a clustering model may be performed, for example, at a site on the Internet or the like, and the clustering model storage unit 622 may download (obtain) and store a clustering model from the site thereof.

In this case, the clustering unit 611 may be configured without providing the clustering model learning unit 621.

The clustering model selecting unit 623 selects a clustering model of the category matching the category of the playback object content supplied from the contents storage device 601 out of the category-based clustering models stored in the clustering model storage unit 622, as the model of interest to be used for clustering, and supplies to the cluster determining unit 625.

The playback object content is supplied from the contents storage device 601 to the feature amount extracting unit 624.

The feature amount extracting unit 624 extracts the feature amount of each frame of the playback object content from the contents storage device 601, and supplies to the cluster determining unit 625.

Here, learning of a clustering model is performed using the feature amount extracted from a content for learning.

With the feature amount extracting unit 624, the same feature amount as that to be used for learning of a clustering model is extracted from the playback object content.

Accordingly, in the event that as for a clustering model, for example, the above HMM serving as a contents model is employed, and with the clustering model learning unit 621, learning of a contents model serving as a clustering model is performed in the same way as with the contents model learning unit 12 in FIG. 2, the feature amount extracting unit 624 extracts the feature amount of each frame of the playback object content in the same way as with the feature amount extracting unit 22 in FIG. 2.

The cluster determining unit 625 uses the clustering model supplied from the clustering model selecting unit 623, and the feature amount supplied from the feature amount extracting unit 624 to determine a cluster to which each frame of the playback object content belongs, and supplies (outputs) clustering information representing the clustering result that is the cluster thereof to the scene classifying unit 612.

In the event that as for a clustering model, for example, the above HMM serving as a contents model is employed, the cluster determining unit 625 estimates, in the same way as with the maximum likelihood state sequence estimating unit 34 in FIG. 9, the maximum likelihood state sequence that is a state sequence causing state transition where likelihood is the highest that the feature amount of the playback object content (the time sequence of the feature amount of each frame of the playback object content) from the feature amount extracting unit 624 will be observed in the model of interest from the clustering model selecting unit 623, for example, in accordance with the Viterbi algorithm.

Now, let us say that, with the model of interest, the state at point-in-time t (the t'th state from the head, which makes up the maximum likelihood state sequence) with the head of the maximum likelihood state sequence in the event that the feature amount of the playback object content is observed (hereafter, also referred to as the maximum likelihood state sequence of the model of interest as to the playback object content) as a reference is represented as s(t), and also the number of frames of the playback object content is represented as T.

In this case, the maximum likelihood state sequence of the model of interest as to the playback object content is a sequence of T states $s(1), S(2), \ldots, s(T)$, of which the t'th state (state at the point-in-time t) s(t) corresponds to the frame (frame t) at the point-in-time t of the playback object content.

Also, if we say that the total number of the states of the model of interest is represented as N, the state s(t) at the point-in-time t is one of the N states $s_1, s_2, \ldots, s_N$.

Further, each of the N states $s_1, s_2, \ldots, s_N$ is appended with a state ID that is an index for determining a state.

Now, if we say that the state s(t) at the point-in-time t of the maximum likelihood state sequence of the model of interest as to the playback object content is the i'th state $s_i$ of the N states $s_1, s_2, \ldots, s_N$, the frame at the point-in-time t corresponds to the state $s_i$.

The entity of the maximum likelihood state sequence of the model of interest as to the playback object content is the state ID sequence of any state of the N states $S_1, s_2, \ldots, s_N$, corresponding to the frame at each point-in-time t of the playback object content.

The maximum likelihood state sequence of the model of interest as to the playback object content described above expresses what kind of state transition the playback object content causes on the model of interest.

Also, with the maximum likelihood state sequence of the model of interest as to the playback object content, as described above, if we say that the state s(t) at the point-in-time t is the i'th state $s_i$ of the N states $s_1, s_2, \ldots, s_N$, the frame at the point-in-time t corresponds to the state $s_i$.

Accordingly, the frame at the point-in-time t is clustered to a cluster corresponding to the i'th state $s_i$ that is the state s(t) at the point-in-time t, of the maximum likelihood state sequence, of the N states of the model of interest by regarding each of the N states of the model of interest as a cluster, so it can be said that with estimation of the maximum likelihood state sequence of the model of interest as to the playback object content, a cluster to which each frame of the playback object content belongs is determined.

After estimating the maximum likelihood state sequence of the model of interest as to the playback object content, the cluster determining unit 625 outputs the maximum likelihood state sequence thereof as the clustering information.

[Display Control of Thumbnail and Others]

Description will be made regarding the display control of thumbnails and the playback object content by the display control unit 614 in FIG. 53.

As for a method for displaying thumbnails and the playback object content by the display control unit 614, for example, there are six types of display methods of 2D map display, state display, 2-pane display, 5-pain display, time sequence display, and flat display.

Hereafter, description will be made regarding display control of these six types of display of 2D map display, state display, 2-pane display, 5-pain display, time sequence display, and flat display.

Note that, with regard to display control of these six types of display of 2D map display, state display, 2-pane display, 5-pain display, time sequence display, and flat display, display control of one type of display thereof may be implemented into the display system, or display control of multiple types of display including all may be implemented into the display system.

In the event that, of the six types of display of 2D map display, state display, 2-pane display, 5-pain display, time sequence display, and flat display, display control of multiple types of display including all is implemented into the display system, whether to perform which display control may be selected, for example, by the user operating the operating unit 615 (FIG. 53).

Further, whether to perform which display control may be switched during playback of the playback object content, for example, by the user operating the operating unit 615.

[2D Map Display]

Figure 56:
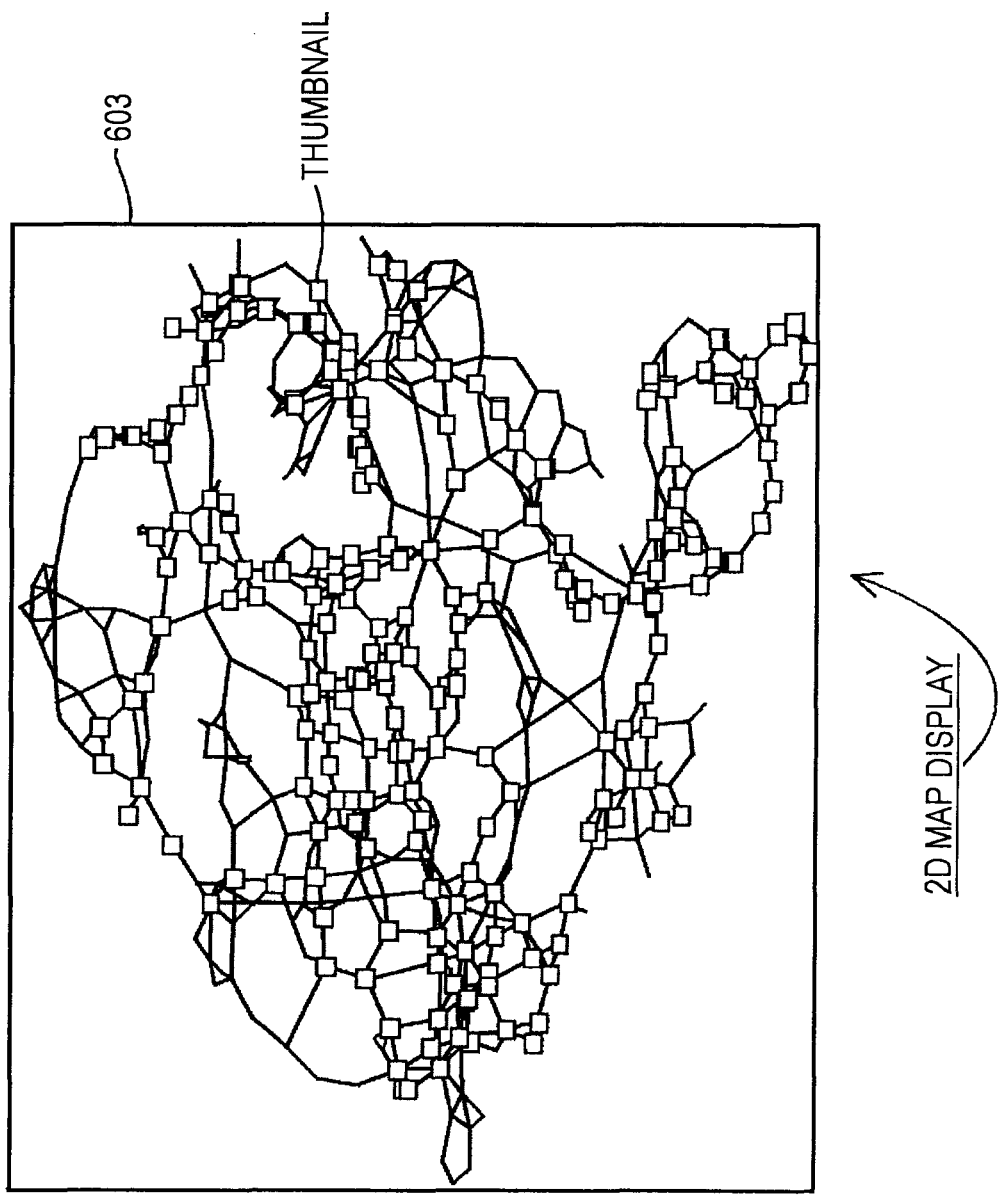
FIG. 56 is a diagram illustrating a display example of a 2D map.

FIG. 56 is a diagram illustrating a display example of 2D map display.

With 2D map display, the display control unit 614 generates, with a clustering model used for clustering of the playback object content, i.e., a state transition model that is the model of interest, a model map that is a two-dimensional map where states are disposed so as to reduce distance between states where state transition can mutually be performed, disposes, in the position of each state of the model map thereof, the thumbnail of a scene (including a frame) belonging to a cluster corresponding to the state thereof, and displays on the display device 603.

That is to say, the display control unit 614 generates a model map by disposing the N states $s_1$ through $s_N$ of the model of interest are disposed on a two-dimensional map (plane) so as to reduce distance between states where state transition can mutually be performed.

Note that the control unit 616 obtains the model of interest from the clustering unit 611, and supplies to the display control unit 614.

Further, the display control unit 614 draws the segment of a line connecting states on the model map according to state transition probability between states thereof.

Specifically, the display control unit 614 draws, for example, the segment of a line connecting the state of a transition source $s_i$ and the state of a transition destination of state transition where the state transition probability is the maximum, of state transition from a certain state $s_i$, on the model map.

Alternatively, the display control unit 614 draws, for example, the segment of a line connecting the state of a transition source $s_i$ and the state of a transition destination of state transition where the state transition probability is equal to or greater than a predetermined threshold, of state transition from a certain state $s_i$, on the model map.

Here, in FIG. 56, the edge points of the segment of a line represent states, and the segment of a line represents state transition.

The display control unit 614 recognizes a cluster to which each scene of the playback object content belongs from the scene information supplied from the thumbnail creating unit 613, and disposes in the position of each of the N states $s_1$ through $s_N$ of the model map the thumbnail of a (clustered) scene belonging to a cluster corresponding to the state $s_i$ thereof.

Here, in FIG. 56, a small rectangle represents a thumbnail. In FIG. 56, there is a state where no thumbnail is disposed. This represents that, with the playback object content, there is no frame clustered to the cluster corresponding to the state thereof.

Also, there is a case where multiple scenes belong to the cluster corresponding to a certain state $s_i$. In this case, the thumbnail of each of the multiple scenes belonging to the cluster corresponding to the state $s_i$ may be arrayed and displayed in the position of the state $s_i$ of the model map.

However, upon displaying the thumbnail of each of multiple scenes in the position of one state $s_i$, (a part of) the thumbnails of the multiple scenes are overlapped with a thumbnail displayed in the position of another state $s_j$, so the thumbnails may not readily be viewed.

Also, in order to prevent the thumbnail of each of multiple scenes displayed in the position of one state $s_i$, and the thumbnail displayed in the position of another state $s_j$ from being overlapped, there is a method for reducing the size of a thumbnail, but reducing the size of a thumbnail may also prevent the thumbnail from being readily viewed.

Therefore, in the event that multiple scenes belong to the cluster corresponding to a certain state $s_i$, in the position of the state $s_i$ of the model map, of the thumbnail of each of the multiple scenes belonging to the cluster corresponding to the state $s_i$, for example, only the thumbnail of one scene that is the fastest in the time sequential order (playback order is the fastest) in the playback object content may be displayed.

Note that in the event that multiple scenes belong to the cluster corresponding to a certain state $s_i$, the thumbnail of one scene belonging to the cluster corresponding to the state $s_i$, to be displayed in the position of the state $s_i$ of the model map, may be switched according to, for example, operations of the operating unit 615 (FIG. 53) by the user.

Specifically, for example, in the event that three scenes c1, c2, and c3 belong to the cluster corresponding to the state $s_i$ in time sequential order, each time the operating unit 615 is operated so as to switch the thumbnail, the thumbnail to be displayed in the position of the state $s_i$ of the model map may cyclically be switched such as the thumbnail of the scene c1, the thumbnail of the scene c2, the thumbnail of the scene c3, the thumbnail of the scene c1, and so on.

As described above, with 2D map display, states are disposed so as to reduce distance between states where state transition can be mutually performed, of the clustering model (model of interest) used for clustering of the playback object content, and also, in the position of each state of the model map where state transition is drawn, the thumbnail of a scene belonging to the cluster corresponding to the state thereof is disposed and displayed.

Therefore, according to 2D map display, the user can readily recognize the outline of the playback object content at first sight by recognizing the structure of the playback object content with the thumbnail of a scene disposed in the position of each state, and the segment of a line representing state transition between states, as described in FIG. 9 and others.

Here, with the model map, the N states $s_1$ through $s_N$ of the model of interest are disposed so as to reduce distance between states where state transition can be mutually performed, such a state layout may be performed in the same way as with the contents structure presenting unit 14 in FIG. 9.

Specifically, the display control unit 614 obtains inter-state distance $d_{ij}^*$ from one state $s_i$ to another state $s_j$ of the model of interest based on the state transition probability $a_{ij}$ of state transition from one state $s_i$ to another state $s_j$, and obtains state coordinates $Y_i$ that are the coordinates of the position of the state $s_i$ on the model map so as to reduce error between Euclidean distance $d_{ij}$ from one state $s_i$ to another state $s_j$ and the inter-state distance $d_{ij}^*$ on the model map, and specifically, for example, so as to minimize the Sammon Map error function E in Expression (1).

Subsequently, the display control unit 614 disposes the corresponding state $s_i$ in the position of the state coordinates $Y_i$.

Note that, as described above, in the event that the error function E in Expression (1) is employed as is, and the state coordinates $Y_i$ on the model map is obtained so as to minimize the error function E, the states are, as illustrated in FIG. 11, disposed in a circular pattern on the model map, and concentrated in the vicinity (outside) of the circumference, which prevents the user from viewing the locations of the states, and accordingly, visibility may be diminished.

Therefore, with the display control unit 614 as well, as illustrated in FIG. 12, the state coordinates $Y_i$ on the model map may be obtained so as to correct the error function E in Expression (1) to minimize the error function E after correction.

Specifically, with the display control unit 614, in the event that the Euclidean distance $d_{ij}$ from one state $s_i$ to another state $s_j$ is not greater than a predetermined threshold THd (e.g., THd=1.0 or the like), with calculation of the error function in Expression (1), the Euclidean distance $d_{ij}$ is used as is as the Euclidean distance $d_{ij}$, and in the event that the Euclidean distance $d_{ij}$ is greater than the predetermined threshold THd, with calculation of the error function in Expression (1), the inter-state distance $d_{ij}*$ is used as the Euclidean distance $d_{ij}$ (set to $d_{ij}=d_{ij}*$) (the Euclidean distance $d_{ij}$ is set to distance equal to the inter-state distance $d_{ij}*$).

As described above, the state coordinates $Y_i$ on the model is obtained so as to minimize the error function E after correction, and thus, the Euclidean distance $d_{ij}$ is kept in distant between two somewhat distant states $s_i$ and $s_j$, so visibility can be prevented from being diminished by states being concentrated in the vicinity of the circumference of the model map. That is to say, as illustrated in FIG. 12, the model map with sufficient visibility can be displayed.

Figure 57:
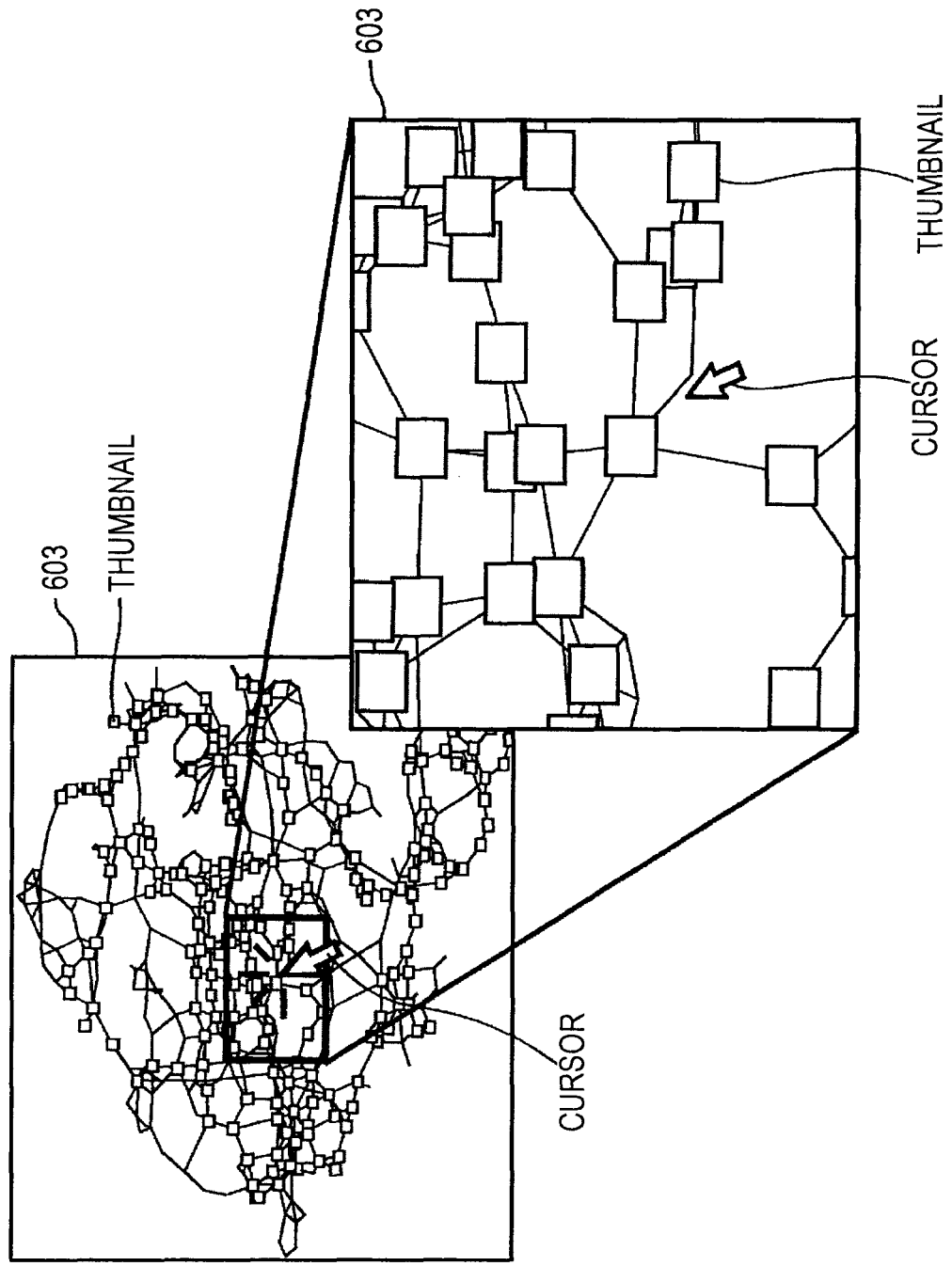
FIG. 57 is a diagram illustrating another display example of a 2D map.

FIG. 57 is a diagram illustrating another display example of 2D map display.

As described above, with regard to 2D map display, with the clustering model used for clustering of the playback object content, i.e., the model of interest, in the position of each state of the model map where states are disposed so as to reduce distance between states where state transition can be mutually performed, the thumbnail of a scene (including a frame) belonging to the cluster corresponding to the state thereof is disposed.

Accordingly, for example, in the event that the frames of the playback object content is subjected to clustering to a great number of clusters, the number of thumbnails to be displayed increases. Subsequently, in order to display such a great number of thumbnails so as not to be mutually overlapped, the sizes of the thumbnails need to be reduced to some extent.

However, in the event that the sizes of the thumbnails are small, the thumbnails may be prevented from being readily viewed.

Therefore, with 2D map display, the display control unit 614 may enlarge and display a portion of the model map on the display device 603.

Specifically, upon the user operating the operating unit 615 so as to enlarge a certain position of the model map, i.e., upon the user moving the cursor to a certain position, and clicking the operating unit 615, the display control unit 614 enlarges, as illustrated in FIG. 57, a predetermined range including the position of the cursor, of the model map, and displays on the display device 603.

In this case, the user can apparently confirm the images serving as thumbnails.

Note that enlargement of the model map is released by a predetermined operation of the operating unit 615.

Figure 58:
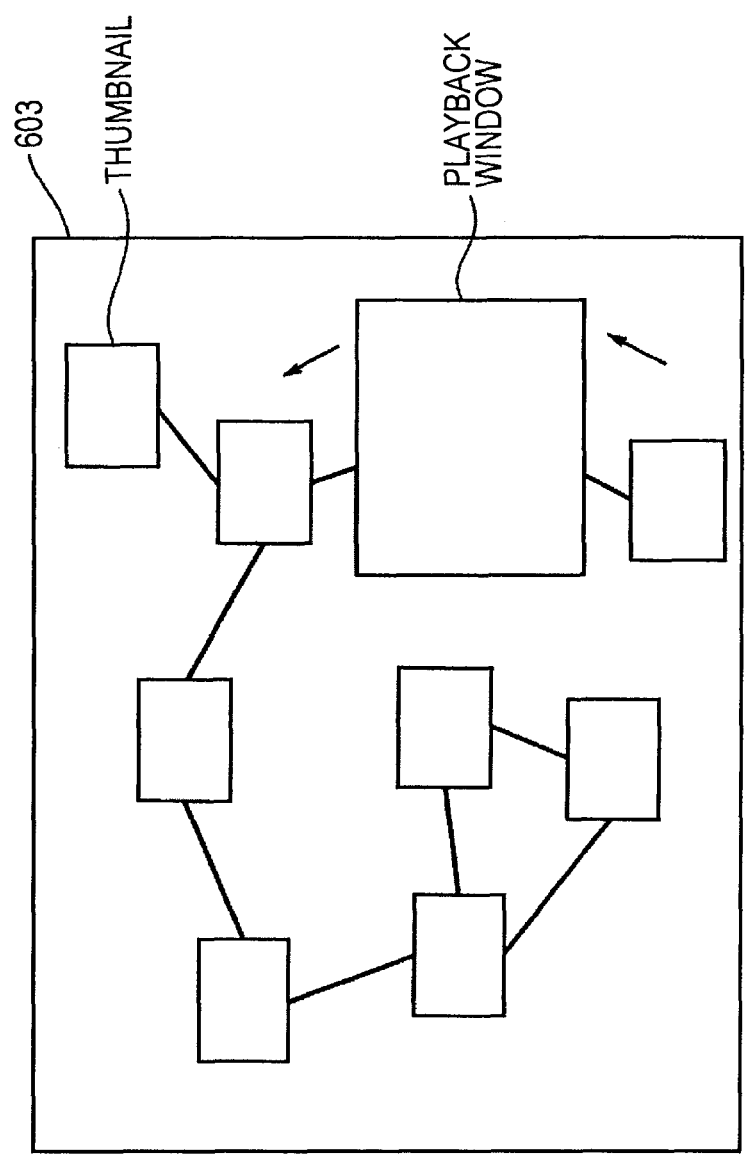
FIG. 58 is a diagram illustrating yet another display example of a 2D map.

FIG. 58 is a diagram illustrating yet another display example of 2D map display.

As described in FIG. 54, with the display control device 602 (FIG. 53), upon the user operating the operating unit 615 to provide specification input for specifying the playback object content, the control unit 616 selects the content specified by the specification input thereof as the playback object content, reads out the playback object content thereof from the contents storage device 601, and supplies to the clustering unit 611 and thumbnail creating unit 613.

Readout of the playback object content from the contents storage device 601 for supplying the playback object content to the clustering unit 611 and thumbnail creating unit 613, and supply of the playback object content to the clustering unit 611 and thumbnail creating unit 613 are performed at high speed so as to rapidly perform display of thumbnails.

As described above, in addition to high-speed supply of the playback object content to the clustering unit 611 and thumbnail creating unit 613, the control unit 616 performs playback control of the playback object content for supplying the playback object content from the contents storage device 601 to the display control unit 614 for display in real time.

Subsequently, the display control unit 614 displays, under the playback control of the control unit 616, of each frame of the playback object content supplied from the contents storage device 601, for example, from the head frame thereof to the display device 603 in real time.

Specifically, the display control unit 614 displays, in the same way as with the cases in FIG. 56 and FIG. 57, the model map where in the position of each state of the model map where the segment of a line representing state transition is drawn, the thumbnail of a scene belonging to a cluster corresponding to the state thereof is disposed, and also with the playback object content, draws the playback object frame that is a frame to be played now on a playback window that is a window greater than the thumbnails by a predetermined size, and displays the playback window in the position of the state corresponding to the cluster to which the playback object frame thereof, of the model map.

Accordingly, upon the cluster to which the playback object frame belongs changing, i.e., upon the scene changing, the display position of the playback window is, as illustrated with an arrow in FIG. 58, moved from the position of the state corresponding to the cluster before change, to the position of the state corresponding to the cluster after change.

In this case, the user can recognize that a frame belonging to which cluster is now played (becomes the playback object frame).

As described above, in the event that the playback window where the playback object frame is drawn is displayed along with the model map, with the model map, the thumbnail of the nearest scene in time sequence as to the playback object frame of the playback window may be displayed in the position of the state corresponding to a cluster to which multiple scenes belong.

In this case, the user can confirm, with scenes belonging to each cluster, of the scenes belonging to the cluster thereof, the outline of the nearest scene in time sequence as to the playback object frame.

Also, the user can provide specification input for specifying a state on the model map by operating the operating unit 615.

In this case, the control unit 616 changes a frame belonging to a cluster corresponding to the state specified by the specification input thereof to the playback object frame based on the specification input for specifying a state on the model map, and starts playback control from the playback object frame thereof.

Accordingly, upon the user viewing the thumbnail displayed in the position of a state of the model map, and providing specification input for specifying the thumbnail thereof, of the scene that the thumbnail thereof represents, for example, the head frame becomes the playback object frame, and the playback window where the playback object frame is drawn is displayed in the position of the thumbnail specified by specification input.

As described above, the user simply provides specification input for specifying the thumbnail displayed on the position of a state while viewing the playback object frame, whereby the user can jump to the scene that the thumbnail thereof represents, i.e., jump the playback position, as if it were.

Accordingly, (the thumbnail displayed on the position of) a state serves as a so-called chapter, and can be used for cue of a chapter.

Specifically, for example, commercial contents recorded in DVDs are (frequently) provided with chapters, but on the other hand, a moving image content filmed personally needs to be manually provided with chapters by the user. According to the display control device 602, chapters may automatically be added to contents in an equivalent manner.

Also, with conventional recorders, there may be provided a jump button to be operated at the time of jumping the playback position from the position (frame) to be played now to a position after (or before) predetermined time such as five seconds, 30 seconds, or the like, for example.

The user can recognize the outline of a content by repeating operations wherein the jump button is operated to jump the playback position, an image to be played from the position after jump is momentarily viewed, and the jump button is operated again.

However, with the operation of the jump button, there may be no change in scenes before jump of the playback position and after jump, and in this case, there is a need to operate the jump button over and over to recognize the outline of a content.

Also, with the operation of the jump button, there may be a great number of scenes between a scene before jump of the playback position and a scene after jump, and in this case, it is difficult to recognize the outline of a content.

On the other hand, according to 2D map display, a model map is displayed wherein in the position of each state of the model map where the segment of a line representing state transition is drawn, the thumbnail of a scene belonging to a cluster corresponding to the state thereof is disposed, and further, a playback window where the playback object frame is drawn is displayed in the position of the state corresponding to a cluster to which the playback object frame belongs, of the model map.

Accordingly, the user can expect the outline of a scene immediately after or immediately before a scene having the playback object frame by viewing the thumbnail disposed in the position of a state connected to the state of the position where the playback window is displayed, i.e., a state corresponding to a cluster to which the playback object frame belongs, so can more readily recognize the outline of the playback object content.

[State Display]

Figure 59:
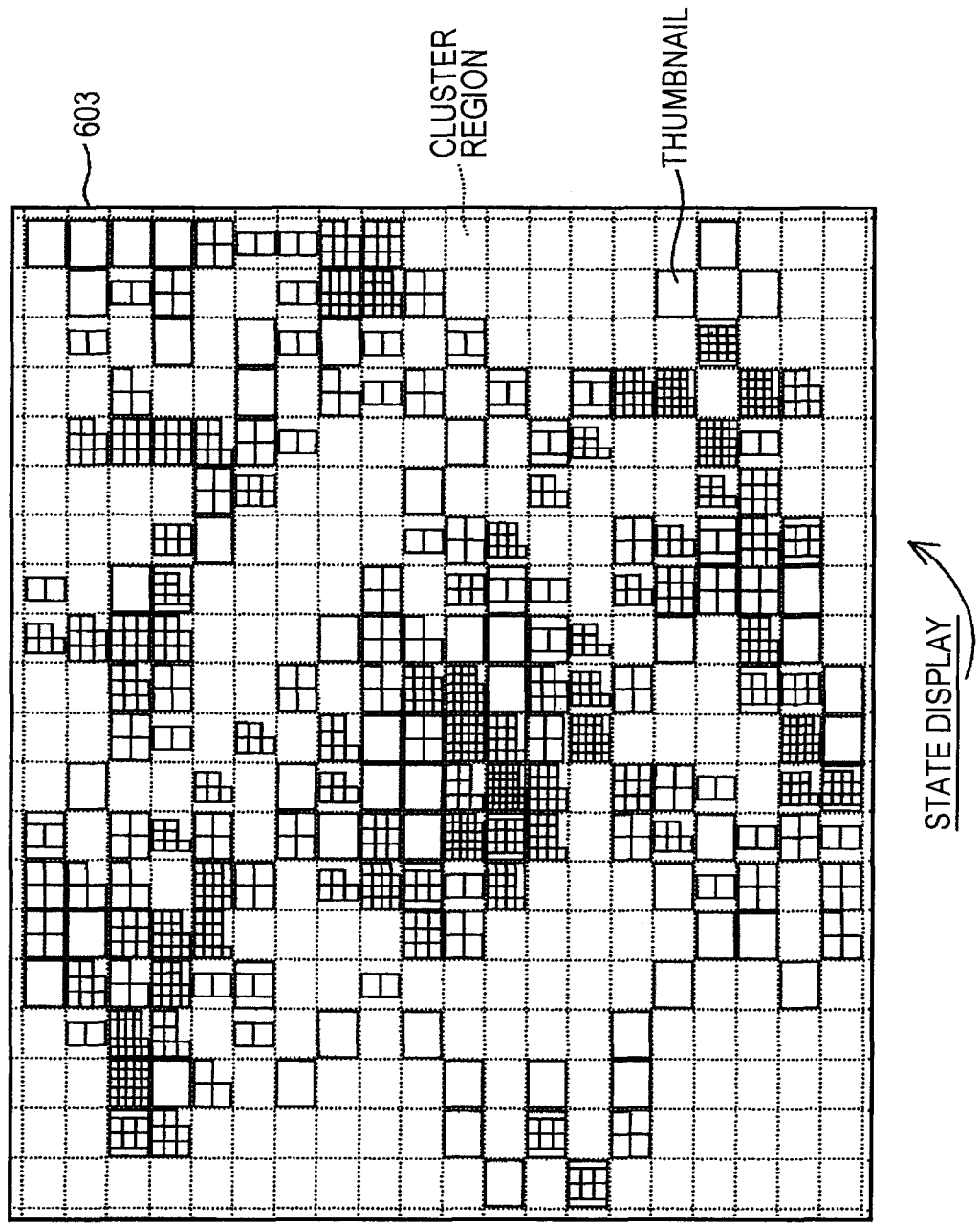
FIG. 59 is a diagram illustrating a display example of state display.

FIG. 59 is a diagram illustrating a display example of state display.

With state display, the display control unit 614 (FIG. 53) disposes the thumbnail of a scene (including a frame) belonging to the corresponding cluster in a rectangular cluster region obtained by sectioning the display screen of the display device 603 in accordance with a clustering model used for clustering of the playback object content, i.e., a cluster corresponding of the state of the state transition model that is the model of interest, and displays on the display device 603.

Specifically, the display control unit 614 sections the display screen of the display device 603 to cluster regions of which the number is the total number N (or more) of the states of the model of interest, in a grid shape, and for example, assumes that, in the raster scan order, the i'th cluster region from the upper left corresponds to the i'th cluster (state $s_i$) of clustering at the clustering unit 611, and disposes the thumbnail of a scene belonging to a cluster corresponding to the i'th state, of the N states $s_1$ through $s_N$ of the model of interest, in the i'th cluster region thereof.

Here, in FIG. 59, a region surrounded with a dotted line representing a cluster region. Also, a rectangle with a solid line within a cluster region represents a thumbnail.

In FIG. 59, there is a cluster region where no thumbnail is disposed, but this represents that with the playback object content, there is no frame subjected to clustering to a cluster corresponding to the cluster region thereof.

With 2D map described in FIG. 56 through FIG. 58, an arrangement has been made wherein in the position of the state $s_i$ of the model map, only the thumbnail of one scene belonging to a cluster corresponding to the state $s_i$ thereof is displayed, but with state display, the thumbnails of all the scenes belonging to the corresponding cluster may be displayed in a cluster region.

That is to say, with state display, in the event that only one scene belongs to a cluster corresponding to a certain state $s_i$, only the thumbnail of the one scene thereof is displayed in the i'th cluster region.

Also, in the event that multiple scenes belong to a cluster corresponding to a certain state $s_i$, the thumbnail of each of the multiple scenes is arrayed and displayed in the i'th cluster region.

In FIG. 59, each of the cluster regions of which the number is the total number N (or more) of the states of the model of interest is a region of the same size, and accordingly, the more the number of thumbnails to be displayed in a cluster region is, the smaller the sizes of the thumbnails to be displayed in the cluster of the same size are.

As described above, with state display, the thumbnails of scenes belonging to the same cluster are arrayed and displayed in one cluster region, whereby the user can confirm all the scenes of the playback object content in a manner surveying scenes (scenes having the same content) belonging to the same cluster and also surveying scenes belonging to each cluster, so can readily recognize the outline of the playback object content.

Figure 60:
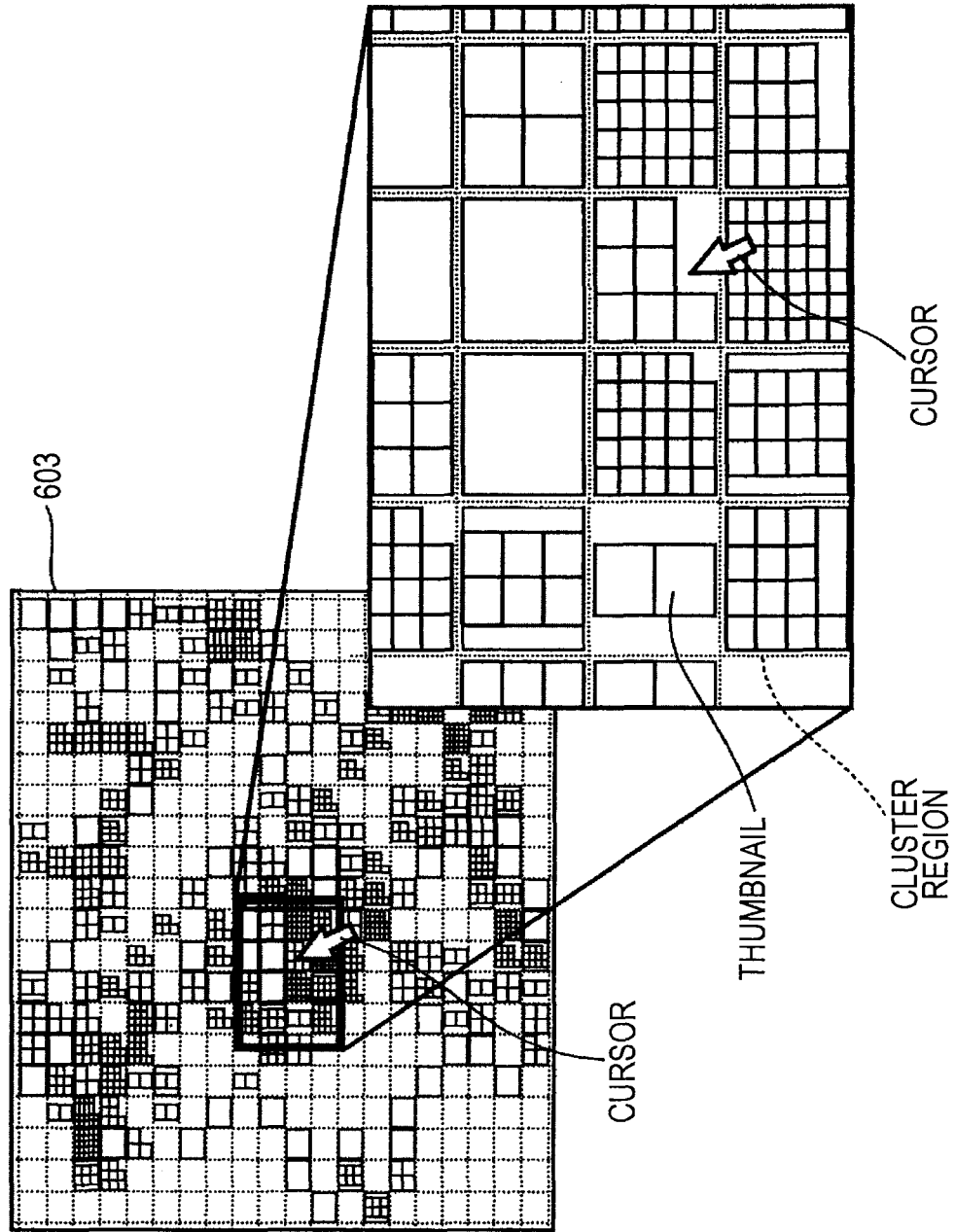
FIG. 60 is a diagram illustrating another display example of state display.

FIG. 60 is a diagram illustrating another display example of state display.

As described above, with state display, in rectangular cluster regions obtained by sectioning the display screen in accordance with the clusters corresponding to the states of the model of interest, the thumbnails of all the scenes belonging to the corresponding cluster are arrayed and displayed.

Accordingly, in the event that the number of scenes belonging to the cluster corresponding to a cluster region is great, the thumbnails of such a great number of scenes are arrayed and displayed in the cluster region thereof, so the sizes of the thumbnails need to be reduced, and as a result thereof, thumbnails may be prevented from being readily viewed.

Therefore, with state display as well, in the same way as with the case of 2D map display, the display control unit 614 may enlarge and display several cluster regions on the display device 603.

Specifically, upon the user operating the operating unit 615 so as to enlarge a cluster region, i.e., for example, upon the user moving the cursor to the position of a certain region and clicking the operating unit 615, the display control unit 614 enlarges and displays, as illustrated in FIG. 60, a predetermined range including a cluster region in the position of the cursor on the display device 603.

In this case, the user can apparently confirm an image serving as a thumbnail.

Note that enlargement of a cluster region as described above is, in the same way as with enlargement of a model map described in FIG. 57, released by a predetermined operation of the operating unit 615.

Also, with state display as well, in the same way as with the case of 2D map display, the playback window (FIG. 58) where the playback object frame is drawn may be displayed.

Specifically, an arrangement may be made wherein the display control unit 614 displays a cluster region where the thumbnail of a scene is disposed, and also displays the playback window where the playback object frame is drawn in the position of the cluster region to which the playback object frame belongs.

Further, with state display as well, in the same way as with the case of 2D map display, the user can provide specification input for specifying a cluster region or a thumbnail displayed in a cluster region by operating the operating unit 615.

Here, whether or not the specification input specifies any of a cluster region, and a thumbnail displayed in the cluster region may be switched according to the operation of the operating unit 615, for example.

In the event that the specification input specifies a cluster region, the control unit 616 changes, based on the specification input for specifying the cluster region, a frame belonging to the cluster corresponding to the cluster region specified by the specification input thereof to the playback object frame, and starts playback control from the playback object frame thereof.

Specifically, the control unit 616 sets, of scenes belonging to the cluster corresponding to the cluster region specified by the specification input, for example, the head frame of the nearest scene in time sequence as to the playback object frame to the playback object frame (performs playback control). Subsequently, with the display control unit 614, the playback window where the playback object frame is drawn is displayed in the position of the cluster region specified by the specification input.

As described above, the user can jump the playback position, by simply providing specification input for specifying a cluster region while viewing the playback object frame, to the scene represented by the thumbnail displayed in the cluster region thereof.

Also, in the event that the specification input specifies a thumbnail disposed in a cluster region, the control unit 616 changes, based on the specification input for specifying the thumbnail, a frame included in the scene that the thumbnail specified by the specification input represents to the playback object frame, and starts playback control from the playback object frame thereof.

Specifically, the control unit 616 sets, of the scene that the thumbnail specified by the specification input represents, for example, the head frame to the playback object frame. Subsequently, with the display control unit 614, the playback window where the playback object frame thereof is drawn is displayed in the position of the cluster region where the thumbnail specified by the specification input is disposed.

As described above, the user can jump the playback position, by simply providing specification input for specifying a thumbnail while viewing the playback object frame, to the scene that the thumbnail thereof represents.

[2-Pane Display]

Figure 61:
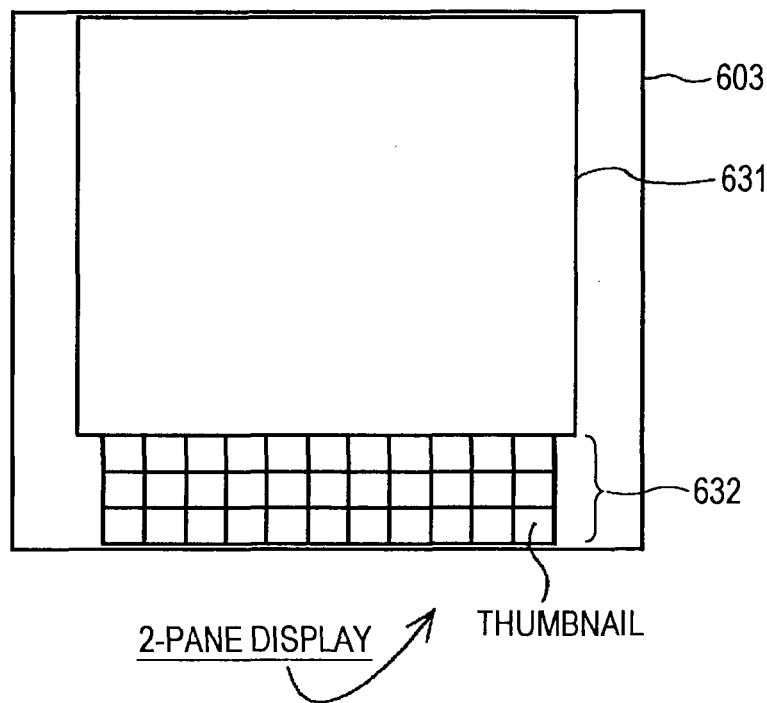
FIG. 61 is a diagram illustrating a display example of 2-pane display.

FIG. 61 is a diagram illustrating a display example of 2-pane display.

With 2-pane display, the display control unit 614 displays the playback window 631 where (the playback object frame of) the playback object content is drawn, and the cluster window 632 where the thumbnail of a scene (including a frame) belonging to the cluster to which the playback object frame belongs is drawn, on the display device 603.

In FIG. 61, the playback window 631 is displayed in the region of around ⅔ on the upper side of the display screen of the display device 603, and the cluster window 632 is displayed on the lower side of the playback window 631.

Also, with the cluster window 632, the thumbnails of all the scenes (including a scene including the playback object frame) belonging to the cluster to which the playback object frame belongs are arrayed in the time sequential order and displayed (drawn) in regions obtained by equally dividing the cluster window 632.

All the scenes belonging to the cluster to which the playback object frame belongs where the thumbnails are displayed on the cluster window 632 are scenes having the same content, and thus, according to the cluster window 632, the user can readily recognize the same scene as with the scene including the playback object frame.

With 2-pane display as well, in the same way as with the case of 2D map display, the user can provide specification input for specifying a thumbnail displayed on the cluster window 632 by operating the operating unit 615.

The control unit 616 changes a frame included in a scene that the thumbnail specified by the specification input thereof represents, to the playback object frame, and starts playback control from the playback object frame thereof.

Specifically, the control unit 616 sets, of the scene that the thumbnail specified by the specification input represents, for example, the head frame to the playback object frame. Subsequently, with the display control unit 614, the playback object frame thereof is displayed on the playback window 631 instead of the frame that has been the playback object frame up to that time.

Further, the display control unit 614 also changes the display of the cluster window 632 in response to change in the playback object frame.

All the scenes belonging to the cluster to which the playback object frame belongs of which the thumbnails are displayed on the cluster window 632 are scenes having the same content, so according to 2-pane display, the user can jump the playback position to another same scene as the scene including the playback object frame by simply providing specification input for specifying a thumbnail while viewing the playback object frame.

[5-Pane Display]

Figure 62:
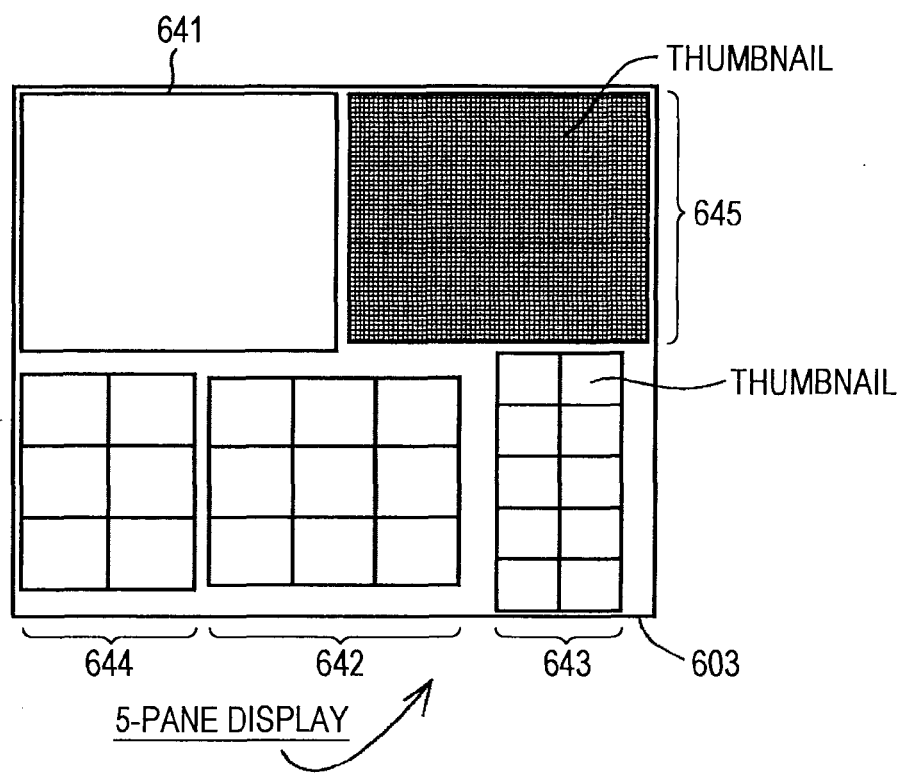
FIG. 62 is a diagram illustrating a display example of 5-pane display.

FIG. 62 is a diagram illustrating a display example of 5-pane display.

With 5-pane display, the display control unit 614 displays, in the same way as with 2-pane display described in FIG. 61, the playback window 641 where the playback object content is drawn, and the cluster window 642 where the thumbnail of a scene (including a frame) belonging to the cluster to which the playback object frame belongs is drawn, on the display device 603.

Further, with 5-pane display, the display control unit 614 displays the cluster windows 643 and 644, and the thumbnail window 645 on the display device 603.

With the cluster window 643, the thumbnails of all the scenes (including a frame) belonging to the cluster to which (the frame of) a scene immediately before a scene including the playback object frame belongs are, for example, arrayed in the time sequential order and displayed in the same way as with the cluster window 632 in FIG. 61.

All the scenes belonging to the cluster to which the scene immediately before the scene including the playback object frame belongs where the thumbnails are displayed on the cluster window 643 are scenes having the same content, and thus, according to the cluster window 643, the user can readily recognize the same scene as with the scene immediately before the scene including the playback object frame.

With the cluster window 644, the thumbnails of all the scenes (including a frame) belonging to the cluster to which (the frame of) a scene immediately after a scene including the playback object frame belongs are, for example, arrayed in the time sequential order and displayed in the same way as with the cluster window 632 in FIG. 61.

Therefore, according to the cluster window 644, the user can readily recognize the same scene as the scene immediately after the scene including the playback object frame.

With the thumbnail window 645, the thumbnails of all the scenes of the playback object content are, for example, arrayed in the time sequence and displayed in the same way as with the cluster window 632 in FIG. 61.

Therefore, according to the thumbnail window 645, all the scenes of the playback object content can readily be recognized.

As described above, according to 5-pane display, the user can recognize the same scene as the scene including the playback object frame (hereafter, also referred to as current scene) by the cluster window 642 while confirming the whole of the playback object content by the thumbnail window 645, and further can also recognize the same scene as the scene immediately before the current scene, and the scene immediately after the current scene by the cluster windows 643 and 644.

Here, in FIG. 62, the playback window 641 is displayed in the region of around ¼ on the upper left side of the display screen of the display device 603, and the thumbnail window 645 is displayed in the region of around ¼ on the upper right side of the display screen, on the right side of the playback window 641.

Further, in FIG. 62, of (three) regions obtained by dividing the region of around ½ on the lower side of the display screen of the display device 603 into three in the horizontal direction, the cluster window 644 is displayed in the first region from the left, the cluster window 642 is displayed in the second region, and the cluster window 643 is displayed in the third region, respectively.

Note that, with 5-pane display, of the thumbnails to be displayed on the thumbnail window 645, the thumbnail of the current scene may be subjected to emphasis display such as surrounding with a frame, or the like.

Further, with the thumbnail window 645, of the thumbnails of all the scenes of the playback object content, except for the thumbnails displayed on the cluster windows 642 through 644, only the remaining thumbnails may be displayed.

Also, with 5-pane display as well, in the same way as with the case of 2D map display or the like, the user can provide specification input for specifying a thumbnail displayed on the cluster windows 642 through 644, and the thumbnail window 645 by operating the operating unit 615.

The control unit 616 changes, based on the specification input for specifying a thumbnail, a frame included in the scene that the thumbnail specified by the specification input represents to the playback object frame, and starts playback control from the playback object frame thereof.

Specifically, the control unit 616 sets, of the scene that the thumbnail specified by the specification input represents, for example, the head frame to the playback object frame. Subsequently, with the display control unit 614, the playback object frame thereof is displayed on the playback window 641 instead of the frame that has been the playback object frame.

Further, the display control unit 614 also changes the display of the cluster windows 642 through 644 in response to change in the playback object frame.

Therefore, according to 5-pane display, the user can jump the playback position to an arbitrary scene of the playback object content by simply providing specification input for specifying a thumbnail.

[Time Sequence Display]

Figure 63:
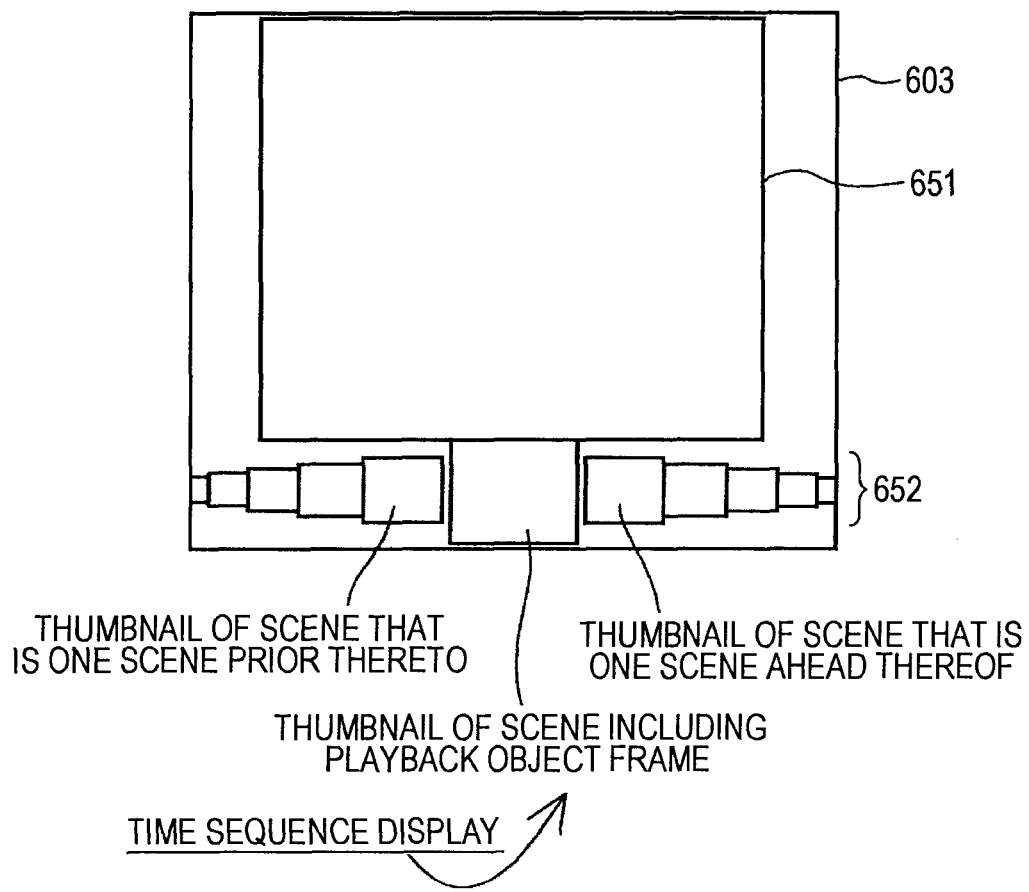
FIG. 63 is a diagram illustrating a display example of time sequence display.

FIG. 63 is a diagram illustrating a display example of time sequence display.

With time sequence display, the display control unit 614 displays a playback window 651 where the playback object content is drawn, and a thumbnail image group 652 on the display device 603.

In FIG. 63, the playback window 651 is displayed in the region of around ¾ on the upper side of the display screen of the display device 603, and the thumbnail image group 652 is displayed in the region of around ¼ on the lower side of the display screen, on the lower side of the playback window 651.

The thumbnail image group 652 is an image where the thumbnail of a scene (current scene) including the playback object frame, the thumbnails of one or more scenes after the current scene, and the thumbnails of one or more scenes before the current scene are arrayed in time sequence.

Specifically, in FIG. 63, the thumbnail of the current scene is disposed in the center of the thumbnail image group 652, and with the direction from the right to the left as a point-in-time advancement direction, the thumbnails of four scenes immediately before the current scene are disposed in time sequence on the right side of the thumbnail of the current scene.

Further, with the thumbnail image group 652, the thumbnails of the four scenes immediately after the current scene are disposed on the left side of the thumbnail of the current scene in time sequence.

Also, with the thumbnail image group 652 in FIG. 63, thumbnails are displayed in a manner stuck on the side face of a cylinder, such as a 3D image. Thus, of the thumbnails making up the thumbnail image group 652, the thumbnail of the current scene is displayed in the largest size, the farther the thumbnail of a scene is apart from the current scene in time sequence, the smaller the thumbnail is displayed.

As described above, with the thumbnail image group 652, the thumbnail of the current scene, the thumbnails of one or more scenes after the current scene, and the thumbnails of one or more scenes before the current scene are arrayed in time sequence, so according to the thumbnail image group 652, the user can readily recognize a scene temporally near the current scene.

With time sequence display as well, in the same way as with the case of 2D map display or the like, the user can provide specification input for specifying a thumbnail of the thumbnail image group 652 by operating the operating unit 615.

The control unit 616 changes, based on the specification input for specifying a thumbnail, a frame included in the scene that the thumbnail specified by the specification input represents to the playback object frame, and starts playback control from the playback object frame thereof.

Specifically, the control unit 616 sets, of the scene that the thumbnail specified by the specification input represents, for example, the head frame to the playback object frame. Subsequently, with the display control unit 614, the playback object frame thereof is displayed on the playback window 651 instead of the frame that has been the playback object frame.

Further, the display control unit 614 also changes the display of the thumbnail image group 652 in response to change in the playback object frame.

Therefore, according to time sequence display, the user can jump the playback position to an arbitrary scene of the playback object content by simply providing specification input for specifying a thumbnail.

Here, with the thumbnail image group 652, the thumbnails of one or more scenes after the current scene, and the thumbnails of one or more scenes before the current scene are arrayed in time sequence, so the playback position can be jumped to the scene following (immediately after) the current scene, the scene after following the current scene, or the like, for example.

Accordingly, it can be said that each thumbnail of the thumbnail image group 652 has a function such as the above jump button of a conventional recorder.

Note that, with jumping by the jump button, the frame (playback object frame) after jumping is not restricted to the frame of a scene different from the current scene, and may be the frame of the current scene, so the scene may not be changed, but jumping by a thumbnail of the thumbnail image group 652 is more effective than jumping with the jump button in that, with jumping by a thumbnail of the thumbnail image group 652, the frame after jumping is always the frame of a scene different from the current scene.

[Flat Display]

Figure 64:
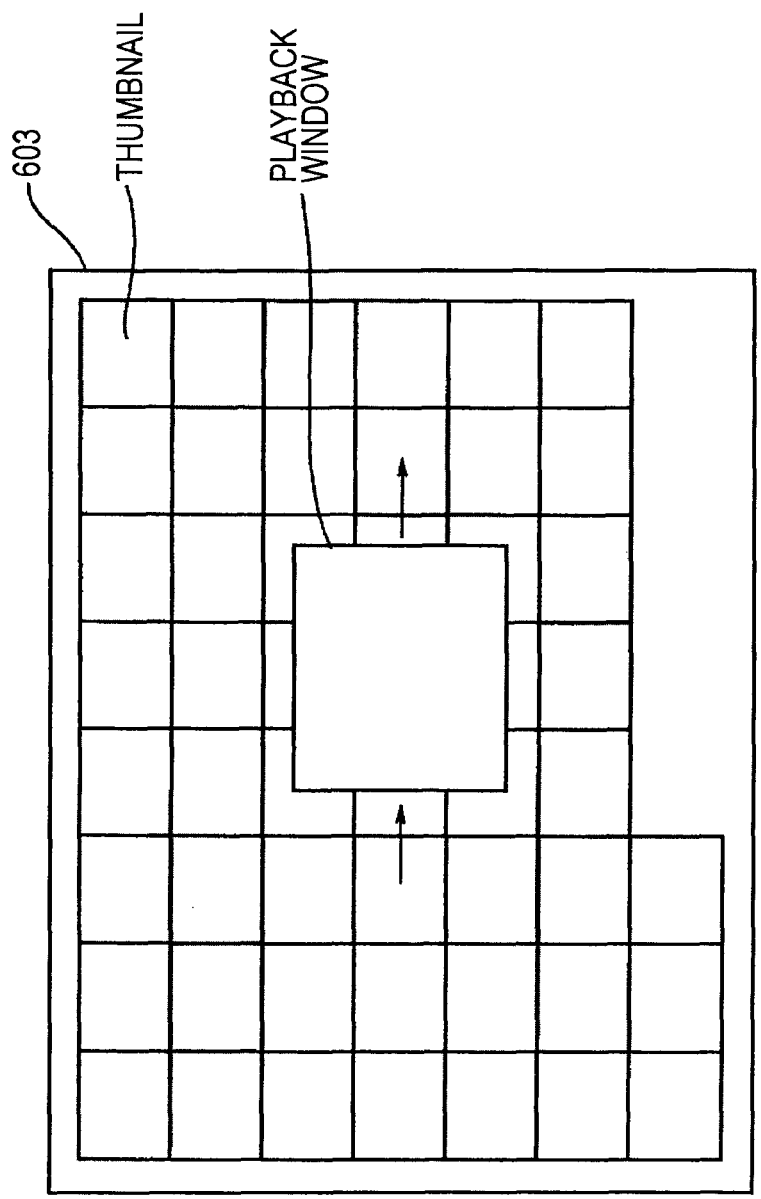
FIG. 64 is a diagram illustrating a display example of flat display.

FIG. 64 is a diagram illustrating a display example of flat display.

With flat display, the display control unit 614 arrays, in the same way as with the thumbnail window 645 of 5-pane display in FIG. 62, the thumbnails of all the scenes of the playback object content in time sequence, and displays on the display device 603.

Therefore, according to flat display, all the scenes of the playback object content can readily be recognized.

Also, with flat display as well, in the same way as with 2D map display, the playback window where the playback object frame is drawn may be displayed.

Specifically, an arrangement may be made wherein the display control unit 614 displays the thumbnails of all the scenes of the playback object content, and also displays the playback window where the playback object frame is drawn in the position of the thumbnail of the scene (current scene) of the playback object frame thereof.

Further, with flat display as well, in the same way as with the case of 2D map display, the user can provide specification input for specifying a thumbnail by operating the operating unit 615.

The control unit 616 changes, based on the specification input for specifying a thumbnail, a frame included in the scene that the thumbnail specified by the specification input represents to the playback object frame, and starts playback control from the playback object frame thereof.

Specifically, the control unit 616 sets, of the scene that the thumbnail specified by the specification input represents, for example, the head frame to the playback object frame. Subsequently, with the display control unit 614, the playback window where the playback object frame thereof is drawn is displayed in the position of the thumbnail specified by the specification input.

As described above, by simply providing specification input for specifying a thumbnail while viewing the playback object frame, the user can jump the playback position to the scene that the thumbnail thereof represents.

[Learning of Clustering Model in Case of Clustering Model Being HMM]

Figure 65:
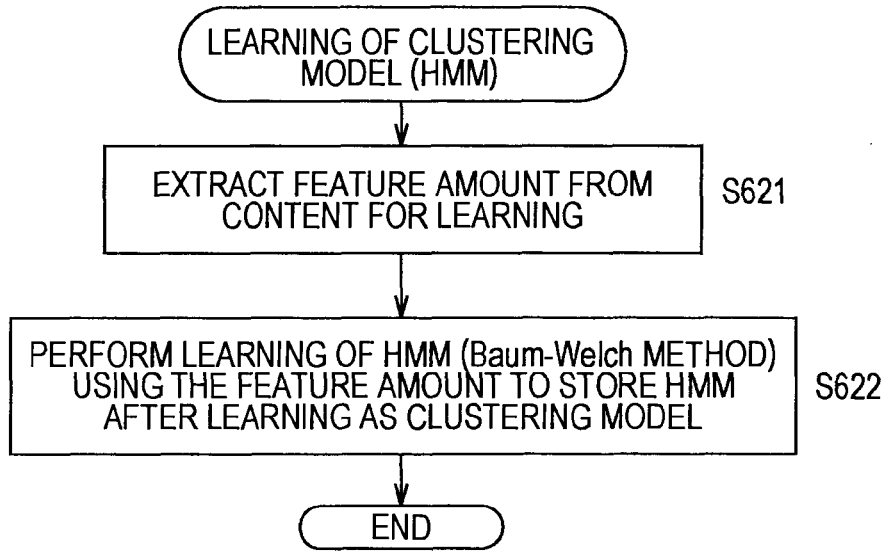
FIG. 65 is a flowchart for describing clustering model learning processing in the event that a clustering model is an HMM.

FIG. 65 is a flowchart for describing clustering model learning processing that the clustering model learning unit 621 (FIG. 55) performs in the event that a clustering model is an HMM.

Here, as described in FIG. 55, as for a clustering model, for example, a state transition model including a state and state transition may be employed. Also, as for a state transition model to be employed as a clustering model, for example, an HMM serving as a contents model, a new vector quantized model that is a model employing the k-means method to be used for vector quantization, a new GMM that is a model employing GMM, or the like may be employed.

FIG. 65 is a flowchart for describing, in the event that of the above HMM, new vector quantized model, and new GMM model, the HMM is employed as a clustering model, learning processing of the clustering model thereof.

In step S621, the clustering model learning unit 621 (FIG. 55) takes the contents stored in the contents storage unit 601 as contents for learning to learn a clustering model, and classifies the contents for learning for every category.

Subsequently, the clustering model learning unit 621 extracts, for example, in the same way as with the contents model learning unit 12 in FIG. 2, the feature amount of each frame of the contents for learning, and the processing proceeds from step S621 to step S622.

In step S622, the clustering model learning unit 621 uses, regarding each category, (the time sequence of) the feature amount of a frame of the content for learning of the category thereof to perform learning of an HMM serving as a clustering model in the same way as with the contents model learning unit 12 in FIG. 2, thereby generating (obtaining) an HMM serving as a clustering model for every category.

Subsequently, the clustering model learning unit 621 supplies and stores the HMM serving as a clustering model for every category to the clustering model storage unit 622, and the clustering model learning processing ends.

Here, in the event that the clustering model is an HMM, a state of the HMM corresponds to a cluster.

[Clustering in Case of Clustering Model Being HMM]

Figure 66:
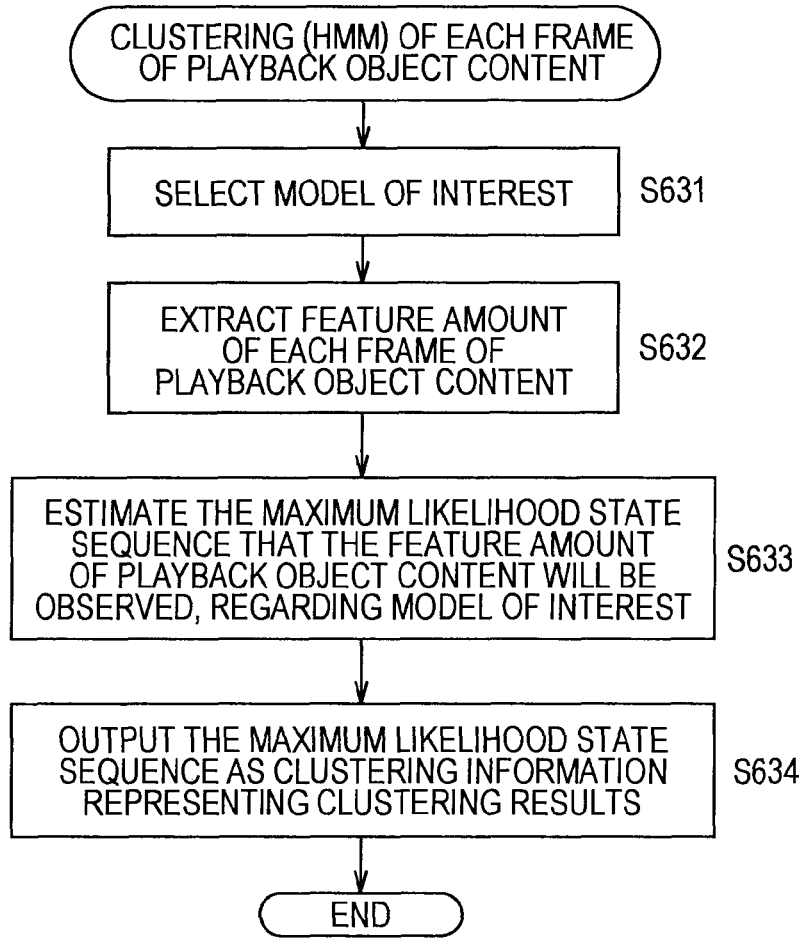
FIG. 66 is a flowchart for describing clustering processing in the event that a clustering model is an HMM.

FIG. 66 is a flowchart for describing, in the event the clustering model is an HMM, clustering processing of the playback object content that the clustering unit 611 (FIG. 55) performs.

In step S631, the clustering model selecting unit 623 (FIG. 55) selects a clustering model of which the category matches the category of the playback object content out of the clustering models for every category, stored in the clustering model storage unit 622, as the model of interest to be used for clustering, supplies to the cluster determining unit 625, and the processing proceeds to step S632.

In step S632, the feature amount extracting unit 624 (FIG. 55) extracts the feature amount of each frame of the playback object content from the contents storage device 601 (the same feature amount used for learning of an HMM serving as a contents model), supplies to the cluster determining unit 625, and the processing proceeds to step S633.

In step S633 and subsequent step S634, the cluster determining unit 625 (FIG. 55) uses the model of interest from the clustering model selecting unit 623, and the feature amount of (the time sequence of) each frame of the playback object content from the feature amount extracting unit 624 to determine a cluster to which each frame of the playback object content belongs, and supplies (outputs) clustering information representing the clustering result that is the cluster thereof to the scene classifying unit 612.

Specifically, in step S633, the clustering determining unit 623 estimates, in the same way as with the maximum likelihood state sequence estimating unit 34 in FIG. 9, the maximum likelihood state sequence (the maximum likelihood state sequence of the model of interest as to the playback object content) that is a state sequence causing state transition where likelihood is the highest that the feature amount (the time sequence of feature amount of each frame of the playback object content) of the playback object content from the feature amount extracting unit 624 will be observed with the model of interest from the clustering model selecting unit 623, and the processing proceeds to step S634.

In step S634, the cluster determining unit 625 outputs the maximum likelihood state sequence of the model of interest as to the playback object content to the scene classifying unit 612 (FIG. 53) as the clustering information, and the clustering processing of the playback object content ends.

Figure 67:
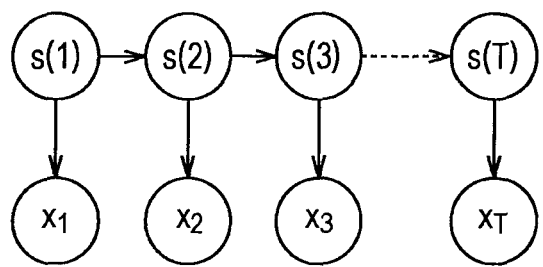
FIG. 67 is a diagram illustrating a graphical model expressing clustering in the event that an HMM is employed as a clustering model.

FIG. 67 illustrates a graphical model expressing clustering in the event of employing an HMM as a clustering model.

The graphical model in FIG. 67 expresses that the feature amount $x_t$ of the frame at the point-in-time t of the playback object content is observed in the state s(t) at the point-in-time t of the maximum likelihood state sequence s(1), s(2), ..., S(T) of the model of interest as to the playback object content (T represents the number of frames of the playback object content).

The maximum likelihood state sequence s(1) through S(T) of the model of interest as to the playback object content represents that the frame at the point-in-time t of the playback object content has been subjected to clustering to a cluster corresponding to the state s(t).

[Learning of Clustering Model in Case of Clustering Model Being New Vector Quantized Model]

Figure 68:
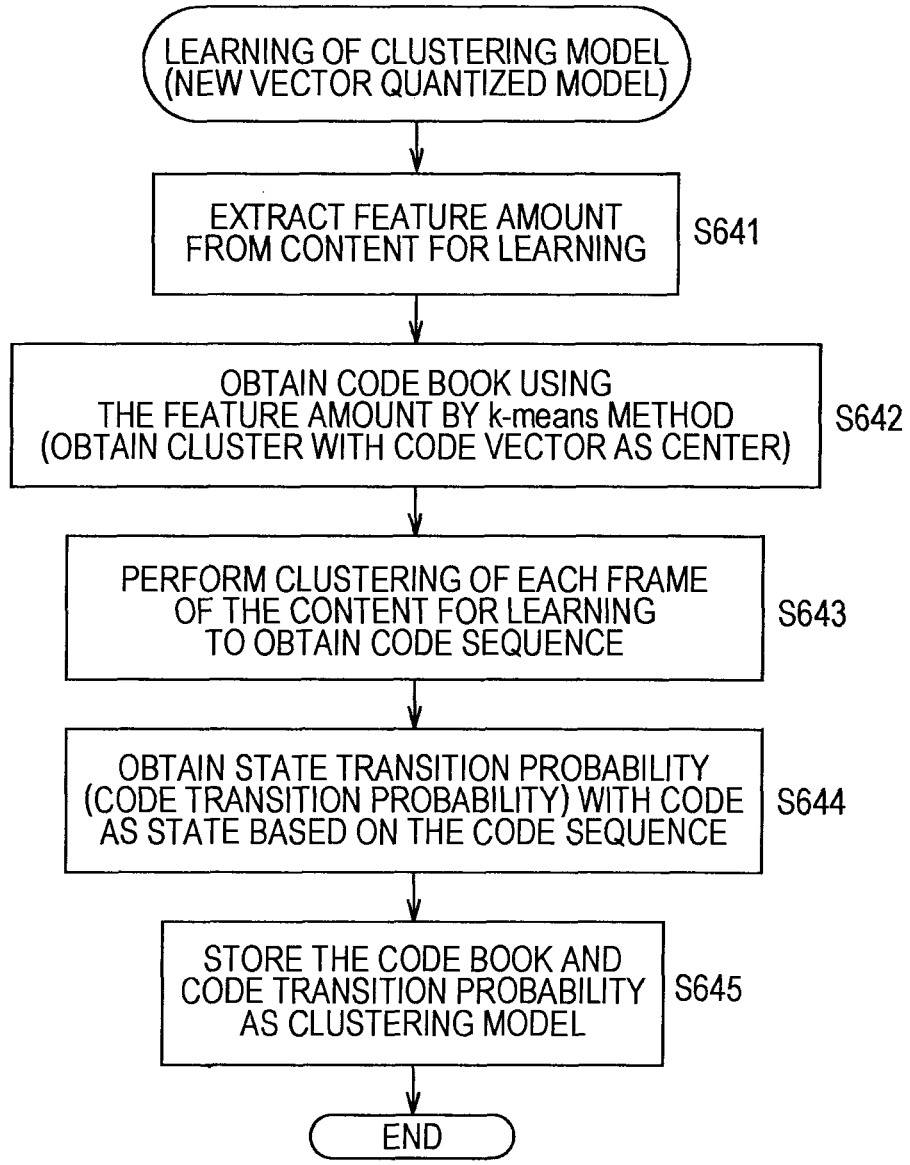
FIG. 68 is a flowchart for describing clustering model learning processing in the event that a clustering model is a new vector quantized model.

FIG. 68 is a flowchart for describing, in the event that the clustering model is a new vector quantized model, clustering model learning processing that the clustering model learning unit 621 (FIG. 55) performs.

In step S641, the clustering model learning unit 621 (FIG. 55) takes the contents stored in the contents storage unit 601 as contents for learning to learn a clustering model, and classifies the contents for learning for every category.

Subsequently, the clustering model learning unit 621 extracts, for example, in the same way as with the contents model learning unit 12 in FIG. 2, the feature amount (vector) of each frame of the contents for learning, and the processing proceeds from step S641 to step S642.

In step S642, the clustering model learning unit 621 uses, regarding each category, the feature amount of each frame of the content for learning of the category thereof to obtain a code book to be used for vector quantization of the feature amount (vector) of the frame, for example, by the k-means method, and the processing proceeds to step S643.

Specifically, the clustering model learning unit 621 obtains a code vector that is the vector of space (feature amount space) of the feature amount of the frame by the k-means method, and registers on the code book in a manner correlated with code presenting (identifying) the code vector thereof.

Note that in the event that the clustering model is a new vector quantized model, (the code representing) the code vector corresponds to the state of the new vector quantized model that is a state transition model, and consequently the cluster.

Now, let us say that the total number of the code vectors of the code book is N, and of the N code vectors, the n'th code vector is represented as $\mu_n$, and also the code representing the code vector $\mu_n$ thereof is represented as n.

In step S643, the clustering model learning unit 621 subject, regarding each category, the feature amount of each frame of the content for learning of the category thereof to clustering by vector quantization using the code book of the category thereof, outputs the sequence of code (code sequence) serving as the clustering results, and the processing proceeds to step S644.

Specifically, if we say that the feature (vector) of the frame at the point-in-time t of the content for learning is represented as $x_t$, the clustering model learning unit 621 performs clustering by subjecting the feature amount (vector) $x_t$ to vector quantization so as to obtain code n to minimize distance $|x_t-\mu_n|$ between code s(t) represented with Expression s(t)= argmin$|x_t-\mu_n|$, i.e., the feature amount (vector) $x_t$ and the code vector $\mu_n$.

The clustering model learning unit 621 subjects, regarding each category, the feature amount of each frame of the content for learning of the category thereof to clustering by vector quantization using the code book of the category thereof, outputs the code sequence s(1), s(2), ..., s(T) (T represents the number of frames of the playback object content) serving as the clustering results.

In step S644, the clustering model learning unit 621 obtains, regarding each category, based on the code sequence s(1) through s(T) of the category thereof, the state transition probability (hereafter, also referred to as "code transition probability") of the state corresponding to (the code vector represented by) the code, and the processing proceeds to step S645.

Specifically, the clustering model learning unit 621 obtains code transition probability $A_{ij}$=P(j=s(t+1)|i=s(t)) that is state transition probability that state transition will be made from a state i corresponding to the code s(t) at certain point-in-time t to a state j corresponding to the code s(t+1) at the next point-in-time t+1.

Note that, with the code sequence s(1) through s(T), if we say that the number of times of state transition from the state i corresponding to the code s(t) at the point-in-time t to the state j corresponding to the code s(t+1) at the next point-in-time t+1 is represented as $m_{i,j}$, state transition probability P(s(t+1)|(s(t)) that state transition will be made from the state i corresponding to the code s(t) at the point-in-time t to the state j corresponding to the code s(t+1) at the next point-in-time t+1 is represented with Expression P(s(t+1)|s(t))= $m_{s(t),s(t+1)}/\Sigma m_{s(t),n}$.

Here, with Expression P(s(t+1)|s(t))=$m_{s(t),s(t+1)}/\Sigma m_{s(t),n}$, $\Sigma$ of the denominator of the right side represents summation obtained by changing n to an integer from 1 to N.

In step S645, the clustering model learning unit 621 supplies and stores a set of the code book obtained regarding each category, and the code transition probability $A_{ij}$ to the clustering model storage unit 622 as a new vector quantized model that is a state transition model including the state corresponding to the code, and state transition with the code transition probability $A_{ij}$ as state transition probability, and the clustering model learning processing ends.

[Clustering in Case of Clustering Model being New Vector Quantized Model]

Figure 69:
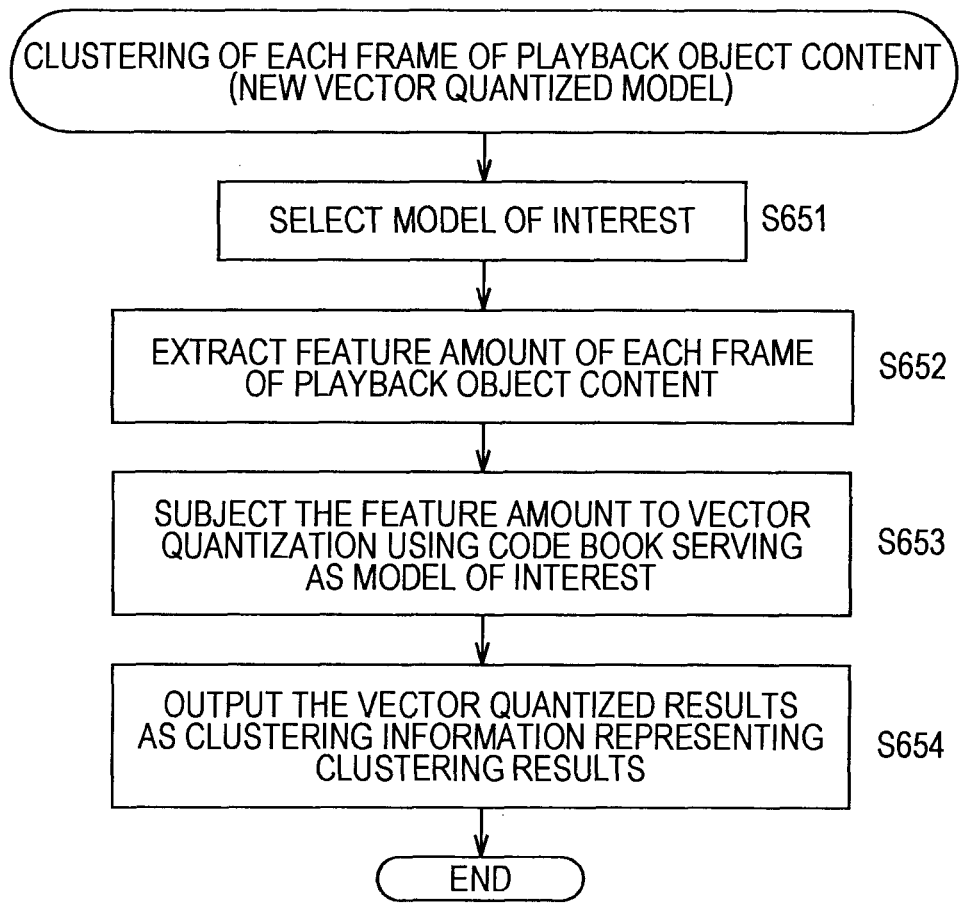
FIG. 69 is a flowchart for describing clustering processing in the event that a clustering model is a new vector quantized model.

FIG. 69 is a flowchart for describing, in the event that the clustering model is a new vector quantized model, clustering processing of the playback object content that the clustering unit 611 (FIG. 55) performs.

In step S651, the clustering model selecting unit 623 (FIG. 55) selects a clustering model of which the category matches the category of the playback object content out of the clustering models for every category, stored in the clustering model storage unit 622 as the model of interest to be used for clustering, supplies to the cluster determining unit 625, and the processing proceeds to step S652.

In step S652, the feature amount extracting unit 624 (FIG. 55) extracts the feature amount of each frame of the playback object content from the contents storage device 601 (the same feature amount as the feature amount used for learning of a new vector quantized model serving as a contents model), supplies to the cluster determining unit 625, and the processing proceeds to step S653.

In step S653 and subsequent step S654, the cluster determining unit 625 (FIG. 55) uses the model of interest from the clustering model selecting unit 623, and the feature amount of each frame of the playback object content from the feature amount extracting unit 624 to determine the cluster to which each frame of the playback object content belongs, and supplies (outputs) clustering information representing the clustering result that is the cluster thereof to the scene classifying unit 612.

Specifically, in step S653, the cluster determining unit 623 subjects each frame of the playback object content to clustering by subjecting the feature amount (vector) of each frame of the playback object content from the feature amount extracting unit 624 to vector quantization using the code book serving as the model of interest from the clustering model selecting unit 623, and the processing proceeds to step S654.

In step S654, the cluster determining unit 625 outputs (the sequence of) the code that is the vector quantization result of each frame of the playback object content to the scene classifying unit 612 (FIG. 53) as the clustering information, and the clustering processing of the playback object content ends.

Note that the code transition probability that is the state transition probability of the new vector quantized model is not employed for clustering using the new vector quantized model, but in the event that 2D map display described in FIG. 56 through FIG. 58 is performed, the code transition probability is employed at the time of drawing the segment of a line connecting between states on the model map according to the state transition probability between the states thereof.

Figure 70:
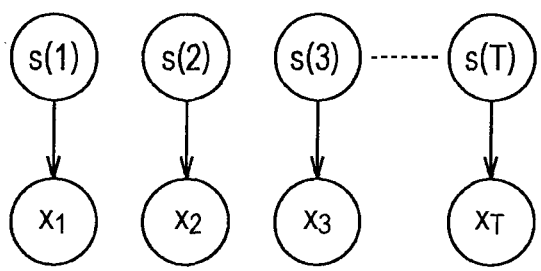
FIG. 70 is a diagram illustrating a graphical model expressing clustering in the event that a new vector quantized model is employed as a clustering model.

FIG. 70 is a diagram illustrating a graphical model expressing clustering in the event of employing the new vector quantized model as a clustering model.

The graphical model in FIG. 70 expresses that in the state corresponding to the code s(t) that is the vector quantization results of the frame at the point-in-time t of the playback object content (in FIG. 70, T represents the number of frames of the playback object content), the feature amount $x_t$ of the frame at the point-in-time t of the playback object content is observed.

Also, the code s(t) represents that the frame at the point-in-time t of the playback object content has been subjected to clustering to a cluster corresponding to (the state corresponding to) the code s(t).

[Learning of Clustering Model in Case of Clustering Model Being New GMM]

Figure 71:
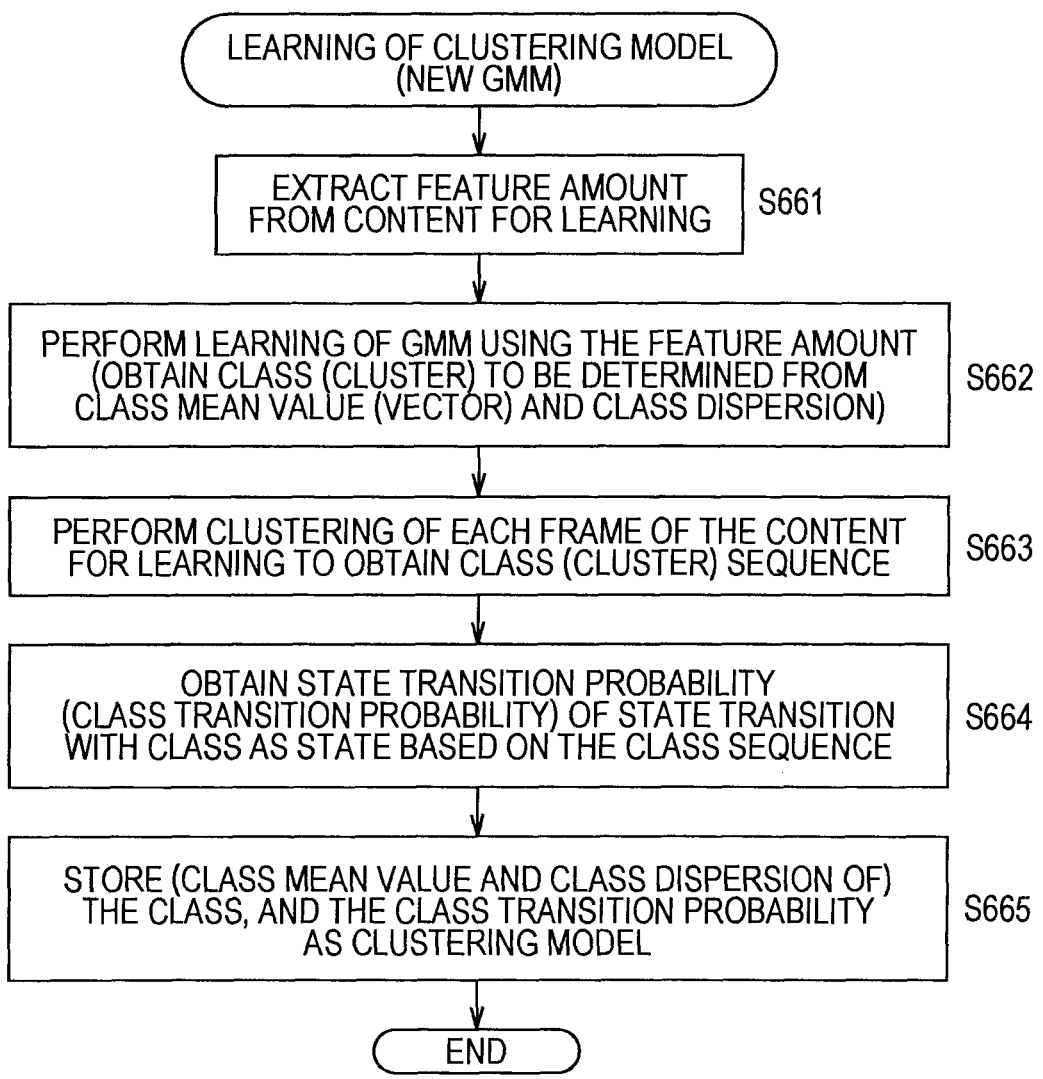
FIG. 71 is a flowchart for describing clustering processing in the event that a clustering model is a new GMM.

FIG. 71 is a flowchart for describing, in the event that the clustering model is a new GMM, clustering model learning processing that the clustering model learning unit 621 (FIG. 55) performs.

In step S661, the clustering model learning unit 621 takes the contents stored in the contents storage unit 601 as contents for learning to learn a clustering model, and classifies the contents for learning for every category.

Subsequently, the clustering model learning unit 621 extracts, for example, in the same way as with the contents model learning unit 12 in FIG. 2, the feature amount (vector) of each frame of the contents for learning, and the processing proceeds from step S661 to step S662.

In step S662, the clustering model learning unit 621 uses, regarding each category, the feature amount of each frame of the content for learning of the category thereof to perform learning of a common GMM, thereby obtaining the mean value (vector) and dispersion of the class of the GMM, and the processing proceeds to step S663.

Specifically, the clustering model learning unit 621 obtains the mean value and dispersion that stipulate the class that is partial space (distribution) of the space (feature amount space) of the feature amount of a frame.

Here, the mean value and dispersion that stipulate the class will be referred to as class mean value and class dispersion, respectively. The class stipulated by the class mean value and class dispersion corresponds to the state of a new GMM that is a state transition model, and consequently to a cluster.

Now, let us say that the total number of classes of the GMM is N, and of the N classes, the class mean value and class dispersion of the n'th class n are represented as $\mu_n$ and $\sigma^2_n$, respectively.

In step S663, the clustering model learning unit 621 subjects, regarding each category, the feature of each frame of the content for learning of the category thereof to clustering by classifying into one class of the GMM of the category thereof, and outputs the sequence of classes (class sequence) classified from the feature amount, serving as the clustering results, and the processing proceeds to step S664.

Specifically, if we say that the feature amount (vector) of the frame at the point-in-time t of the content for learning is represented as $x_t$, the clustering model learning unit 621 performs clustering by classifying the feature amount $x_t$ into the class s(t) represented by Expression s(t)=argmax{Normal($x_t$; $\mu_n$, $\sigma^2_n$)}.

Here, with Expression s(t)=argmax{Normal($x_t$; $\mu_n$, $\sigma^2_n$)}, Normal($x_t$; $\mu_n$, $\sigma^2_n$) represents the function value of a normal distribution function where the mean value (vector) is the class mean value $\mu_n$, dispersion is the class dispersion $\sigma^2_n$, and an argument is the feature amount $x_t$.

Therefore, according to Expression s(t)=argmax{Normal($x_t$; $\mu_n$, $\sigma^2_n$)}, the feature amount $x_t$ is subjected to clustering by being classified into the class n that maximize the function value of the normal distribution function with the feature amount $x_t$ as an argument.

The clustering model learning unit 621 performs clustering by classifying, regarding each category, the feature amount of each frame of the content for learning of the category thereof into one class of the GMM of the category thereof in time sequence, and outputs the class sequence s(1), s(2), . . . , s(T) (T represents the number of frames of the playback object content) serving as the clustering results.

In step S664, the clustering model learning unit 621 obtains, regarding each category, based on the class sequence s(1) through s(T) of the category thereof, the state transition probability of the state corresponding to the class (hereafter, also referred to as "class transition probability"), and the processing proceeds to step S665.

Specifically, the clustering model learning unit 621 obtains code transition probability $A_{ij}$=P(j=s(t+1)|i=s(t)) that is state transition probability that state transition will be made from a state i corresponding to the code s(t) at certain point-in-time t to a state j corresponding to the code s(t+1) at the next point-in-time t+1.

Note that, with the code sequence s(1) through s(T), if we say that the number of times of state transition from the state i corresponding to the class i at the point-in-time t+1 to the state j corresponding to the class j at the next point-in-time t+1 is represented as $m_{i,j}$, state transition probability P(s(t+1)|(s(t)) that state transition will be made from the state corresponding to the code s(t) at the point-in-time t to the state corresponding to the class s(t+1) at the next point-in-time t+1 is, in the same way as the above code transition probability, represented with Expression $P(s(t+1)|s(t))=m_{s(t),s(t+1)}/\Sigma m_{s(t),n}$.

Here, with Expression $P(s(t+1)|s(t))=m_{s(t),s(t+1)}/\Sigma m_{s(t),n}$, $\Sigma$ of the denominator of the right side represents summation obtained by changing n to an integer from 1 to N.

In step S665, the clustering model learning unit 621 supplies and stores a set of the GMM obtained regarding each category, and the code transition probability $A_{ij}$ to the clustering model storage unit 622 as a new GMM that is a state transition model including the state corresponding to the class, and state transition with the code transition probability $A_{ij}$ as state transition probability, and the clustering model learning processing ends.

[Clustering in Case of Clustering Model being New GMM]

Figure 72:
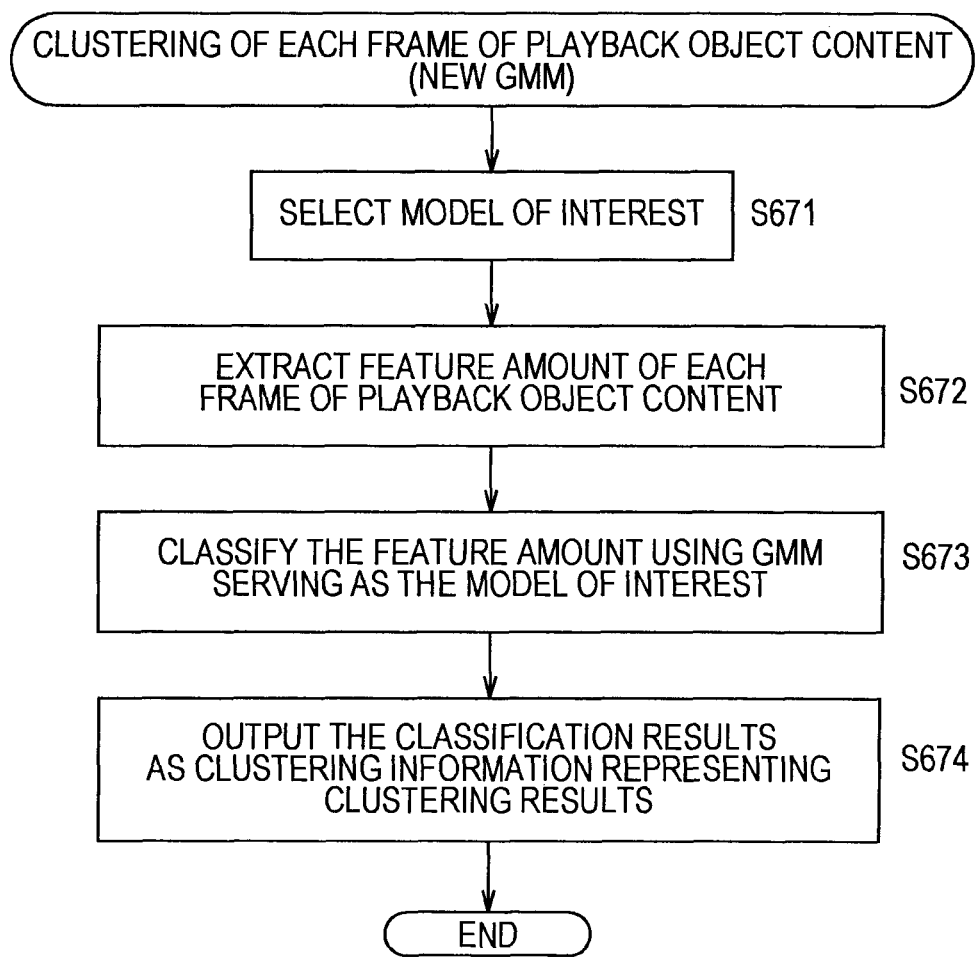
FIG. 72 is a diagram illustrating a graphical model expressing clustering in the event that a new GMM is employed as a clustering model.

FIG. 72 is a flowchart for describing, in the event that the clustering model is a new GMM, clustering processing of the playback object content that the clustering unit 611 (FIG. 55) performs.

In step S671, the clustering model selecting unit 623 (FIG. 55) selects a clustering model of which the category matches the category of the playback object content out of the clustering models for every category, stored in the clustering model storage unit 622 as the model of interest to be used for clustering, supplies to the cluster determining unit 625, and the processing proceeds to step S672.

In step S672, the feature amount extracting unit 624 (FIG. 55) extracts the feature amount of each frame of the playback object content from the contents storage device 601 (the same feature amount as the feature amount used for learning of a new GMM serving as a contents model), supplies to the cluster determining unit 625, and the processing proceeds to step S673.

In step S673 and subsequent step S674, the cluster determining unit 625 (FIG. 55) uses the model of interest from the clustering model selecting unit 623, and the feature amount of each frame of the playback object content from the feature amount extracting unit 624 to determine the cluster to which each frame of the playback object content belongs, and supplies (outputs) clustering information representing the clustering result that is the cluster thereof to the scene classifying unit 612.

Specifically, in step S673, the cluster determining unit 623 subjects each frame of the playback object content to clustering by performing class classification for classifying the feature amount of each frame of the playback object content from the feature amount extracting unit 624 into one class of the GMM serving as the model of interest from the clustering model selecting unit 623, and the processing proceeds to step S674.

In step S674, the cluster determining unit 625 outputs (the sequence of) the class that is the class classification result of each frame of the playback object content to the scene classifying unit 612 (FIG. 53) as the clustering information, and the clustering processing of the playback object content ends.

Note that the class transition probability that is the state transition probability of the new GMM is not employed for clustering using the new GMM, but in the event that 2D map display described in FIG. 56 through FIG. 58 is performed, the class transition probability is employed at the time of drawing the segment of a line connecting between states on the model map according to the state transition probability between the states thereof.

Also, the graphical model expressing clustering in the event of employing the new GMM as a clustering model is the same as the graphical model expressing clustering in the event of employing the new vector quantized model, illustrated in FIG. 70, so description thereof will be omitted.

Description has been made so far regarding the case of employing the HMM that is a state transition model, new vector quantized model, and new GMM, but as for a clustering model, a model other than a state transition model, i.e., for example, a code book or GMM may be employed.

Even in the event of employing a code book other than a state transition model, or GMM, the clustering unit 611 may perform vector quantization employing a code book, class classification employing a GMM, described in FIG. 69 or FIG. 72, as clustering.

However, in the event of employing a code book other than a state transition model, or GMM, there is no state transition probability, so 2D map display where display employing state transition probability is performed may not be performed (state display, 2-pane display, 5-pane display, time sequence display, and flat display may be performed).

[Description of Computer with Present Invention Being Applied]

Next, the above series of processing may be performed by hardware, and may be performed by software. In the event of performing the series of processing by software, a program making up the software thereof is installed into a general-purpose computer or the like.

Figure 73:
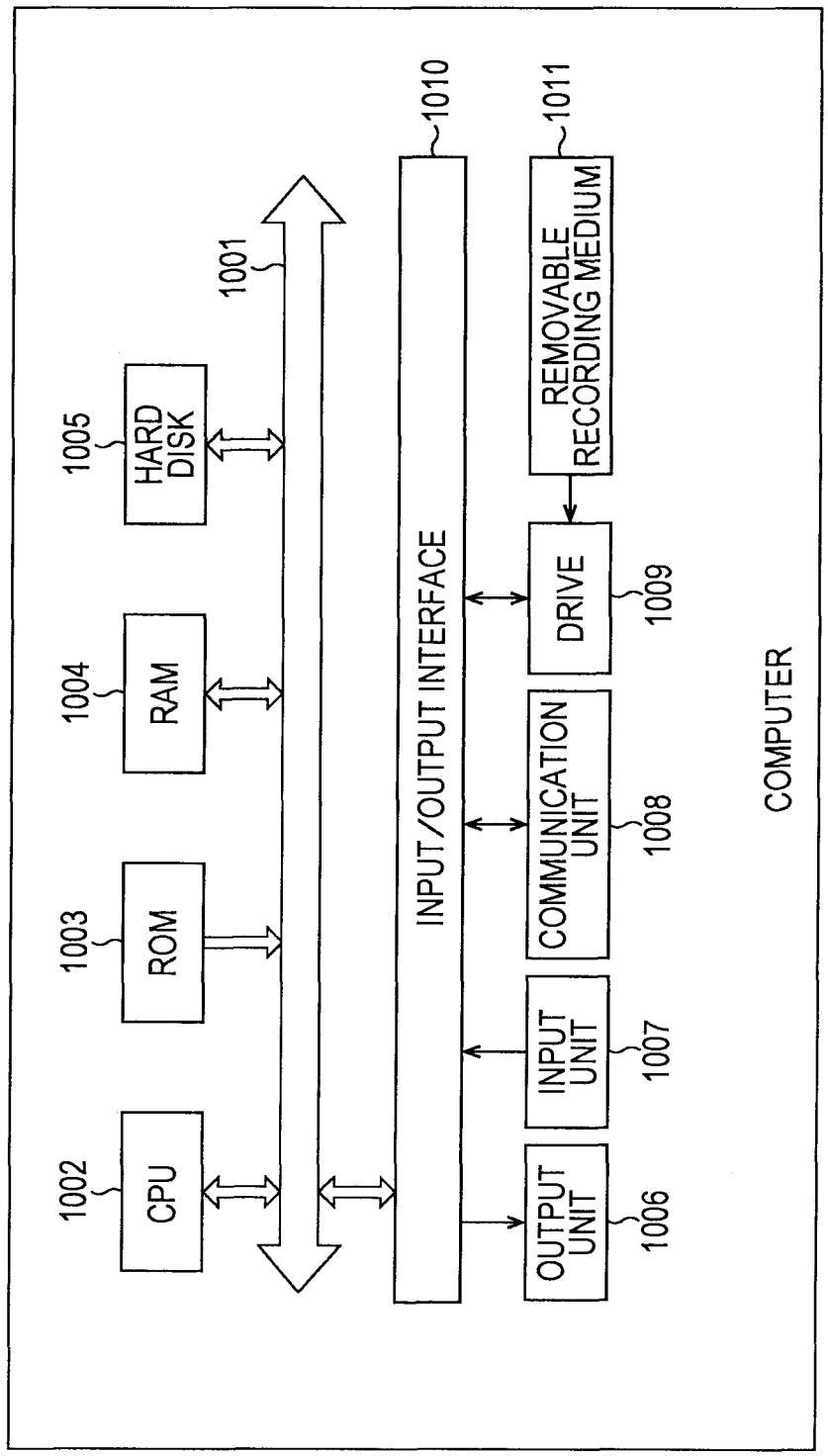
FIG. 73 is a block diagram illustrating a configuration example of an embodiment of a computer to which the present invention has been applied.

Therefore, FIG. 73 illustrates a configuration example of an embodiment of a computer into which a program that executes the above series of processing is installed.

The program may be recorded beforehand in a hard disk 1005 or ROM 1003 serving as a recording medium housed in the computer.

Alternatively, the program may be stored (recorded) beforehand in a removable recording medium to be mounted on a drive 1009. Such a removable recording medium 1011 may be provided as so-called package software. Here, examples of the removable recording medium 1011 include flexible disks, CD-ROM (Compact Disc Read Only Memory), MO (Magneto Optical) disks, DVD (Digital Versatile Disc), magnetic disks, and semiconductor memory.

Note that the program may be downloaded into the computer via a communication network or broadcast network and installed into a built-in hard disk 1005 in addition to installing into the computer from the removable recording medium 1011 as described above. Specifically, for example, the program may wirelessly be transferred to the computer from a download site via satellite for digital satellite broadcasting, or may be transferred to the computer by cable via a network such as a LAN (Local Area Network) or the Internet.

The computer houses a CPU (Central Processing Unit) 1002, and the CPU 1002 is connected to an input/output interface 1010 via a bus 1001.

Upon a command being input by a user operating an input unit 1007 or the like via the input/output interface 1010, the CPU 1002 executes, in accordance therewith, the program stored in the ROM (Read Only Memory) 1003. Alternatively, the CPU 1002 loads the program stored in the hard disk 1005 into RAM (Random Access Memory) 1004 and executes this.

Thus, the CPU 1002 performs the processing in accordance with the above flowcharts, or the processing to be performed by the configurations of the above block diagrams. Subsequently, with the CPU 1002, according to need, for example, the processing results is output from an output unit 1006, or transmitted from a communication unit 1008, or further recorded in the hard disk, or the like, via the input/output interface 1010.

Note that the input unit 1007 is configured of a keyboard, a mouse, a microphone, and so forth. Also, the output unit 1006 is configured of an LCD (Liquid Crystal Display), a speaker, and so forth.

Now, with the present Specification, processing that the computer performs in accordance with the program does not necessarily have to be performed in time sequence along the sequence described as a flowchart. Specifically, the processing that the computer performs in accordance with the program also includes processing executed in parallel or individually (e.g., parallel processing or processing by an object).

Also, the program may be a program to be executed by a single computer (processor), or a program to be processed by multiple computers in a distributed manner. Further, the program may be a program to be transferred to a remote computer and executed there.

Note that embodiments of the present invention are not restricted to the above-mentioned embodiments, and various changes can be made without departing from the essence and spirit of the present invention.

REFERENCE SIGNS LIST 11 contents storage unit
12 contents model learning unit
13 model storage unit
14 contents structure presenting unit
15 digest generating unit
16 scrapbook generating unit
21 learning contents selecting unit
22 feature amount extracting unit
23 frame dividing unit
24 sub region feature amount extracting unit
25 connecting unit
26 feature amount storage unit
27 learning unit
31 contents selecting unit
32 model selecting unit
33 feature amount extracting unit
34 maximum likelihood state sequence estimating unit
35 state-enabled image information generating unit
36 inter-state distance calculating unit
37 coordinates calculating unit
38 map drawing unit
39 display control unit
51 highlight detector learning unit
52 detector storage unit
53 highlight detecting unit
61 contents selecting unit
62 model selecting unit
63 feature amount extracting unit
64 maximum likelihood state sequence estimating unit
65 highlight label generating unit
66 learning label generating unit
67 learning unit
71 contents selecting unit
72 model selecting unit
73 feature amount extracting unit
74 maximum likelihood state sequence estimating unit
75 detection label generating unit
76 detector selecting unit
77 maximum likelihood state sequence estimating unit
78 highlight scene detecting unit
79 digest contents generating unit
80 playback control unit
101 initial scrapbook generating unit
102 initial scrapbook storage unit
103 registered scrapbook generating unit
104 registered scrapbook storage unit
105 playback control unit
111 contents selecting unit
112 model selecting unit
113 feature amount extracting unit
114 maximum likelihood state sequence estimating unit
115 state-enabled image information generating unit
116 inter-state distance calculating unit
117 coordinates calculating unit
118 map drawing unit
119 display control unit
121 state selecting unit
122 selected state registration unit
141 scrapbook selecting unit
142 contents selecting unit
143 model selecting unit
144 feature amount extracting unit
145 maximum likelihood state sequence estimating unit
146 frame extracting unit
147 frame registration unit
201 contents model learning unit
202 model storage unit
202a image model storage unit
202b audio model storage unit
202c object model storage unit
203 contents structure presenting unit
204 digest generating unit
205 scrapbook generating unit
220 image feature amount extracting unit
221 audio feature amount extracting unit
222 audio feature amount storage unit
223 learning unit
224 object feature amount extracting unit
225 object feature amount storage unit
226 learning unit
241 primitive feature amount extracting unit
242 average calculating unit
243 dispersion calculating unit
224 connecting unit
261 object extracting unit
262 frame dividing unit
263 sub region feature amount extracting unit
264 connecting unit
291 highlight detector learning unit
292 detector storage unit
293 highlight detecting unit
311 image model selecting unit
312 image feature amount extracting unit
313 image maximum likelihood state sequence estimating unit
314 learning label generating unit
315 learning unit
316 audio model selecting unit
317 audio feature amount extracting unit
318 audio maximum likelihood state sequence estimating unit
319 object model selecting unit
320 object feature amount extracting unit
321 object maximum likelihood state sequence estimating unit
341 image model selecting unit
342 image feature amount extracting unit
343 image maximum likelihood state sequence estimating unit
344 detection label generating unit
345 detector selecting unit 346 maximum likelihood state sequence estimating unit
347 highlight scene detecting unit
348 digest contents generating unit
349 playback control unit
350 audio model selecting unit
351 audio feature amount extracting unit
352 audio maximum likelihood state sequence estimating unit
353 object model selecting unit
354 object feature amount extracting unit
355 object maximum likelihood state sequence estimating unit
371 initial scrapbook generating unit
372 initial scrapbook storage unit
373 registered scrapbook generating unit
374 registered scrapbook storage unit
375 playback control unit
411 image model selecting unit
412 image feature amount extracting unit
413 image maximum likelihood state sequence estimating unit
414 image-state-enabled image information generating unit
415 distance between image states calculating unit
416 image coordinates calculating unit
417 image map drawing unit
418 display control unit
419 state selecting unit
420 selected state registration unit
421 audio model selecting unit
422 audio feature amount extracting unit
423 audio maximum likelihood state sequence estimating unit
424 audio-state-enabled image information generating unit
425 distance between audio states calculating unit
426 audio coordinates calculating unit
427 audio map drawing unit
428 object model selecting unit
429 object feature amount extracting unit
430 object maximum likelihood state sequence estimating unit
431 object-state-enabled image information generating unit
432 distance between object states calculating unit
433 object coordinates calculating unit
434 object map drawing unit
501 image model selecting unit
502 image feature amount extracting unit
503 image maximum likelihood state sequence estimating unit
504 frame extracting unit
505 frame registration unit
506 audio model selecting unit
507 audio feature amount extracting unit
508 audio maximum likelihood state sequence estimating unit
509 object model selecting unit
510 object feature amount extracting unit
511 object maximum likelihood state sequence estimating unit
601 contents storage device
602 display control device
603 display device
611 clustering unit
612 scene classifying unit
613 thumbnail creating unit
614 display control unit
615 operating unit
616 control unit
621 clustering model learning unit
622 clustering model storage unit
623 clustering model selecting unit
624 feature amount extracting unit
625 cluster determining unit
631 playback window
632 cluster window
641 playback window
642 through 644 cluster window
645 thumbnail window
651 playback window
652 thumbnail image group
1001 bus
1002 CPU
1003 ROM
1004 RAM
1005 hard disk
1006 output unit
1007 input unit
1008 communication unit
1009 drive
1010 input/output interface
1011 removable recording medium

The invention claimed is:

1. A display control device comprising:
clustering means configured to subject each frame of a content to clustering into any of a plurality of clusters;
scene classifying means configured to classify, regarding each of said plurality of clusters, a frame belonging to said each of said plurality of clusters into a scene that is a group of one or more frames that temporally continue;
thumbnail creating means configured to create a thumbnail of said scene; and
display control means configured to display the thumbnail of said scene on a display device configured to display an image,
wherein said clustering means use a state transition model including a state and state transition to subject a frame of said content to clustering into a cluster corresponding to said state,
wherein said display control means generate a model map that is a two-dimensional map where states are disposed so that the states of which the state transition can mutually be performed approximate to each other, and perform display control of 2D map display for disposing and displaying, in the position of each state of said model map, the thumbnail of said scene including a frame belonging to a cluster corresponding to the state thereof, and
wherein said display control means obtain distance between states from one state to another state of said state transition model based on state transition probability of state transition from said one state to said another state, obtain state coordinates that are the coordinates of the positions of said states on said model map so that difference between Euclidean distance from said one state to said another state is small, and generate said model map where said states that correspond to each other are disposed in the positions of said state coordinates.

2. The display control device according to claim 1, further comprising:
control means configured to control playback of said content;

wherein said display control means display a playback object frame that is a frame to be played, in the position of a state corresponding to a cluster to which said playback object frame belongs, of said model map.

3. The display control device according to claim 2, wherein said control means play, based on instruction input for instructing a state on said model map, said content with a frame belonging to a cluster corresponding to a state instructed by said instruction input as said playback object frame.

4. The display control device according to claim 1, wherein said display control means obtain said state coordinates so as to minimize a Sammon Map error function in proportional to statistical error between said Euclidean distance and said distance between states, and perform calculation of said error function by setting Euclidean distance from said one state to said another state to distance equal to said distance between states from said one state to said another state, in the event that Euclidean distance from said one state to said another state is greater than a predetermined threshold.

5. The display control device according to claim 1, wherein said display control means perform display control of state display for disposing and displaying the thumbnail of a scene including a frame belonging to the corresponding cluster in a rectangular cluster region obtained by sectioning a display screen of said display device in accordance with a cluster corresponding to the state of said state transition model.

6. The display control device according to claim 5, further comprising:
control means configured to play, based on instruction input for instructing said cluster region, said content with a frame belonging to a cluster corresponding to a cluster region instructed by said instruction input as a playback object frame that is a frame to be played.

7. The display control device according to claim 1, further comprising:
control means configured to control playback of said content;
wherein said display control means perform display control of two-pane display for displaying the thumbnail of a scene including a playback object frame that is a frame to be played, and a frame belonging to a cluster to which said playback object frame belongs.

8. The display control device according to claim 7, wherein said control means play, based on instruction input for instructing said thumbnail, said content with a frame of a scene that the thumbnail instructed by said instruction input represents, as said playback object frame.

9. The display control device according to claim 1, further comprising:
control means configured to control playback of said content;
wherein said display control means perform 5-pane display for displaying a playback object frame that is a frame to be played, the thumbnail of a scene including a frame belonging to a cluster to which said playback object frame belongs, the thumbnail of a scene including a frame belonging to a cluster to which a frame of a scene immediately after a scene including said playback object frame belongs, the thumbnail of a scene including a frame belonging to a cluster to which a frame of a scene immediately before a scene including said playback object frame belongs, and the thumbnails of all the scenes of said content.

10. The display control device according to claim 9, wherein said control means play, based on instruction input for instructing said thumbnail, said content with a frame of a scene that a thumbnail instructed by said instruction input represents, as said playback object frame.

11. The display control device according to claim 1, further comprising:
control means configured to control playback of said content;
wherein said display control means perform display control of time sequence display for displaying a playback object frame that is a frame to be played, and also display the thumbnail of a scene including said playback object frame, the thumbnails of one or more scenes after a scene including said playback object frame, and the thumbnails of one or more scenes before a scene including said playback object frame by arraying in the time sequence.

12. The display control device according to claim 11, wherein said control means play, based on instruction input for instructing said thumbnail, said content with a frame of a scene that a thumbnail instructed by said instruction input represents, as said playback object frame.

13. The display control device according to claim 1, wherein said display control means perform display control of flat display for displaying the thumbnails of all the scenes of said content by arraying in the time sequence.

14. The display control device according to claim 13, further comprising:
control means configured to control playback of said content;
wherein said display control means display a playback object frame that is a frame to be played in the position of a thumbnail of a scene including said playback object frame.

15. The display control device according to claim 14, wherein said control means play, based on instruction input for instructing said thumbnail, said content with a frame of a scene that a thumbnail instructed by said instruction input represents, as said playback object frame.

16. A display control method comprising the steps of, with a display control device:
subjecting each frame of a content to clustering into any of a plurality of clusters;
sectioning, regarding each of said plurality of clusters, a frame belonging to said cluster into a scene that is a group of one or more frames that temporally continue;
creating the thumbnail of said scene;
displaying the thumbnail of said scene on a display device for displaying an image;
using a state transition model including a state and state transition to subject a frame of said content to clustering into a cluster corresponding to said state;
generating a model map that is a two-dimensional map where states are disposed so that the states of which the state transition can mutually be performed approximate to each other, and performing display control of 2D map display for disposing and displaying, in the position of each state of said model map, the thumbnail of said scene including a frame belonging to a cluster corresponding to the state thereof; and
obtaining distance between states from one state to another state of said state transition model based on state transition probability of state transition from said one state to said another state, obtaining state coordinates that are the coordinates of the positions of said states on said model map so that difference between Euclidean distance from said one state to said another state is small, and generating said model map where said states that correspond to each other are disposed in the positions of said state coordinates.

17. A nontransitory computer-readable medium encoded with a computer program, which when executed by a computer, causes the computer to serve as:

clustering means configured to subject each frame of a content to clustering into any cluster of a plurality of clusters;

scene classifying means configured to section, regarding each of said plurality of clusters, a frame belonging to said cluster into a scene that is a group of one or more frames that temporally continue;

thumbnail creating means configured to create the thumbnail of said scene; and display control means configured to display the thumbnail of said scene on a display device configured to display an image, wherein said clustering means use a state transition model including a state and state transition to subject a frame of said content to clustering into a cluster corresponding to said state, wherein said display control means generate a model map that is a two-dimensional map where states are disposed so that the states of which the state transition can mutually be performed approximate to each other, and perform display control of 2D map display for disposing and displaying, in the position of each state of said model map, the thumbnail of said scene including a frame belonging to a cluster corresponding to the state thereof, and wherein said display control means obtain distance between states from one state to another state of said state transition model based on state transition probability of state transition from said one state to said another state, obtain state coordinates that are the coordinates of the positions of said states on said model map so that difference between Euclidean distance from said one state to said another state is small, and generate said model map where said states that correspond to each other are disposed in the positions of said state coordinates.

* * * * *